(12) United States Patent
Okazawa et al.

(10) Patent No.: US 7,237,247 B2
(45) Date of Patent: Jun. 26, 2007

(54) DISC CARTRIDGE HAVING DEEPER CONCAVE PORTION CONTINUOUS WITH SHUTTER OPENER/CLOSER GROOVE

(75) Inventors: Hironori Okazawa, Katano (JP); Teruyuki Takizawa, Neyagawa (JP); Yoshito Saji, Nishinomiya (JP); Kuniko Nakata, Neyagawa (JP); Manabu Obata, Tokyo (JP); Naoki Inoue, Tokyo (JP); Mitsunori Matsumura, Tokyo (JP)

(73) Assignees: Matsushita Electric Industrial Co., Ltd., Osaka (JP); Sony Corporation, Tokyo (JP)

( * ) Notice: Subject to any disclaimer, the term of this patent is extended or adjusted under 35 U.S.C. 154(b) by 411 days.

(21) Appl. No.: 10/486,745

(22) PCT Filed: Feb. 25, 2003

(86) PCT No.: PCT/JP03/02092

§ 371 (c)(1),
(2), (4) Date: Feb. 17, 2004

(87) PCT Pub. No.: WO03/077252

PCT Pub. Date: Sep. 18, 2003

(65) Prior Publication Data

US 2005/0018333 A1  Jan. 27, 2005

(30) Foreign Application Priority Data

Mar. 8, 2002 (JP) ............................. 2002-063679
Jul. 12, 2002 (JP) ............................. 2002-204152
Aug. 29, 2002 (JP) ............................. 2002-251629

(51) Int. Cl.
*G11B 23/03* (2006.01)
*G11B 19/04* (2006.01)

(52) U.S. Cl. ...................................... 720/739; 360/133
(58) Field of Classification Search ................ 360/133, 360/60; 720/738–744, 729; 369/291.1
See application file for complete search history.

(56) References Cited

U.S. PATENT DOCUMENTS 4,773,056 A    9/1988  Ito (Continued)

FOREIGN PATENT DOCUMENTS

EP    0 332 214 A2    9/1989

(Continued)

OTHER PUBLICATIONS

Saji et al., "Disc Cartridge", filed Aug. 26, 2003, U.S. Appl. No. 10/469,062.

*Primary Examiner*—Craig A. Renner
(74) *Attorney, Agent, or Firm*—Akin Gump Strauss Hauer & Feld LLP

(57) ABSTRACT

A disc cartridge includes a cartridge body, a first shutter, a second shutter, and a rotational member. The cartridge body includes a disc storage portion, a chucking opening and a head opening. The disc storage portion has a disc window and a bottom and stores a disc, having first and second sides, therein so that the disc is rotatable in the disc storage portion and that the disc exposes the first side inside the disc window. The first and second shutters are provided on the bottom of the disc storage portion to expose or cover the head opening. The rotational member is provided over the first and second shutters inside the disc storage portion and is engaged with the first and second shutters in such a manner as to open or close the first and second shutters when rotates inside the disc storage portion.

4 Claims, 77 Drawing Sheets

U.S. PATENT DOCUMENTS

| | | |
|---|---|---|
| 4,773,061 A | 9/1988 | Stark et al. |
| 4,829,504 A | 5/1989 | Sunaga et al. |
| 4,862,448 A | 8/1989 | Tanaka et al. |
| 5,048,008 A * | 9/1991 | Haruna ................ 720/738 |
| 5,499,233 A | 3/1996 | Childers et al. |
| 5,526,342 A * | 6/1996 | Akiyama et al. ........... 360/133 |
| 5,991,261 A * | 11/1999 | Maeda et al. ............... 360/133 |
| 6,125,011 A * | 9/2000 | Ikebe et al. ................. 360/133 |
| 6,172,962 B1 | 1/2001 | Goto et al. |
| 6,339,583 B1 | 1/2002 | Watanabe et al. |
| 6,370,108 B1 * | 4/2002 | Ikebe et al. ................. 360/133 |
| 2001/0010609 A1 | 8/2001 | Uwabo et al. |
| 2001/0055270 A1 | 12/2001 | Obata et al. |
| 2002/0071375 A1 | 6/2002 | Takahashi et al. |
| 2003/0053409 A1 | 3/2003 | Okazawa et al. |
| 2003/0112738 A1 | 6/2003 | Takizawa et al. |
| 2003/0112739 A1 | 6/2003 | Takizawa et al. |
| 2003/0112740 A1 | 6/2003 | Takizawa et al. |
| 2003/0112741 A1 | 6/2003 | Takizawa et al. |
| 2003/0117939 A1 | 6/2003 | Takizawa et al. |

FOREIGN PATENT DOCUMENTS

| | | |
|---|---|---|
| EP | 0 366 452 A2 | 5/1990 |
| EP | 0 866 458 A1 | 9/1998 |
| EP | 0 973 161 A2 | 1/2000 |
| EP | 0 973 163 A2 | 1/2000 |
| EP | 1 156 488 A2 | 11/2001 |
| EP | 1 274 082 A2 | 1/2003 |
| GB | 2 326 515 A | 12/1998 |
| JP | 61-104381 A | 5/1986 |
| JP | 04-067486 A | 3/1992 |
| JP | 09-153264 A | 6/1997 |
| JP | 10-031856 A | 2/1998 |
| JP | 11-238335 A | 8/1999 |
| JP | 11-339424 A | 12/1999 |
| JP | 2000-048520 A | 2/2000 |
| JP | 2000-090628 A | 3/2000 |
| JP | 2000-113630 A | 4/2000 |
| JP | 2001-283558 A | 10/2001 |
| WO | WO 99/26242 A1 | 5/1999 |
| WO | WO 02/056313 A1 | 7/2002 |
| WO | WO 03/041075 A1 | 5/2003 |
| WO | WO 03/041076 A1 | 5/2003 |

* cited by examiner

DISC CARTRIDGE HAVING DEEPER CONCAVE PORTION CONTINUOUS WITH SHUTTER OPENER/CLOSER GROOVE

CROSS-REFERENCE TO RELATED APPLICATIONS

This application is a Section 371 of International Application No. PCT/JP03/02092, filed Feb. 25, 2003 which was published in the English language on Sep. 18, 2003, under International Publication No. WO 03/077252 A2, the disclosure of which is incorporated herein by reference.

TECHNICAL FIELD

The present invention relates to a disc cartridge for use to store a disk storage medium such as an optical disc or a magnetic disk therein in a rotatable state.

BACKGROUND ART

Various disc cartridges have been proposed as protective cases for disk storage media.

For example, Japanese Laid-Open Publication No. 9-153264 discloses a disc cartridge in which a disk storage medium having a single or double signal recording sides (which will be herein referred to as a "disc" simply) is completely enclosed in a disc storage portion. The disc storage portion is defined inside a cartridge body that is made up of upper and lower halves. The cartridge body includes chucking openings and a head opening. The chucking openings allow the turntable of a spindle motor and a damper to chuck a disc inserted, while the head opening allows a read/write head to read and/or write a signal from/on the disc. The lower one of the chucking openings is continuous with the head opening. Accordingly, while the user carries such a cartridge, dust easily enters the inside of the cartridge through these openings and the disc is also easily soiled with finger marks. For that reason, the disc cartridge further includes a shutter for closing these openings up.

A disc cartridge having such a structure, however, has the following drawbacks. Firstly, such a disc cartridge cannot be so thin. This is because the disc storage space, defined between the upper and lower halves, should be thick enough to allow a disc drive to accurately read or write a signal (or information) from/onto the disc stored in such a disc cartridge. The reasons why the disc storage space should be relatively thick include the expected flutter or warp of the disc being rotated and an error that may occur in disposing the disc cartridge at a predetermined position inside the disc drive.

Secondly, the shutter for closing up these chucking and head openings at the same time cannot be formed at a low cost, thus increasing the overall manufacturing cost of such a disc cartridge. The reason is as follows. Specifically, the lower half of the disc cartridge is provided with a chucking opening for the turntable of the spindle motor and a head opening, while the upper half thereof is provided with another chucking opening for the clamper. Thus, to close these three openings up at a time, the shutter needs to be formed in a U-shape, which is not so cheap to make.

Thirdly, the disc stored inside such a disc cartridge is not fixed in many cases, thus possibly causing dust or fine particle deposition and scratching problems. Specifically, although a disc with a metal hub can be attracted and fixed in position via a magnetic force so as not to move inconstantly, an optical disc with no hub, e.g., a CD or a DVD, is normally not fixed, and movable freely, inside the disc cartridge. Accordingly, when the shutter of the disc cartridge is opened inside the disc drive, dust may enter the cartridge through its openings and be deposited on the disc easily. Also, if the disc is shaken so much as to contact with the inner walls of the disc cartridge, the signal recording side of the disc may get scratched or fine particles may be stirred up and deposited on the disc.

DISCLOSURE OF INVENTION

In order to overcome the problems described above, an object of the present invention is to provide a disc cartridge that has a reduced thickness and a simplified, much less expensive shutter for a single-sided disc, in particular.

Another object of the present invention is to provide a disc cartridge that can drastically reduce the dust to be deposited on the disc stored therein by getting the disc firmly held inside the disc cartridge and eliminating the inconstant movement of the disc.

A third object of the present invention is to provide a disc cartridge of a good design by displaying the label side of the disc stored therein.

A disc cartridge according to a preferred embodiment of the present invention includes a cartridge body, first and second shutters and a rotational member. The cartridge body includes a disc storage portion, a chucking opening and a head opening. The disc storage portion has a disc window and a bottom and stores a disc, having first and second sides, therein so that the disc is rotatable in the disc storage portion and that the disc exposes the first side inside the disc window. The chucking opening is provided on the bottom of the disc storage portion so as to get the disc chucked externally. The head opening is also provided on the bottom of the disc storage portion so as to allow a head, which reads and/or writes a signal from/on the second side of the disc, to access the second side of the disc. The first and second shutters are provided on the bottom of the disc storage portion to expose or cover the head opening. The rotational member is provided over the first and second shutters inside the disc storage portion and is engaged with the first and second shutters in such a manner as to open or close the first and second shutters when rotates inside the disc storage portion.

In one preferred embodiment of the present invention, the center of rotation of the rotational member preferably substantially matches with the center of the disc that is stored in the disc storage portion.

In this particular preferred embodiment, the rotational member preferably includes: a disc supporting portion for supporting an outer edge of the second side of the disc thereon; and a notch provided for the disc supporting portion. The notch is preferably located inside the head opening while the first and second shutters are opened.

Specifically, while the first and second shutters are closed, the disc supporting portion preferably contacts with the outer edge of the second side of the disc.

In yet another preferred embodiment, the first and second shutters preferably each include a notch so as to define a hole in a region corresponding to a center hole of the disc while the first and second shutters are closed.

In this particular preferred embodiment, the first and second shutters preferably include first and second convex portions around the notches of the first and second shutters, respectively.

Specifically, the upper surface of the disc supporting portion of the rotational member and the upper surface of the first and second convex portions of the first and second shutters are preferably located at substantially the same vertical levels.

More particularly, the first and second shutters preferably respectively include first and second protrusions that protrude into the center hole of the disc while the first and second shutters are closed.

In that case, the upper surface of the first and second protrusions of the first and second shutters is preferably located at a vertical level higher than the upper surface of the first and second convex portions thereof.

In yet another preferred embodiment, the first and second shutters preferably have their shafts under the disc supporting portion of the rotational member.

In this particular preferred embodiment, the disc supporting portion of the rotational member preferably includes first and second protrusions that protrude toward the bottom of the disc storage portion, and the first and second shutters preferably include first and second guide grooves that respectively engage with the first and second protrusions of the rotational member.

In yet another preferred embodiment, the rotational member preferably has a sidewall that covers the outer side surface of the disc, and a first opener/closer is preferably provided for the sidewall.

In this particular preferred embodiment, the head opening preferably reaches a first side surface of the cartridge body. The cartridge body preferably has an opening on a second side surface thereof that is adjacent to the first side surface. The first opener/closer is preferably located inside the opening of the second side surface.

In that case, at least one of the first and second shutters preferably includes a second opener/closer that protrudes from the head opening.

In yet another preferred embodiment, the first and second shutters preferably include a number of disc holders. The disc holders preferably contact with an outer edge and a surrounding portion of the disc and preferably hold the disc thereon while the first and second shutters are closed.

In that case, each of the disc holders preferably has a downwardly tapered slope.

A disc cartridge according to another preferred embodiment of the present invention includes a cartridge body, first and second shutters and a rotational member. The cartridge body includes a disc storage portion, a chucking opening and a head opening. The disc storage portion has a disc window and a bottom and stores a disc, having first and second sides, therein so that the disc is rotatable in the disc storage portion and that the disc exposes the first side inside the disc window. The chucking opening is provided on the bottom of the disc storage portion so as to get the disc chucked externally. The head opening is also provided on the bottom of the disc storage portion so as to allow a head, which reads and/or writes a signal from/on the second side of the disc, to access the second side of the disc. The first and second shutters are provided on the bottom of the disc storage portion to expose or cover the head opening. The rotational member is provided over the first and second shutters inside the disc storage portion and rotates as the first and second shutters are opened or closed. The rotational member includes: a disc supporting portion for supporting an outer edge of the second side of the disc thereon while the first and second shutters are closed; and a notch provided for the disc supporting portion. The notch is located inside the head opening while the first and second shutters are opened.

In one preferred embodiment of the present invention, the disc cartridge preferably further includes a shielding member. The shielding member is preferably located inside the notch of the disc supporting portion while the first and second shutters are closed and preferably swings in a radial direction of the disc.

In this particular preferred embodiment, the shielding member preferably contacts with the outer edge of the disc while the first and second shutters are closed.

Specifically, the shielding member preferably has a shaft that is located over the first side of the disc and that is parallel to a tangent line defined with respect to the disc.

More specifically, the shielding member preferably swings as the rotational member rotates.

Even more specifically, the rotational member preferably includes a sidewall that covers the outer side surface of the disc, and the shaft of the shielding member is preferably located between an upper shell of the cartridge body and the rotational member.

In yet another preferred embodiment, the disc storage portion preferably includes a sidewall along an outer periphery of the bottom. One of the first and second shutters preferably includes a disc holder for applying an elastic force to the disc and holding the disc thereon in such a manner that the outer edge of the disc contacts with the sidewall of the disc storage portion inside the notch of the rotational member while the first and second shutters are closed.

A disc cartridge according to another preferred embodiment of the present invention includes a cartridge body and at least one disc stopper. The cartridge body includes a disc storage portion, a chucking opening and a head opening. The disc storage portion has a disc window and a bottom and stores a disc, having first and second sides, therein so that the disc is rotatable in the disc storage portion and that the disc exposes the first side inside the disc window. The chucking opening is provided on the bottom of the disc storage portion so as to get the disc chucked externally. The head opening is also provided on the bottom of the disc storage portion so as to allow a head, which reads and/or writes a signal from/on the second side of the disc, to access the second side of the disc. The at least one disc stopper is provided for the cartridge body so as to protrude into the disc window and thereby prevent the disc from dropping through the disc window. The radius $R1$ of the disc and the radius $R2$ of a smallest circular opening, of which the center matches with the center of the disc window and which is in contact with the disc stopper, preferably satisfy $14/15 \leq R2/R1$.

In one preferred embodiment of the present invention, the radii $R1$ and $R2$ preferably satisfy $14/15 \leq R2/R1 < 1$.

In another preferred embodiment, the disc cartridge preferably further includes another disc stopper, and the two disc stoppers are preferably arranged symmetrically with respect to the center of the disc window.

A disc cartridge according to another preferred embodiment of the present invention includes a cartridge body and a type recognizing region. The cartridge body includes a disc storage portion, a chucking opening and a head opening. The disc storage portion has a disc window and a bottom and stores a disc, having first and second sides, therein so that the disc is rotatable in the disc storage portion and that the disc exposes the first side inside the disc window. The chucking opening is provided on the bottom of the disc storage portion so as to get the disc chucked externally. The head opening is also provided on the bottom of the disc storage portion so as to allow a head, which reads and/or writes a signal from/on the second side of the disc, to access the second side of the disc. The type recognizing region is provided for the cartridge body to recognize the type of the disc stored in the disc cartridge. The presence and absence of a concave portion in/from the type recognizing region represent two possible types of the disc stored in the disc cartridge.

In one preferred embodiment of the present invention, the cartridge body includes a positioning hole, which is engageable with a positioning pin of a disc drive, and the type recognizing region is provided near the positioning hole.

In another preferred embodiment, one of the two possible types of the disc to be stored in the disc cartridge has a single signal recording layer, while the other type of the disc has double signal recording layers. If the disc stored in the disc cartridge has a single signal recording layer, then the concave portion is absent from the type recognizing region. If the disc stored in the disc cartridge has double signal recording layers, then the concave portion is present in the type recognizing region.

A disc cartridge according to another preferred embodiment of the present invention includes a cartridge body, a first shutter, a second shutter, a groove, an opener/closer, a first concave portion and a second concave portion. The cartridge body includes a disc storage portion, a chucking opening and a head opening. The disc storage portion has a disc window and a bottom and stores a disc, having first and second sides, therein so that the disc is rotatable in the disc storage portion and that the disc exposes the first side inside the disc window. The chucking opening is provided on the bottom of the disc storage portion so as to get the disc chucked externally. The head opening is also provided on the bottom of the disc storage portion so as to allow a head, which reads and/or writes a signal from/on the second side of the disc, to access the second side of the disc. The first and second shutters are provided on the bottom of the disc storage portion to expose or cover the head opening. The groove is provided on, and extends along, a first side surface of the cartridge body. The opener/closer protrudes through the bottom of the groove and moves along the groove, thereby opening or closing the first and second shutters. The first concave portion is provided on the first side surface of the cartridge body. The second concave portion is provided on a second side surface of the cartridge body. The second side surface is opposed to the first side surface. The first concave portion is continuous with the groove on the first side surface and has a bottom that is deeper than the bottom of the groove. The bottom of the first concave portion and the bottom of the groove are connected together by a sloped surface that defines a predetermined angle with the bottom of the first concave portion.

In one preferred embodiment of the present invention, the first concave portion passes through the back surface of the cartridge body but does not reach the upper surface of the cartridge body.

In this particular preferred embodiment, a side surface of the first concave portion, which crosses the bottom of the first concave portion, is located closer to the upper surface of the cartridge body than a side surface of the groove, which crosses the bottom of the groove.

In a specific preferred embodiment, the predetermined angle that is defined by the sloped surface with the bottom of the first concave portion is in the range of about 20 degrees to about 40 degrees.

A disc cartridge according to another preferred embodiment of the present invention includes a cartridge body, a first shutter, a second shutter, and a write-protect mechanism. The cartridge body includes a disc storage portion, a chucking opening and a head opening. The disc storage portion has a disc window and a bottom and stores a disc, having first and second sides, therein so that the disc is rotatable in the disc storage portion and that the disc exposes the first side inside the disc window. The chucking opening is provided on the bottom of the disc storage portion so as to get the disc chucked externally. The head opening is also provided on the bottom of the disc storage portion so as to allow a head, which reads and/or writes a signal from/on the second side of the disc, to access the second side of the disc. The first and second shutters are provided on the bottom of the disc storage portion to expose or cover the head opening. The write-protect mechanism is provided for the cartridge body and includes an elongated hole and a sliding member. The elongated hole is provided on the back surface of the cartridge body and includes a first region and second region. The sliding member has a raised portion protruding through the elongated hole, and is supported such hat the raised portion goes back and forth inside the elongated hole. When the disc cartridge is overlapped with another disc cartridge, which complies with a different set of specifications and which also includes a first region and a second region, such that the center of the disc stored in the former disc cartridge matches with that of the disc stored in the latter disc cartridge and that insert directions of the two disc cartridges are matched with each other, the first region of the another disc cartridge for use to determine whether the disc stored therein is writable or unwritable overlaps with the first region of the disc cartridge almost completely and the second region of the another disc cartridge for use to read information unique to the disc stored therein also overlaps with the second region of the disc cartridge almost completely. The first and second regions of the another disc cartridge are arranged in a direction that is perpendicular to the direction that the front sides of the two disc cartridges face. A direction in which the elongated hole extends intersects with the direction in which the first and second regions of the another disc cartridge are arranged. The sliding member goes back and forth inside the elongated hole such that the first region of the elongated hole is selectively opened or closed.

In one preferred embodiment of the present invention, the cartridge body includes a side surface having a portion that is parallel to the elongated hole.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 120 is a plan view illustrating the back surface of a disc cartridge according to a twenty-first specific preferred embodiment of the present invention.

FIG. 121 is a side view of the disc cartridge shown in FIG. 120 as viewed in the direction indicated by the arrow 121.

FIG. 122 is a side view of the disc cartridge shown in FIG. 120 as viewed in the direction indicated by the arrow 122.

FIG. 123 is a perspective view illustrating main members of the disc cartridge shown in FIG. 120.

FIG. 124 is a plan view illustrating the write-protect mechanism and surrounding members of the disc cartridge shown in FIG. 120 on a larger scale.

FIG. 125 is an exploded perspective view of the write-protect mechanism for use in the disc cartridge shown in FIG. 120.

FIG. 126 is a perspective view illustrating a situation where the write-protect mechanism indicates a writable state.

FIG. 127 is a perspective view illustrating a situation where the write-protect mechanism indicates an unwritable state.

BEST MODE FOR CARRYING OUT THE INVENTION

EMBODIMENT 1

Figure 1:
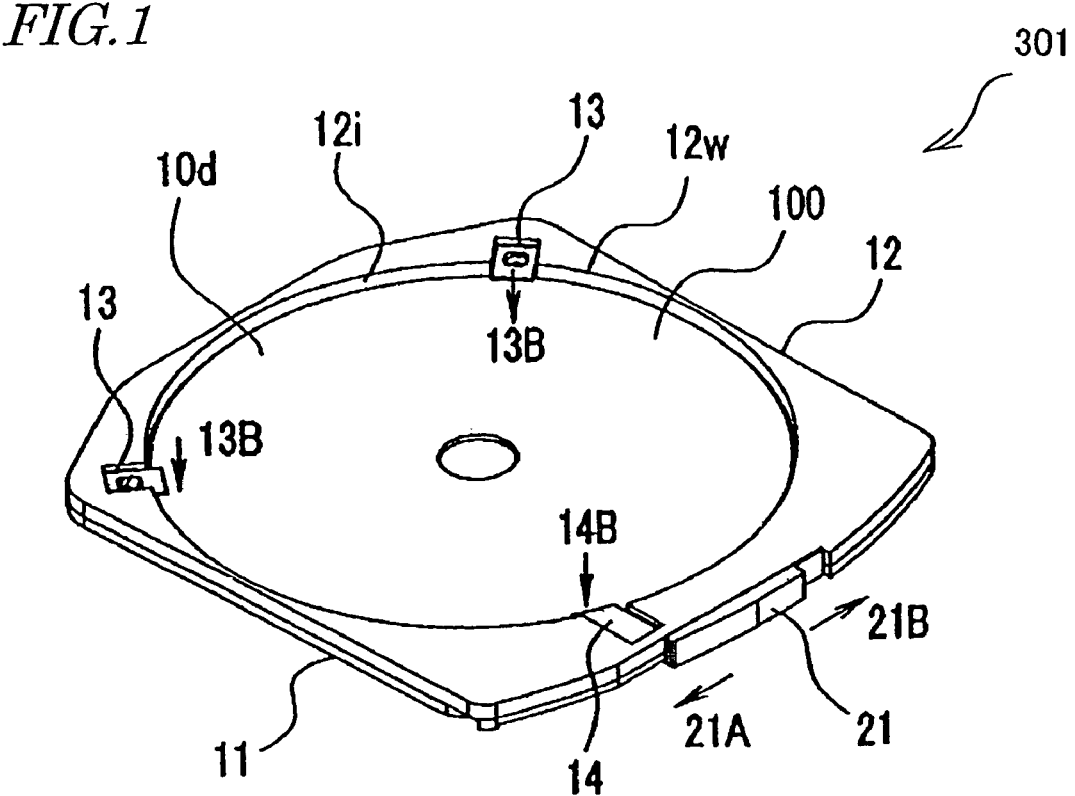
FIG. 1 is a perspective view illustrating an overall configuration for a disc cartridge according to a first specific preferred embodiment of the present invention.
Figure 2:
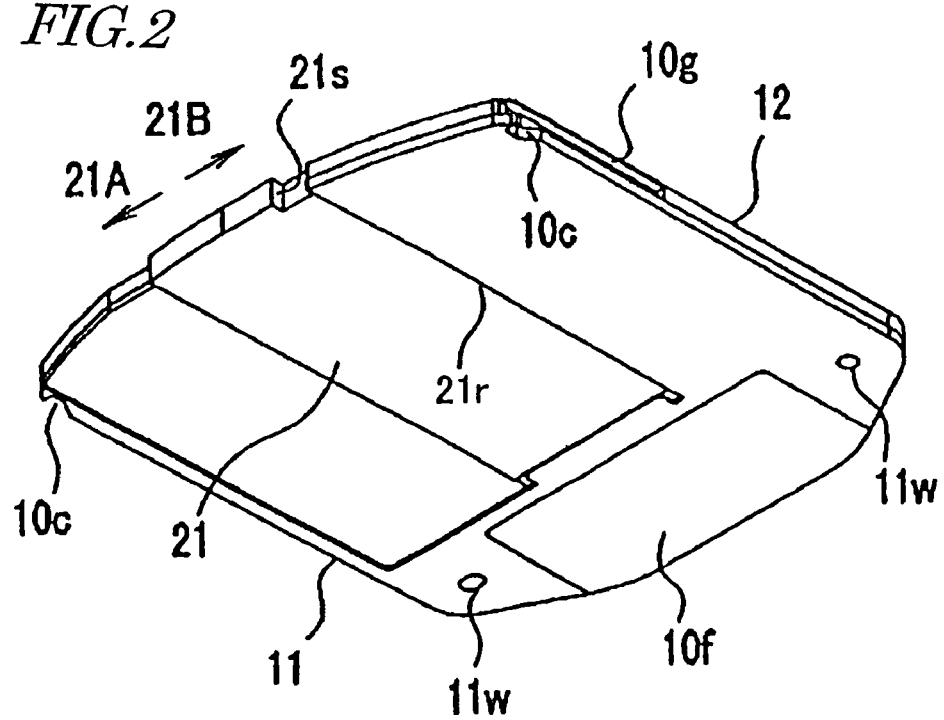
FIG. 2 is a perspective view of the disc cartridge shown in FIG. 1 as viewed from below it.
Figure 3:
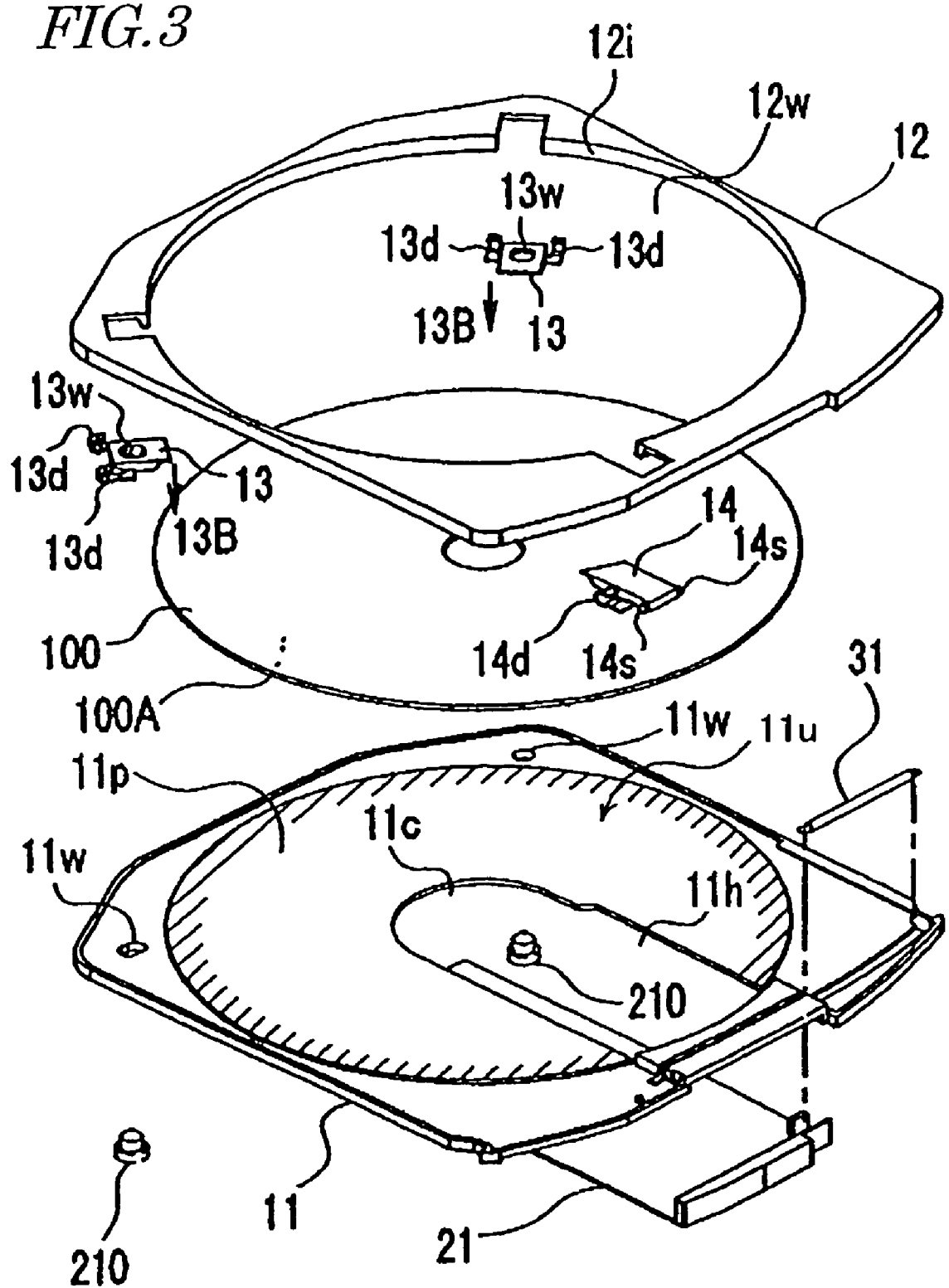
FIG. 3 is an exploded perspective view of the disc cartridge shown in FIG. 1.

Hereinafter, a disc cartridge 301 according to a first specific preferred embodiment of the present invention will be described with reference to FIGS. 1, 2 and 3. FIG. 1 is a perspective view illustrating an overall configuration of the disc cartridge 301, including a disc 100 stored, as viewed from above the cartridge 301. FIG. 2 is a perspective view of the disc cartridge 301 as viewed from below the cartridge 301. FIG. 3 is an exploded perspective view illustrating respective parts of the disc cartridge 301.

The disc 100 includes first and second sides. The first side of the disc 100, on which its label, for example, is normally printed, is illustrated in FIG. 1, while the second side thereof, i.e., the signal recording side 100A, is illustrated as the backside in FIG. 3.

As shown in FIG. 1, the disc cartridge 301 includes a lower shell 11, an upper shell 12, disc holders 13, 14 and a shutter 21.

As shown in FIG. 3, the lower shell 11 includes a chucking opening 11c and a head opening 11h. The chucking opening 11c allows a chucking member (e.g., a spindle motor for rotating the disc 100) to enter the disc cartridge 301 externally. The head opening 11h allows a head, which reads and/or writes a signal from/on the signal recording side 100A of the disc 100, to enter the disc cartridge 301 and access a target location on the disc 100. The lower shell 11 also includes two positioning holes 11w, which engage with cartridge positioning pins 210 of a disc drive (not shown), thereby fixing the disc cartridge 301 in its predetermined position inside the disc drive. The lower shell 11 faces the signal recording side 100A of the disc 100.

The upper shell 12 includes a circular disc window 12w, through which the disc 100 can be introduced and removed into/from the disc cartridge 301 and which expands over the entire projection area of the disc 100 to expose the upper side of the disc 100. The upper and lower shells 12 and 11 are adhered or welded together at their outer periphery, thereby forming a cartridge body 10.

A disc storage portion 10d for storing the disc 100 therein (see FIG. 1) is defined by an inner lower surface 11u and an inner side surface 12i of the cartridge body 10. The inner lower surface 11u is opposed to the signal recording side 100A of the disc 100, while the inner side surface 12i has a substantially cylindrical shape and defines the disc window 12w inside. That is to say, the inner lower surface 11u is the bottom of the disc storage portion 10d. The inner lower surface 11u is covered with a protective layer 11p for the purpose of preventing the signal recording side 100A of the disc 100 from getting scratched or attracting dust.

The protective layer 11p may be appropriately selected from the group consisting of anti-scratching nonwoven fabric, dustproof nonwoven fabric, anti-scratching coating and dustproof coating. In this preferred embodiment, a sheet of a dustproof nonwoven fabric is adhered or ultrasonic welded as the protective layer 11p to the inner lower surface 11u.

In the disc storage portion 10d, a gap, which is wide enough to allow the disc 100 to rotate freely, is provided between the inner side surface 12i and the outer periphery of the disc 100. Also, the top of the disc storage portion 10d is the disc window 12w so that the disc 100 stored in the disc storage portion 10d has one of its sides exposed inside the disc window 12w.

As shown in FIG. 3, the disc cartridge 301 includes two disc holders 13 of the same shape. Each of the disc holders 13 includes a pair of elastic portions 13d and a hole 13w that runs obliquely through the disc holder 13. When the elastic portions 13d of the disc holders 13 are sandwiched between the upper and lower shells 12 and 11, an elastic force is applied to the respective inner ends of the disc holders 13 in the direction indicated by the arrows 13B in FIG. 3. As a result, the disc 100 is pressed against the inner lower surface 11u. Also, these two disc holders 13 are disposed so that the holes 13w thereof are located substantially over the positioning-holes 11w.

The other disc holder 14 includes a shaft 14s and two elastic portions 14d. The disc holder 14 is secured to the cartridge body 10 so as to rotate on the shaft 14s. When the elastic portions 14d of the disc holder 14 are sandwiched between the upper and lower shells 12 and 11, an elastic force is applied to the respective inner ends of the disc holder 14 in the direction indicated by the arrow 14B in FIG. 1. As a result, the disc 100 is pressed against the inner lower surface 11u.

The shutter 21 is externally fitted with the lower shell 11 so as to face the signal recording side 100A of the disc 100. As shown in FIGS. 1 and 2, when the shutter 21 is moved horizontally in the direction indicated by the arrow 21A or 21B, the chucking opening 11c and the head opening 11h are exposed or covered. A shutter spring 31 is extended between the shutter 21 and the cartridge body 10 to apply an elastic force to the shutter 21 in such a direction as to close the shutter 21.

As shown in FIG. 2, a label plane or concave portion 10f, on which the user can note down the contents of the disc 100 stored, is provided on the bottom of the cartridge body 10 (i.e., the lower shell 11). As also shown in FIG. 2, a pair of concave portions 10c, provided on the right- and left-hand sides of the cartridge body 10, may be used as either pull-in notches or positioning recesses when the disc cartridge 301 is pulled in and loaded into a disk drive or when the disc cartridge 301 is stored in a changer. Another concave portion 10g is provided near one of the concave portions 10c. This concave portion 10g has such a shape as to prevent the user from inserting this disc cartridge 301 in a wrong direction. That is to say, this concave portion 10g is just fitted with a convex portion, provided for the disc drive, only when the disc cartridge 301 is inserted in the correct direction. Suppose the user tries to insert the disc cartridge 301 into the disc drive upside down or the wrong way round. In that case, these concave and convex portions are never fitted with each other, thereby preventing the user from inserting this disc cartridge 301 in the wrong way.

Figure 4:
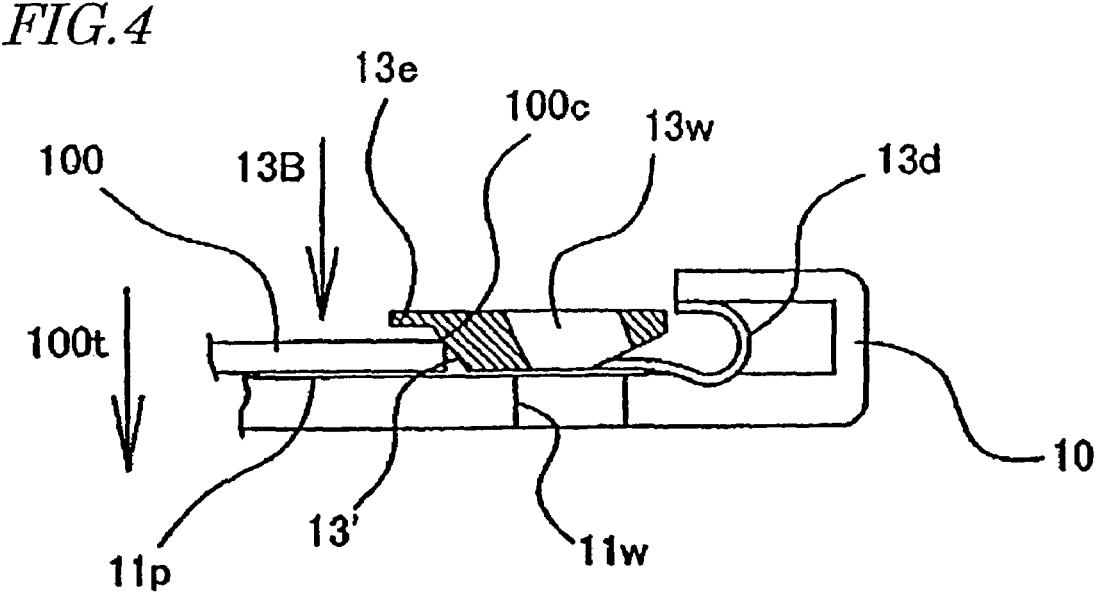
FIG. 4 is a cross-sectional view illustrating a disc older and a surround portion of the disc cartridge shown in FIG. 1.
Figure 5:
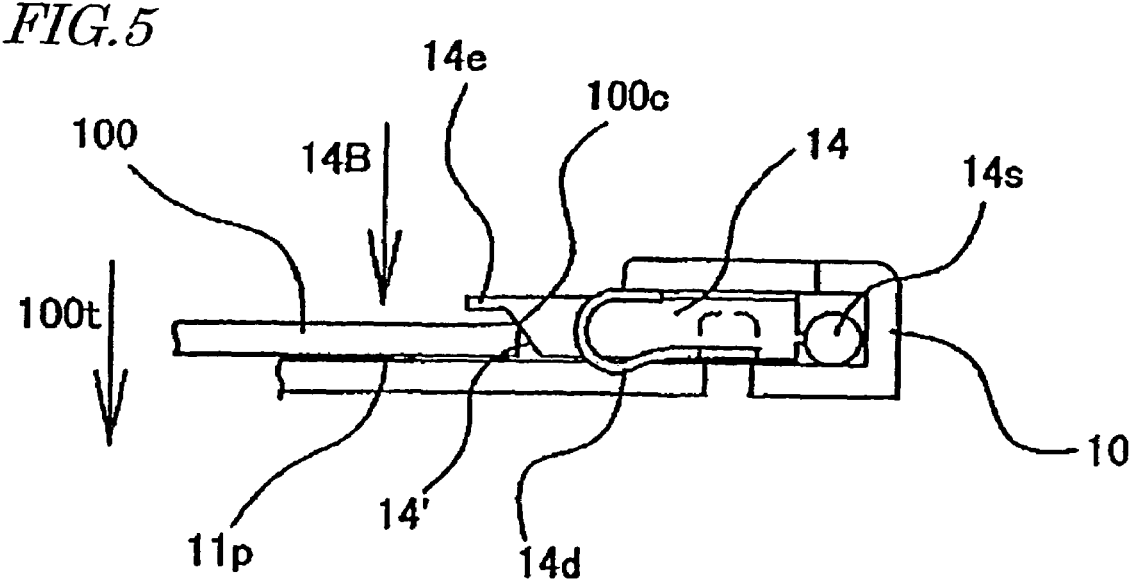
FIG. 5 is a cross-sectional view illustrating another disc holder and a surround portion of the disc cartridge shown in FIG. 1.

Next, it will be described in further detail with reference to FIGS. 4 and 5 how the disc holders 13 and 14 hold the disc 100 thereon. FIG. 4 is a cross-sectional view of the disc holder 13 in a state where the disc 100 has been mounted thereon as shown in FIGS. 1 through 3, while FIG. 5 is a cross-sectional view of the disc holder 14 in the state where the disc 100 has been mounted thereon. FIGS. 3 and 4 are both taken in a disc radial direction.

As shown in FIGS. 4 and 5, the disc holders 13 and 14 include slopes 13' and 14', which are expanded over a portion of the projection area of the disc 100 (i.e., over the outer periphery of the disc 100), at the respective inner ends thereof. As described above, an elastic force is applied from the elastic portions 13d or 14d to the disc holder 13 or 14 in the direction indicated by the arrow 13B or 14B. In that situation, the slope 13' or 14' contacts with the outer edge 100c of the disc 100, thereby gripping the disc 100 thereon and pressing the disc 100 in a thickness direction 100t thereof. As a result, the signal recording side 100A of the disc 100 is brought into tight contact with the sheet 11p. In this manner, the disc 100 is fixed inside the cartridge body 10. In this state, the outer periphery of the signal recording side 100A of the disc 100 keeps a close contact with the sheet 11p. Thus, no dust will be deposited on the signal recording side 100A.

Next, it will be described in detail with reference to FIGS. 6, 7 and 8 how the disc 100 is released from the disc holders 13 and 14.

Figure 6:
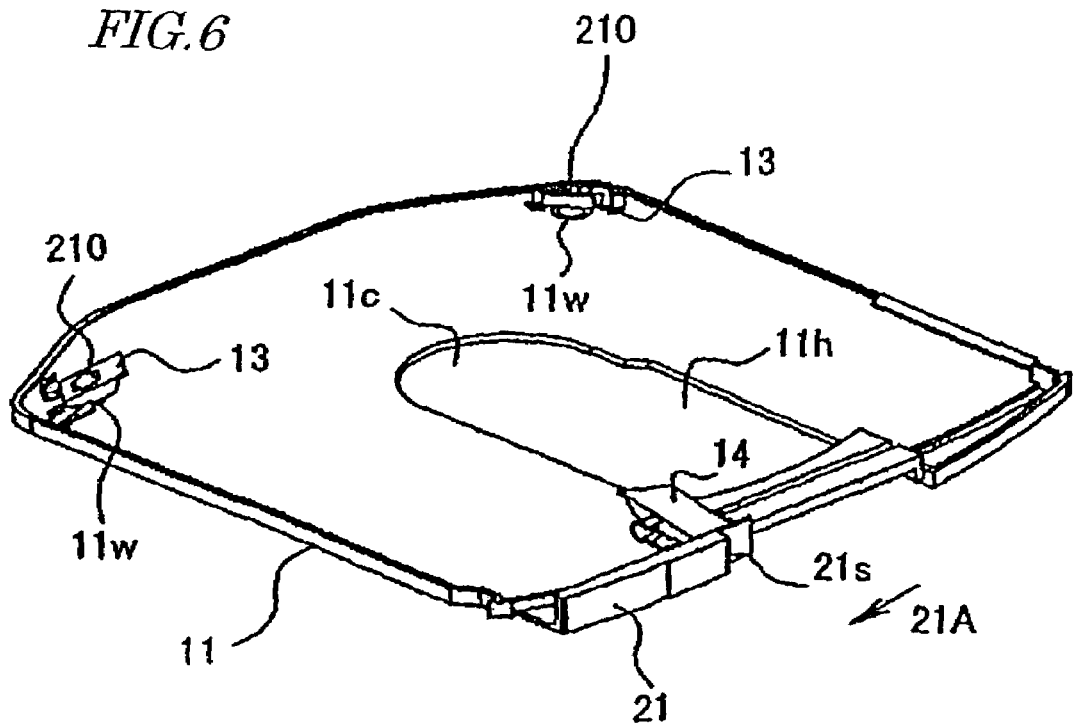
FIG. 6 is a perspective view illustrating a state of the disc cartridge shown in FIG. 1 in which its shutter is opened and positioning pins have been inserted into its positioning holes.

FIG. 6 is a perspective view illustrating the lower shell 11 of the disc cartridge 301 with the upper shell 12 and the disc 100 removed therefrom. As shown in FIG. 6, the shutter 21 has its L-shaped portion 21s pressed by a shutter opening mechanism (not shown) of the disc drive in the direction indicated by the arrow 21A. As a result, the chucking opening 11c and the head opening 11h are now exposed. Also, the cartridge positioning pins 210 of the disc drive are engaged with the positioning holes 11w of the cartridge body 10.

Figure 7:
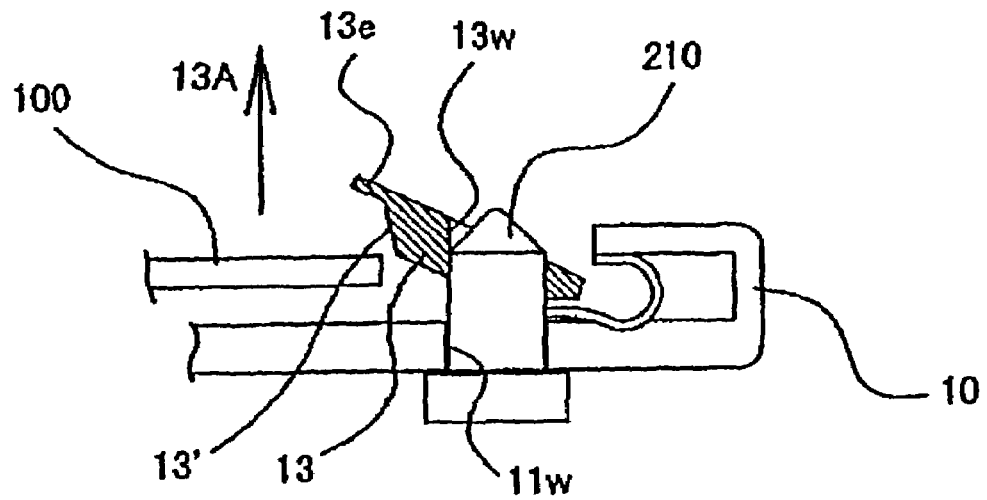
FIG. 7 is a cross-sectional view illustrating a disc holder and a surround portion of the disc cartridge shown in FIG. 6.

FIG. 7 is a cross-sectional view of the disc holder 13 in the state shown in FIG. 6 and is taken in a disc radial direction. FIG. 8 is a perspective view illustrating the disc holder 14 and the shutter 21 in the state shown in FIG. 6 to a larger scale.

As shown in FIG. 7, when the cartridge positioning pin 210 of the disc drive is inserted into the positioning hole 11w of the lower shell 11, the cartridge positioning pin 210 engages with the obliquely running hole 13w of the disc holder 13. As a result, the disc holder 13 is lifted in the direction indicated by the arrow 13A, and the disc 100 is released from the grip of the slope 13' and is now freely rotatable. At this point in time, the rim 13e at the end of the disc holder 13 still hangs over a portion of the projection area of the disc 100 (i.e., the outer periphery thereof).

Accordingly, even if the disc 100 is released in the disc cartridge 301 that has been loaded into a vertically mounted disc drive, the disc 100 will not drop down from the disc cartridge 301.

Figure 8:
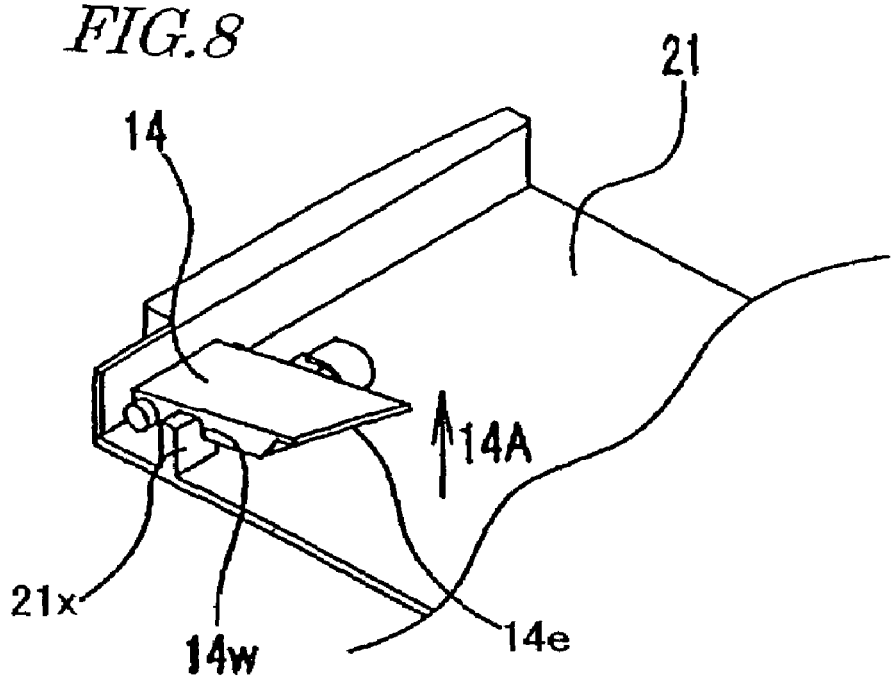
FIG. 8 is a perspective view illustrating another disc holder and a surround portion of the disc cartridge shown in FIG. 6.

On the other hand, when the shutter 21 is opened, a guide rib 21x provided on the shutter 21 enters a concave portion 14w of the disc holder 14, thereby raising the bottom of the concave portion 14w as shown in FIG. 8. As a result, the disc holder 14 is lifted to the direction indicated by the arrow 14A and the disc 100 is released from the grip of the slope 14' and becomes freely rotatable. At this point in time, the rim 14e at the end of the disc holder 14 still hangs over a portion of the projection area of the disc 100 (i.e., the outer periphery thereof). Accordingly, even if the disc 100 is released in the disc cartridge 301 that has been loaded into a vertically mounted disc drive, the disc 100 will not drop down from the disc cartridge 301.

Also, to remove the disc 100 intentionally, the user must release the disc 100 from the three disc holders 13 and 14 at the same time. Accordingly, it is possible to prevent the user from removing the disc 100 accidentally.

In this preferred embodiment, the end 21r of the shutter 21, which is opposed to the signal recording side 100A of the disc 100 when the shutter 21 is closed, may be provided with a brush or a dust cleaner as shown in FIG. 2 so that dust is removed from the signal recording side 100A of the disc 100 every time the shutter 21 is opened and closed. Optionally, the disc cartridge 301 may also include a locking mechanism for locking the disc holders 13 and 14 onto the cartridge body 10 when the disc 100 is mounted thereon.

EMBODIMENT 2

Figure 9:
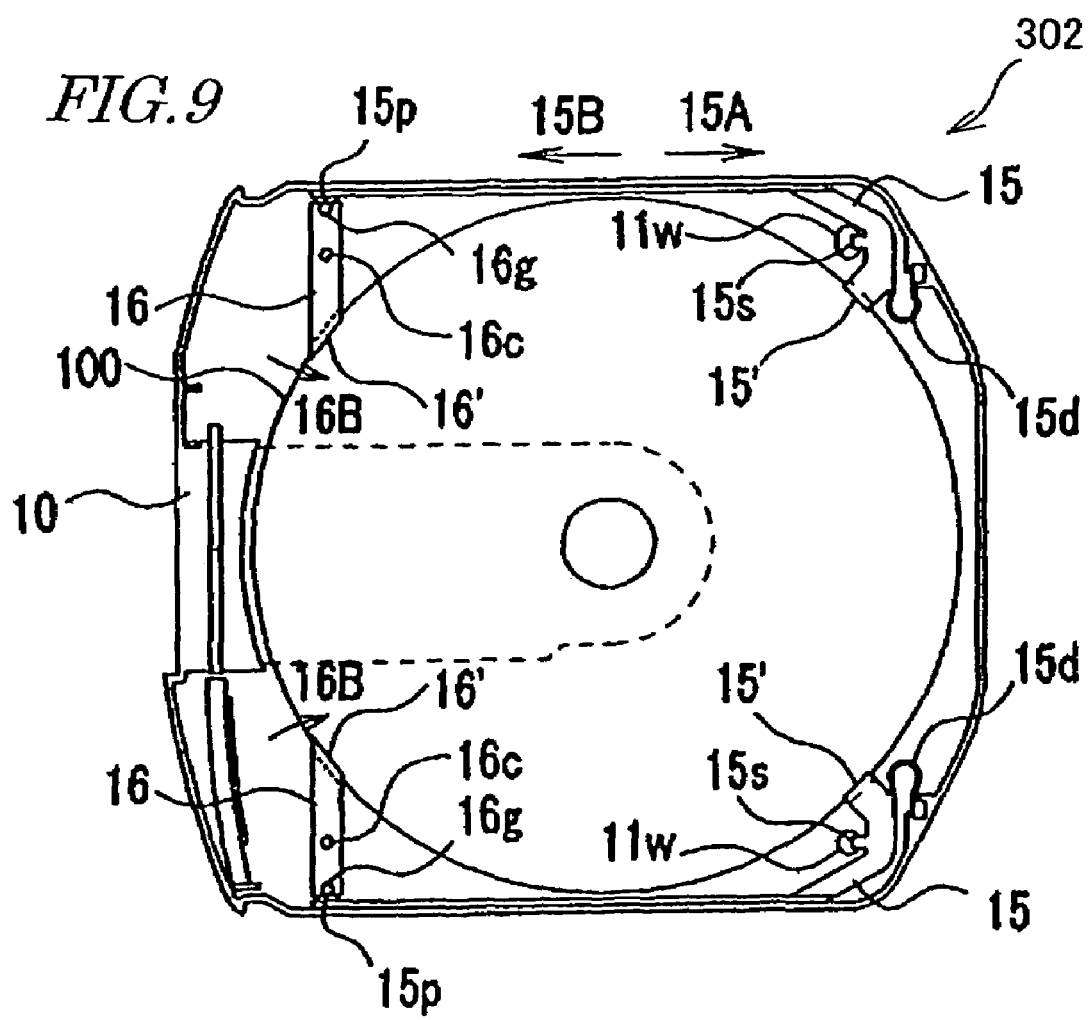
FIG. 9 is a plan view illustrating an overall configuration for a disc cartridge according to a second specific preferred embodiment of the present invention.
Figure 10:
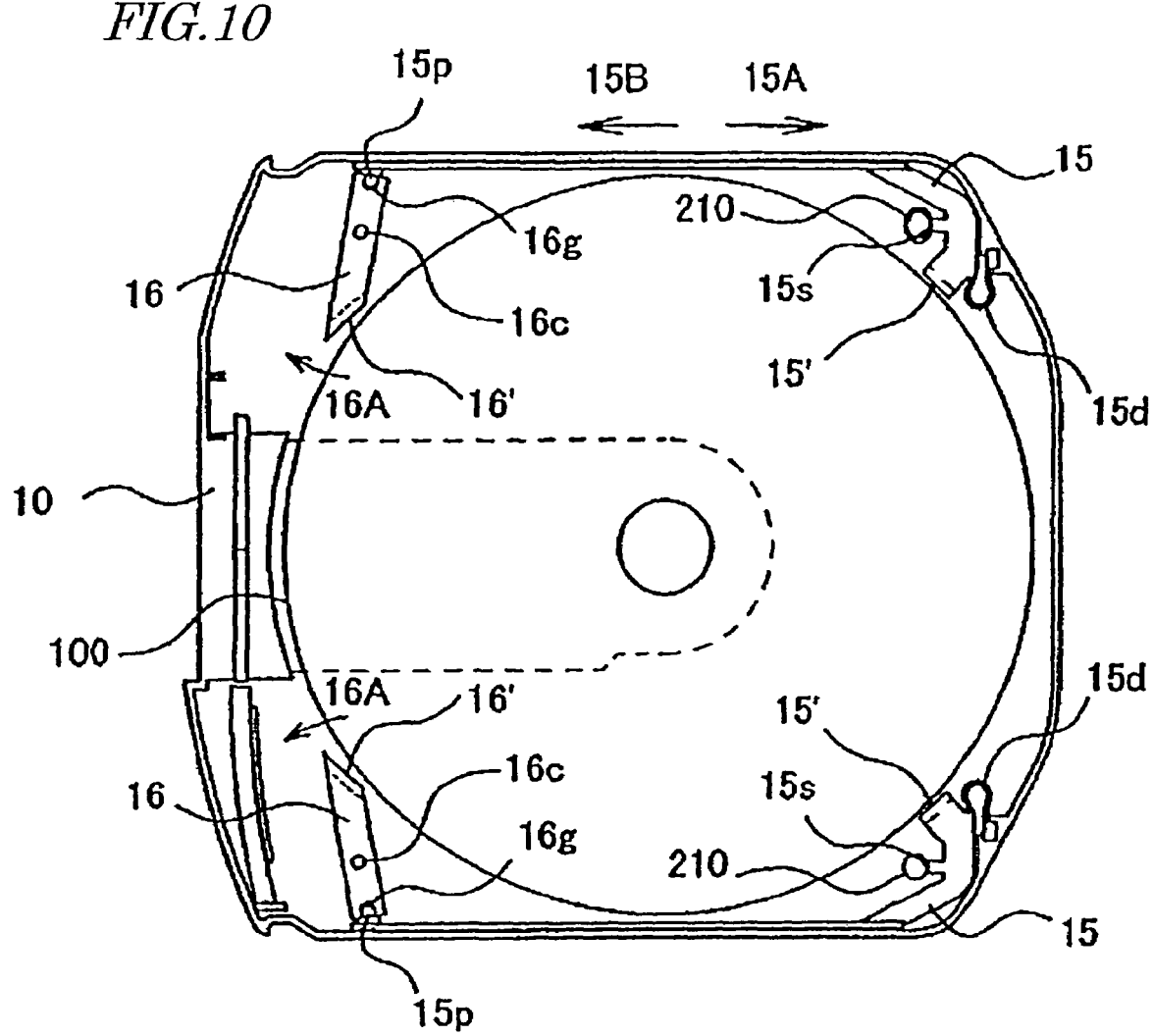
FIG. 10 is a plan view illustrating a state of the disc cartridge shown in FIG. 9 in which the disc has been released from its disc holders.

Hereinafter, a disc cartridge 302 according to a second specific preferred embodiment of the present invention will be described with reference to FIGS. 9 and 10. Specifically, FIG. 9 is plan view illustrating an overall configuration for the disc cartridge 302 in which the disc 100 is held by disc holders. FIG. 10 is a plan view illustrating an overall configuration for the disc cartridge 302 in which the disc 100 has been released from the disc holders. In FIGS. 9 and 10, each member having substantially the same function as the counterpart of the first preferred embodiment described above is identified by the same reference numeral and the description thereof will be omitted herein.

The disc cartridge 302 of the second preferred embodiment is different from the disc cartridge 301 of the first preferred embodiment in the function and structure of the disc holders. Specifically, the disc cartridge 302 of the second preferred embodiments includes two pairs of disc holders 5 and 16 which slide in the direction indicated by the arrow 15A or 15B, as shown in FIG. 9.

Each of the disc holders 15 includes an elastic portion 15d, which applies an elastic force to the disc holder 15 in the direction indicated by the arrow 15B. Just like the disc holders 13 and 14 of the first preferred embodiment, a slope 15' provided at the end of each disc holder 15 presses and fixes the disc 100 against the cartridge body 10.

Each of the disc holders 16 includes a shaft 16c. That is to say, the disc holder 16 is provided for the cartridge body 10 so as to rotate on its shaft 16c. Just like the disc holders 13 and 14 of the first preferred embodiment, a slope 16' provided at the end of each disc holder 16 presses and fixes the disc 100 against the cartridge body 10. Each of the disc holders 15 further includes a coupling pin 15p, which is engaged and interlocked with a groove 16g of its associated disc holder 16.

When the two cartridge positioning pins 210 of the disc drive are engaged with the positioning holes 11w of the cartridge body 10, respective protrusions 15s of the disc holders 15 are pushed and lifted by the positioning pins 210 as shown in FIG. 10. As a result, the disc holders 15 are moved in the direction indicated by the arrow 15A and the disc 100 is released from the grip of the slopes 15'. In the meantime, as the disc holders 15 are moved in the direction 15A, the disc holders 16 are rotated to the direction indicated by the arrow 16A. Consequently, the disc 100 is also released from the grip of the slopes 16'.

EMBODIMENT 3

Figure 11:
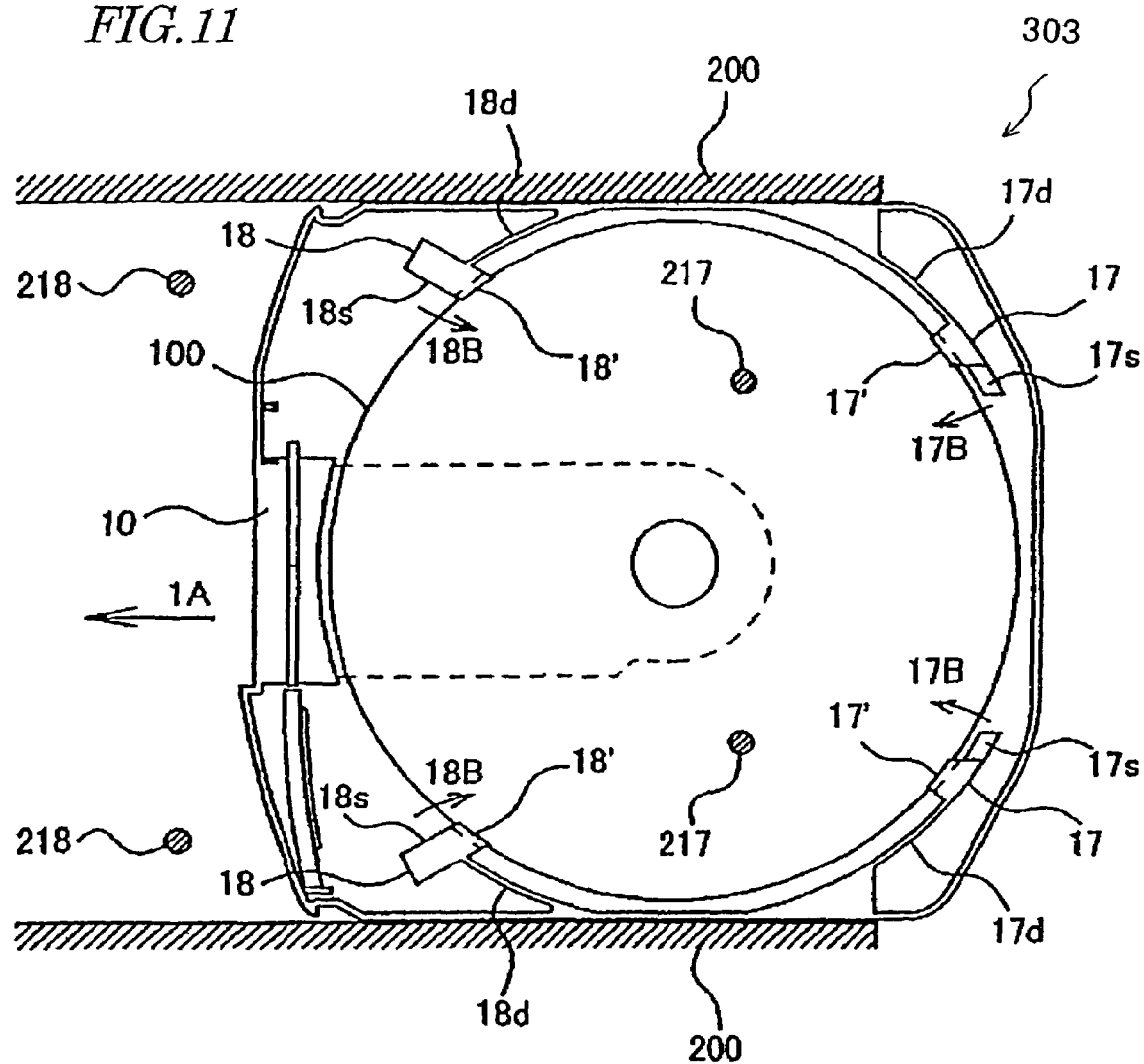
FIG. 11 is a plan view illustrating an overall configuration for a disc cartridge according to a third specific preferred embodiment of the present invention.
Figure 12:
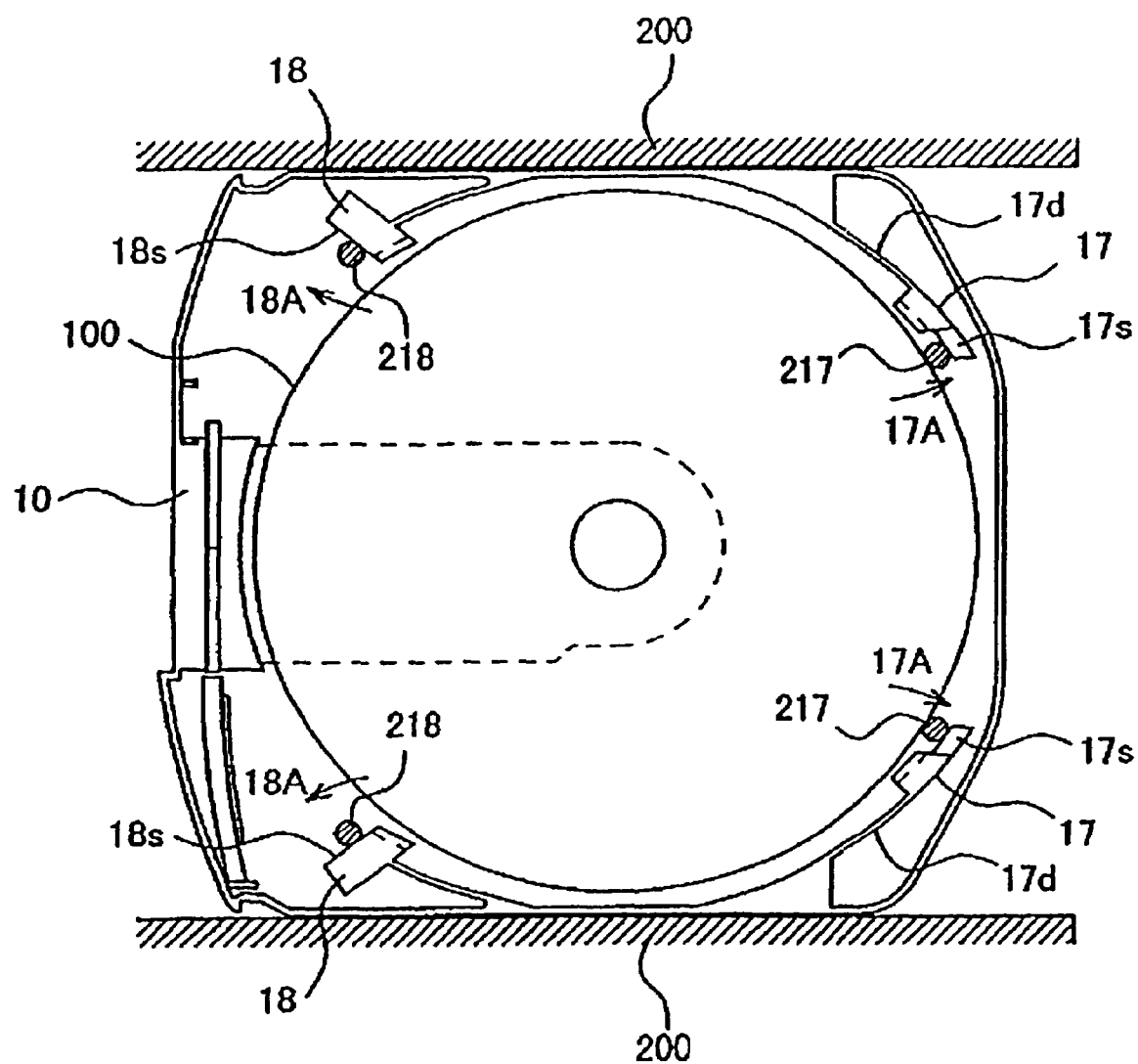
FIG. 12 is a plan view illustrating a state of the disc cartridge shown in FIG. 11 in which the disc has been released from its disc holders.

Hereinafter, a disc cartridge 303 according to a third specific preferred embodiment of the present invention will be described with reference to FIGS. 11 and 12. Specifically, FIG. 11 is plan view illustrating an overall configuration for the disc cartridge 303 in which the disc 100 is held by disc holders. FIG. 12 is a plan view illustrating an overall configuration for the disc cartridge 303 in which the disc 100 has been released from the disc holders. In FIGS. 11 and 12, each member having substantially the same function as the counterpart of the first preferred embodiment described above is identified by the same reference numeral and the description thereof will be omitted herein.

The disc cartridge 303 of the third preferred embodiment is different from the disc cartridge 301 of the first preferred embodiment in the function and structure of the disc holders. Specifically, the disc cartridge 303 of the third preferred embodiments includes two pairs of disc holders 17 and 18, to which an elastic force is applied in the directions indicated by the arrows 17B and 18B, respectively, as shown in FIG. 11. These disc holders 17 and 18 have been molded together with the cartridge body 10 so as to form integral parts of the cartridge body 10.

Each of the disc holders 17 includes an elastic portion 17d, which applies an elastic force to the disc holder 17 in the direction indicated by the arrow 17B. Just like the disc holders 13 and 14 of the first preferred embodiment, a slope 17' provided at the end of each disc holder 17 presses and fixes the disc 100 against the cartridge body 10.

Each of the disc holders 18 also includes an elastic portion 18d, which applies an elastic force to the disc holder 18 in the direction indicated by the arrow 18B. A slope 18' provided at the end of each disc holder 18 also presses and fixes the disc 100 against the cartridge body 10.

When this disc cartridge 303 is inserted into a disc drive 200, a pair of disc releasing pins 217, provided for the disc drive 200, presses protrusions 17s of the disc holders 17. As a result, the disc 100 is released from the disc holders 17 as shown in FIG. 12. At the same time, another pair of disc releasing pins 218, also provided for the disc drive 200, contacts with the side surfaces 18s of the disc holders 18. Consequently, the disc 100 is also released from the disc holders 18 as shown in FIG. 12.

EMBODIMENT 4

Figure 13:
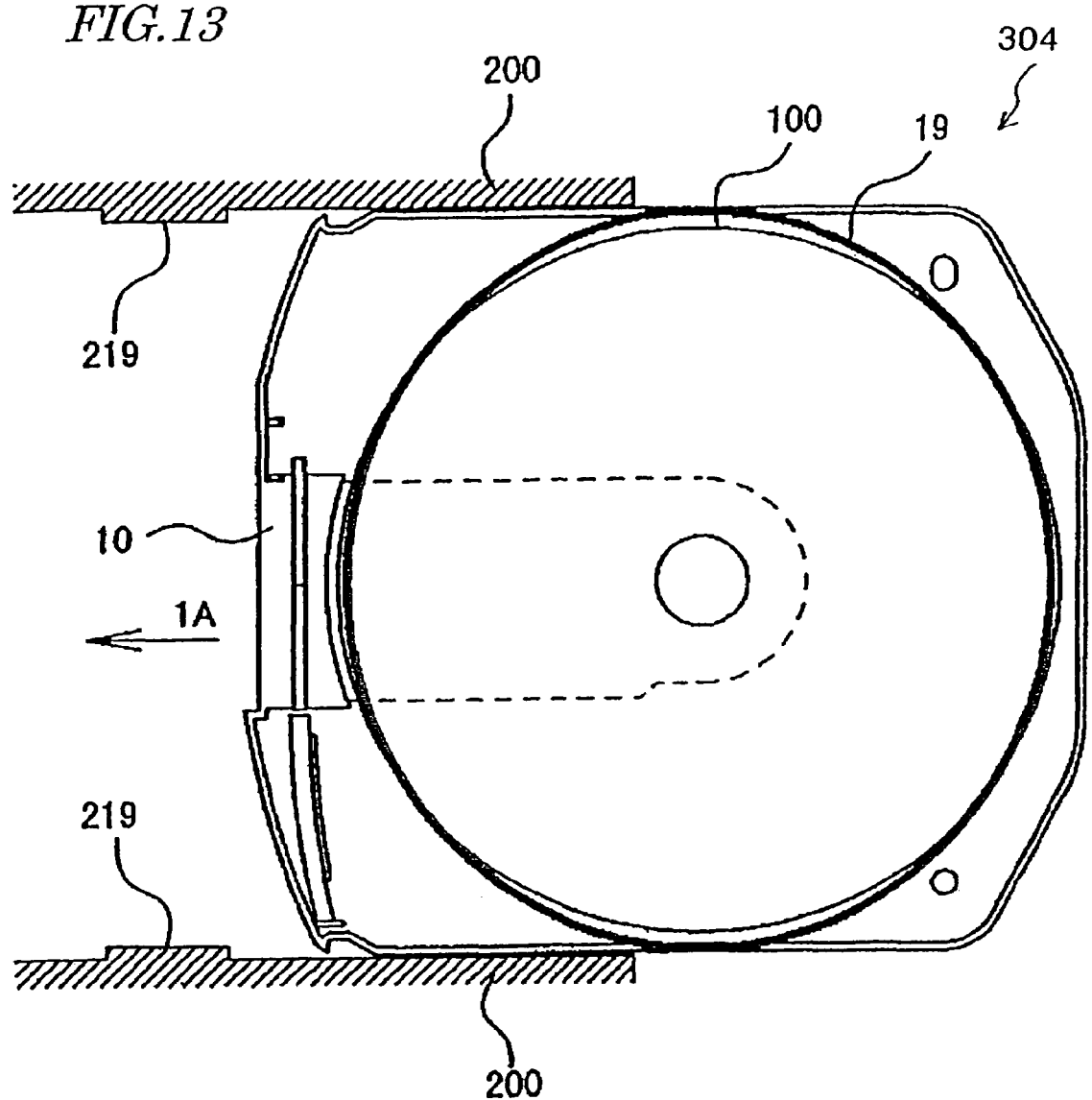
FIG. 13 is a plan view illustrating an overall configuration for a disc cartridge according to a fourth specific preferred embodiment of the present invention.
Figure 14:
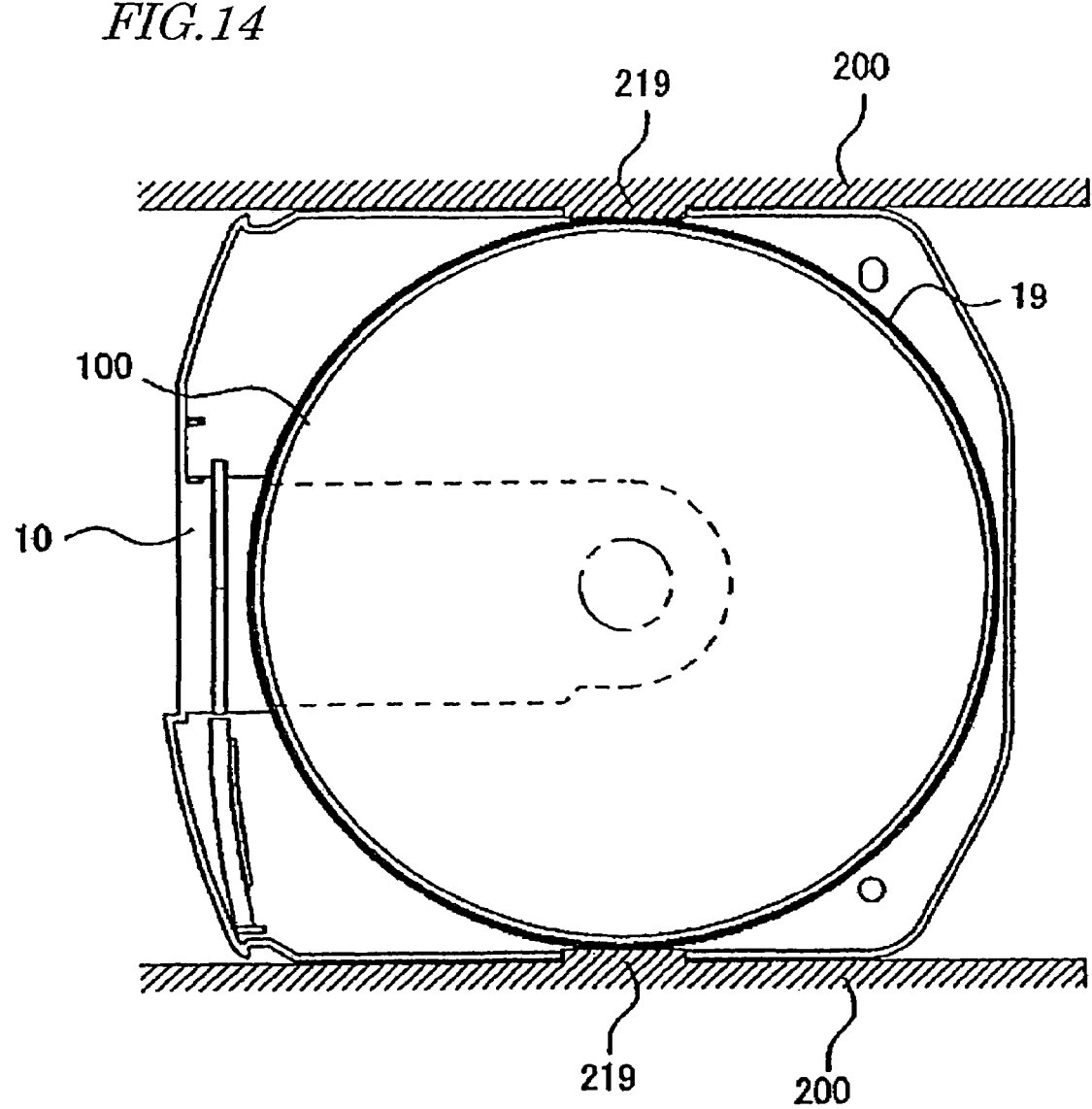
FIG. 14 is a plan view illustrating a state of the disc cartridge shown in FIG. 13 in which the disc has been released from its disc holder.

Hereinafter, a disc cartridge 304 according to a fourth specific preferred embodiment of the present invention will be described with reference to FIGS. 13 and 14. Specifically, FIG. 13 is plan view illustrating an overall configuration for the disc cartridge 304 in which the disc 100 is held by a disc holder. FIG. 14 is a plan view illustrating an overall configuration for the disc cartridge 304 in which the disc 100 has been released from the disc holder. In FIGS. 13 and 14, each member having substantially the same function as the counterpart of the first preferred embodiment described above is identified by the same reference numeral and the description thereof will be omitted herein.

The disc cartridge 304 of the fourth preferred embodiment is different from the disc cartridge 301 of the first preferred embodiment in the function and structure of the disc holder. Specifically, the disc cartridge 304 includes a ring like disc holder 19.

As shown in FIG. 13, the disc holder 19 is a ring like elastic member, which is made of rubber, for example, and can change its shape freely. When no force is externally applied thereto, the disc holder 19 has an ellipsoidal planar shape. However, by applying an external force thereto, the disc holder 19 may be deformed into a substantially completely round shape. In that case, the inside diameter of the disc holder 19 is greater than the diameter of the disc 100.

As shown in FIG. 13, the ellipsoidal disc holder 19 is in contact with the disc 100 at multiple points, thereby fixing the disc 100 onto the cartridge body 10. However, when this disc cartridge 304 is inserted into a disc drive 200, convex portions 219, provided for the disc drive 200, press the major axis portion of the ellipsoidal disc holder 19, thereby deforming the disc holder 19 as shown in FIG. 14. As a result, the disc holder 19 is deformed into an approximately completely round shape and is no longer in contact with the disc 100. That is to say, the disc 100 is released from the disc holder 19.

To release the disc 100 from the disc holder 19, the force that deforms the disc holder 19 may also be applied from the convex portion of the disc drive 200, which engages with the concave portion 10g (see FIG. 2) provided for preventing the user from inserting the disc cartridge in the wrong direction, to the disc holder 19. Alternatively, that force may also be applied from a pair of convex portions of the disc drive 200, which engages with the concave portions 10c (see FIG. 2) provided on the right- and left-hand sides of the disc cartridge 304 for pulling in the disc cartridge 304, to the disc holder 19.

EMBODIMENT 5

Figure 15:
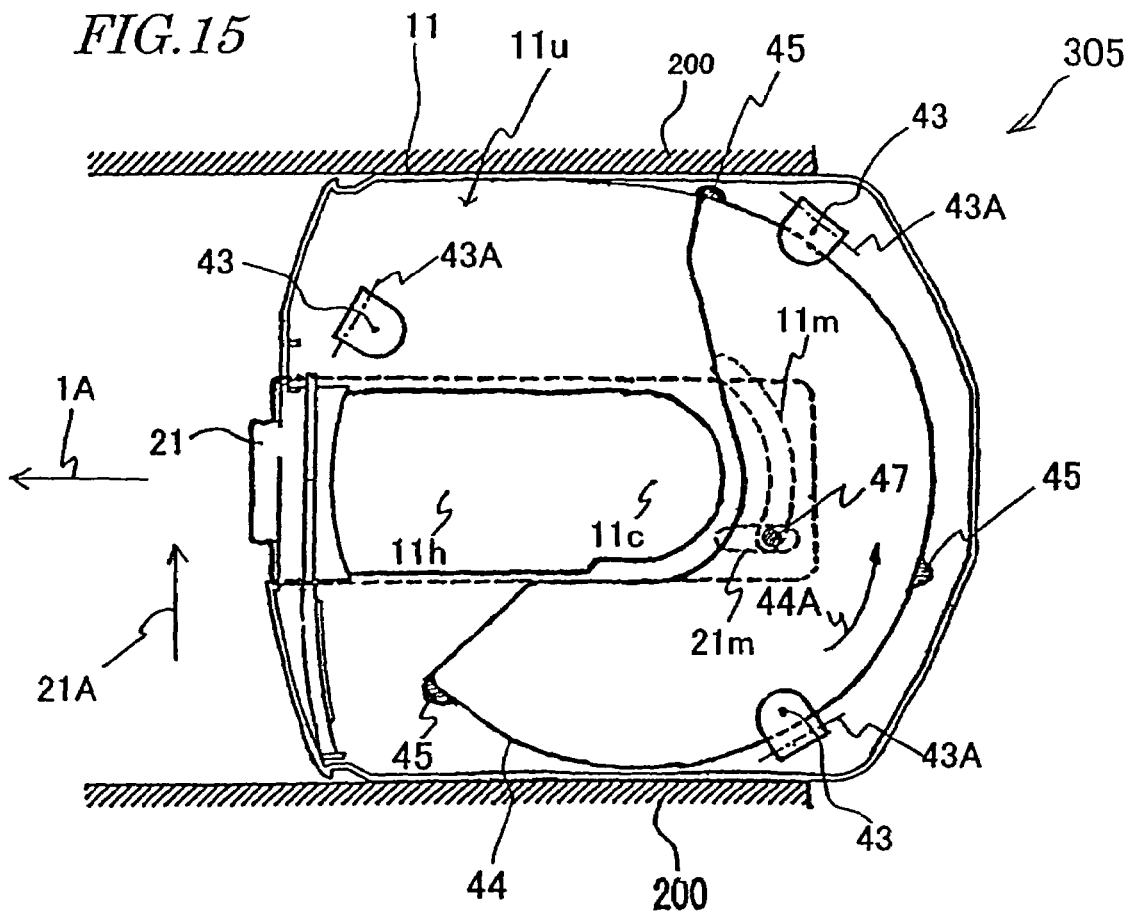
FIG. 15 is a plan view illustrating an overall configuration for a disc cartridge according to a fifth specific preferred embodiment of the present invention in a state where its shutter is closed.
Figure 16:
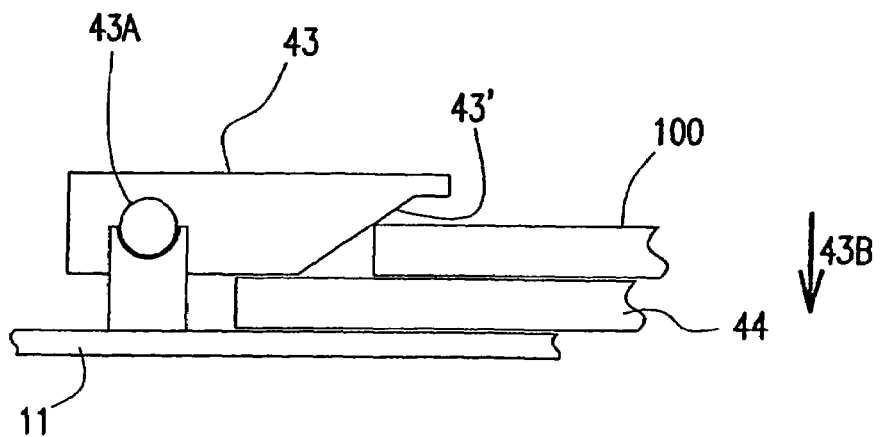
FIG. 16 is a cross-sectional view of a disc holder of the disc cartridge in the-state shown in FIG. 15.
Figure 17:
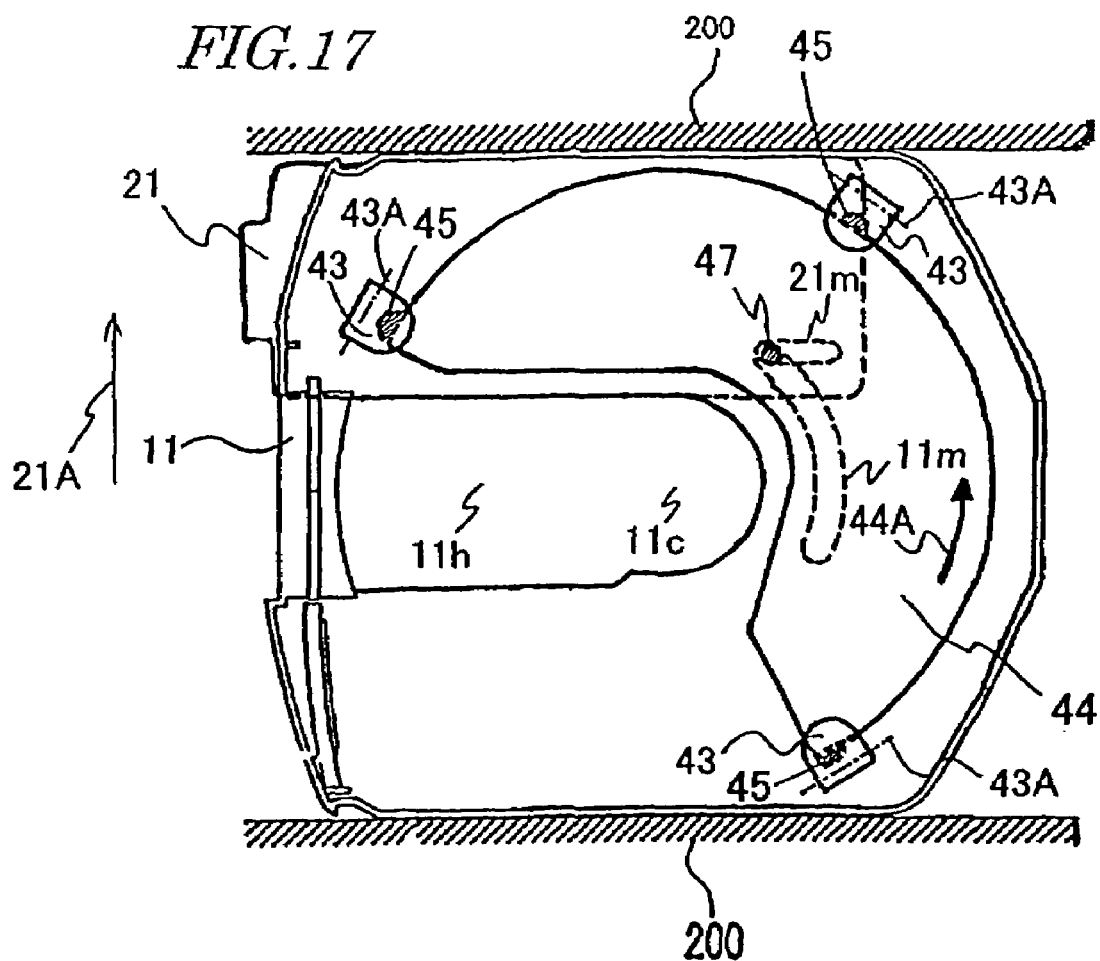
FIG. 17 is a plan view illustrating an overall configuration for the disc cartridge shown in FIG. 15 in a state where its shutter is opened.
Figure 18:
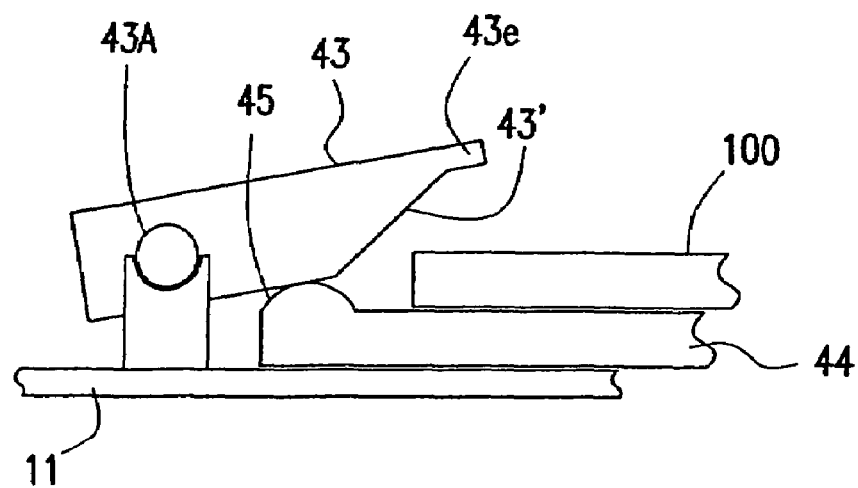
FIG. 18 is a cross-sectional view of the disc holder of the disc cartridge in the state shown in FIG. 17.

Hereinafter, a disc cartridge 305 according to a fifth specific preferred embodiment of the present invention will be described with reference to FIGS. 15 through 18. FIGS. 15 and 17 are plan views illustrating the structure of the disc cartridge 305 of the fifth preferred embodiment from which the upper shell has been removed. Specifically, FIG. 15 illustrates a state where the shutter 21 covers the openings 11h and 11c, while FIG. 17 illustrates a state where the shutter 21 exposes the openings 11h and 11c. FIGS. 16 and 18 illustrate states of a disc holder 43 when the shutter 21 is closed and when the shutter 21 is opened, respectively.

In FIGS. 15 through 18, each member having substantially the same function as the counterpart of the first preferred embodiment described above is identified by the same reference numeral.

The disc cartridge 305 of the fifth preferred embodiment is characterized in that the disc holding and releasing operations and the opening and closing operations are synchronously performed by disc holders 43 and the shutter 21, respectively, by way of a disc holder/shutter interlocking member 44.

The disc holder/shutter interlocking member 44 is provided over the inner lower surface 11u so as to rotate and slide around the chucking opening 11c of the lower shell 11 as indicated by the arrow 44A in FIGS. 15 and 17. The disc holder/shutter interlocking member 44 has a fan shape, or in the shape of a partially notched ring that has an inside diameter equal to the diameter of the chucking opening 11c.

The disc holder/shutter interlocking member 44 includes a pin 47 that extends toward the lower shell 11 (i.e., in the direction going into the paper of FIGS. 15 and 17). The lower shell 11 and the shutter 21 are respectively provided with guide grooves 11m and 21m that both engage with the pin 47. Also, multiple protrusions 45, which extend outward and upward (i.e., in the direction coming out of the paper of FIGS. 15 and 17), are provided on the outer periphery of the disc holder/shutter interlocking member 44. Furthermore, the upper surface of the disc holder/shutter interlocking member 44 is covered with a nonwoven fabric or a coating to prevent the signal recording side 100A of the disc 100 from getting scratched or attracting dust.

A number of disc holders 43 are disposed at predetermined intervals on the inner lower surface 11u so as to hold the outer edge of the disc 100 thereon when the disc 100 is stored in the disc cartridge 305. In the preferred embodiment shown in FIGS. 15 and 17, three disc holders 43 are provided. Alternatively, two, four or more disc holders 43 may also be provided. In any case, each of those disc holders 43 is secured to the lower shell 11 so as to rotate on the shaft 43A thereof.

As shown in FIG. 16, each of the disc holders 43 is located at such a position so as to partially overlap with the outer periphery of the disc holder/shutter interlocking member 44. Also, an elastic portion (not shown in FIG. 16) such as the elastic portion 14d shown in FIG. 5, for example, applies an elastic force to each disc holder 43 downward (i.e., toward the lower shell 11). Accordingly, while contacting with the outer edge of the disc 100, the slope 43' of the disc holder 43 not only presses the disc 100 in the direction indicated by the arrow 43B in FIG. 16 so that the disc 100 is brought into contact with the disc holder/shutter interlocking member 44 but also holds the disc 100 thereon.

As shown in FIG. 15, when the disc cartridge 305 including the disc (not shown) is inserted into a disc drive 200 in the direction indicated by the arrow 1A, a shutter opener/closer (not shown), provided for the disc drive 200, moves the shutter 21 in the direction indicated by the arrow 21A, thereby opening the shutter 21. When the shutter 21 starts to move in the direction 21A, a force is also applied in the direction 21A to the pin 47 of the disc holder/shutter interlocking member 44 that is engaged with the guide groove 21m of the shutter 21. As a result, the pin 47 is moved along the guide groove 11m of the lower shell 11, and the disc holder/shutter interlocking member 44 starts to rotate to the direction indicated by the arrow 44A around the chucking opening 11c. The guide groove 11m preferably extends approximately in the direction in which the shutter 21 is moved so that the disc holder/shutter interlocking member 44 moves along with the shutter 21.

When the shutter 21 is completely open, the protrusions 45 on the outer periphery of the disc holder/shutter interlocking member 44 are located under the disc holders 43 as shown in FIG. 17. Then, as shown in FIG. 18, the disc holders 43 are pushed up by the protrusions 45 and the slopes 43' of the disc holders 43 separate themselves from the outer edge of the disc 100. As a result, the force that has been vertically applied to the disc 100 in the direction indicated by the arrow 43B is removed from the disc 100 and the disc 100 is now freely rotatable. At this point in time, the rim 43e at the end of the disc holder 43 still hangs over a portion of the projection area of the disc 100 (i.e., the outer periphery thereof). Accordingly, even if the disc 100 is released in the disc cartridge 305 that has been loaded into a vertically mounted disc drive, the disc 100 will not drop down from the disc cartridge 305.

In the disc cartridge 305 of the fifth preferred embodiment, the disc can be released even if the disc cartridge 305 is not inserted into the disc drive 200. Accordingly, if the shutter 21 is opened manually, the disc holders 43 will release the disc 100 synchronously with the movement of the shutter 21. Thus, the user can remove an unwanted disc from the cartridge 305 and insert a new disc thereto any time he or she likes.

EMBODIMENT 6

Figure 19:
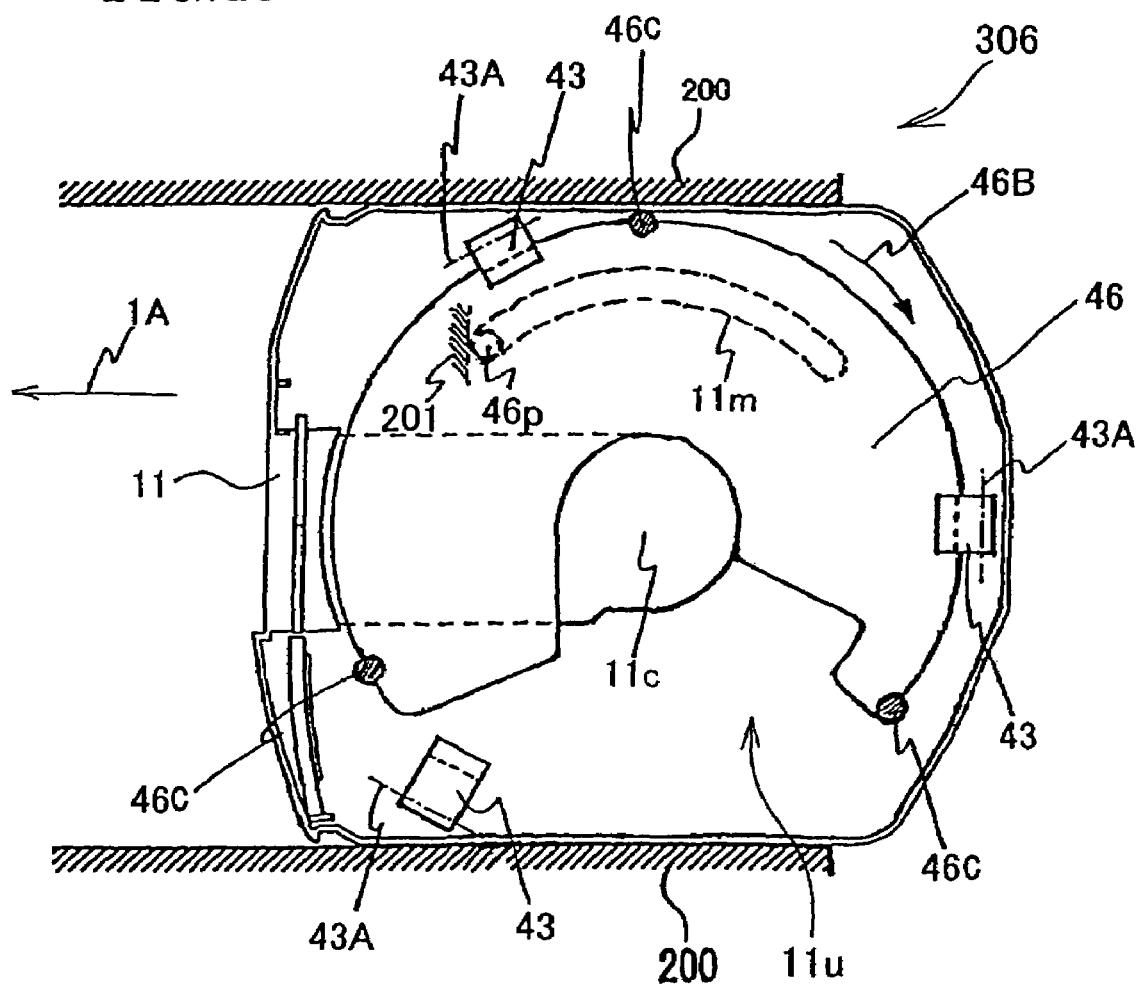
FIG. 19 is a plan view illustrating an overall configuration for a disc cartridge according to a sixth specific preferred embodiment of the present invention in a state where its shutter is closed.
Figure 20:
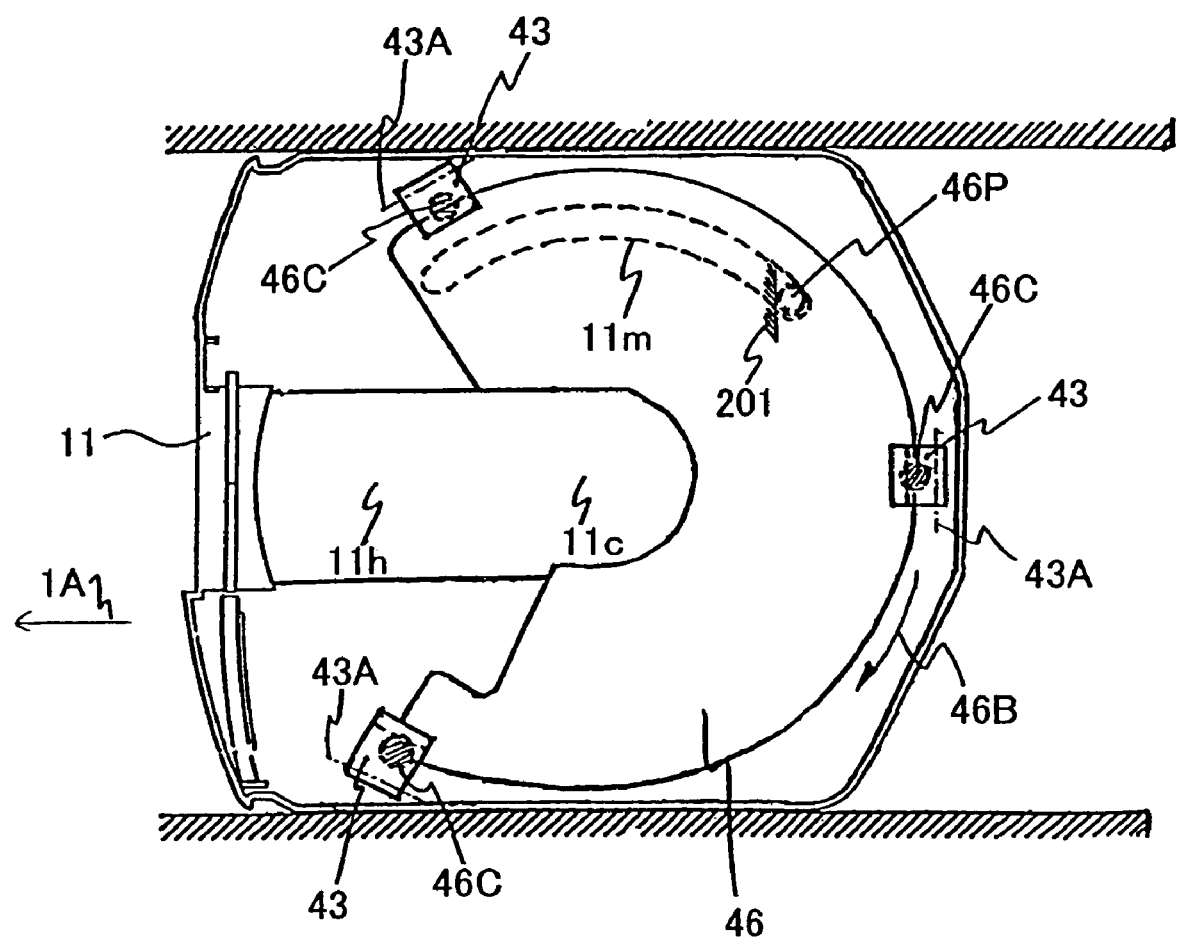
FIG. 20 is a plan view illustrating an overall configuration for the disc cartridge shown in FIG. 19 in a state where its shutter is opened.

Hereinafter, a disc cartridge 306 according to a sixth specific preferred embodiment of the present invention will be described with reference to FIGS. 19 and 20. FIGS. 19 and 20 are plan views illustrating the structure of the disc cartridge 306 of the sixth preferred embodiment from which the upper shell has been removed. Specifically, FIG. 19 illustrates a state where the shutter covers the head opening 11h, while FIG. 20 illustrates a state where the shutter exposes the opening 11h. In FIGS. 19 and 20, each member having substantially the same function as the counterpart of the first or fifth preferred embodiment described above is identified by the same reference numeral.

The disc cartridge 306 of the sixth preferred embodiment is characterized in that the shutter 46 thereof performs the functions of the disc holder/shutter interlocking member 44 and the shutter 21 of the disc cartridge 305 of the fifth referred embodiment. The shutter 46 is provided over the inner lower surface 11u so as to rotate and slide around the chucking opening 11c of the lower shell 11 as indicated by the arrow 46B in FIGS. 19 and 20. The shutter 46 has a fan shape, or in the shape of a partially notched ring that has an inside diameter equal to the diameter of the chucking opening 11c.

The shutter 46 includes a pin 46p that extends toward the lower shell 11 (i.e., in the direction going into the paper of FIGS. 19 and 20). The lower shell 11 is provided with a guide groove 11m that engages with the pin 46p. When the pin 46p is located at one end of the guide groove 11m, the head opening 11h is closed up by the shutter 46. And when the pin 46p is located at the other end of the guide groove 11m, the head opening 11h is exposed by the shutter 46. The guide groove 11m is provided along a portion of an arc that is concentric with the chuck opening 11c. The guide groove 11m preferably extends approximately in the direction 1A in which the disc cartridge 306 is inserted into a disc drive 200 so that the shutter 46 is opened as the disc cartridge 306 is inserted into the disc drive 200.

Multiple protrusions 46c, which extend outward and upward (i.e., in the direction coming out of the paper of FIGS. 19 and 20), are provided on the outer periphery of the shutter 46. Furthermore, the upper surface of the shutter 46 is covered with a nonwoven fabric or a coating to prevent the signal recording side 100A of the disc 100 from getting scratched or attracting dust.

A number of disc holders 43, having a structure similar to that of the disc holders of the fifth preferred embodiment, are disposed at predetermined intervals on the inner lower surface 11u. The disc holders 43 and the protrusions 46c of the shutter 46 together hold or release the disc synchronously with the movement of the shutter 46 as already described for the fifth preferred embodiment.

When the disc cartridge 306 of the sixth preferred embodiment is inserted into the disc drive 200 in the direction indicated by the arrow 1A in FIG. 19, the pin 46p of the shutter 46 will soon contact with a contact member 201 provided for the disc drive 200. And when the disc cartridge 306 is inserted deeper into the disc drive 200, the pin 46p is pressed by the contact member 201 to start to move along the guide groove 11m. Then, the shutter 46 starts to rotate around the chucking opening 11c of the lower shell 11 to the direction indicated by the arrow 46B in FIG. 19. As the shutter 46 rotates to that direction, the head opening 11h is opened little by little.

As shown in FIG. 20, when the disc cartridge 306 has been fully inserted into the disc drive 200, the pin 46p will reach the other end of the guide groove 11m. As a result, the head opening 11h is completely exposed. At this point in time, as already described for the fifth preferred embodiment, the protrusions 46c on the outer periphery of the shutter 46 are located under the disc holders 43 as shown in FIG. 20. Then, the disc holders 43 are pushed up by the protrusions 46c toward the upper shell 12 (i.e., in the direction coming out of the paper of FIG. 20). As a result, the disc 100 that has been held by the disc holders 43 is released and now freely rotatable.

The disc cartridge 306 of the sixth preferred embodiment needs no disc holder/shutter interlocking member. Thus, compared to the disc cartridge 305 of the fifth preferred embodiment, the disc cartridge 306 can be thinner. Also, if the pin 46p is moved manually along the guide groove 11m, the shutter 46 can be opened and the disc can be released and removed from the disc holders 43.

In the sixth preferred embodiment described above, the shutter 46 is rotated clockwise as viewed from over the upper shell of the cartridge 306. However, the shutter 406 may also be rotated counterclockwise if the guide groove 11m is formed at a different position.

EMBODIMENT 7

Figure 21:
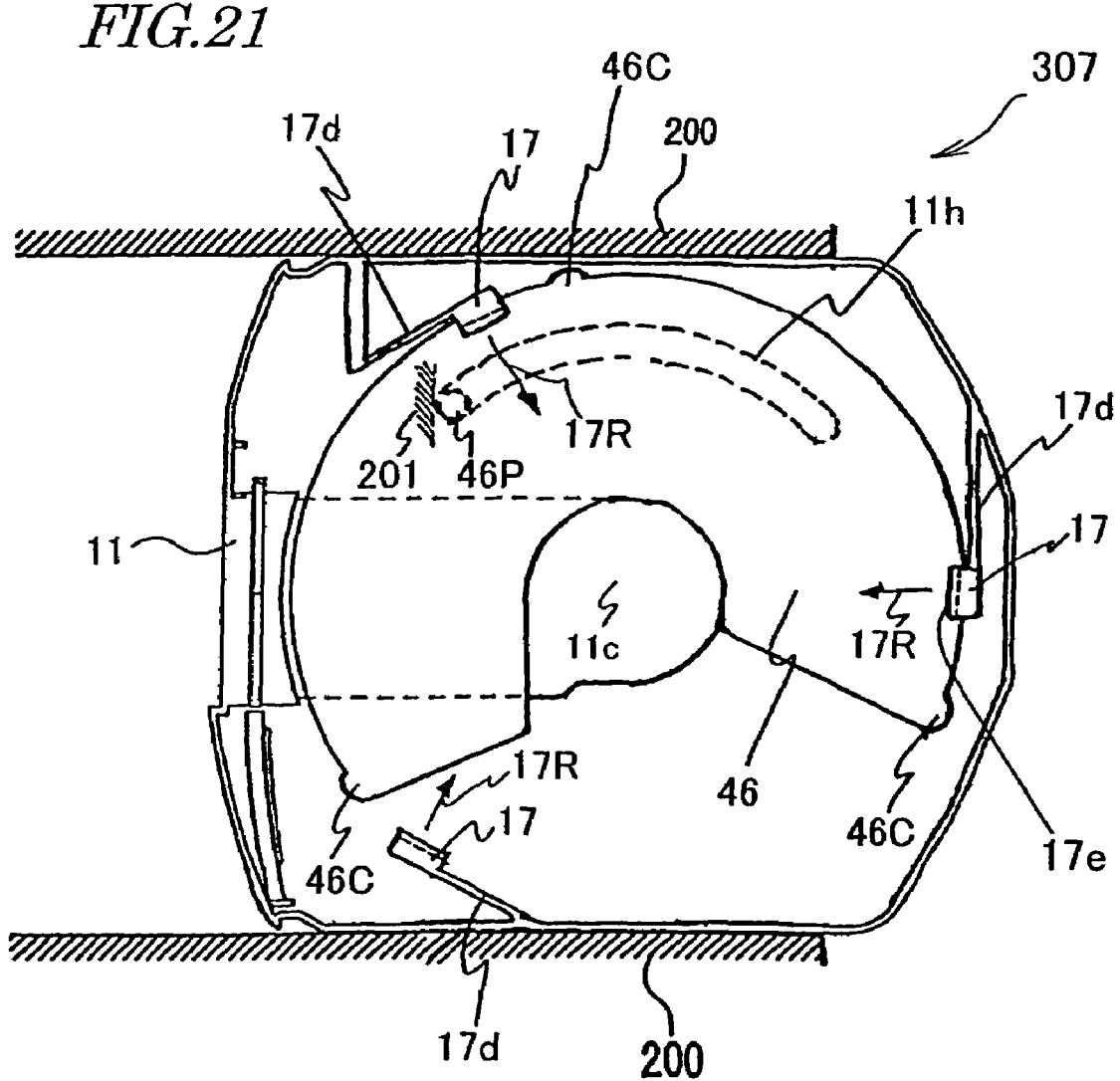
FIG. 21 is a plan view illustrating an overall configuration for a disc cartridge according to a seventh specific preferred embodiment of the present invention in a state where its shutter is closed.
Figure 22:
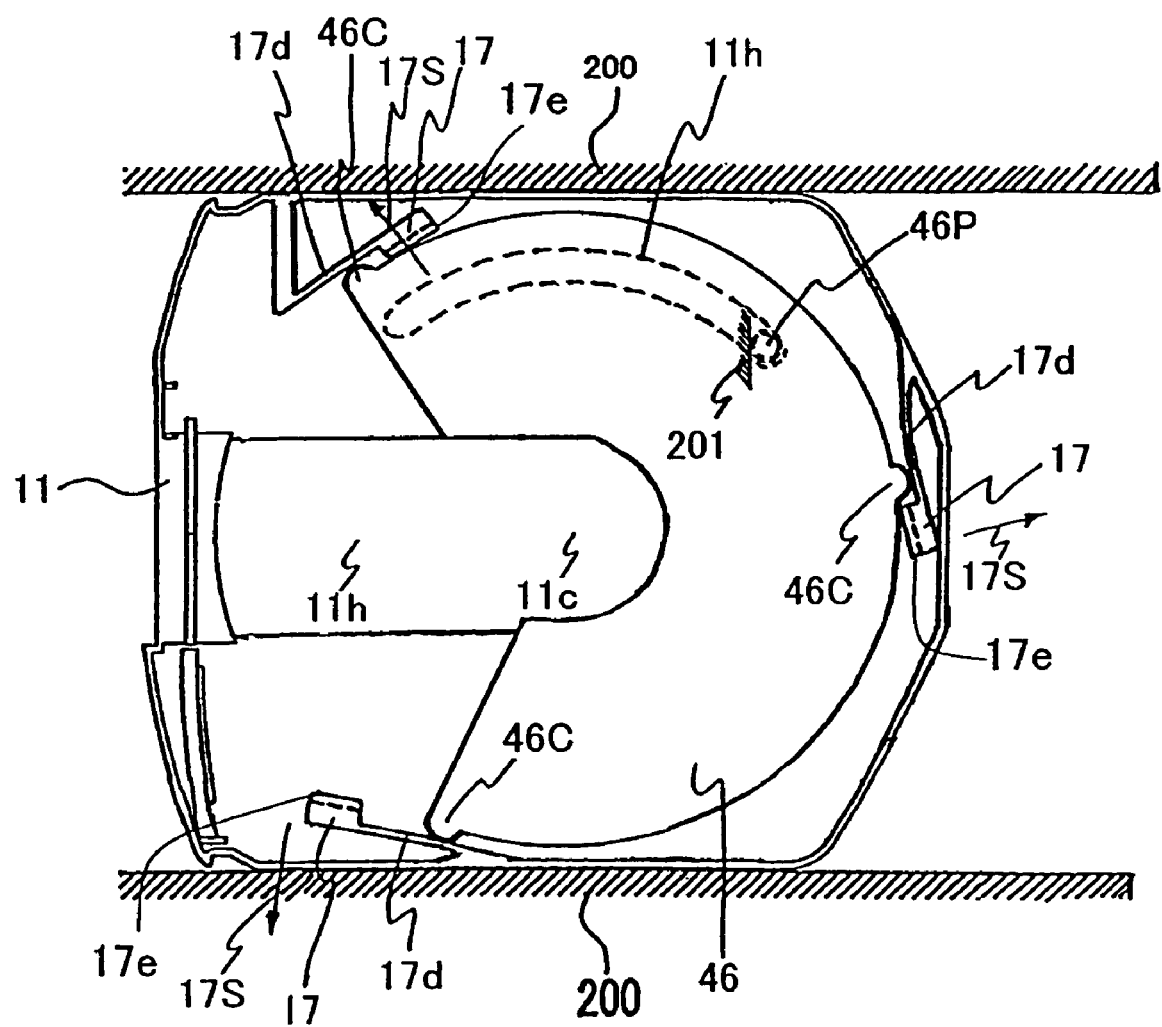
FIG. 22 is a plan view illustrating an overall configuration for the disc cartridge shown in FIG. 21 in a state where its shutter is opened.

Hereinafter, a disc cartridge 307 according to a seventh specific preferred embodiment of the present invention will be described with reference to FIGS. 21 and 22. FIGS. 21 and 22 are plan views illustrating the structure of the disc cartridge 307 of the seventh preferred embodiment from which the upper shell has been removed. Specifically, FIG. 21 illustrates a state where the shutter covers the head opening 11h, while FIG. 22 illustrates a state where the shutter exposes the head opening 11h. In FIGS. 21 and 22, each member having substantially the same function as the counterpart of the third or sixth preferred embodiment described above is identified by the same reference numeral.

The disc cartridge 307 of the seventh preferred embodiment is different from the disc cartridge 306 of the sixth preferred embodiment in the structure of the disc holders. Specifically, as shown in FIGS. 21 and 22, the disc cartridge 307 includes a plurality of disc holders 17. Just like the disc holders of the third preferred embodiment described above, each of these disc holders 17 also includes an elastic portion 17d. While the shutter 46 is going to be closed, the elastic portions 17d apply an elastic force to the disc 100 mounted, thereby holding and pressing the disc 100 toward the center thereof as indicated by the arrows 17R in FIG. 21. In this preferred embodiment, the disc holders 17 form integral parts of the lower shell 11. Alternatively, the disc holders 17 may also be formed separately from the lower shell 11.

When taken in the disc radial direction, each of these disc holders 17 also has a slope that expands over a portion of the projection area of the disc (i.e., the outer periphery of the disc 100) just like the disc holder 43 shown in FIG. 18. Accordingly, if the disc 100 gets held by the disc holders 17 so as to have its outer edge contact with the respective slopes of the disc holders 17, then the disc 100 is pressed against the shutter 46.

The shutter 46 includes a plurality of protrusions 46c on the outer periphery thereof. In this preferred embodiment, the protrusions 46c protrude outward. Also, the protrusions 46c are located at such positions on the outer periphery of the shutter 46 as to contact with the elastic portions 17d of the disc holders 17 when the shutter 46 is opened as shown in FIG. 22.

As shown in FIG. 22, when the shutter 46 is opened, the protrusions 46c dominate the inwardly applied elastic force of the elastic portions 17d, thereby pushing the elastic portions 17d outward as indicated by the arrows 17s. As a result, the disc 100 is released. However, each of the disc holders 17 also includes a rim 17e at the end thereof. Even after the disc 100 has been released, the rim 17e still hangs over a portion of the projection area of the disc 100. Accordingly, even if the disc 100 is released in the disc cartridge 307 that has been loaded into a vertically mounted disc drive 200, the disc 100 will not drop down from the disc cartridge 307.

The disc cartridge 307 of the seventh preferred embodiment achieves all the effects of the sixth preferred embodiment described above. In addition, according to this seventh preferred embodiment, the disc holders 17 may form integral parts of the lower shell 11. Then, the disc cartridge can have a simplified structure and can be formed at a low manufacturing cost.

EMBODIMENT 8

Hereinafter, a disc cartridge 308 according to an eighth specific preferred embodiment of the present invention will be described with reference to the accompanying drawings.

Figure 23:
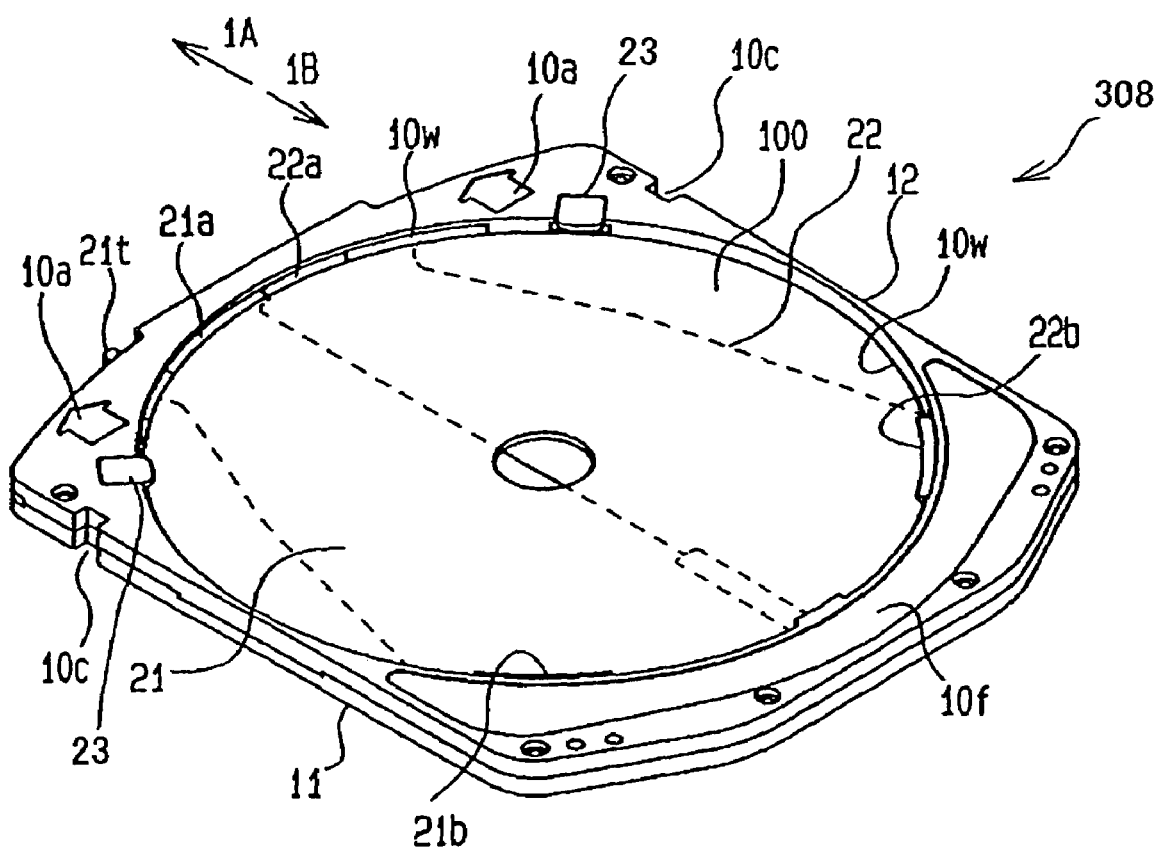
FIG. 23 is a perspective view illustrating an overall configuration for a disc cartridge according to an eighth specific preferred embodiment of the present invention.
Figure 24:
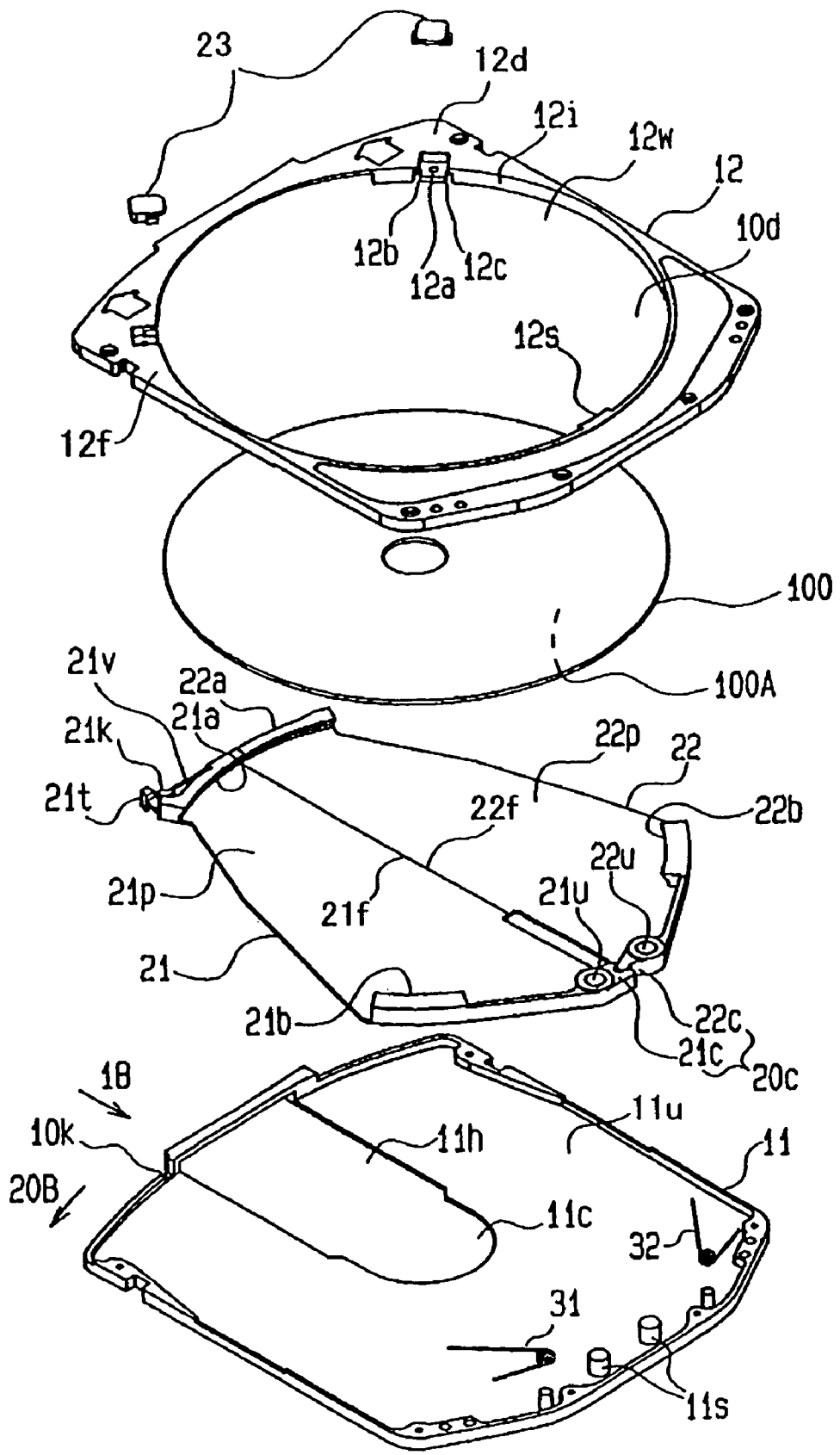
FIG. 24 is an exploded perspective view of the disc cartridge shown in FIG. 23.

First, the structure of the disc cartridge 308 will be outlined with reference to FIGS. 23 and 24. As in the first preferred embodiment described above, the disc 100 shown in FIGS. 23 and 24 also includes first and second sides. The first side of the disc, on which its label, for example, is normally printed, is illustrated in FIG. 23, while the second side thereof, i.e., the signal recording side 100A, is illustrated as the backside in FIG. 24.

As shown in FIGS. 23 and 24, the disc cartridge 308 includes a lower shell 11, an upper shell 12, a pair of shutters 21 and 22 and disc stoppers 23.

As shown in FIG. 24, the lower shell 11 includes a chucking opening 11c and a head opening 11h. The chucking opening 11c allows a chucking member (e.g., a spindle motor for rotating the disc 100) to enter the disc cartridge 308 externally. The head opening 11h allows a head, which reads and/or writes a signal from/on the signal recording side 100A of the disc 100, to enter the disc cartridge 308 and access a target location on the disc 100. The lower shell 11 faces the signal recording side 100A of the disc 100. Also, the head opening 11h reaches a side surface of the lower shell 11.

The upper shell 12 includes a circular disc window 12w, through which the disc 100 can be introduced and removed into/from the disc cartridge 308 and which expands over the entire projection area of the disc 100 to expose the upper side of the disc 100. The upper and lower shells 12 and 11 are adhered or welded together at their outer periphery, thereby forming a cartridge body 10.

A disc storage portion 10d for storing the disc 100 therein is defined by an inner lower surface 11u and an inner side surface 12i of the cartridge body 10. The inner lower surface 11u is opposed to the signal recording side 100A of the disc 100, while the inner side surface 12i has a substantially cylindrical shape and defines the disc window 12w inside. That is to say, the inner lower surface 11u is the bottom of the disc storage portion 10d.

In the disc storage portion 10d, a gap, which is wide enough to allow the disc 100 to rotate freely, is provided between the inner side surface 12i and the outer periphery of the disc 100. Also, the top of the disc storage portion 10d is the disc window 12w so that the disc 100 stored in the disc storage portion 10d has one of its sides exposed inside the disc window 12w.

Two removable disc stoppers 23 are provided for the upper shell 12 so as to partially protrude into the disc window 12w as shown in FIGS. 23 and 24. A third disc stopper 12s is further provided for the upper shell 12 so as to protrude into the disc window 12w. But the third disc stopper 12s forms an integral part of the upper shell 12. These three disc stoppers 23 and 12s are arranged substantially at regular intervals around the circumference of the disc window 12w for the purpose of preventing the disc 100 from dropping down from the disc window 12w. These disc stoppers 23 and 12s are effective particularly when this disc cartridge 308 is loaded into a vertically mounted disc drive.

The shutters 21 and 22 are disposed between the signal recording side 100A of the disc 100 and the inner lower surface 11u of the cartridge body 10. The shutters 21 and 22 include holes 21u and 22u, respectively. These holes 21u and 22u are engaged in a freely rotatable state with shafts 11s, which are located outside of the disc storage portion 10d of the cartridge body 10 and on a deep side of the cartridge body 10 opposite to the head opening 11h thereof. Thus, the shutters 21 and 22 rotate on the shafts 11s in such a manner as to cover or expose the chucking and head openings 11c and 11h.

A cam 21c and a follower 22c are provided near the holes 21u and 22u of the shutters 21 and 22, respectively. The cam 21c and the follower 22c have mutually engaging shapes and together make up an interlocking mechanism 20c for opening and closing the shutters 21 and 22 while interlocking them with each other.

The respective upper surfaces of the shutters 21 and 22, which are opposed to the signal recording side 100A of the disc 100, are covered with protective layers 21p and 22p for the purpose of preventing the signal recording side 100A of the disc 100 from getting scratched or attracting dust.

The protective layers 21p and 22p may be appropriately selected from the group consisting of anti-scratching nonwoven fabric, dustproof nonwoven fabric, anti-scratching coating and dustproof coating. In this preferred embodiment, sheets of a dustproof nonwoven fabric are adhered or ultrasonic welded as the protective layers 21p and 22p to the shutters 21 and 22, respectively.

Shutter springs 31 and 32 are provided outside of the disc storage portion 10d for the shutters 21 and 22, respectively. These springs 31 and 32 apply an elastic force to the shutters 21 and 22 in such a direction as to close the shutters 21 and 22. Optionally, an elastic force may also be applied from any other type of elastic members to the shutters 21 and 22 in that direction.

In the disc cartridge 308 shown in FIG. 24, the shutters 21 and 22 each include two disc holders 21a, 21b and 22a, 22b at both ends thereof. Each of these disc holders 21a, 21b, 22a and 22b has a downwardly tapered cross-sectional shape (or slope) to grip the outer edge of the, disc 100 while the shutters 21 and 22 are closed. The structure and operation of the disc holders 21a, 21b, 22a and 22b will be described in further detail later.

As shown in FIG. 23, the upper surface of the cartridge body 10 (or the upper shell 12) has a label plane 10f, on which the user can note down the contents of the disc 100 stored, and embossed arrow marks (or concave portions) 10a that indicate the direction (the arrow 1A) in which this disc cartridge 308 should be inserted into a disc drive. The cartridge body 10 further includes two concave portions 10c on two of its side surfaces that are parallel to the direction 1A in which the disc cartridge 308 is inserted. These concave portions 10c may be used as either pull-in notches or positioning recesses when the disc cartridge 308 is pulled in and loaded into a disk drive or when the disc cartridge 308 is stored in a changer.

Figure 25:
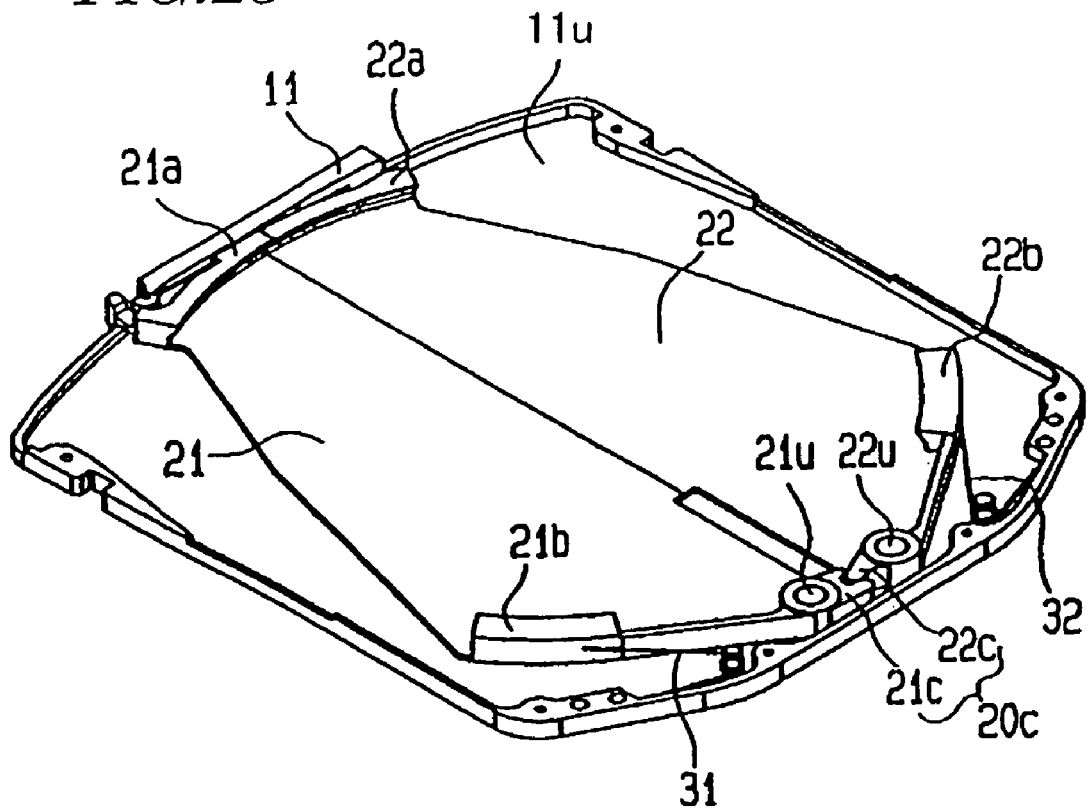
FIG. 25 is a perspective view illustrating the disc cartridge shown in FIG. 23 with its upper shell and the disc removed to show a state where its shutters are closed.

FIG. 25 is a perspective view illustrating the disc cartridge 308 with the upper shell 12 and the disc 100 removed to show a state where the shutters 21 and 22 cover the chucking and head openings 11c and 11h. In FIG. 25, the disc holders 21a, 21b, 22a and 22b of the shutters 21 and 22 are located at such positions as to grip the outer edge of the disc 100 (not shown in FIG. 25).

Figure 26:
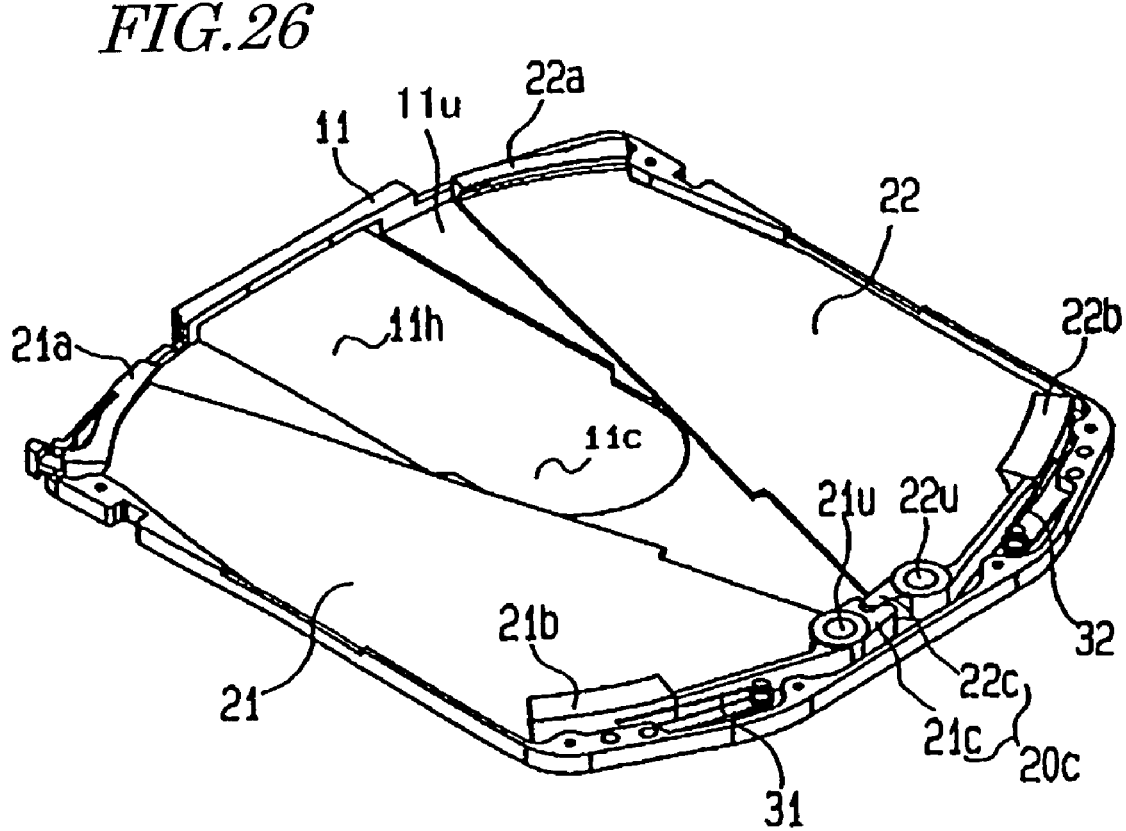
FIG. 26 is a perspective view illustrating the disc cartridge shown in FIG. 23 with its upper shell and the disc removed to show a state where its shutters are opened.

FIG. 26 is a perspective view illustrating the disc cartridge 308 with the upper shell 12 and the disc 100 removed to show a state where the shutters 21 and 22 expose the chucking and head openings 11c and 11h. As a result of the rotation of the shutters 21 and 22 on their holes 21u and 22u, respectively, the chucking and head openings 11c and 11h are now exposed. Also, as the shutters 21 and 22 have rotated, the disc holders 21a, 21b, 22a and 22b have also rotated on the holes 21u and 22u. Consequently, the disc holders 21a, 21b, 22a and 22b are now separated from the outer edge of the disc 100 (not shown in FIG. 26).

Figure 27:
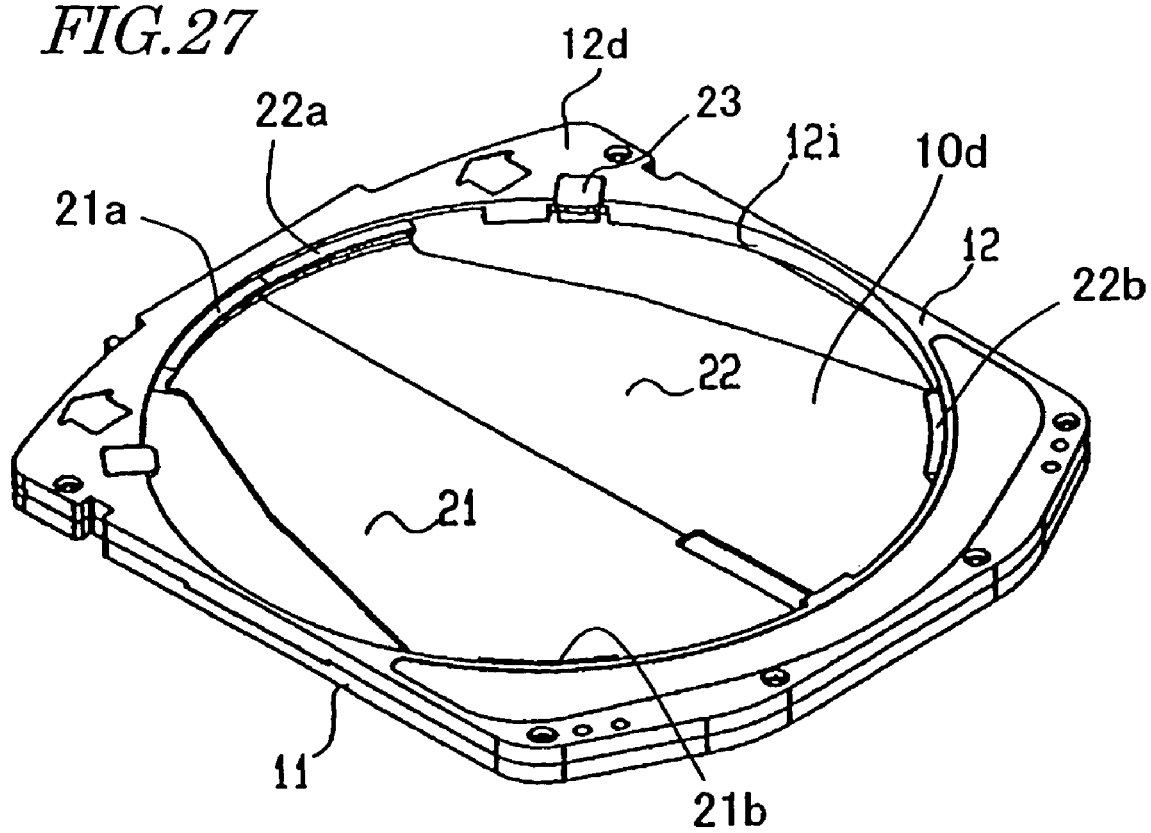
FIG. 27 is a perspective view illustrating the disc cartridge shown in FIG. 23 with the disc removed to show a state where its shutters are closed.
Figure 28:
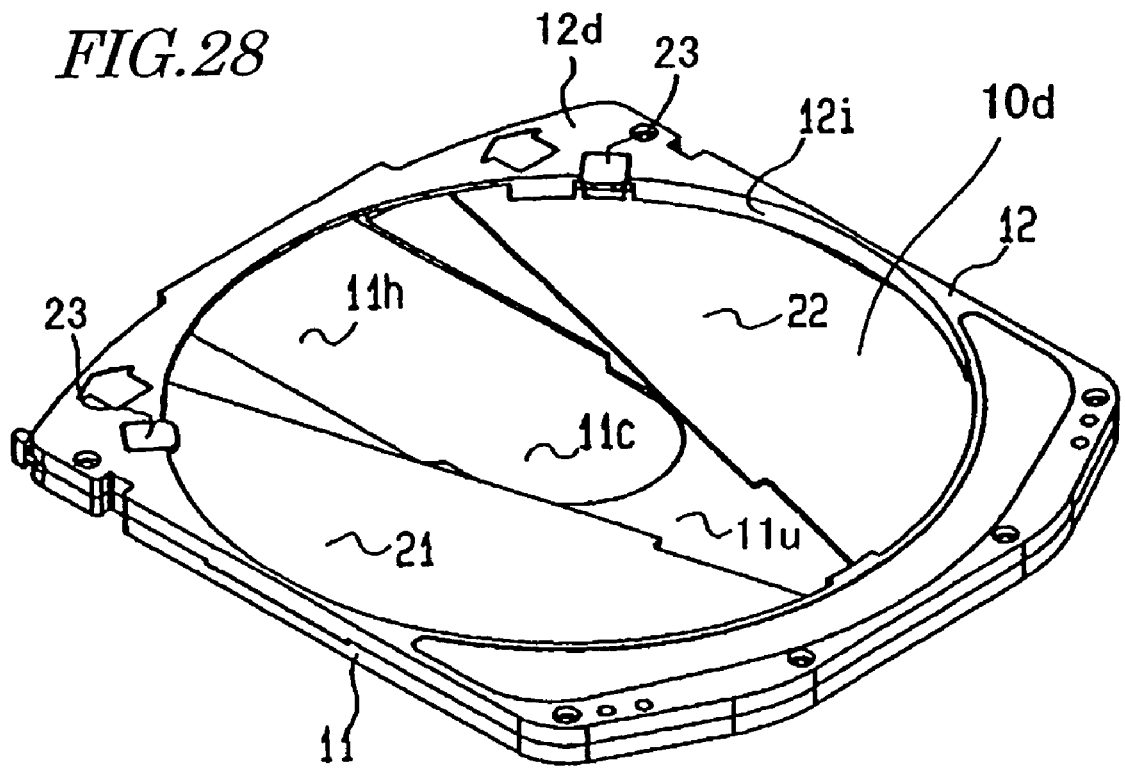
FIG. 28 is a perspective view illustrating the disc cartridge shown in FIG. 23 with the disc removed to show a state where its shutters are opened.

FIG. 27 is a perspective view illustrating the disc cartridge 308, on which the disc 100 has not been mounted yet, to show a state where the shutters 21 and 22 cover the chucking and head openings 11c and 11h. As shown in FIG. 27, the disc holders 21a, 21b, 22a and 22b protrude into the disc storage portion 10d. Thus, when the disc 100 is stored in this disc cartridge 308, the disc 100 is held by these disc holders 21a, 21b, 22a and 22b. On the other hand, FIG. 28 is a perspective view illustrating the disc cartridge 308, on which the disc 100 has not been mounted yet, to show a state where the shutters 21 and 22 expose the chucking and head openings 11c and 11h. As shown in FIG. 28, while the shutters 21 and 22 are opened, the disc holders 21a, 21b, 22a and 22b are stored outside of the disc storage portion 10d of the cartridge body 10.

Figure 29:
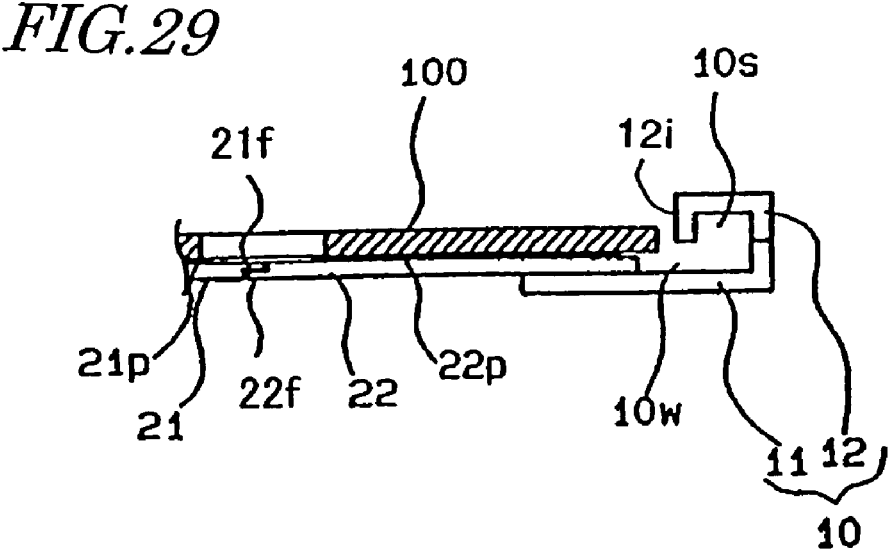
FIG. 29 is a partial cross-sectional view of the disc cartridge shown in FIG. 23, which is viewed along a plane that passes the center of the disc.

Next, the structure and the operation of the shutters 21 and 22 will be described in further detail with reference to FIGS. 29, 30 and 31. FIG. 29 is a partial cross-sectional view of the disc cartridge 308, which is viewed along a plane that passes the center of the disc 100. As shown in FIG. 29, the inner side surface 12i of the cartridge body 10 is provided with a notched portion 10w so as not to interfere with the opening and closing operations of the shutters 21 and 22. Also, the cartridge body 10 further includes shutter storage 10s for storing a portion of the shutters 21 and 22 being opened. Furthermore, at least the edges 21f and 22f of the shutters 21 and 22, which are butted against each other over the chucking and head openings 11c and 11h while the shutters 21 and 22 are closed, overlap with each other vertically (i.e., in the thickness direction of the disc 100) as shown in FIG. 29.

Figure 30:
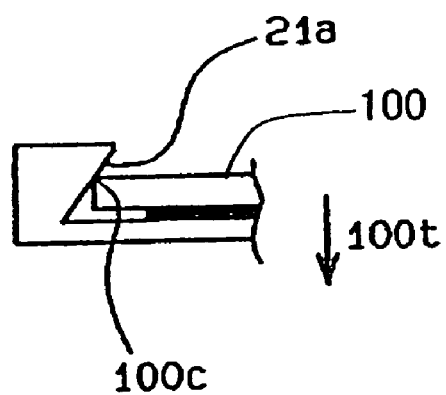
FIG. 30 is a cross-sectional view illustrating a portion of the shutter of the disc cartridge shown in FIG. 23.

On the other hand, as shown in FIG. 30, each of the disc holders 21a, 21b, 22a and 22b includes a slope 21a', 21b', 22a' or 22b', which hangs over the projection area of the disc 100 and overlaps with the outer edge of the disc 100. That is to say, the slope 21a', 21b', 22a' or 22b' has a downwardly tapered cross section and leans toward the disc 100 as shown in FIG. 30. While the chucking and head openings 11c and 11h are covered with the shutters 21 and 22, the slopes 21a', 21b', 22a' and 22b' are allowed to contact with the outer edge 100c of the disc 100, thereby gripping the disc 100 thereon and pressing the disc 100 in the thickness direction 100t. As a result, the sheets 21p and 22p of the shutters 21 and 22 contact with the signal recording side 100A of the disc 100 and the disc 100 is fixed in the cartridge body 10. In such a state, the signal recording side 100A of the disc 100 is in close contact with the sheets 21p and 22p. Thus, no dust will be deposited on the signal recording side 100A.

Also, if the exposed side of the disc 100 is rotated manually or if the shutters 21 and 22 are opened or closed intentionally, then dust, finger marks or any other dirt that has adhered onto the signal recording side 100A of the disc 100 may be wiped away.

Figure 31:
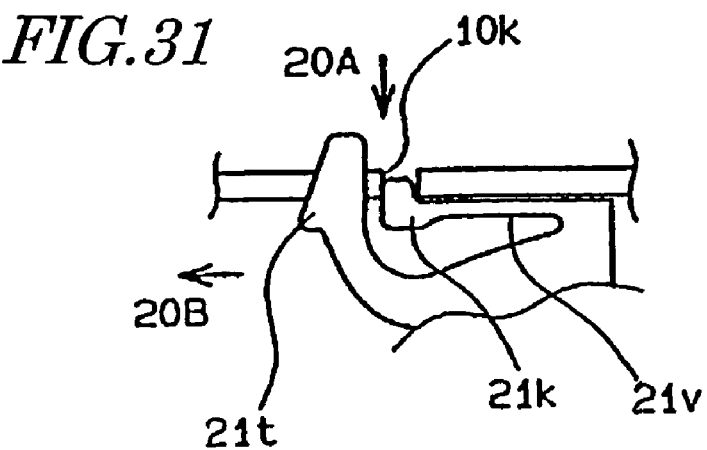
FIG. 31 is a partial plan view illustrating a shutter opener/closer and its surrounding portion of the disc cartridge shown in FIG. 23.

Furthermore, as shown in FIG. 31, the shutter 21 includes a shutter opener/closer 21t, an elastic portion 21v and a locking protrusion 21k. These portions 21t, 21v and 21k form integral parts of the shutter 21. Specifically, the shutter opener/closer 21t is for use to open and close the shutter 21 externally. The locking protrusion 21k is connected to the shutter 21 by way of the elastic portion 21v. While the shutter 21 covers the chucking and head openings 11c and 11h, the locking protrusion 21k, to which an elastic force is being applied from the elastic portion 21v, engages with a locking hole 10k of the cartridge body 10, thereby preventing the shutter 21 from rotating and fixing the shutter 21 to the cartridge body 10 as shown in FIG. 31. When the shutter 21 is fixed, the other shutter 22, which is interlocked with the former shutter 21 via the interlocking mechanism 20c, is also fixed.

Accordingly, only by getting the locking protrusion 21k pressed externally by a protrusion, for example, in the direction indicated by the arrow 20A and disengaged from the locking hole 10k while pressing the opener/closer 21t in the direction indicated by the arrow 20B at the same time, the shutters 21 and 22 can be rotated to expose the chucking and head openings 11c and 11h and the disc 100 can be released from the disc holders 21a, 21b, 22a and 22b. Thus, it is possible to prevent the user from removing the disc 100 accidentally.

Figure 32:
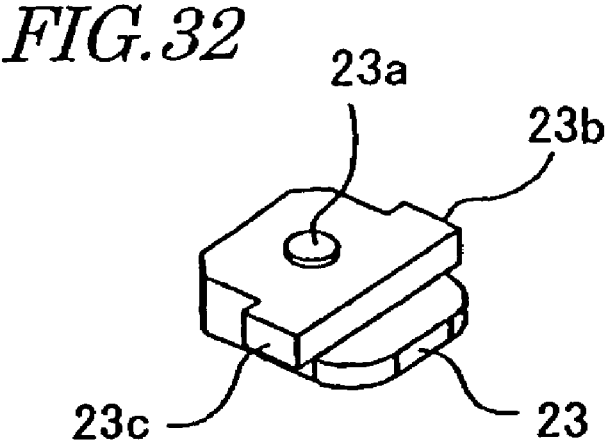
FIG. 32 is a perspective view illustrating a disc stopper of the disc cartridge shown in FIG. 23.

Next, the structure and operation of the disc stoppers 23 will be described in further detail with reference to FIGS. 24 and 32. FIG. 32 is a perspective view illustrating the removable disc stopper 23 upside down. The convex portions 23a, 23b and 23c of the disc stopper 23 are respectively engaged with concave portions 12a, 12b and 12c provided for the upper shell 12 near the disc window 12w thereof as shown in FIG. 24. Thus, if these convex portions 23a, 23b and 23c are disengaged from the concave portions 12a, 12b and 12c, the disc stopper 23 can be removed from the upper shell 12.

Figure 33:
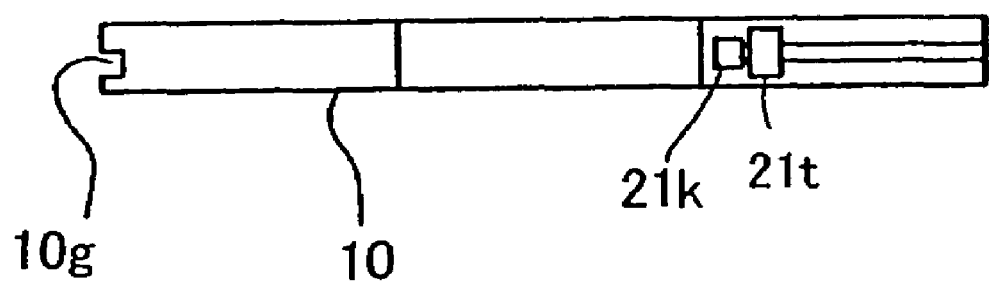
FIG. 33 is a front view illustrating the insertion side of the disc cartridge shown in FIG. 23.

Next, a mechanism for preventing the user from inserting this disc cartridge 308 into a disc drive in the wrong way will be described with reference to FIG. 33. FIG. 33 is a front view illustrating the insertion side of the disc cartridge 308 shown in FIG. 23 as viewed in the direction 1B (see FIG. 23). As shown in FIG. 33, the cartridge body 10 includes a concave portion 10g on one side surface thereof and is asymmetric in the direction IA in which the disc cartridge 308 is inserted into the disc drive (see FIG. 23). The concave portion 10g is not located at the center of thickness of the cartridge body 10.

By providing such a concave portion 10g for the disc cartridge 308, only when its associated convex portion, provided for the disc drive, is fitted with this concave portion 10g, the disc cartridge 308 can be inserted into the disc drive correctly and the disc drive can operate normally.

Stated otherwise, even if the user tries to insert the disc cartridge 308 into the disc drive upside down by mistake, he or she cannot insert the cartridge 308 into the disc drive. This is because the associated convex portion of the disc drive interferes with the other side surface of the disc cartridge 308 with no concave portion 10g. Also, even if the user tries to insert the disc cartridge 308 into the disc drive upside down and in the wrong way by mistake, he or she cannot insert the cartridge 308 into the disc drive, either. This is because the convex portion of the disc drive also interferes with the non-recessed portion of the side surface with the concave portion 10g. Thus, it is possible to prevent the user from inserting the disc cartridge 308 erroneously.

The disc cartridge 308 of the eighth preferred embodiment described above may be modified in various manners.

For example, the thickness of the cartridge body 10 may be further reduced to such an extent that the disc stoppers 23 will not protrude from the upper surface 12f of the upper shell 12 (see FIG. 24) while the shutters 21 and 22 are closed. In that case, while the shutters 21 and 22 are going to be opened, the disc holders 21a and 22a may push the respective convex portions 23a of the disc stoppers 23 upward from under the disc stoppers 23, thereby protruding the disc stoppers 23 from the upper surface 12f of the upper shell 12. According to such a structure, a sufficiently broad space can be allowed the disc 100 to rotate inside the disc storage portion 10d and yet the disc cartridge 308 can have its thickness further reduced.

Also, the disc stoppers 23 may form integral parts of the cartridge body 10. In that case, the disc stoppers 23 should be able to be bent almost perpendicularly so that the disc 100 mounted can be removed.

Furthermore, the shutter springs 31 and 32 may apply an elastic force in such a direction as to open the shutters 21 and 22. If the shutters 21 and 22 can operate almost completely synchronously by way of the interlocking mechanism, one of the shutter springs 31 and 32 may be omitted.

In the preferred embodiment described above, the locking protrusion 21k forms an integral part of the shutter 21. Alternatively, a locking lever, including a locking protrusion and a convex portion at the end thereof, may be connected to the cartridge body 10 via an elastic portion, and an associated concave portion may be provided for the shutter so that the convex and concave portions engage with each other. In that case, by pressing the locking protrusion through a locking hole of the cartridge body, these convex and concave portions may be disengaged from each other so as to allow the shutters to rotate freely. Optionally, in that alternative preferred embodiment, the locking lever, as well as the shutter springs (i.e., elastic members), may be resin springs that form integral parts of the cartridge body 10.

EMBODIMENT 9

Hereinafter, a disc cartridge 309 according to a ninth specific preferred embodiment of the present invention will be described with reference to the accompanying drawings.

Figure 34:
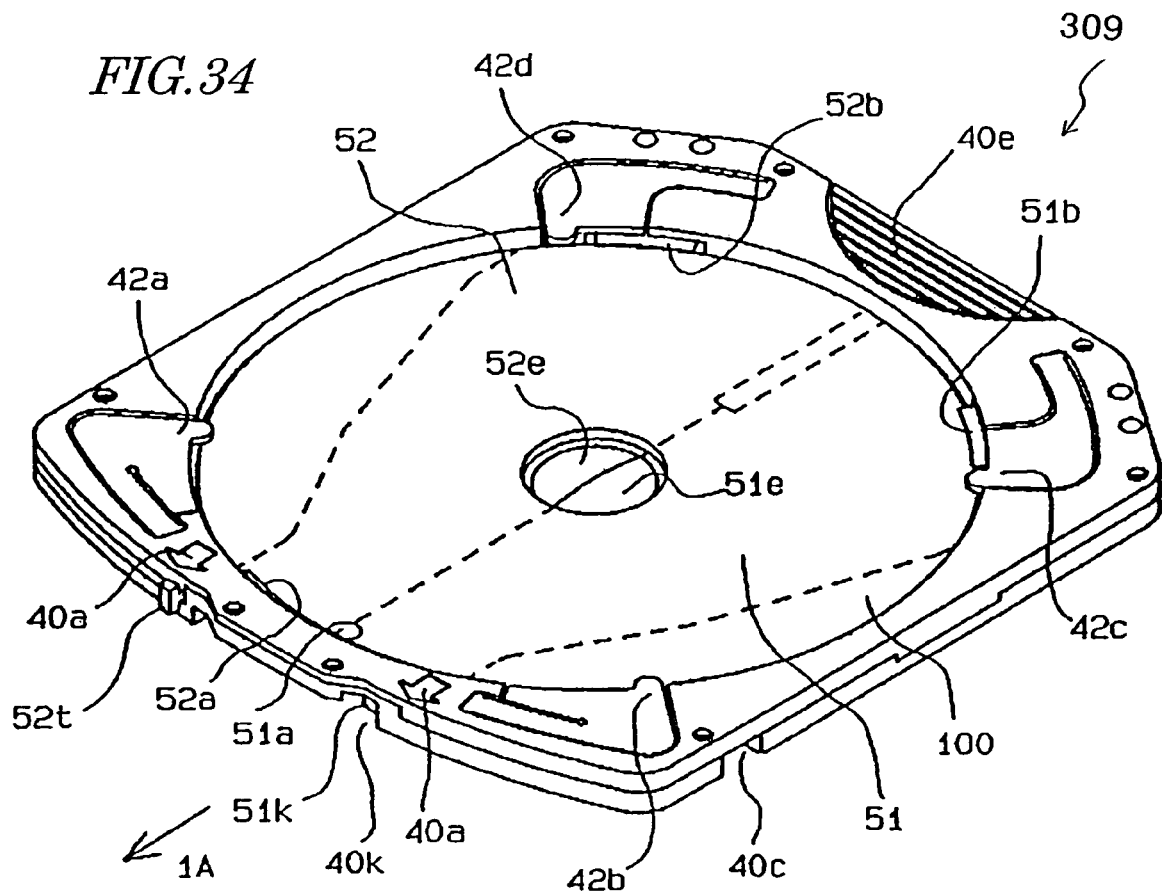
FIG. 34 is a perspective view illustrating an overall configuration for a disc cartridge according to a ninth specific preferred embodiment of the present invention.
Figure 35:
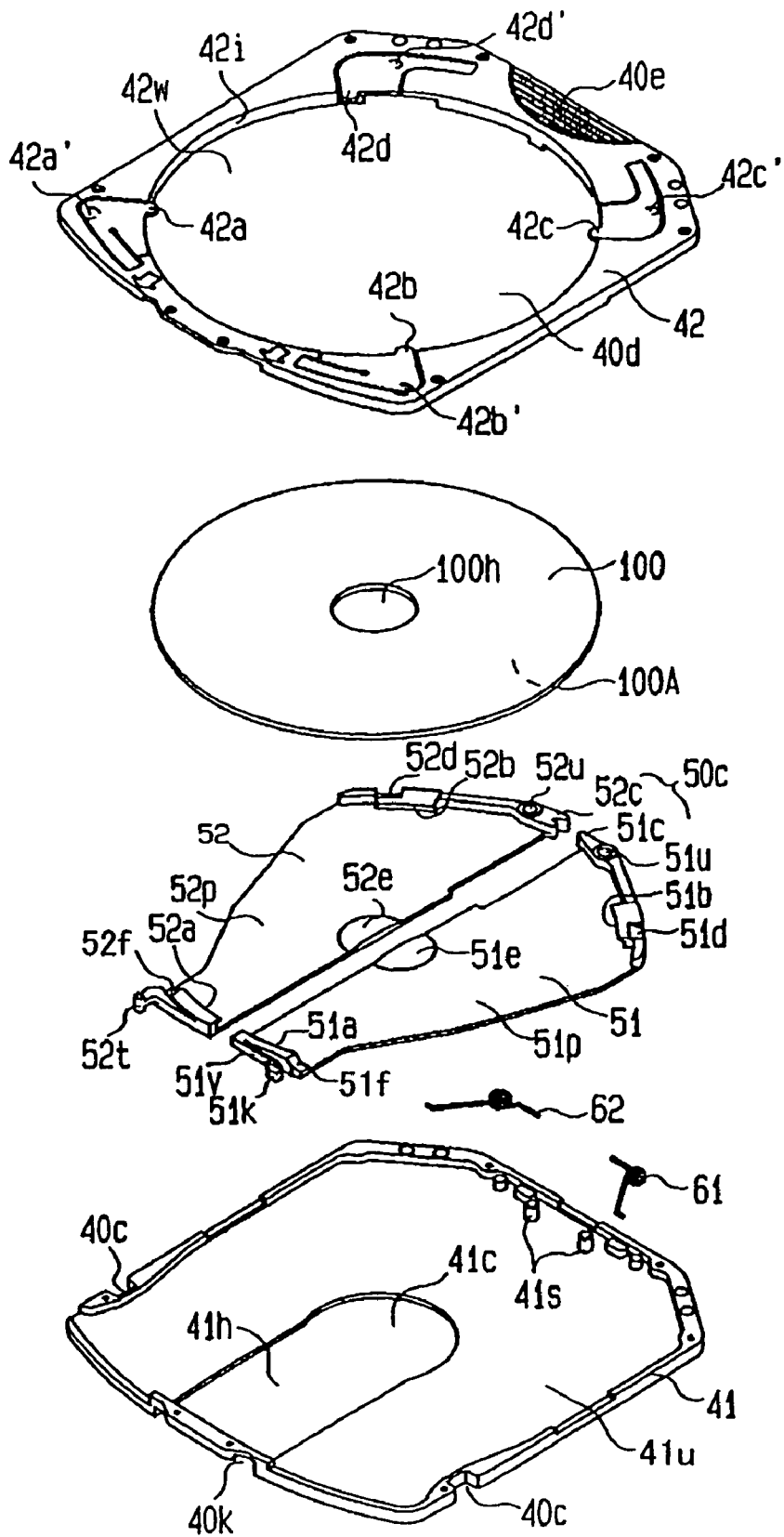
FIG. 35 is an exploded perspective view of the disc cartridge shown in FIG. 34.

As shown in FIGS. 34 and 35, the disc cartridge 309 includes a lower shell 41, an upper shell 42, disc stoppers 42a, 42b, 42c and 42d, and a pair of shutters 51 and 52.

As shown in FIG. 35, the lower shell 41 includes a chucking opening 41c and a head opening 41h. The chucking opening 41c allows a chucking member (e.g., a spindle motor for rotating the disc 100) to enter the disc cartridge 309 externally. The head opening 41h allows a head, which reads and/or writes a signal from/on the signal recording side 100A of the disc 100, to enter the disc cartridge 309 and access a target location on the disc 100. The lower shell 41 faces the signal recording side 100A of the disc 100. Also, the head opening 41h reaches one side surface of the lower shell 41.

The upper shell 42 includes a circular disc window 42w, through which the disc 100 can be introduced and removed into/from the disc cartridge 309 and which expands over the entire projection area of the disc 100 to expose the upper side of the disc 100. The upper and lower shells 42 and 41 are adhered or welded together at their outer periphery, thereby forming a cartridge body 40.

A disc storage portion 40d for storing the disc 100 therein is defined by a first inner surface 41u and a second inner surface 42i of the cartridge body 40. The first inner surface 41u is opposed to the signal recording side 100A of the disc 100, while the second inner surface 42i has a substantially cylindrical shape and defines the disc window 42w inside. That is to say, the first inner surface 41u is the bottom of the disc storage portion 40d.

In the disc storage portion 40d, a gap, which is wide enough to allow the disc 100 to rotate freely, is provided between the second inner surface 42i and the outer periphery of the disc 100. Also, the top of the disc storage portion 40d is the disc window 42w so that the disc 100 stored in the disc storage portion 40d has one of its sides exposed inside the disc window 42w.

The disc stoppers 42a, 42b, 42c and 42d form integral parts of the upper shell 42 so as to partially protrude into the disc window 42w. Each of these disc stoppers 42a, 42b, 42c and 42d is separated from the upper shell 42 via a slit. These disc stoppers 42a, 42b, 42c and 42d are used to prevent the disc 100 from dropping down from the disc window 42w. The disc stoppers 42a, 42b, 42c and 42d are effective particularly when this disc cartridge 309 is loaded into a vertically mounted disc drive. Optionally, these disc stoppers 42a, 42b, 42c and 42d may be integrated with the upper shell 42 by way of elastic members.

The shutters 51 and 52 are disposed between the signal recording side 100A of the disc 100 and the first inner surface 41u of the cartridge body 40. The shutters 51 and 52 include holes 51u and 52u, respectively. These holes 51u and 52u are engaged in a freely rotatable state with shafts 41s, which are located outside of the disc storage portion 40d of the cartridge body 40 and on a deep side of the cartridge body 40 opposite to the head opening 41h thereof. Thus, the shutters 51 and 52 rotate on the shafts 41s in such a manner as to cover or expose the chucking and head openings 41c and 41h.

A cam 51c and a follower 52c are provided near the holes 51u and 52u of the shutters 51 and 52, respectively. The cam 51c and the follower 52c have mutually engaging shapes and together make up an interlocking mechanism 50c for opening and closing the shutters 51 and 52 while interlocking them with each other.

The respective upper surfaces of the shutters 51 and 52, which are opposed to the signal recording side 100A of the disc 100, are covered with protective layers 51p and 52p for the purpose of preventing the signal recording side 100A of the disc 100 from getting scratched or attracting dust.

The protective layers 51p and 52p may be appropriately selected from the group consisting of anti-scratching non-woven fabric, dustproof nonwoven fabric, anti-scratching coating and dustproof coating. In this preferred embodiment, sheets of a dustproof nonwoven fabric are adhered or ultrasonic welded as the protective layers 51p and 52p to the shutters 51 and 52, respectively.

Shutter springs 61 and 62 are provided outside of the disc storage portion 40d for the shutters 51 and 52, respectively. These springs 61 and 62 apply an elastic force to the shutters 51 and 52 in such a direction as to close the shutters 51 and 52. Alternatively, the shutter springs 61 and 62 may apply an elastic force to the shutters 51 and 52 in such a direction as to open the shutters 51 and 52. Also, if the shutters 51 and 52 can operate almost completely synchronously by way of the interlocking mechanism, one of the shutter springs 61 and 62 may be omitted.

As in the eighth preferred embodiment described above, the shutters 51 and 52 each include two disc holders 51a, 51b and 52a, 52b at both ends thereof as shown in FIG. 35. Furthermore, as will be described in detail later, convex portions 51e and 52e are formed on the shutters 51 and 52, respectively, so as to be located under the center hole of the disc 100 while the shutters 51 and 52 are closed.

As shown in FIG. 34, the upper surface of the cartridge body 40 (or the upper shell 42) has embossed arrow marks (or concave portions) 40a that indicate the direction (the arrow 1A) in which this disc cartridge 309 should be inserted into a disc drive. The cartridge body 40 further includes two concave portions 40c on two of its side surfaces that are parallel to the direction 1A in which the disc cartridge 309 is inserted into the disc drive. These concave portions 40c may be used as either pull-in notches or positioning recesses when the disc cartridge 309 is pulled in and loaded into a disk drive or when the disc cartridge 309 is stored in a changer. Optionally, only one of the side surfaces of the disc cartridge 309 may include the concave portion 40c. In that case, the concave portion 40c can contribute to preventing the user from inserting or loading this disc cartridge 309 into the disc drive upside down by mistake. The upper surface of the cartridge body 40 further includes a grip 40e that allows the user to grip this disc cartridge 309. This grip 40e has an antislip embossed shape.

Figure 36:
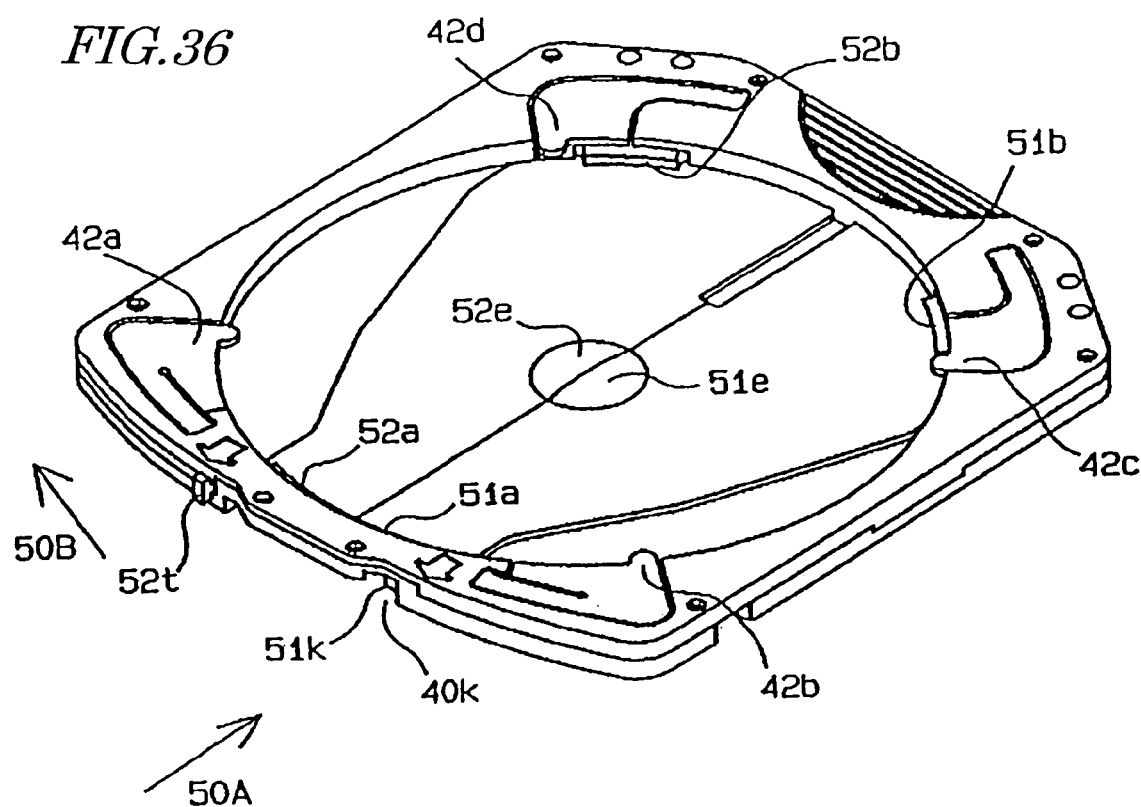
FIG. 36 is a perspective view illustrating the disc cartridge shown in FIG. 34 with the disc removed to show a state where its shutters are closed.
Figure 37:
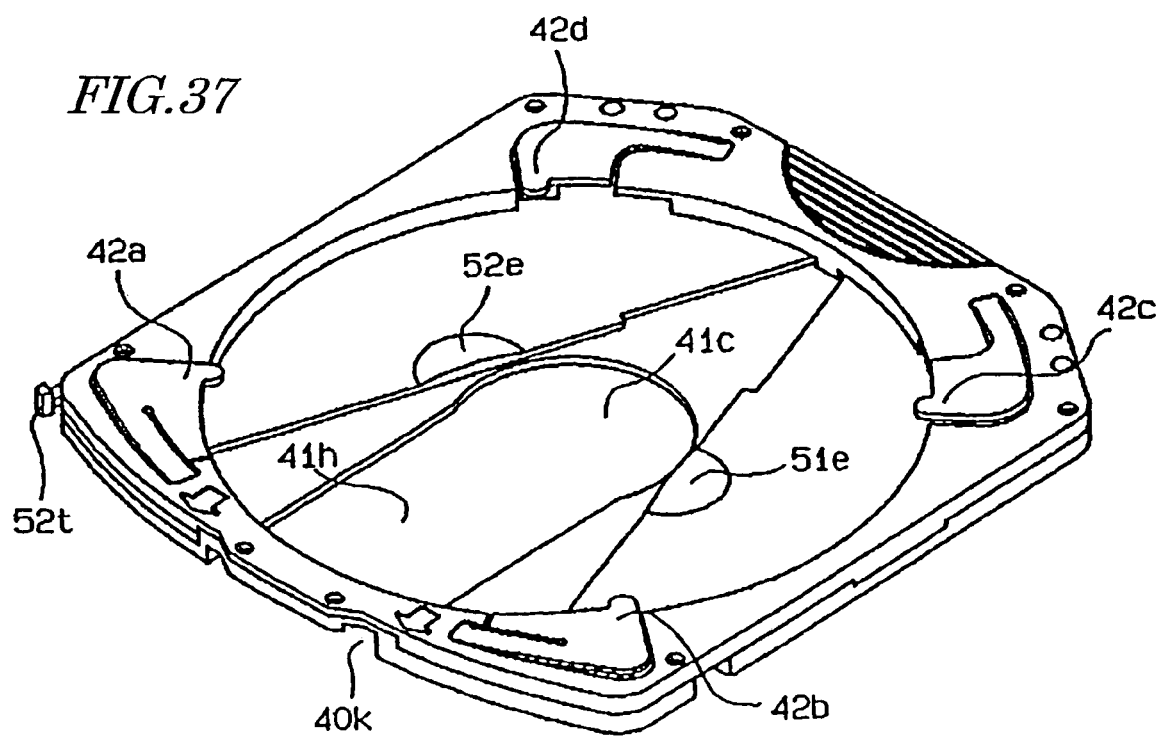
FIG. 37 is a perspective view illustrating the disc cartridge shown in FIG. 34 with the disc removed to show a state where its shutters are opened.

FIG. 36 is a perspective view illustrating the disc cartridge 309, in which no disc 100 has been stored yet, to show a state where the shutters 51 and 52 cover the chucking and head openings 41c and 41h. FIG. 37 is a perspective view illustrating the disc cartridge 309, in which no disc 100 has been stored yet, to show a state where the shutters 51 and 52 expose the chucking and head openings 41c and 41h.

Hereinafter, the structure and the operation of the shutters 51 and 52 will be described in further detail. As shown in FIGS. 34 and 35, the disc holders 51a, 51b, 52a and 52b of the shutters 51 and 52 also have such a cross-sectional shape as including a slope that hangs over the projection area of the disc 100 and overlaps with the outer edge of the disc 100 as in the eighth preferred embodiment. That is to say, the slope is downwardly tapered and leans toward the disc 100. Thus, the effects of the eighth preferred embodiment described above are also achieved by this ninth preferred embodiment.

Also, the shutter 52 includes an opener/closer 52t for use to open and close the shutter 52 externally, while the shutter 51 includes an elastic portion 51v and a locking protrusion 51k as integral parts thereof. The locking protrusion 51k is connected to the shutter 51 by way of the elastic portion 51v as shown in FIG. 35. Thus, while the chucking and head openings 41c and 41h are covered with the shutters 51 and 52, the locking protrusion 51k, to which an elastic force is applied from the elastic portion 51v, engages with a locking hole 40k of the cartridge body 40 (or the lower shell 41), thereby fixing the shutter 51 in a non-rotatable state to the cartridge body 40. When the shutter 51 is fixed in this way, the other shutter 52, which is interlocked with the shutter 51 via the interlocking mechanism 50c, is also fixed.

Accordingly, only by getting the locking protrusion 51k pressed externally by a protrusion, for example, in the direction indicated by the arrow 50A and disengaged from the locking hole 40k while pressing the opener/closer 52t in the direction indicated by the arrow 50B at the same time as shown in FIG. 36, the shutters 51 and 52 can be rotated to expose the chucking and head openings 41c and 41h and the disc 100 can be released from the disc holders 51a, 51b, 52a and 52b. Thus, it is possible to prevent the user from removing the disc 100 accidentally.

Unlike the eighth preferred embodiment described above, the locking protrusion 51k and the opener/closer 52t are provided in this preferred embodiment for the two different shutters 51 and 52. Such a structure is particularly effective for a disc cartridge for a disc of a small size. This is because a disc cartridge for a disc of a small size and the shutters thereof should have relatively small sizes and it is normally difficult to provide the locking protrusion and opener/closer for a single shutter out of design considerations. Also, even when a single shutter can include both the locking protrusion and the opener/closer, a very narrow gap would be allowed between a shutter opening/closing mechanism and an unlocking mechanism on the disc drive side or these two mechanisms need to be formed within a very limited space, thus making it hard to design the disc drive as intended.

In the preferred embodiment described above, the locking protrusion 51k forms an integral part of the shutter 51. Alternatively, a locking lever, including a locking protrusion and a convex portion at the end thereof, may be connected to the cartridge body 40 by way of an elastic portion, and an associated concave portion may be provided for the shutter so that the convex and concave portions engage with each other. In that case, by pressing the locking protrusion through a locking hole of the cartridge body, these convex and concave portions may be disengaged from each other so as to allow the shutters to rotate freely. Optionally, in that alternative preferred embodiment, the locking lever, as well as the shutter springs (i.e., elastic members), may be resin springs that form integral parts of the cartridge body 40.

Figure 38:
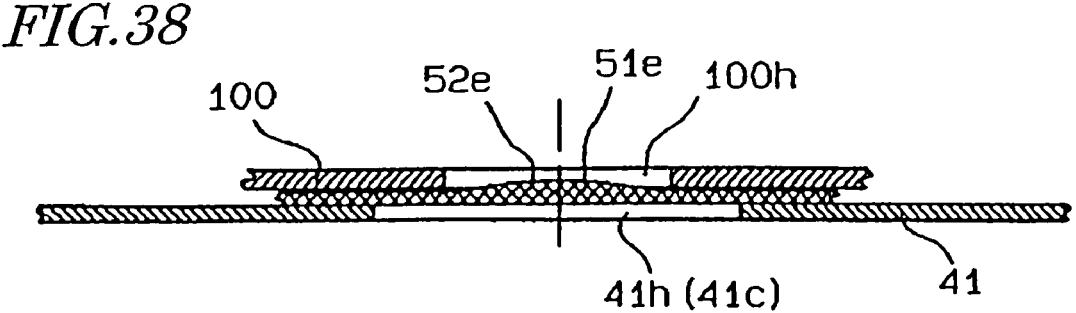
FIG. 38 is a partial cross-sectional view of the disc cartridge shown in FIG. 34, which is viewed along a plane that passes the center of the disc to show a state where its shutters are closed.

Next, it will be described how the convex portions 51e and 52e on the shutters 51 and 52 work. FIG. 38 is a partial cross-sectional view of the disc cartridge 309, which is viewed along a plane that passes the center of the disc 100. As shown in FIG. 38, while the shutters 51 and 52 are closed, the convex portions 51e and 52e protrude into the center hole 100h of the disc 100 and the disc 100 is now in contact with the shutters 51 and 52.

Figure 39:
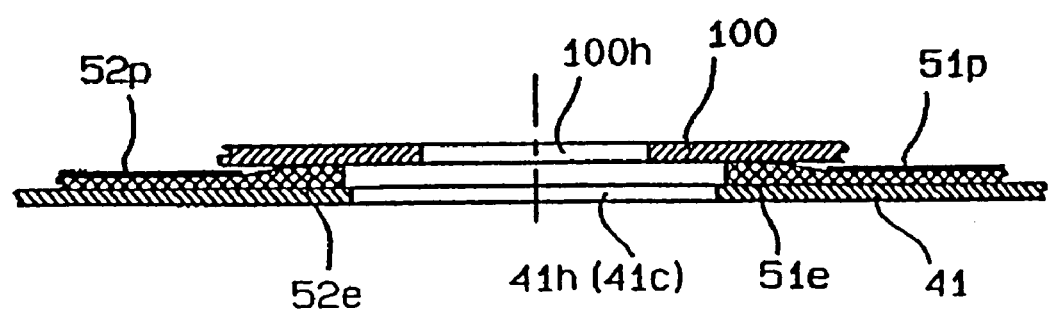
FIG. 39 is a partial cross-sectional view of the disc cartridge shown in FIG. 34, which is viewed along a plane that passes the center of the disc to show a state where its shutters are opened.

As shown in FIG. 39, while the shutters 51 and 52 are going to be opened, the convex portions 51e and 52e slide from inside the center hole 100h into under the lower side of the disc 100, thereby lifting the disc 100 up from the shutters 51 and 52. In this manner, while the shutters 51 and 52 are going to be opened or closed, the signal recording side 100A of the disc 100 will not get scratched by the shutters 51 and 52. Also, it is inside the signal recording area of the signal recording side 100A that the convex portions 51e and 52e move along with the shutters 51 and 52 being opened or closed. Accordingly, the convex portions 51e and 52e will not contact with, or scratch, the signal recording area.

Figure 40:
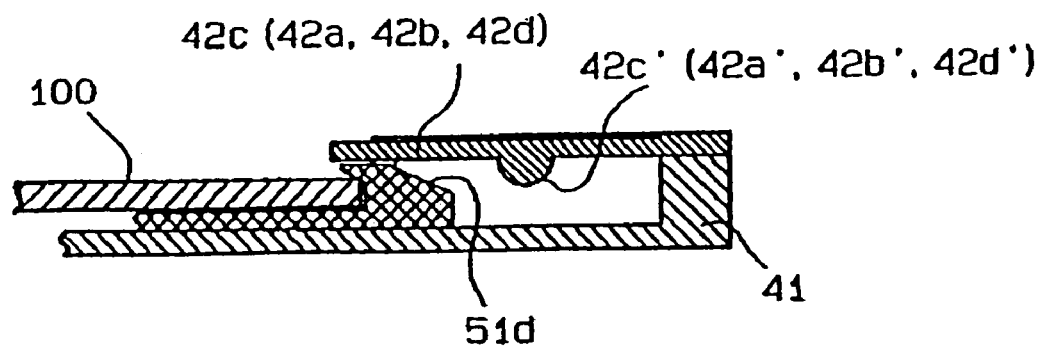
FIG. 40 is a partial cross-sectional view illustrating a portion of the disc cartridge shown in FIG. 34 around the disc outer periphery, which is viewed along a plane passing the center of the disc to show a state where its shutters are closed.

Next, the structure and operation of the disc stoppers will be described with reference to FIGS. 40 and 41. FIG. 40 is a partial cross-sectional view illustrating a portion of the disc cartridge 309 around the disc outer periphery, and is viewed along a plane that passes the center of the disc 100. As shown in FIG. 40, a convex portion 42a', 42b', 42c' or 42d' has been formed on the bottom of the disc stopper 42a, 42b, 42c or 42d. While the shutters 51 and 52 are closed, the disc stopper 42a, 42b, 42c or 42d is substantially parallel to the surface of the disc 100 and falls within the thickness of the cartridge 309 as shown in FIG. 40. An appearance of the disc cartridge 309 in such a state is illustrated in FIG. 36.

Figure 41:
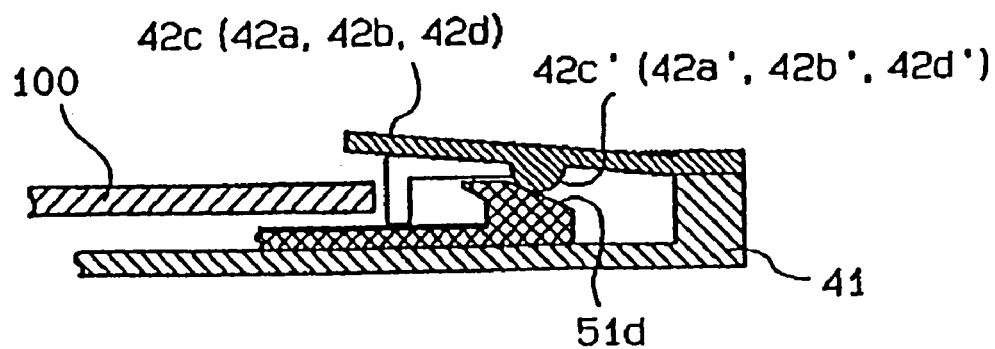
FIG. 41 is a partial cross-sectional view illustrating a portion of the disc cartridge shown in FIG. 34 around the disc outer periphery, which is viewed along a plane passing the center of the disc to show a state where its shutters are opened.

On the other hand, while the shutters 51 and 52 are opened, the slopes 52f, 51f, 51d and 52d of the shutters 51 and 52 contact with the convex portions 42a', 42b', 42c' and or 42d', respectively, thereby lifting the disc stoppers 42a, 42b, 42c and 42d to above the disc 100 as shown in FIG. 41. An appearance of the disc cartridge 309 in such a state is illustrated in FIG. 37. By using such a structure, particularly in an interval after the disc cartridge 309 has been vertically loaded into a disc drive and before the disc 100 is chucked, it is possible to prevent the disc 100 from dropping down from the cartridge 309. In addition, while the disc 100 is being chucked, the disc 100 can move in a broader space. Furthermore, this structure can also contribute to further reducing the thickness of the cartridge.

It should be noted that to keep the shutters 51 and 52 temporarily opened for a while, the slopes 52f, 51f, 51d and 52d may have convex or concave portions that engage with the convex portions 42a', 42b', 42c' and 42d'.

EMBODIMENT 10

Hereinafter, a disc cartridge 310 according to a tenth specific preferred embodiment of the present invention will be described with reference to the accompanying drawings. The disc cartridge 310 of this preferred embodiment is mainly characterized in that disc stoppers are provided for the shutters.

Figure 42:
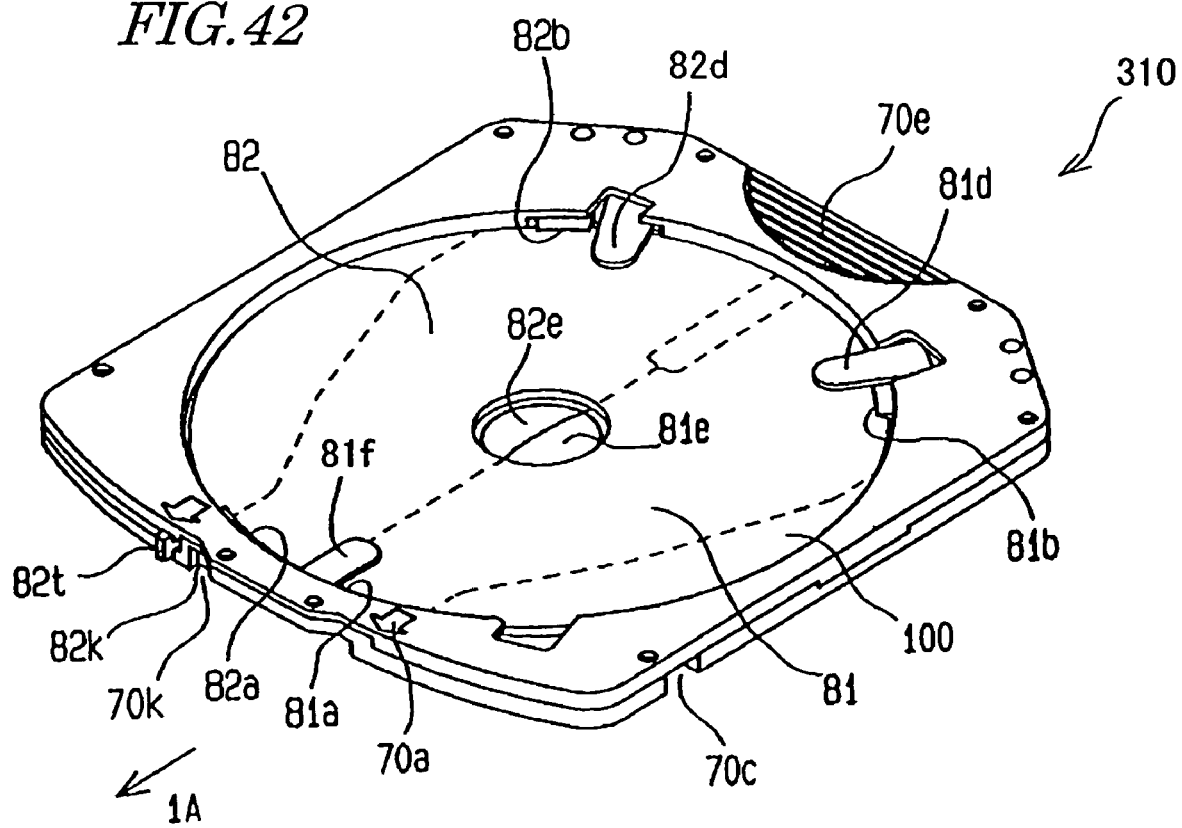
FIG. 42 is a perspective view illustrating an overall configuration for a disc cartridge according to a tenth specific preferred embodiment of the present invention.
Figure 43:
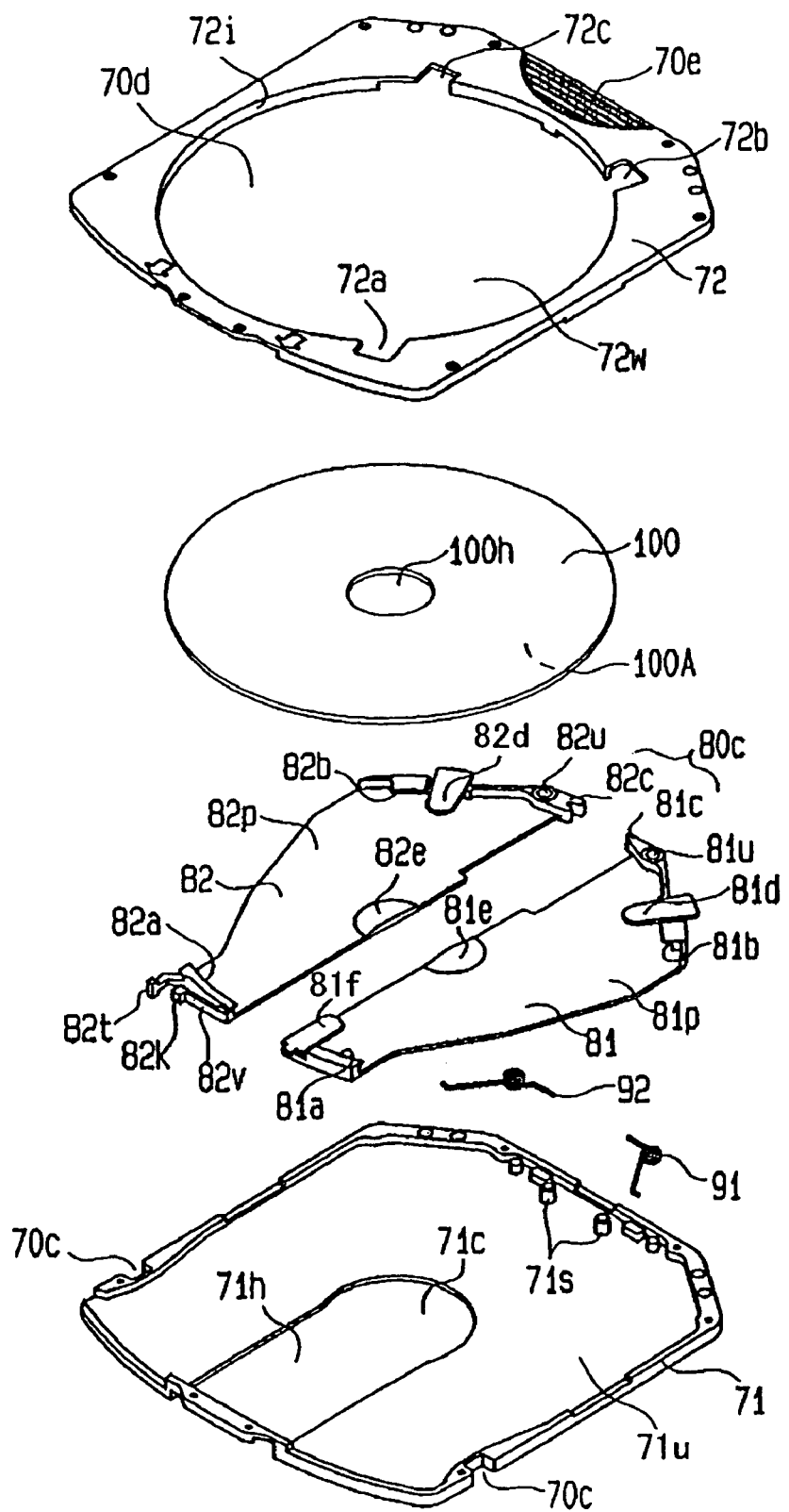
FIG. 43 is an exploded perspective view of the disc cartridge shown in FIG. 42.

As shown in FIGS. 42 and 43, the disc cartridge 310 includes a lower shell 71, an upper shell 72, disc stoppers 81d, 81f, and 82d, and a pair of shutters 81 and 82.

As shown in FIG. 43, the lower shell 71 includes a chucking opening 71c and a head opening 71h. The chucking opening 71c allows a chucking member (e.g., a spindle motor for rotating the disc 100) to enter the disc cartridge 310 externally. The head opening 71h allows a head, which reads and/or writes a signal from/on the signal recording side 100A of the disc 100, to enter the disc cartridge 310 and access a target location on the disc 100. The lower shell 71 faces the signal recording side 100A of the disc 100. Also, the head opening 71h reaches one side surface of the lower shell 71.

The upper shell 72 includes a circular disc window 72w, through which the disc 100 can be introduced and removed into/from the disc cartridge 310 and which expands over the entire projection area of the disc 100 to expose the upper side of the disc 100. The upper and lower shells 72 and 71 are adhered or welded together at their outer periphery, thereby forming a cartridge body 70.

A disc storage portion 70d for storing the disc 100 therein is defined by a first inner surface 71u and a second inner surface 72i of the cartridge body 70. The first inner surface 71u is opposed to the signal recording side 100A of the disc 100, while the second inner surface 72i has a substantially cylindrical shape and defines the disc window 72w inside. That is to say, the first inner surface 71u is the bottom of the disc storage portion 70d.

In the disc storage portion 70d, a gap, which is wide enough to allow the disc 100 to rotate freely, is provided between the second inner surface 72i and the outer periphery of the disc 100. Also, the top of the disc storage portion 70d is the disc window 72w so that the disc 100 stored in the disc storage portion 70d has one of its sides exposed inside the disc window 72w.

The shutters 81 and 82 are disposed between the signal recording side 100A of the disc 100 and the first inner surface 71u of the cartridge body 70. The shutters 81 and 82 include holes 81u and 82u, respectively. These holes 81u and 82u are engaged in a freely rotatable state with shafts 71s, which are located outside of the disc storage portion 70d of the cartridge body 70 and on a deep side of the cartridge body 70 opposite to the head opening 71h thereof. Thus, the shutters 81 and 82 rotate on the shafts 71s in such a manner as to cover or expose the chucking and head openings 71c and 71h.

A cam 81c and a follower 82c are provided near the holes 81u and 82u of the shutters 81 and 82, respectively. The cam 81c and the follower 82c have mutually engaging shapes and together make up an interlocking mechanism 80c for opening and closing the shutters 81 and 82 while interlocking them with each other.

The respective upper surfaces of the shutters 81 and 82, which are opposed to the signal recording side 100A of the disc 100, are covered with protective layers 81p and 82p for the purpose of preventing the signal recording side 100A of the disc 100 from getting scratched or attracting dust.

The protective layers 81p and 82p may be appropriately selected from the group consisting of anti-scratching nonwoven fabric, dustproof nonwoven fabric, anti-scratching coating and dustproof coating. In this preferred embodiment, sheets of a dustproof nonwoven fabric are adhered or ultrasonic welded as the protective layers 81p and 82p to the shutters 81 and 82, respectively.

Shutter springs 91 and 92 are provided outside of the disc storage portion 70d for the shutters 81 and 82, respectively. These springs 91 and 92 apply an elastic force to the shutters 81 and 82 in such a direction as to close the shutters 81 and 82. Alternatively, the shutter springs 91 and 92 may apply an elastic force to the shutters 81 and 82 in such a direction as to open the shutters 81 and 82. Also, if the shutters 81 and 82 can operate almost completely synchronously by way of the interlocking mechanism 80c, one of the shutter springs 91 and 92 may be omitted.

As in the eighth preferred embodiment described above, the shutters 81 and 82 each include two disc holders 81a, 81b and 82a, 82b at both ends thereof as shown in FIG. 43. Convex portions 81e and 82e are also formed on the shutters 81 and 82, respectively, as in the ninth preferred embodiment.

Furthermore, as will be described in detail later, the disc stoppers 81f, 81d and 82d are provided as integral parts of the shutters 81 and 82 near the disc holders 81a, 81b and 82a, respectively. Alternatively, these disc stoppers 81f, 81d and 82d may be integrated with the shutters 81 and 82 by way of elastic members.

As shown in FIG. 42, the upper surface of the cartridge body 70 (or the upper shell 72) has embossed arrow marks (or concave portions) 70a that indicate the direction (the arrow 1A) in which this disc cartridge 310 should be inserted into a disc drive. The cartridge body 70 further includes two concave portions 70c on two of its side surfaces that are parallel to the direction 1A in which the disc cartridge 310 is inserted. These concave portions 70c may be used as either pull-in notches or positioning recesses when the disc cartridge 310 is pulled in and loaded into a disk drive or when the disc cartridge 310 is stored in a changer. Optionally, only one of the side surfaces of the disc cartridge 310 may include the concave portion 70c. In that case, the concave portion 70c can contribute to preventing the user from inserting or loading this disc cartridge 310 into the disc drive upside down by mistake. The upper surface of the cartridge body 70 further includes a grip 70e that allows the user to grip this disc cartridge 310. This grip 70e has an antislip embossed shape.

Figure 44:
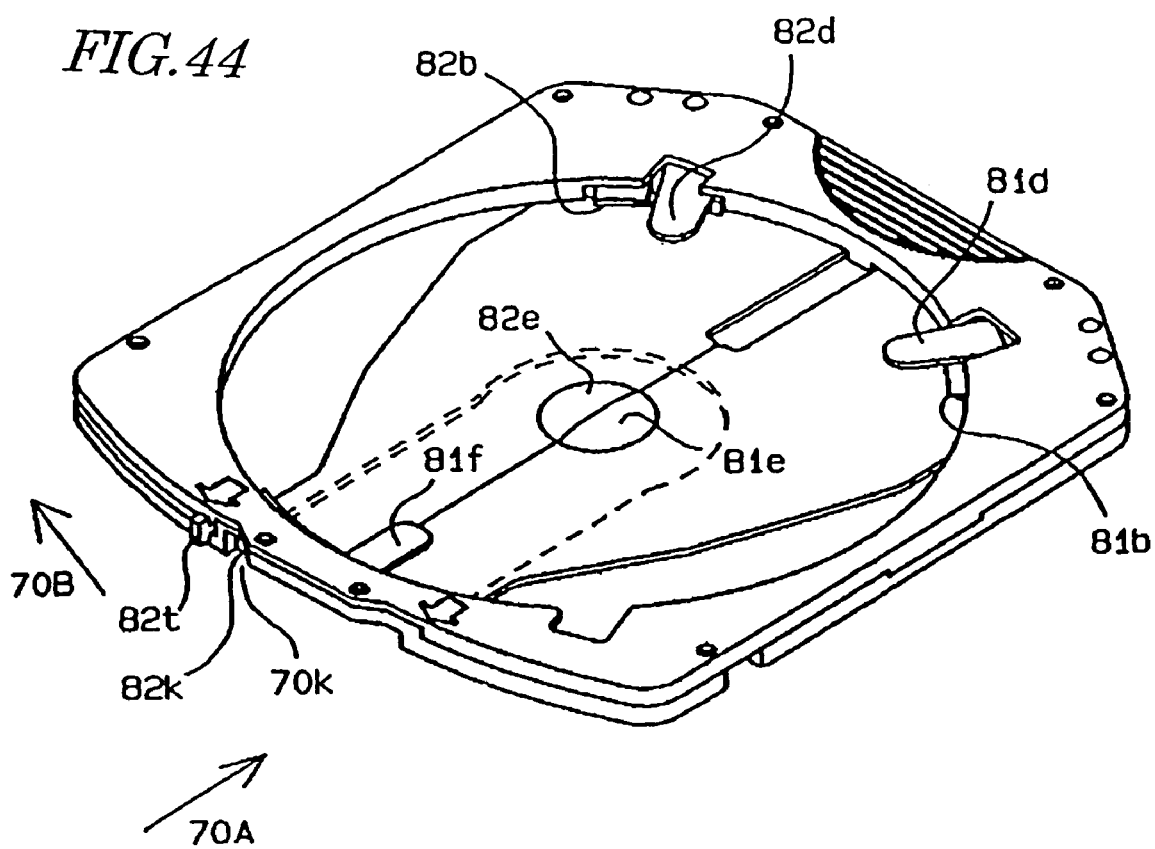
FIG. 44 is a perspective view illustrating the disc cartridge shown in FIG. 42 with the disc removed to show a state where its shutters are closed.
Figure 45:
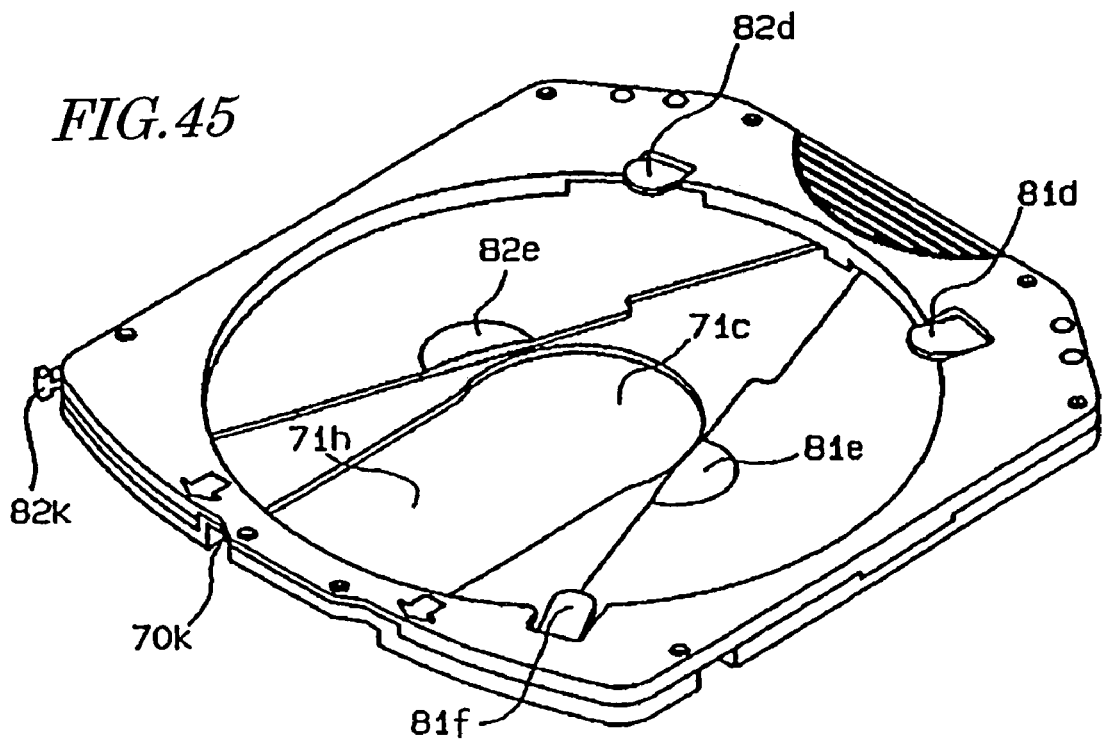
FIG. 45 is a perspective view illustrating the disc cartridge shown in FIG. 42 with the disc removed to show a state where its shutters are opened.

FIG. 44 is a perspective view illustrating the disc cartridge 310, in which no disc 100 has been stored yet, to show a state where the shutters 81 and 82 cover the chucking and head openings 71c and 71h. FIG. 45 is a perspective view illustrating the disc cartridge 310, in which no disc 100 has been stored yet, to show a state where the shutters 81 and 82 expose the chucking and head openings 71c and 71h.

Hereinafter, the structure and the operation of the shutters 81 and 82 will be described in further detail. As shown in FIGS. 42 and 43, the disc holders 81a, 81b, 82a and 82b of the shutters 81 and 82 have such a cross-sectional shape as including a slope that hangs over the projection area of the disc 100 and overlaps with the outer edge of the disc 100 as in the eighth preferred embodiment. That is to say, the slope is downwardly tapered and leans toward the disc 100. Thus, the effects of the eighth preferred embodiment described above are also achieved by this tenth preferred embodiment.

Also, the shutter 82 includes an opener/closer 82t for use to open and close the shutter 82 externally, an elastic portion 82v and a locking protrusion 82k as integral parts thereof. The locking protrusion 82k is connected to the shutter 82 by way of the elastic portion 82v as shown in FIG. 43. Thus, while the chucking and head openings 71c and 71h are covered with the shutters 81 and 82, the locking protrusion 82k, to which an elastic force is applied from the elastic portion 82v, engages with a locking hole 70k of the cartridge body 70 (or the lower shell 71) as shown in FIG. 44, thereby fixing the shutter 82 in a non-rotatable state to the cartridge body 70. When the shutter 82 is fixed in this way, the other shutter 81, which is interlocked with the shutter 82 via the interlocking mechanism 80c, is also fixed.

Accordingly, only by getting the locking protrusion 82k pressed externally by a protrusion, for example, in the direction indicated by the arrow 70A and disengaged from the locking hole 70k while pressing the opener/closer 82t in the direction indicated by the arrow 70B at the same time as shown in FIG. 44, the shutters 81 and 82 can be rotated to expose the chucking and head openings 71c and 71h and the disc 100 can be released from the disc holders 81a, 81b, 82a and 82b. Thus, it is possible to prevent the user from removing the disc 100 accidentally.

In the preferred embodiment described above, the locking protrusion 82k forms an integral part of the shutter 82. Alternatively, a locking lever, including a locking protrusion and a convex portion at the end thereof, may be connected to the cartridge body 70 by way of an elastic portion, and a concave portion may be provided for the shutter so that the convex and concave portions engage with each other. In that case, by pressing the locking protrusion through a locking hole of the cartridge body, these convex and concave portions may be disengaged from each other so as to allow the shutters to rotate freely. Optionally, in that alternative preferred embodiment, the locking lever, as well as the shutter springs (i.e., elastic members), may be resin springs that form integral parts of the cartridge body 70.

Figure 46:
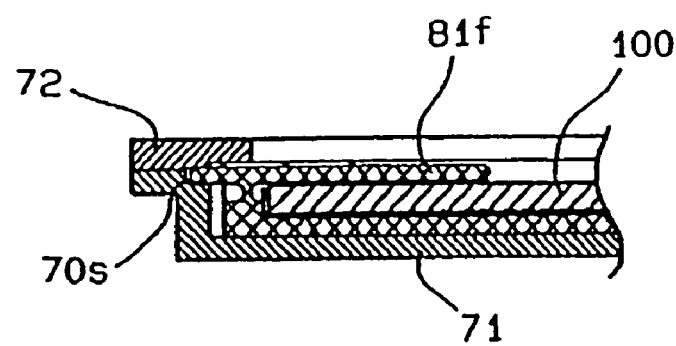
FIG. 46 is a partial cross-sectional view of the disc cartridge shown in FIG. 42, which is viewed along a plane that passes the center of the disc to show a state where its shutters are closed.
Figure 48:
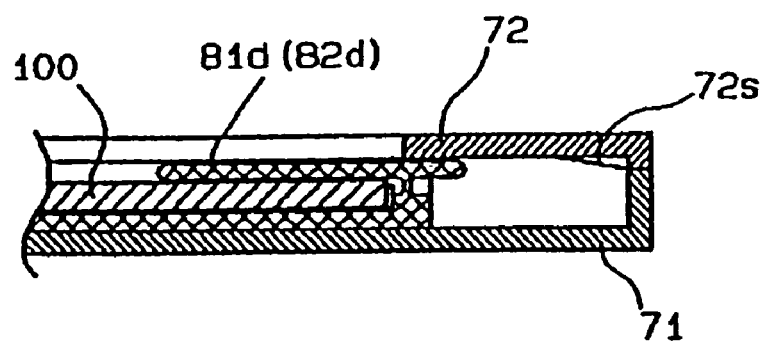
FIG. 48 is a partial cross-sectional view illustrating a portion of the disc cartridge shown in FIG. 42 around the disc outer periphery, which is viewed along a plane passing the center of the disc to show a state where its shutters are closed.

Next, the structure and operation of the disc stoppers 81f, 81d and 82d will be described in further detail. While the shutters 81 and 82 are closed, the disc stoppers 81f, 81d and 82d are substantially parallel to the surface of the disc 100 and do not protrude from the upper surface of the disc cartridge 310 as shown in FIGS. 46 and 48. An appearance of the disc cartridge 310 in such a state is illustrated in FIG. 44.

Figure 47:
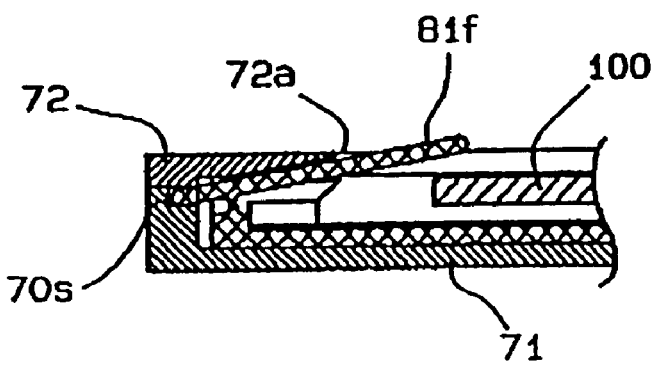
FIG. 47 is a partial cross-sectional view of the disc cartridge shown in FIG. 42, which is viewed along a plane that passes the center of the disc to show a state where its shutters are opened.
Figure 49:
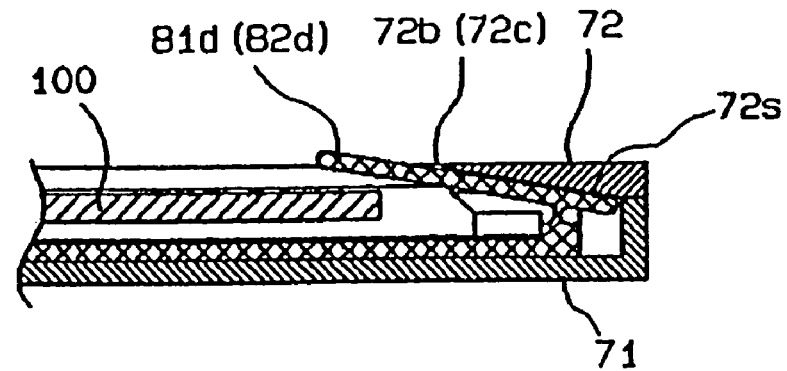
FIG. 49 is a partial cross-sectional view illustrating a portion of the disc cartridge shown in FIG. 42 around the disc outer periphery, which is viewed along a plane passing the center of the disc to show a state where its shutters are opened.

On the other hand, while the shutters 81 and 82 are going to be opened, the disc stoppers 81f, 81d and 82d are guided by a slit 70s and a slope 72s of the cartridge body 70 so as to be lifted to above the disc 100 as shown in FIGS. 47 and 49. The slit 70s is formed in the inner sidewall of the cartridge body 70 as shown in FIG. 47, while the slope 72s is formed on the inner upper surface of the cartridge body 70 as shown in FIG. 49. Also, the upper shell 72 is provided with notched portions 72a, 72b and 72c so as not to interfere with the disc stoppers 81f, 81d and 82d that have been lifted up. An appearance of the disc cartridge 310 in such a state is illustrated in FIG. 45.

While the shutters 81 and 82 are closed, the disc stoppers 81f, 81d and 82d hang over the projection area of the disc 100 and overlap with the outer periphery of the disc 100. Thus, the disc stoppers 81f, 81d and 82d press the disc 100 against the shutters 81 and 82 in the thickness direction, thereby holding it thereon. Accordingly, the disc holders 81a, 81b, 82a and 82b may be omitted from the shutters 81 and 82.

By using such a structure, particularly in an interval after the disc cartridge 310 has been vertically loaded into a disc drive and before the disc 100 is chucked, it is possible to prevent the disc 100 from dropping down from the cartridge 310. In addition, while the disc 100 is being chucked, the disc 100 can move in a broader space. Furthermore, this structure can also contribute to further reducing the thickness of the cartridge body.

EMBODIMENT 11

Hereinafter, a disc cartridge 311 according to an eleventh specific preferred embodiment of the present invention will be described with reference to the accompanying drawings.

Figure 50:
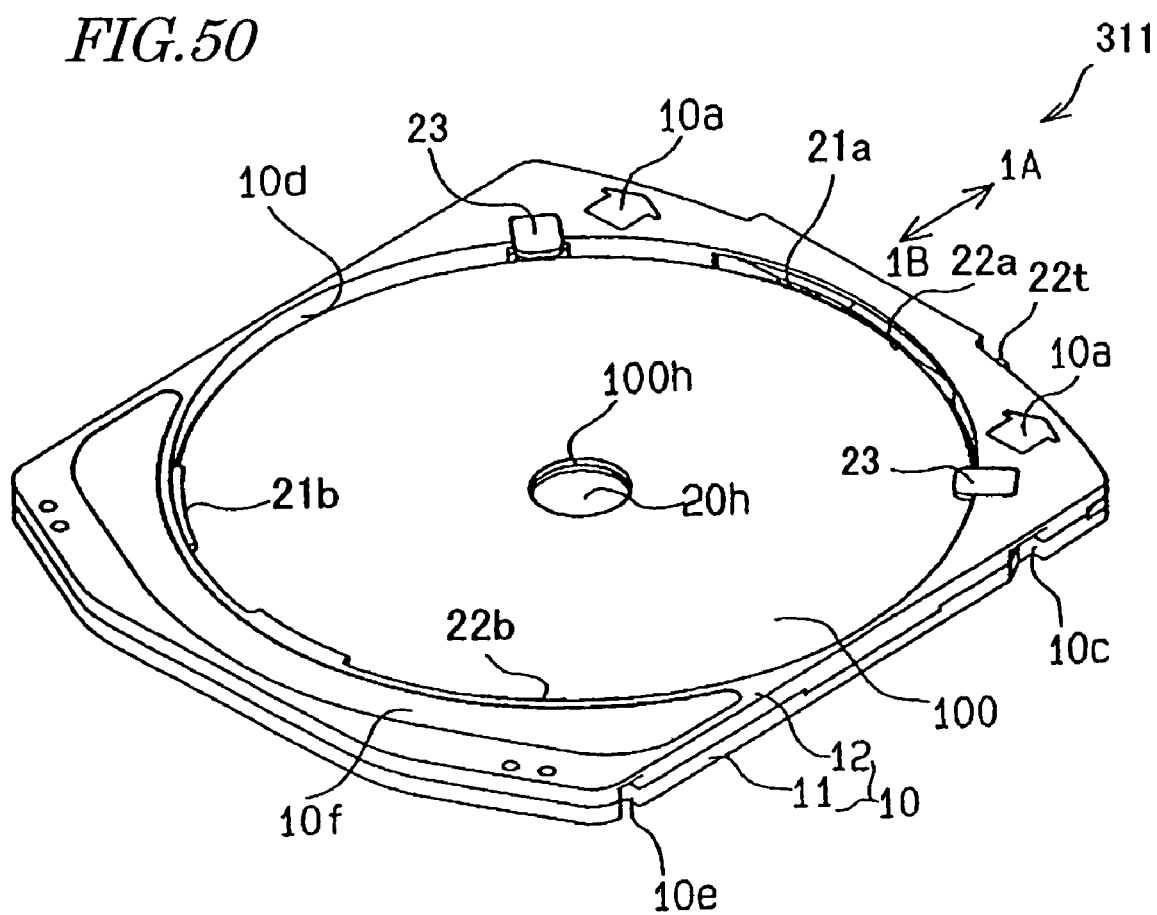
FIG. 50 is a perspective view illustrating an overall configuration for a disc cartridge according to an eleventh specific preferred embodiment of the present invention.
Figure 51:
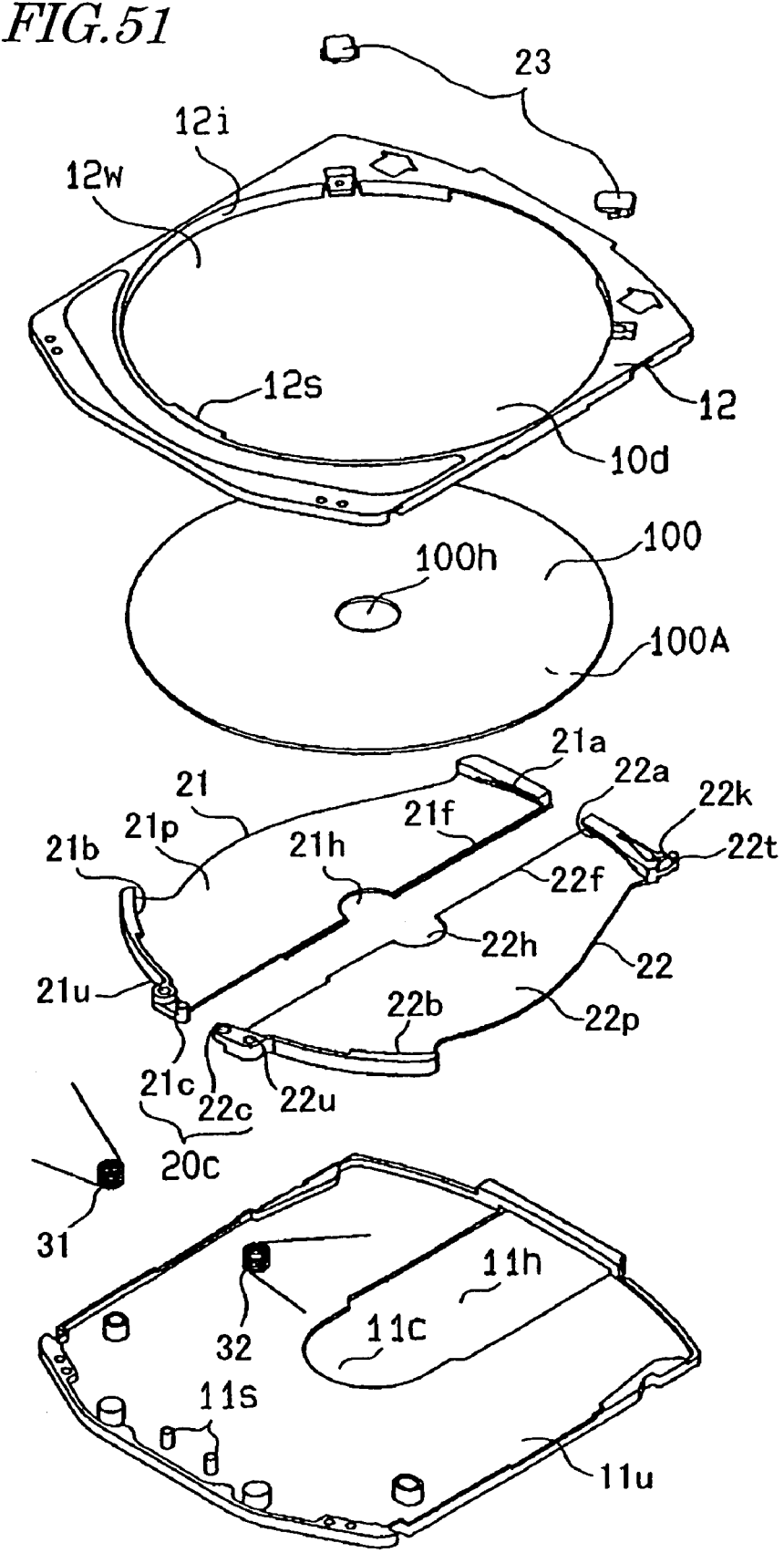
FIG. 51 is an exploded perspective view of the disc cartridge shown in FIG. 50.
Figure 52:
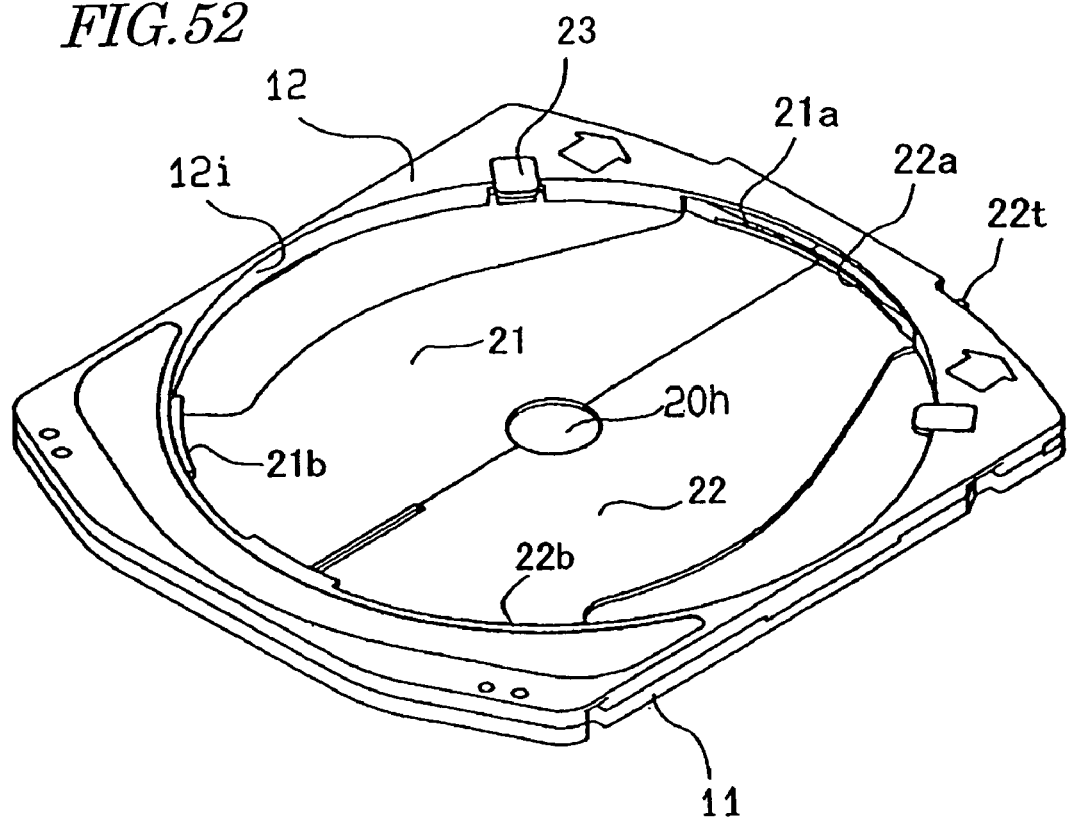
FIG. 52 is a perspective view illustrating the disc cartridge shown in FIG. 50 with the disc removed to show a state where its shutters are closed.
Figure 53:
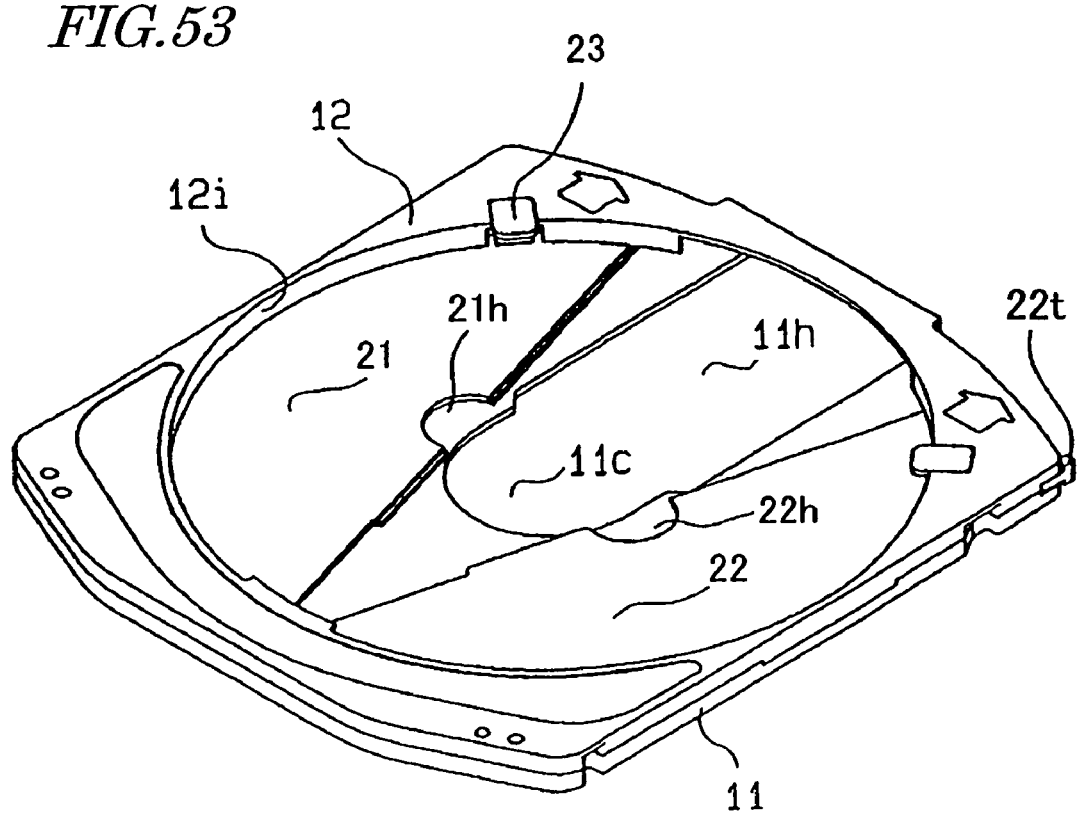
FIG. 53 is a perspective view illustrating the disc cartridge shown in FIG. 50 with the disc removed to show a state where its shutters are opened.
Figure 54:
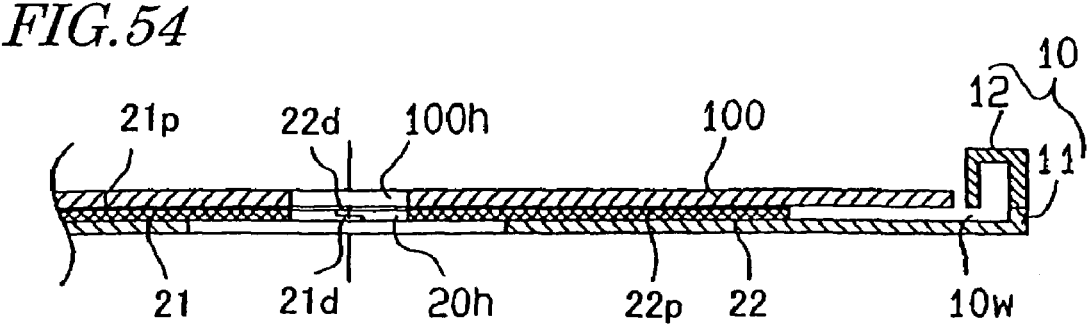
FIG. 54 is a partial cross-sectional view of the disc cartridge shown in FIG. 50, which is viewed along a plane that passes the center of the disc to show a state where its shutters are closed.
Figure 55:
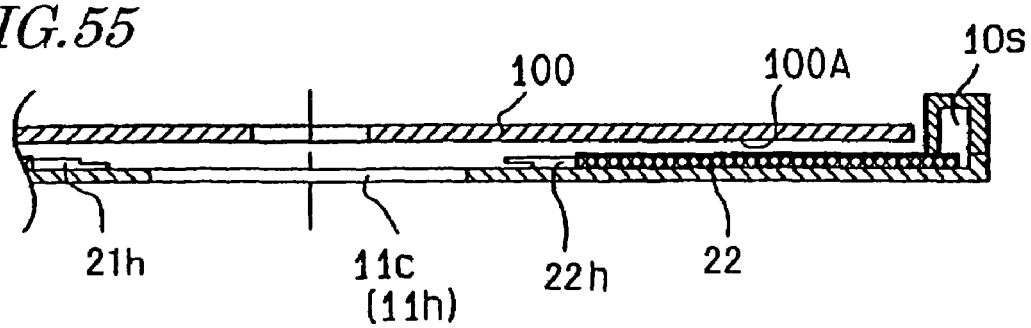
FIG. 55 is a partial cross-sectional view of the disc cartridge shown in FIG. 50, which is viewed along a plane that passes the center of the disc to show a state where its shutters are opened.
Figure 56:
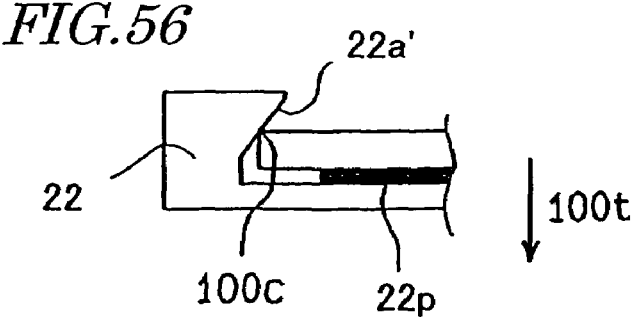
FIG. 56 is a cross-sectional view illustrating a portion of the shutter of the disc cartridge shown in FIG. 50.

As shown in FIGS. 50 and 51, the disc cartridge 311 includes a lower shell 11, an upper shell 12, a pair of shutters 21 and 22 and disc stoppers 23. As shown in FIGS. 52 through 56, the structures and functions of all of these members are the same as those already described for the eighth preferred embodiment and the detailed description thereof will be omitted herein.

Unlike the disc cartridge 308 of the eighth preferred embodiment described above, the shutters 21 and 22 of the disc cartridge 311 of the eleventh preferred embodiment have a hole 20h as shown in FIGS. 50 and 51.

More specifically, while the shutters 21 and 22 of the disc cartridge 311 are closed, the shutters 21 and 22 define the hole 20h just under the center hole 100h of the disc 100 as shown in FIG. 50. As can be seen from FIG. 51, the hole 20h is made up of two notches 21h and 22h of the shutters 21 and 22, respectively.

If the disc cartridge 311 is left with the upper side of the disc 100 exposed upward as shown in FIG. 50, dust may pass through the center hole 100h of the disc 100. Even so, in this structure, the dust should pass and go out through the hole 20h of the shutters 21 and 22 without remaining in the disc cartridge 311, or without being deposited on the shutters 21 and 22. Thus, when the shutters 21 and 22 are opened after that (i.e., when this disc cartridge 311 has been loaded into a disc drive), no dust will be deposited on the signal recording side 100A of the disc 100.

The disc cartridge 311 may be left either upside up as shown in FIG. 50 or upside down (i.e., with the lower shell 11 facing upward). In view of these two possible positions, the hole 20h preferably has a diameter that is approximately equal to that of the center hole 100h. This is because if the holes 20h and 100h have approximately equal diameters, dust will be deposited neither on the shutters 21 and 22 when the disc cartridge 311 is left upside up nor on the signal recording side 100A of the disc 100 when the disc cartridge 311 is left upside down.

Figure 57:
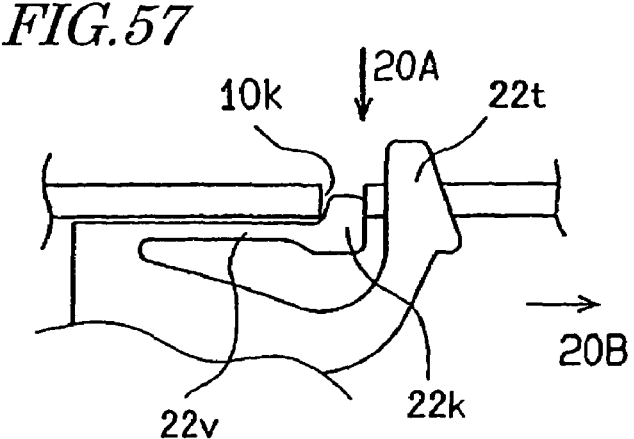
FIG. 57 is a partial plan view illustrating a shutter opener/closer and its surrounding portion of the disc cartridge shown in FIG. 50.

In this disc cartridge 311, the opener/closer 22t for use to open and close the shutters 21 and 22 is provided for the shutter 22 unlike the eighth preferred embodiment described above. More specifically, as shown in FIGS. 51 and 57, the opener/closer 22t, elastic portion 22v and locking protrusion 22k are provided as integral parts of the shutter 22. The locking protrusion 22k is connected to the shutter 22 by way of the elastic portion 22v as shown in FIG. 57. Accordingly, unlike the eighth preferred embodiment described above, the opener/closer 22t is located on the right-hand side of the head opening 11h with respect to the disc 100. The opener/closer 22t operates in the same way as the counterpart of the eighth preferred embodiment described above.

EMBODIMENT 12

Hereinafter, a disc cartridge 312 according to a twelfth specific preferred embodiment of the present invention will be described with reference to the accompanying drawings.

Unlike the disc cartridge 311 of the eleventh preferred embodiment described above, the disc cartridge 312 of this twelfth preferred embodiment includes a rim 12t around the inner side surface 12i of the cartridge body 10 and a ring 20w around the hole 20h defined by the shutters 21 and 22. These features will be described below.

Figure 58:
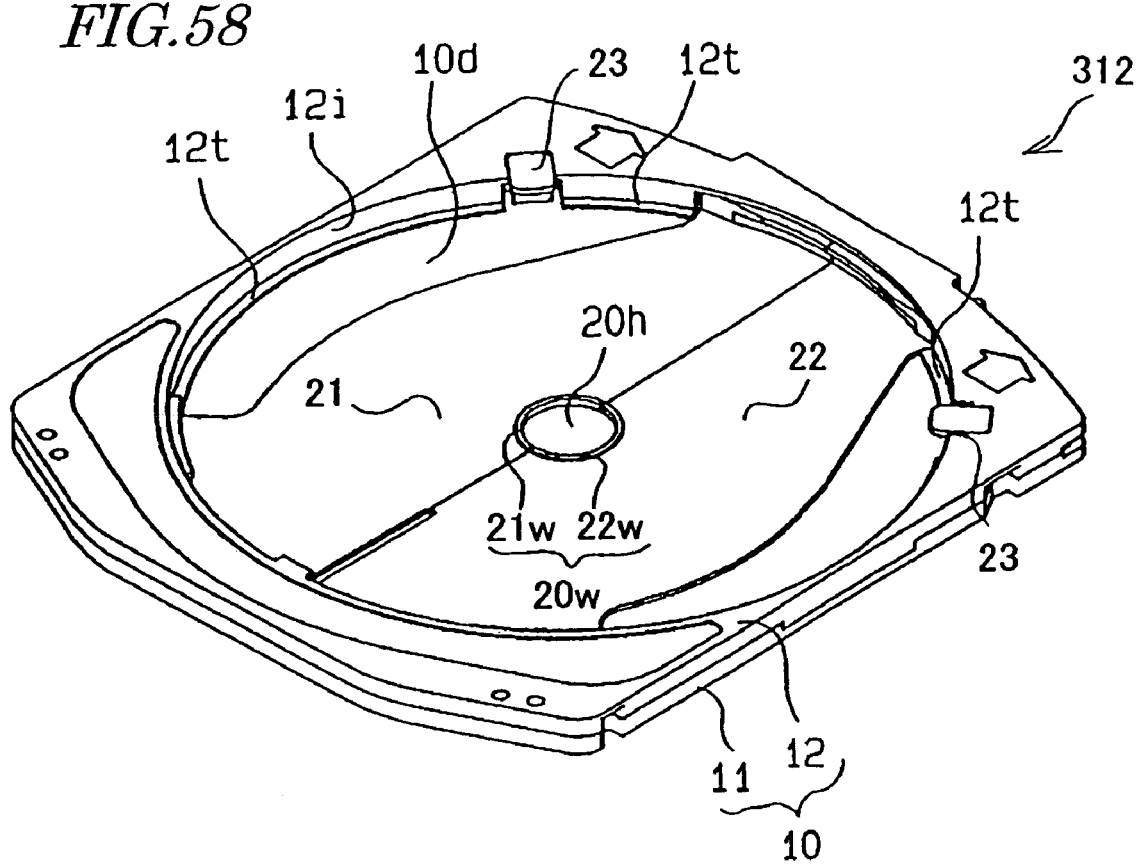
FIG. 58 is a perspective view illustrating a disc cartridge according to a twelfth specific preferred embodiment of the present invention with the disc removed to show a state where its shutters are closed.
Figure 59:
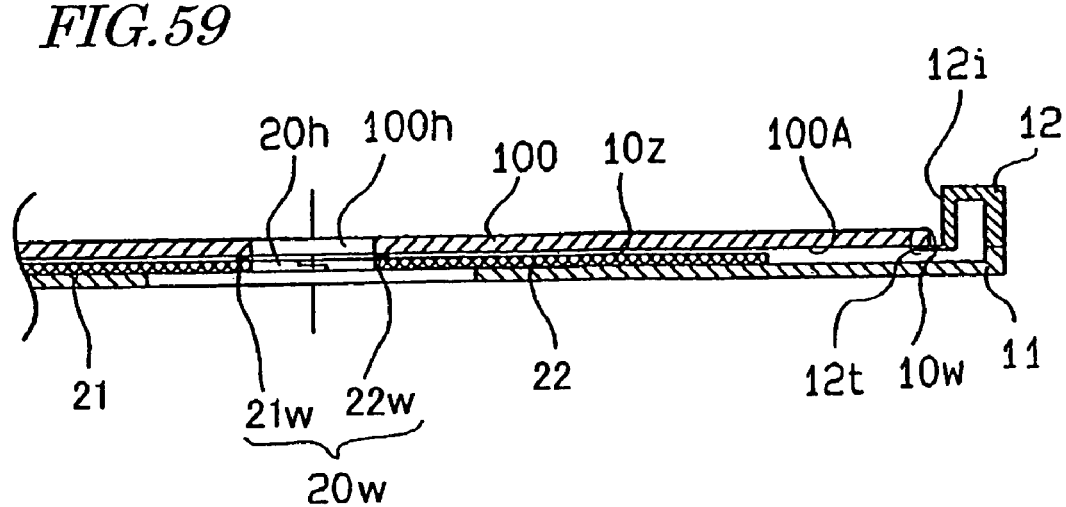
FIG. 59 is a partial cross-sectional view of the disc cartridge shown in FIG. 58, which is viewed along a plane that passes the center of the disc to show a state where its shutters are closed.

As shown in FIG. 58, the rim 12t protrudes from the inner side surface 12i of the upper shell 12 toward the inner periphery of the disc 100 and substantially surrounds the outer periphery of the disc storage portion 10d. FIG. 59 shows a cross section of the disc cartridge 312 in a state where the disc 100 is stored in the disc storage portion 10d. While the shutters 21 and 22 are closed, the outer edge of the signal recording side 100A of the disc 100 contacts with the rim 12t as shown in FIG. 59. As a result, the gap between the outer periphery of the disc 100 and the cartridge body 10 is closed, thereby preventing dust from reaching the signal recording side 100A of the disc 100.

Figure 60:
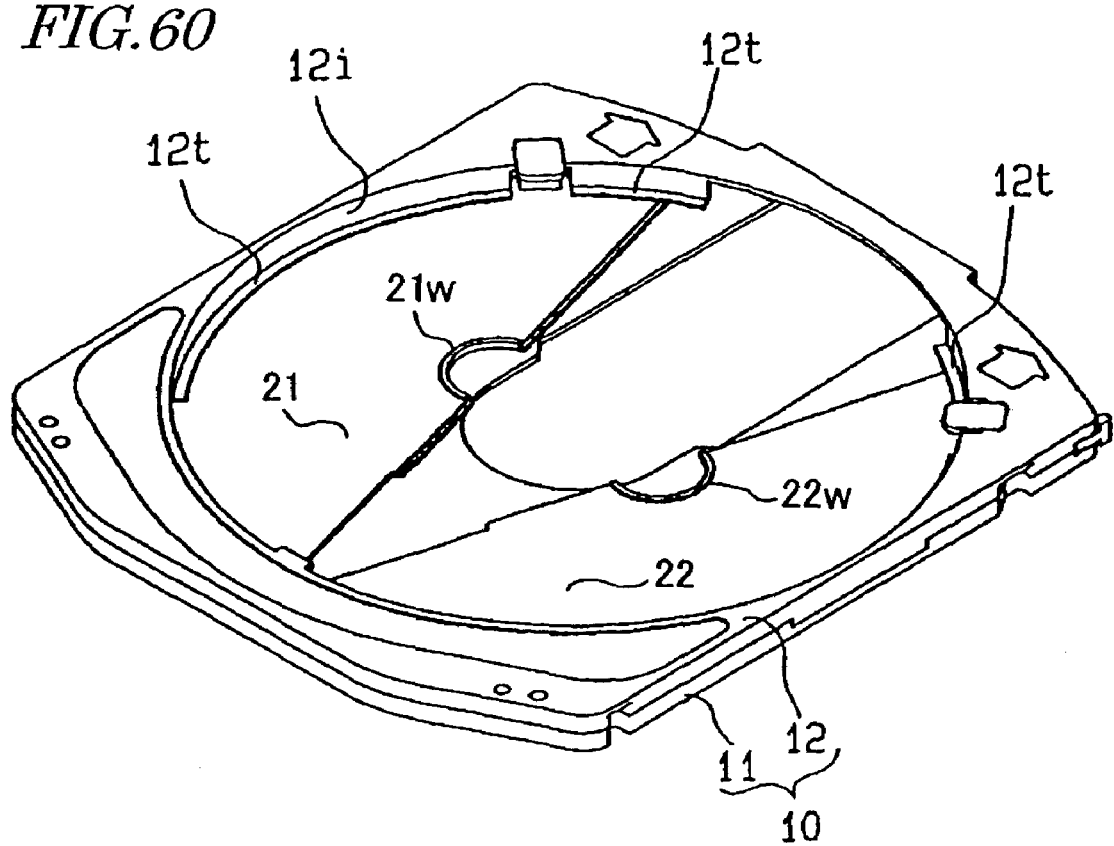
FIG. 60 is a perspective view illustrating the disc cartridge shown in FIG. 58 with the disc removed to show a state where its shutters are opened.
Figure 61:
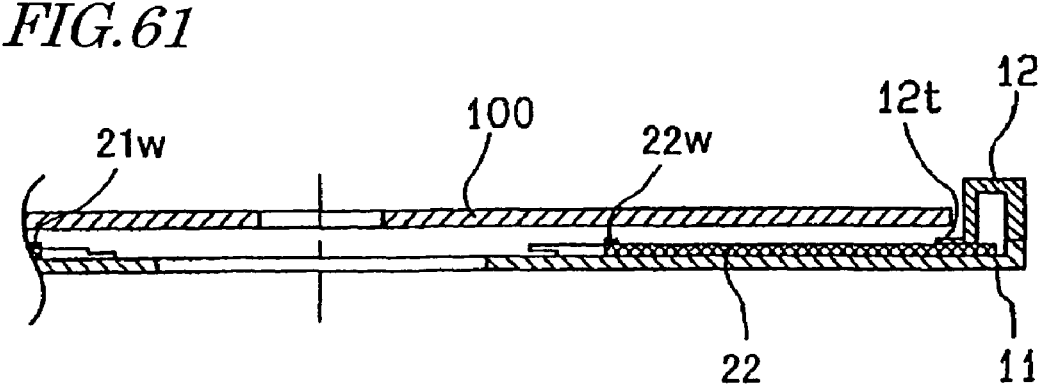
FIG. 61 is a partial cross-sectional view of the disc cartridge shown in FIG. 58, which is viewed along a plane that passes the center of the disc to show a state where its shutters are opened.

Also, a gap 10w is provided between the rim 12t of the cartridge body 10 and the lower shell 11. Thus, when the shutters 21 and 22 are opened, respective portions of the shutters 21 and 22 enter the gap 10w as shown in FIGS. 60 and 61, thereby preventing the shutters 21 and 22 from interfering with the cartridge body 10.

In such a structure, however, while the shutters 21 and 22 are closed, another gap 10z that leads to the open air is also created between the disc 100 and the shutters 21 and 22 as shown in FIG. 59. To close this gap 10z, the shutters 21 and 22 include convex portions 21w and 22w, respectively, around the center hole 100h of the disc 100. As shown in FIG. 58, when the shutters 21 and 22 are closed, these two convex portions 21w and 22w are in tight contact with each other, thereby forming the ring 20w that closes the gap 10z around the disc center hole 100h. As a result, no dust will reach the signal recording side 100A of the disc 100 through the disc center hole 100h.

However, the top of these convex portions 21w and 22w might contact with the signal recording side 100A of the disc 100. Accordingly, the edge of the convex portions 21w and 22w should preferably be round so as not to scratch the signal recording side 100A of the disc 100. Optionally, the convex portions 21w and 22w may form integral parts of the shutters 21 and 22, respectively. In that case, an anti-scratching nonwoven fabric is preferably adhered or ultrasonic welded to that portion of the ring 20w that contacts with the signal recording side 100A of the disc 100 or an anti-scratching coating is preferably formed on that portion. Alternatively, the convex portions 21w and 22w themselves may be made of an anti-scratching nonwoven fabric or an anti-scratching coating and directly adhered or ultrasonic welded to the shutters 21 and 22, respectively.

Also, as shown in FIG. 59, while the shutters 21 and 22 are closed, the disc 100 is lifted by the ring 20w and the rim 12t over the shutters 21 and 22 with the gap 10z left between them. That is to say, most of the signal recording side 100A of the disc 100 is not in contact with the shutters 21 and 22. Accordingly, even if the surface of the shutters 21 and 22 is not covered with an anti-scratching nonwoven fabric, for example, the signal recording side 100A still will not get scratched.

Figure 62:
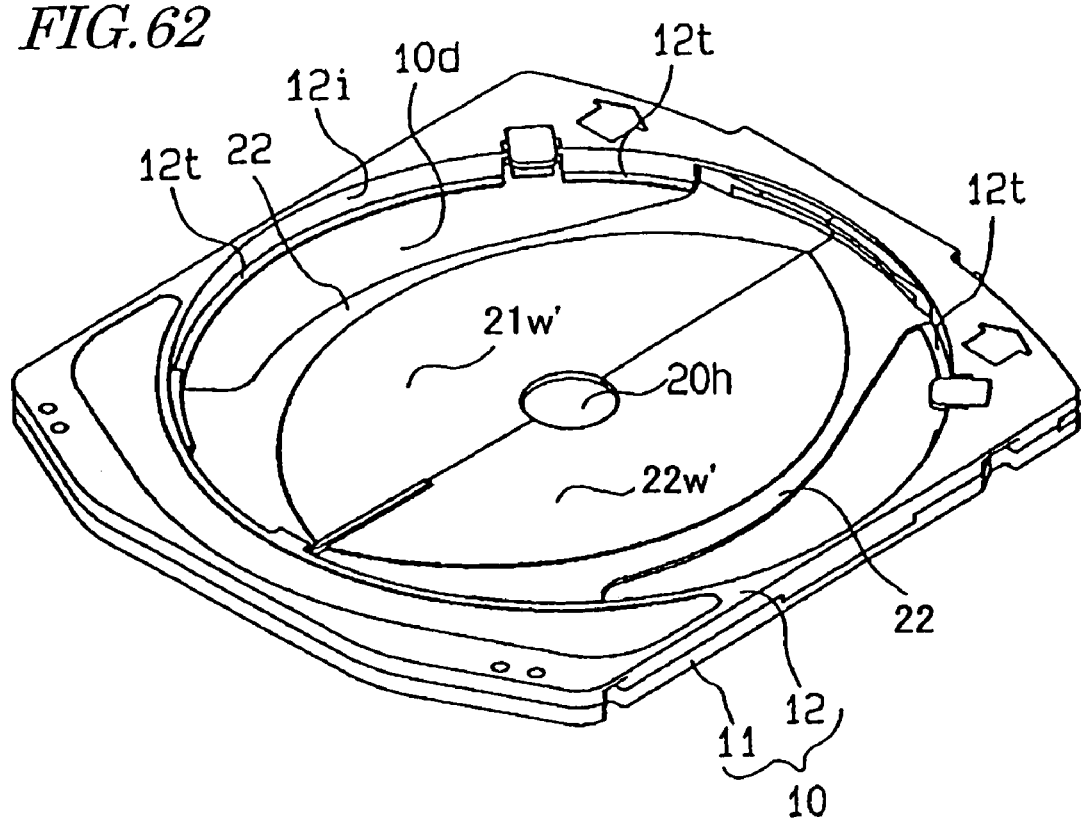
FIG. 62 is a perspective view illustrating a modified example of the disc cartridge shown in FIG. 58 with the disc removed to show a state where its shutters are closed.
Figure 63:
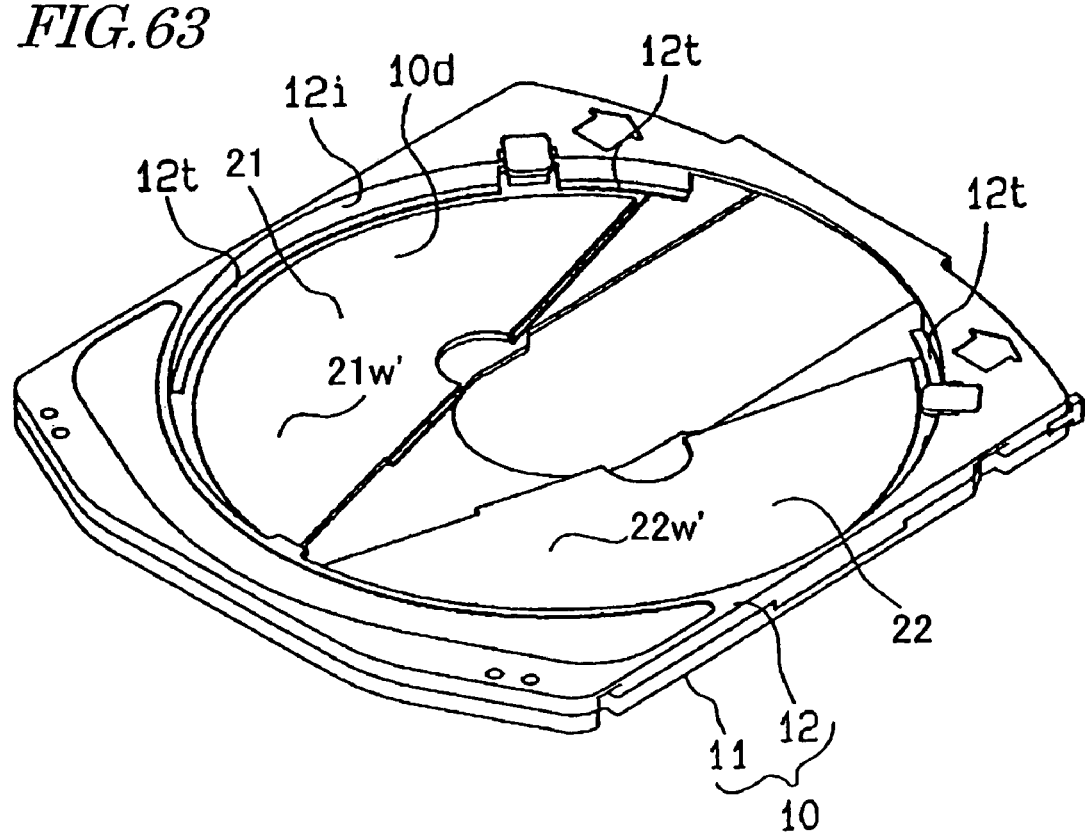
FIG. 63 is a perspective view illustrating a modified example of the disc cartridge shown in FIG. 58 with the disc removed to show a state where its shutters are opened.

FIGS. 62 and 63 illustrate a disc cartridge including alternative convex portions 21w' and 22w' that have been expanded toward the outer periphery of the disc 100. Specifically, FIG. 62 illustrates a state in which the shutters 21 and 22 are closed, while FIG. 63 illustrates a state in which the shutters 21 and 22 are opened.

As shown in FIGS. 62 and 63, while the shutters 21 and 22 are opened, the convex portions 21w' and 22w' are preferably located inside the rim 12t of the disc storage portion 10d (i.e., closer to the center of the disc storage portion 10d). Then, the convex portions 21w' and 22w' will not contact with, or interfere with, the rim 12t.

Optionally, the convex portions 21w' and 22w' may form integral parts of the shutters 21 and 22, respectively. In that case, an anti-scratching nonwoven fabric is preferably adhered or ultrasonic welded to those portions of the convex portions 21w' and 22w' that contact with the disc 100 or an anti-scratching coating is preferably formed thereon. Alternatively, the convex portions 21w' and 22w' themselves may be made of an anti-scratching nonwoven fabric or an anti-scratching coating and directly adhered or ultrasonic welded to the shutters 21 and 22, respectively.

EMBODIMENT 13

Hereinafter, a disc cartridge 313 according to a thirteenth specific preferred embodiment of the present invention will be described with reference to the accompanying drawings.

Figure 64:
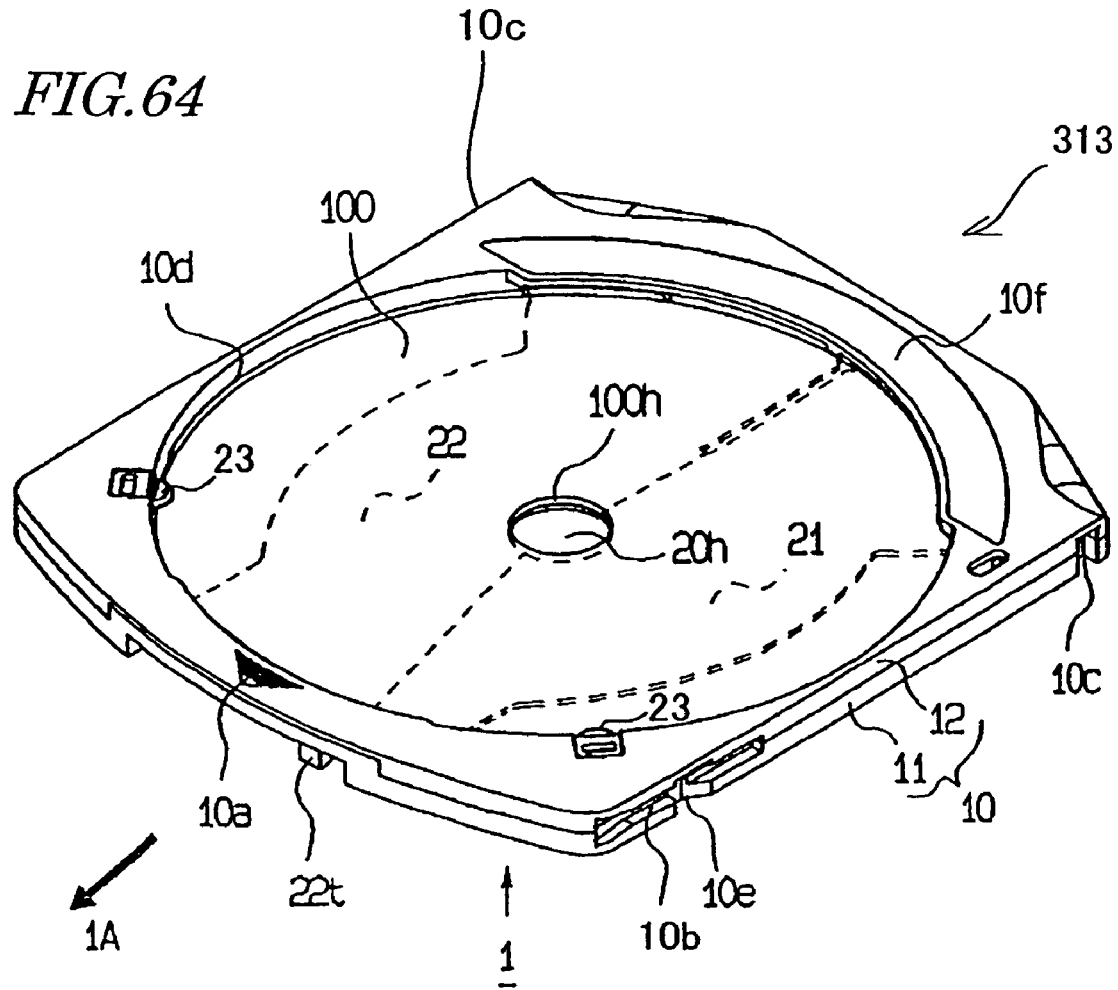
FIG. 64 is a perspective view illustrating an overall configuration for a disc cartridge according to a thirteenth specific preferred embodiment of the present invention.
Figure 65:
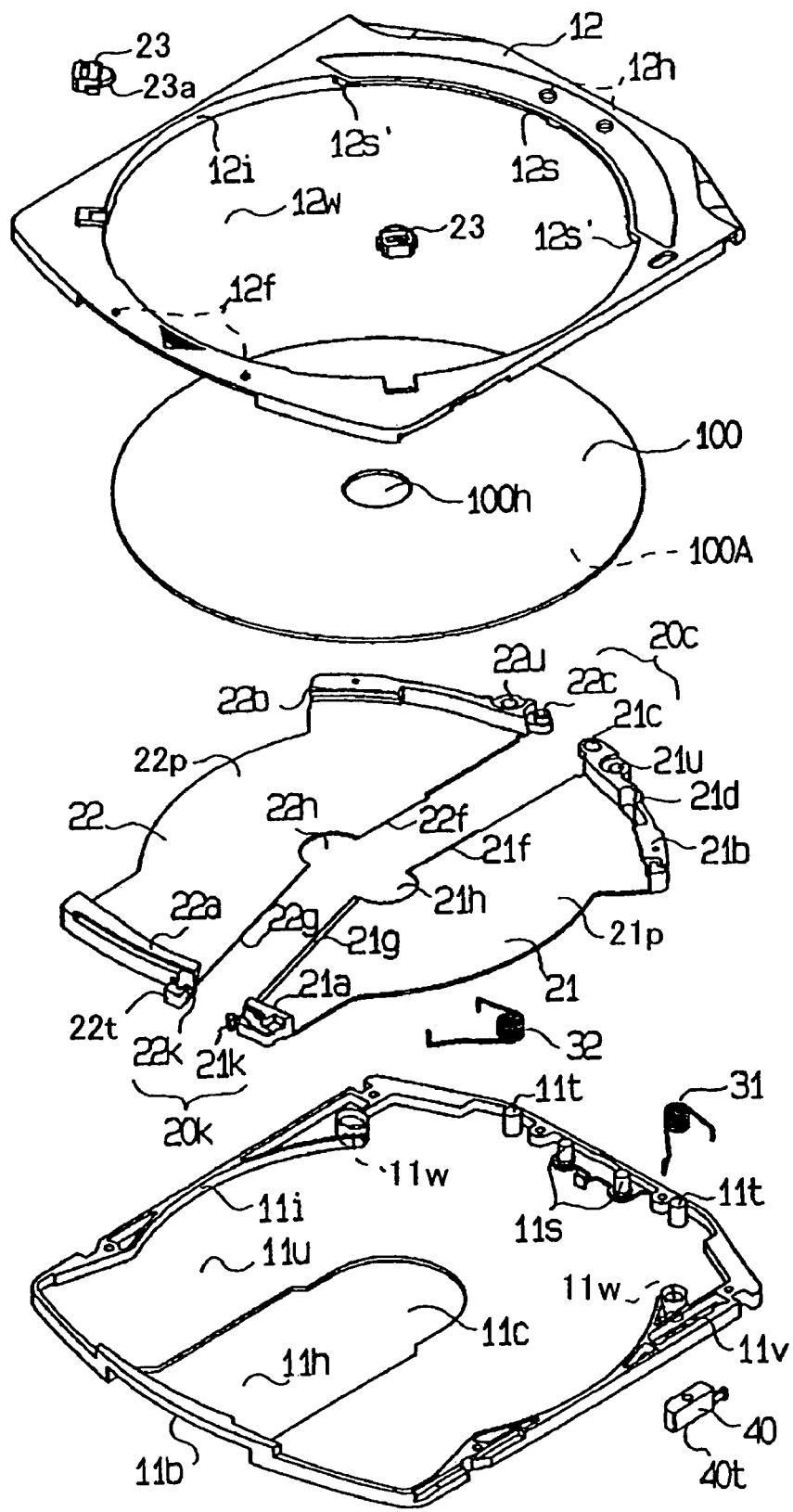
FIG. 65 is an exploded perspective view of the disc cartridge shown in FIG. 64.

First, the structure of the disc cartridge 313 will be outlined with reference to FIGS. 64 and 65. As in the eighth preferred embodiment, the disc 100 shown in FIGS. 64 and 65 also includes first and second sides. The first side of the disc 100, on which its label is normally printed, is illustrated in FIG. 64, while the second side thereof, i.e., the signal recording side 100A, is illustrated as the backside in FIG. 65.

As shown in FIGS. 64 and 65, the disc cartridge 313 includes a lower shell 11, an upper shell 12, a pair of shutters 21 and 22 and disc stoppers 23.

As shown in FIG. 65, the lower shell 11 includes a chucking opening 11c and a head opening 11h. The chucking opening 11c allows a chucking member (e.g., a spindle motor for rotating the disc 100) to enter the disc cartridge 313 externally. The head opening 11h allows a head, which reads and/or writes a signal from/on the signal recording side 100A of the disc 100, to enter the disc cartridge 313 and access a target location on the disc 100. The lower shell 11 faces the signal recording side 100A of the disc 100. The lower shell 11 is formed by molding a synthetic resin into a predetermined shape.

The head opening 11h reaches one side surface of the lower shell 11. To minimize a decrease in rigidity of the lower shell 11 due to the presence of the head opening 11h, the lower shell 11 includes a bridge 11b that links both ends of the head opening 11h together. The lower shell 11 further includes two positioning holes 11w that engage with cartridge positioning pins (not shown) of a disc drive.

The upper shell 12 includes a circular disc window 12w, through which the disc 100 can be introduced and removed into/from the disc cartridge 313 and which expands over the entire projection area of the disc 100 to expose the upper side of the disc 100. The upper and lower shells 12 and 11 are adhered or welded together at their outer periphery, thereby forming a cartridge body 10. The upper shell 12 is also made of a synthetic resin.

A disc storage portion 10d for storing the disc 100 therein is defined by an inner lower surface 11u and an inner side surface 12i of the cartridge body 10. The inner lower surface 11u is opposed to the signal recording side 100A of the disc 100, while the inner side surface 12i has a substantially cylindrical shape and defines the disc window 12w inside. That is to say, the inner lower surface 11u is the bottom of the disc storage portion 10d.

In the disc storage portion 10d, a gap, which is wide enough to allow the disc 100 to rotate freely, is provided between the inner side surface 12i and the outer periphery of the disc 100. Also, the top of the disc storage portion 10d is the disc window 12w so that the disc 100 stored in the disc storage portion 10d has one of its sides exposed inside the disc window 12w.

Two removable disc stoppers 23 are provided for the upper shell 12 so as to partially protrude into the disc window 12w as shown in FIGS. 64 and 65. A third disc stopper 12s is further provided for the upper shell 12 so as to protrude into the disc window 12w. The third disc stopper 12s forms an integral part of the upper shell 12. These three disc stoppers 23 and 12s are arranged substantially at regular intervals around the circumference of the disc window 12w for the purpose of preventing the disc 100 from dropping down from the disc window 12w. Also, two convex disc contact portions 12s' are formed on the disc stopper 12s. For the disc 100, these disc contact portions 12s' are almost as high as the disc contact portions 23a of the disc stoppers 23.

According to this structure, even if the disc cartridge 313 is mounted vertically or upside down, the disc cartridge 313 still can hold the disc 100 without dropping it. That is to say, when the disc cartridge 313 is inserted vertically or upside down into a disc drive, this disc cartridge 313 can particularly effectively prevent the disc 100 from dropping down. It should be noted that the disc stoppers 23 do not have to be removable from the cartridge body 10. Alternatively, as long as the disc stoppers 23 can be rotated or bent inside the disc storage portion 10d to such an extent as to allow the user to remove the disc 100 from the cartridge body 10, the disc stoppers 23 may also be secured to the upper shell 12.

The shutters 21 and 22 lie on a single plane between the signal recording side 100A of the disc 100 and the inner lower surface 11u of the cartridge body 10. The shutters 21 and 22 include holes 21u and 22u, respectively. These holes 21u and 22u are engaged in a freely rotatable state with shafts 11s, which are located outside of the disc storage portion 10d of the cartridge body 10 and on a deep side of the cartridge body 10 opposite to the head opening 11h thereof. Thus, the shutters 21 and 22 rotate on the shafts 11s in such a manner as to cover or expose the chucking and head openings 11c and 11h. The shutters 21 and 22 are also made of a synthetic resin.

A ring portion 21c and a pin portion 22c are provided near the holes 21u and 22u of the shutters 21 and 22, respectively. The ring portion 21c and the pin portion 22c have mutually engaging shapes and together make up an interlocking mechanism 20c for opening and closing the shutters 21 and 22 while interlocking them with each other. The interlocking mechanism 20c may also be implemented as a cam mechanism or a gear mechanism.

The respective upper surfaces of the shutters 21 and 22, which are opposed to the signal recording side 100A of the disc 100, are covered with protective layers 21p and 22p for the purpose of preventing the signal recording side 100A of the disc 100 from getting scratched or attracting dust.

The protective layers 21p and 22p may be appropriately selected from the group consisting of anti-scratching nonwoven fabric, dustproof nonwoven fabric, anti-scratching coating and dustproof coating. In this preferred embodiment, sheets of a dustproof nonwoven fabric are adhered or ultrasonic welded as the protective layers 21p and 22p to the shutters 21 and 22, respectively.

A locking protrusion 21k is provided for the shutter 21, while a locking engaging portion 22k, which engages with the locking protrusion 21k, is provided for the shutter 22. The locking protrusion 21k and locking engaging portion 22k together make up a locking mechanism 20k for locking and unlocking the shutters 21 and 22 to/from each other. By using this mechanism 20k, the shutters 21 and 22 can be locked and unlocked automatically, thus preventing the user from opening the shutters 21 and 22 accidentally. In addition, the signal recording side 100A of the disc 100 can be protected from dust, finger marks or scratches. The locking protrusion 21k and the locking engaging portion 22k form integral parts of the shutters 21 and 22, respectively.

Furthermore, the shutters 21 and 22 are provided with notches 21h and 22h, respectively. When the shutters 21 and 22 are closed, these notches 21h and 22h contact with each other to form a hole 20h just under the center hole 100h of the disc 100. In this case, the diameter of the hole 20h is approximately equal to that of the center hole 100h of the disc 100. In such a structure, even if this disc cartridge 313 is left with the upper side of the disc 100 exposed upward, no dust will be deposited on the shutters 21 and 22. Also, even if the disc cartridge 313 is left upside down, no dust will be directly deposited on the signal recording side 100A of the disc 100, either.

As already described for the eighth preferred embodiment, the shutters 21 and 22 each include two disc holders 21a, 21b and 22a, 22b at both ends thereof. These disc holders 21a, 21b, 22a and 22b are arranged substantially at regular intervals around the circumference of the disc 100. The disc holders 21a, 21b, 22a and 22b form integral parts of the shutters 21 and 22. Each of these disc holders 21a, 21b, 22a and 22b has a downwardly tapered cross-sectional shape (or slope) to grip the outer edge of the disc 100 thereon when the shutters 21 and 22 are closed. By providing these slopes, the disc 100 can be held firmly and pressed against the shutters 21 and 22 while the shutters 21 and 22 are closed.

In this preferred embodiment, only the disc holder 21b is not secured to the shutter 21 but is connected thereto via an elastic portion 21d and is freely rotatable in the radial direction of the disc 100 (i.e., toward the center of the disc 100). Accordingly, the disc holders 21a, 21b, 22a and 22b can firmly hold a disc 100 having any of various diameters or thicknesses without allowing the disc 100 to move inconstantly.

A shutter opener/closer 22t for use to open and close the shutter 22 is formed as an integral part of the shutter 22 on the front side of the disc cartridge 313 opposite to the hole 22u, i.e., near the disc holder 22a. When the shutters 21 and 22 are attached to the cartridge body 10, the shutter opener/closer 22t is located under the bridge 11b and inside the head opening 11h. In opening or closing the shutters 21 and 22, the opener/closer 22t is moved along the bridge 11b inside the head opening 11h. In this arrangement, there is no need to separately provide any gap for allowing the shutter opener/closer 21t to move therein for the cartridge body 10. In other words, since there is no need to provide an extra gap for the cartridge body 10, no dust will enter the cartridge body 10 unnecessarily. Furthermore, the shutter opener/closer 22t can be disposed inside the head opening 11h of the cartridge body 10, thus providing a cartridge of a simplified good design.

Figure 66:
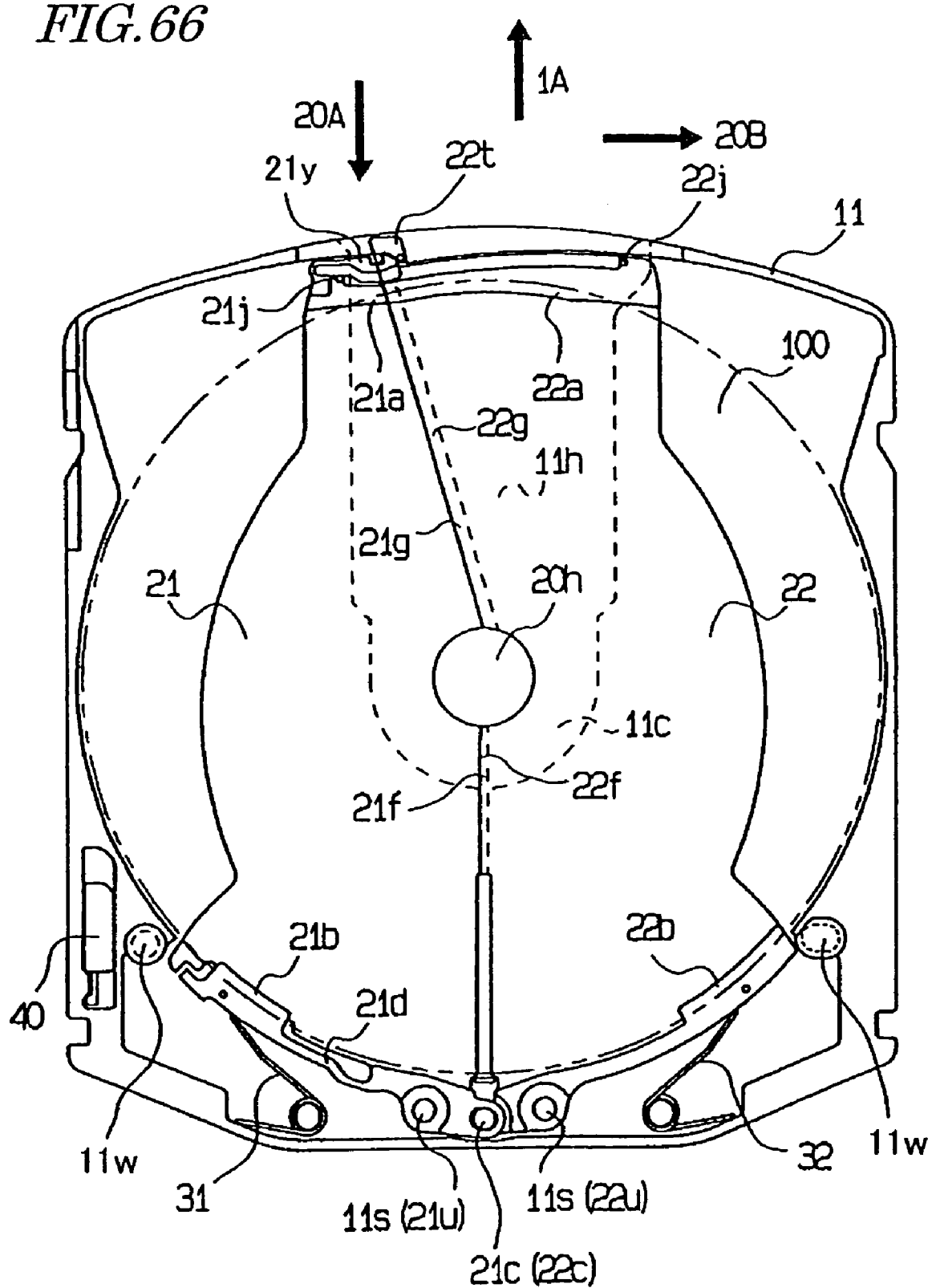
FIG. 66 is a schematic plan view illustrating a state of the disc cartridge shown in FIG. 64 in which its shutters are closed.

As shown in FIG. 66, when closed, the shutters 21 and 62 are not entirely in contact with each other along a line but have a plurality of contact portions that are not aligned with the line. More specifically, the shutters 21 and 22 have a first pair of contact portions 21f and 22f over the chucking opening 11c and a second pair of contact portions 21g and 22g over the head opening 11h, respectively. In this preferred embodiment, the contact portions 21f and 22f contact with each other along the centerline of the disc cartridge 313. On the other hand, the contact portions 21g and 22g contact with each other along a line that defines a predetermined angle (e.g., approximately 15 degrees to approximately 16 degrees) with the centerline of the disc cartridge 313. When the shutters 21 and 22 have such shapes, the shutter 22 can have an integral shape from the vicinity of the shutter opener/closer 22t and can exhibit sufficiently high rigidity.

Shutter springs 31 and 32 are provided outside of the disc storage portion 10d for the shutters 21 and 22, respectively. These springs 31 and 32 apply an elastic force to the shutters 21 and 22 in such a direction as to close the shutters 21 and 22. The shutter springs 31 and 32 are inserted into two spring poles 11t on the inner lower surface 11u of the cartridge body 10. In this preferred embodiment, torsion coil springs are used as the shutter springs 31 and 32. The torsion coil springs 31 and 32 preferably have the same shape to reduce the cost. Examples of other elastic members that may be used as the shutter springs 31 and, 32 include compression springs, leaf springs and elastic resin springs.

As shown in FIG. 65, the disc cartridge 313 includes a write protector 40, which is inserted into a groove 11v of the lower shell 11 so as to slide along the groove 11v. By sliding the write protector 40, the convex portion 40t can be moved, thereby turning ON or OFF a sensor switch provided for a disc drive. In this manner, writing on the disc 100 may be either prohibited or allowed.

That is to say, this disc cartridge 313 is made up of the cartridge body 10 consisting of the lower and upper shells 11 and 12, disc stoppers 23, shutters 21 and 22, shutter springs 31 and 32, and write protector 40.

When the lower and upper shells 11 and 12 are joined together, the two shafts 11s of the lower shell 11 are engaged with two concave portions 12h of the upper shell 12. In this manner, the shafts 11s can have their rigidity increased. Thus, even when the shutters 21 and 22 are open, reduced torsion is created at the respective centers of rotation of the shutters 21 and 22 by the elastic force applied from the shutter springs 31 and 32. As a result, the shutters 21 and 22 can be opened to the intended angle.

As shown in FIG. 64, the upper surface of the cartridge body 10 (or the upper shell 12) has a label plane 10f, on which the user can note down the contents of the disc 100 stored, and an embossed arrow mark (or concave portion) 10a that indicates the direction (the arrow 1A) in which this disc cartridge 313 should be inserted into a disc drive.

The cartridge body 10 further includes two pairs of concave portions 10c and 10e on two of its side surfaces that are parallel to the direction 1A in which the disc cartridge 313 is inserted. These concave portions 10c and 10e may be used as either pull-in notches or positioning recesses when the disc cartridge 313 is pulled in and loaded into a disk drive or when the disc cartridge 313 is stored in a changer. The cartridge body 10 further includes a slit 10b on one of its side surfaces. The slit 10b may be used as a recess to identify the upside and downside of the disc cartridge 313 from each other when this disc cartridge 313 is inserted into the disc drive.

Figure 67:
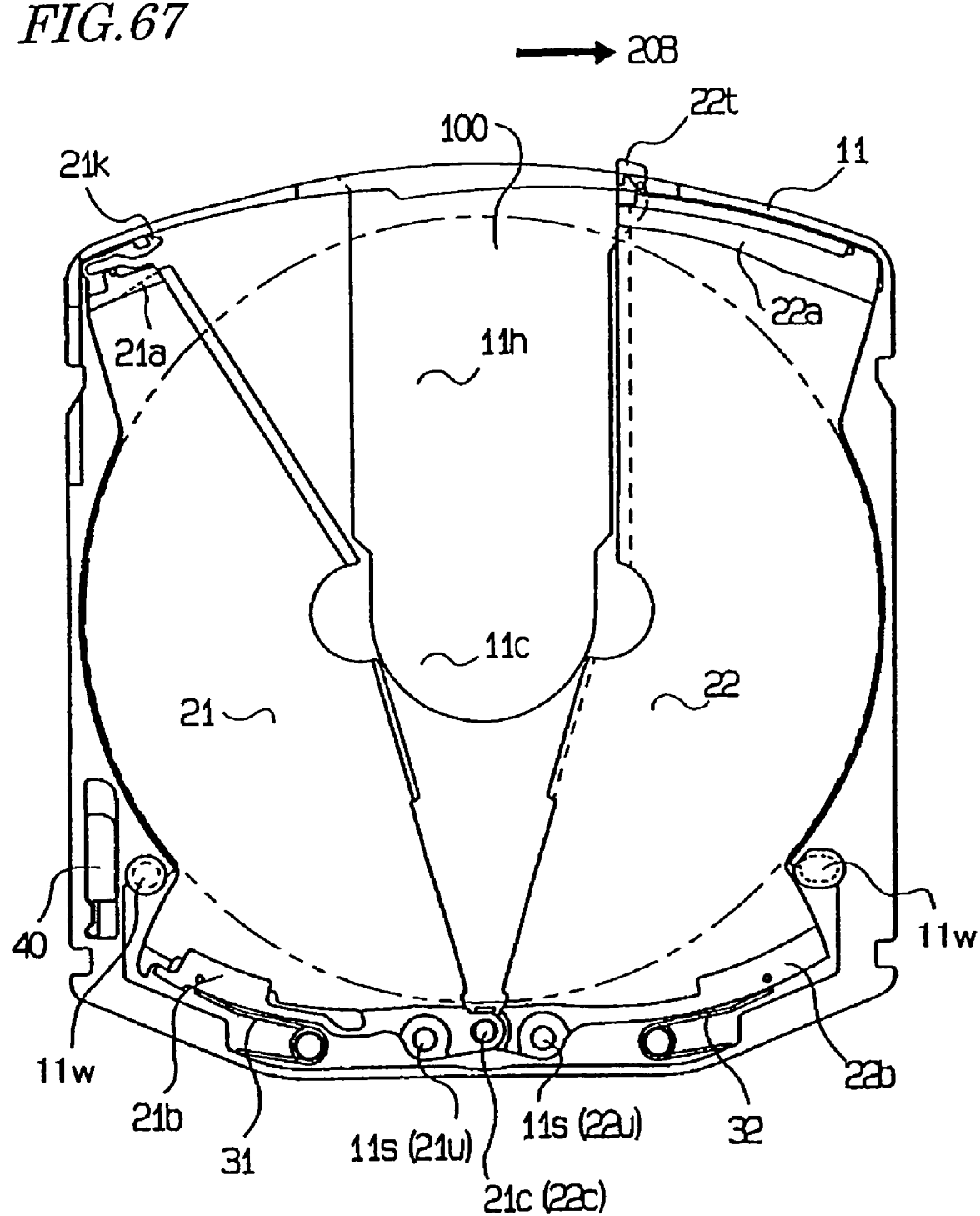
FIG. 67 is a schematic plan view illustrating a state of the disc cartridge shown in FIG. 64 in which its shutters are opened.
Figure 68:
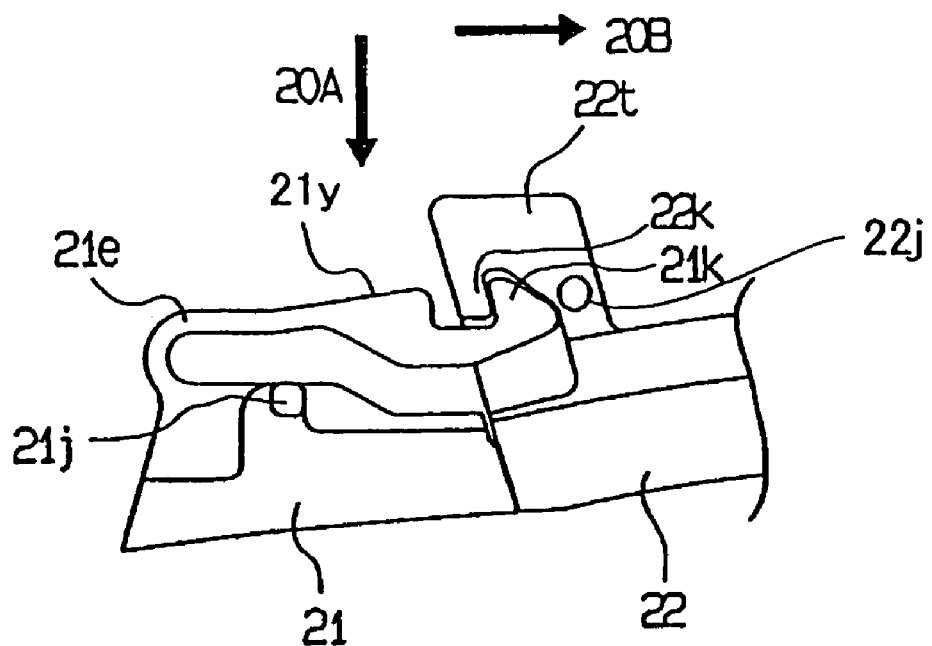
FIG. 68 is a plan view illustrating the details of the shutter locking mechanism of the disc cartridge shown in FIG. 64.
Figure 69:
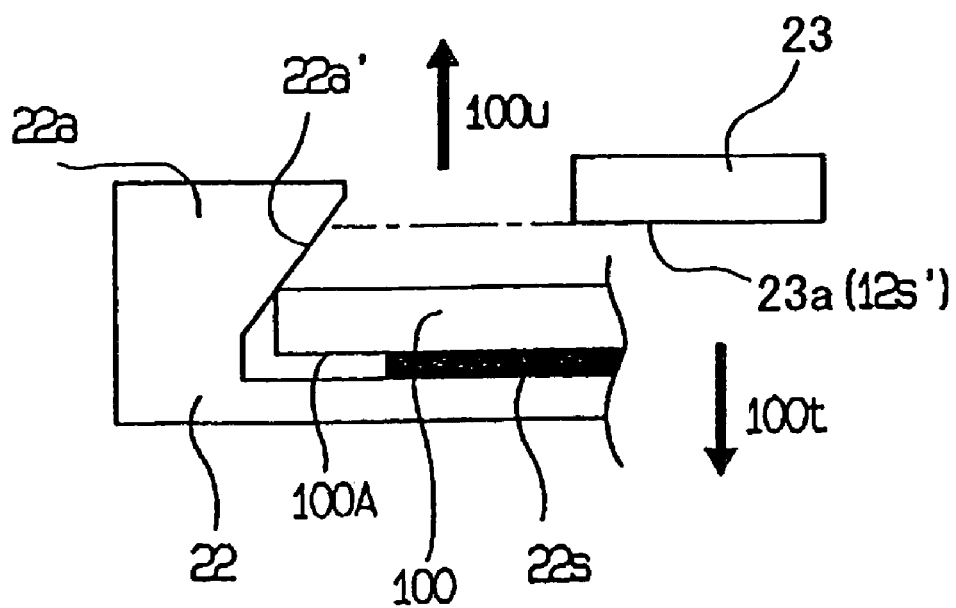
FIG. 69 is a cross-sectional view illustrating the details of the disc holder of the shutter in the disc cartridge shown in FIG. 64.

Hereinafter, it will be described with reference to FIGS. 66, 67, 68 and 69 how this disc cartridge 313 operates. FIGS. 66 and 67 are plan views illustrating the disc cartridge 313 in a state where its shutters 21 and 22 are closed and in a state where its shutters 21 and 22 are opened, respectively. FIG. 68 is a plan view illustrating the details of the shutter locking mechanism 20k. And FIG. 69 is a cross-sectional view illustrating the details of the disc holder 22a of the shutter 22.

First, a storage state of the disc cartridge 313, i.e., a state of the disc cartridge 313 that has not been loaded into a disc drive yet, will be described. In that state, the shutters 21 and 22 are closed as shown in FIG. 66. Also, as shown in FIG. 69, the slope 22a' of the disc holder 22a of the shutter 22 contacts with the outer edge of the disc 100, thereby holding the disc 100 thereon and pressing the disc 100 in the thickness direction 100t. As a result, the signal recording side 100A of the disc 100 is brought into contact with the sheet 22p of the shutter 22 and the disc 100 is fixed in the cartridge body 10. The three other disc holders 21a, 21b and 22b also have their own slopes 21a', 21b' and 22b', respectively. Thus, just like the disc holder 22a, these disc holders 21a, 21b and 22b also hold and fix the disc 100 in the cartridge body 10.

In this state, the signal recording side 100A of the disc 100 is in close contact with the sheets 21p and 22p. Thus, no dust will be deposited on the signal recording side 100A. Also, if the exposed side of the disc 100 is rotated manually or if the shutters 21 and 22 are opened or closed intentionally, then dust, finger marks or any other dirt that has adhered onto the signal recording side 100A of the disc 100 may be wiped away.

Furthermore, since the shutters 21 and 22 are locked by the locking mechanism 20k, the user cannot open the shutters 21 and 22 accidentally. Thus, the signal recording side 100A of the disc 100 can be protected from dust, finger marks or scratches.

Furthermore, the shutters 21 and 22 are provided with notches 21h and 22h, respectively. When the shutters 21 and 22 are closed, these notches 21 and 22 contact with each other to form a hole 20h just under the center hole 100h of the disc 100. In such a structure, even if this disc cartridge 313 is left with the upper side of the disc 100 exposed upward, dust will pass through the center hole 100h but will not be deposited on the shutters 21 and 22.

Figure 70:
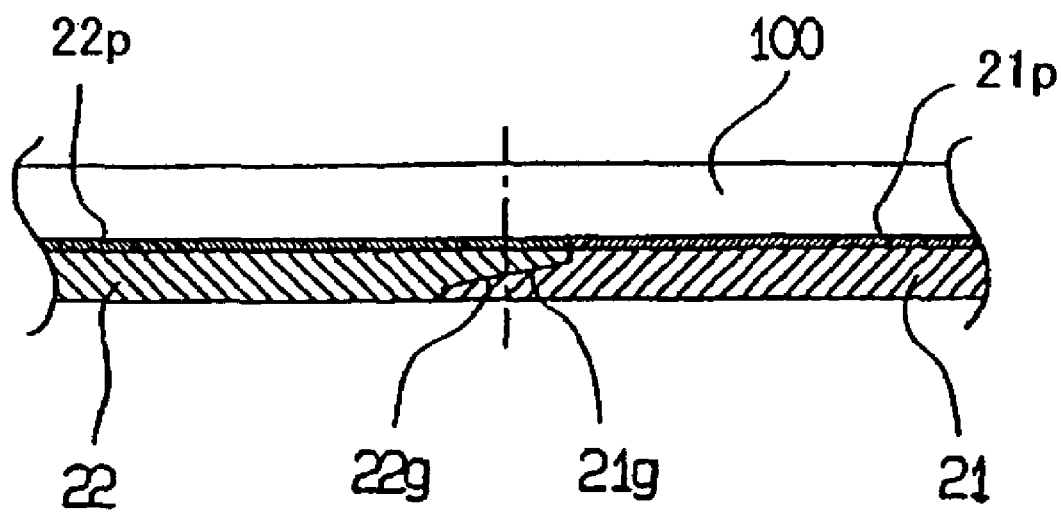
FIG. 70 is a cross-sectional view illustrating the shapes of a pair of contact portions between the two shutters of the disc cartridge shown in FIG. 64.
Figure 71:
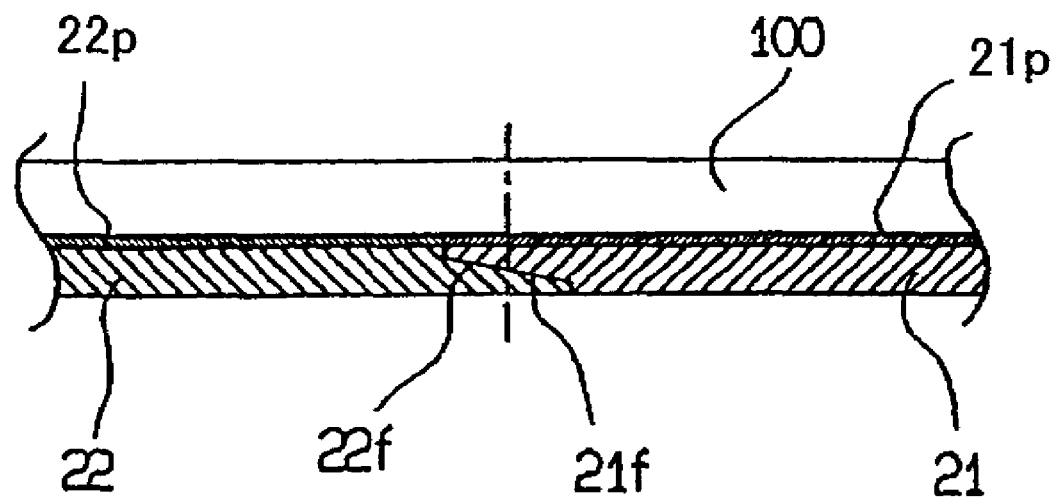
FIG. 71 is a cross-sectional view illustrating the shapes of another pair of contact portions between the two shutters of the disc cartridge shown in FIG. 64.

Also, while the shutters 21 and 22 are closed, at least the two pairs of contact portions 21f, 22f and 21g, 22g of the shutters 21 and 22, which are butted with each other over the chucking and head openings 11h and 11c, respectively, each overlap with each other in the thickness direction of the disc 100 as shown in FIGS. 70 and 71. Accordingly, even if the shutters 21 and 22 have been closed incompletely because a disc 100 having a non-regular diameter has been mounted on this disc cartridge 313 or because the shutters 21 and 22 have not been locked completely, no gap will be created between the contact portions of the shutters 21 and 22. Thus, even in such a situation, the disc 100 can also be protected from dust, finger marks or scratches.

Also, as shown in FIG. 70, the shutters 21 and 22 are in contact with each other around the head opening 11h so that the contact portion 22g of the shutter 22 is located over the contact portion 21g of the shutter 21. On the other hand, as shown in FIG. 71, the shutters 21 and 22 are in contact with each other around the chucking opening 11c so that the contact portion 21f of the shutter 21 is located over the contact portion 22f of the shutter 22. In this manner, the angle defined by one of multiple contact portions 21f or 21g or 22f or 22g of the shutter 21 or 22 may be different from the angle defined by another one of the contact portions 21g or 21f or 22g or 22f of the shutter 21 or 22. In such a structure, the two shutters 21 and 22 can be tightly engaged with each other in the thickness direction of the disc 100. Thus, neither the shutter 21 nor the shutter 22 will be raised unintentionally. In addition, while the shutters 21 and 22 are closed, the contact portions of the shutters 21 and 22 can exhibit increased rigidity.

In this preferred embodiment, the shutters 21 and 22 have the contact portions 21f, 21g, 22f and 22g shown in FIGS. 70 and 71. However, the shutters 21 and 22 may also have contact portions at different locations or may contact with each other in a different manner. For example, the contact portions 21g and 22g shown in FIG. 70 may be shifted to a location around the head opening 11h or the contact portions 21f and 22f shown in FIG. 71 may be shifted to a location around the chucking opening 11c. Then, the shutters 21 and 22 can exhibit even higher rigidity when closed, and the gap between the contact portions can be further reduced, thus preventing the dust from entering the inside of the cartridge.

Also, while the shutters 21 and 22 are closed, convex portions 21j and 22j, provided for the shutters 21 and 22 as shown in FIG. 68, are in contact with two shutter stoppers 12f provided for the upper shell 12 as shown in FIG. 65. Accordingly, the shutters 21 and 22 have its rotation regulated and cannot move from their locked positions. As a result, the shutters 21 and 22 will not move inconstantly in their locked state. In addition, it is possible to prevent the user from breaking the shutters 21 and 22 intentionally. Furthermore, since the shutters 21 and 22 have their rotation regulated, the shutter opener/closer 22t is not displaced. Accordingly, when this disc cartridge 313 is loaded into a disc drive, the shutter opener/closer 22t can be engaged with the shutter opening/closing mechanism of the disc drive just as intended.

Hereinafter, it will be described how this disc cartridge 313 is loaded into the disc drive. As shown in FIG. 66, when the disc cartridge 313 is inserted into the disc drive in the direction 1A, the cartridge positioning pins of the disc drive engage with the positioning holes 11w of the disc cartridge 313, thereby determining the horizontal and vertical positions of the disc cartridge 313 inside the disc drive.

Next, a shutter opener/closer of the shutter opening/closing mechanism provided inside the disc drive engages with the shutter opener/closer 22t shown in FIG. 68. At the same time, an unlocking member of the shutter opening/closing mechanism presses an unlocking portion 21y, which is connected to the shutter 21 by way of an elastic portion 21e, in the direction 20A. As a result, the locking protrusion 21k of the locking mechanism 20k is disengaged from the locking engaging portion 22k thereof, thereby unlocking the shutters 21 and 22 from each other. In such a state, the shutter opener/closer of the shutter opening/closing mechanism moves the shutter opener/closer 22t in the direction indicated by the arrow 20B. Consequently, the shutter 21 rotates on the shaft 11s while dominating the elastic force applied from the shutter spring 31 as shown in FIG. 67. Synchronously with the movement of the shutter 21, the other shutter 22, which is interlocked with the former shutter 21 via the interlocking mechanism 20c, also rotates while dominating the elastic force applied from the shutter spring 32. Accordingly, when the shutter 21 has been opened, the shutter 22 will have also been opened.

By the time the shutters 21 and 22 are opened completely, the locking protrusion 21k and the unlocking portion 21y will have returned to their home positions along with the elastic portion 21e. Thus, the elastic portion 21e made of a resin is not deformed plastically. In this manner, the signal recording side 100A of the disc 100 is exposed through the chucking and head openings 11c and 11h. Also, the disc 100, which has been held by the disc holders 21a, 21b, 22a and 22b, is released therefrom as the shutters 21 and 22 rotate. As a result, the disc 100 is now freely rotatable inside the disc storage portion 10d.

Subsequently, the spindle motor and the turntable of the disc drive enter the chucking opening 11c and the head of the disc drive enters the head opening 11h. Consequently, the disc drive is now ready to perform a read or write operation on the disc 100 loaded.

As described above, only by getting the locking protrusion 21k pressed externally by a protrusion, for example, in the direction indicated by the arrow 20A and disengaged from the locking engaging portion 22k while pressing the shutter opener/closer 22t in the direction indicated by the arrow 20B at the same time, the shutters 21 and 22 can be rotated to expose the chucking and head openings 11c and 11h and the disc 100 can be released from the disc holders 21a, 21b, 22a and 22b. Thus, it is possible to prevent the user from opening the shutters 21 and 22 or removing the disc 100 accidentally. As a result, the disc 100 can be protected from dust, finger marks or scratches.

Hereinafter, it will be described how the disc cartridge 313 is ejected from the disc drive. When an ejecting mechanism of the disc drive starts to operate, the shutter opener/closer of the disc drive, which has been engaged with the shutter opener/closer 22t, disengages itself from the shutter opener/closer 22t. As a result, the shutters 21 and 22 cannot be kept opened and start to rotate in the opposite direction. That is to say, the shutters 21 and 22, to which an elastic force is being applied from the shutter springs 31 and 32 in such a direction as to close the shutters 21 and 22, start to close themselves. Consequently, the shutters 21 and 22 close up the head and chucking openings 11*h* and 11*c*. In this case, the shutters 21 and 22 are locked to each other by the locking mechanism 20*k*. In the meantime, the disc 100 gets held by the disc holders 21*a*, 21*b*, 22*a* and 22*b* again to recover its original state. Then, the disc cartridge 313 is ejected from the disc drive.

In the disc cartridge 313, the disc contact portion 23*a* of the disc stoppers 23 provided for the cartridge body 10 and the disc contact portion 12*s'* of the upper shell 12 are located at the same vertical level as shown in FIG. 69. Also, the top of the slopes 21*a'*, 21*b'*, 22*a'* and 22*b'* of the disc holders 21*a*, 21*b*, 22*a* and 22*b* of the shutters 21 and 22 is higher in level than the bottom of the disc contact portions 23*a* and 12*s'* in the direction 100*u* in which the disc 100 is movable. Accordingly, even if the disc cartridge 313 is loaded into a disc drive either vertically or upside down, the shutters 21 and 22 still can hold the disc 100 firmly thereon. For example, if the disc cartridge 313 is loaded upside down into a disc drive, the disc 100 that is no longer chucked contacts with the disc contact portions 23*a* and 12*s'* and still can maintain its horizontal position. And when the shutters 21 and 22 are closed in such a state, the disc 100 contacts with the slopes 21*a'*, 21*b'*, 22*a'* and 22*b'* this time. Then, the disc 100 will slide along the slopes 21*a'*, 21*b'*, 22*a'* and 22*b'* smoothly to be held firmly by the disc holders 21*a*, 21*b*, 22*a* and 22*b*.

In the disc cartridge of the thirteenth preferred embodiment described above, the cartridge body thereof has a disc window and covers only one side of the disc. Also, the disc cartridge includes a shutter opener/closer inside a head opening of the cartridge body, and therefore, there is no need to provide an unnecessary gap for the cartridge body. As a result, no dust will enter the inside of the cartridge body.

In addition, in the disc cartridge of this thirteenth preferred embodiment, the two shutters thereof are made to contact with each other along the centerline of the disc over the chucking opening and along a line, which defines a predetermined angle with the centerline, over the head opening. Accordingly, these shutters can have an integrated structure from the vicinity of the shutter opener/closer and can exhibit sufficiently high rigidity.

Furthermore, since the two shutters are locked or unlocked to/from each other, the user cannot open or close the shutters accidentally. Thus, the disc can be protected from dust, finger marks or scratches.

Moreover, at least one of multiple disc holders of the disc cartridge is not secured to its associated shutter but is just connected thereto via an elastic portion. As an elastic force is also applied from a shutter spring to that disc holder, the disc holder can be deformed sufficiently elastically in the disc radial direction. For that reason, even if a disc of a non-regular size has been mounted on this disc cartridge, the disc cartridge can also hold such a disc firmly without allowing it to move inconstantly.

EMBODIMENT 14

Hereinafter, a disc cartridge 314 according to a fourteenth specific preferred embodiment of the present invention will be described with reference to FIGS. 72 through 81. In FIGS. 72 through 81, each member of the disc cartridge 314 of the fourteenth preferred embodiment, having substantially the same function as the counterpart of the disc cartridge 313 of the thirteenth preferred embodiment described above, is identified by the same reference numeral.

Figure 72:
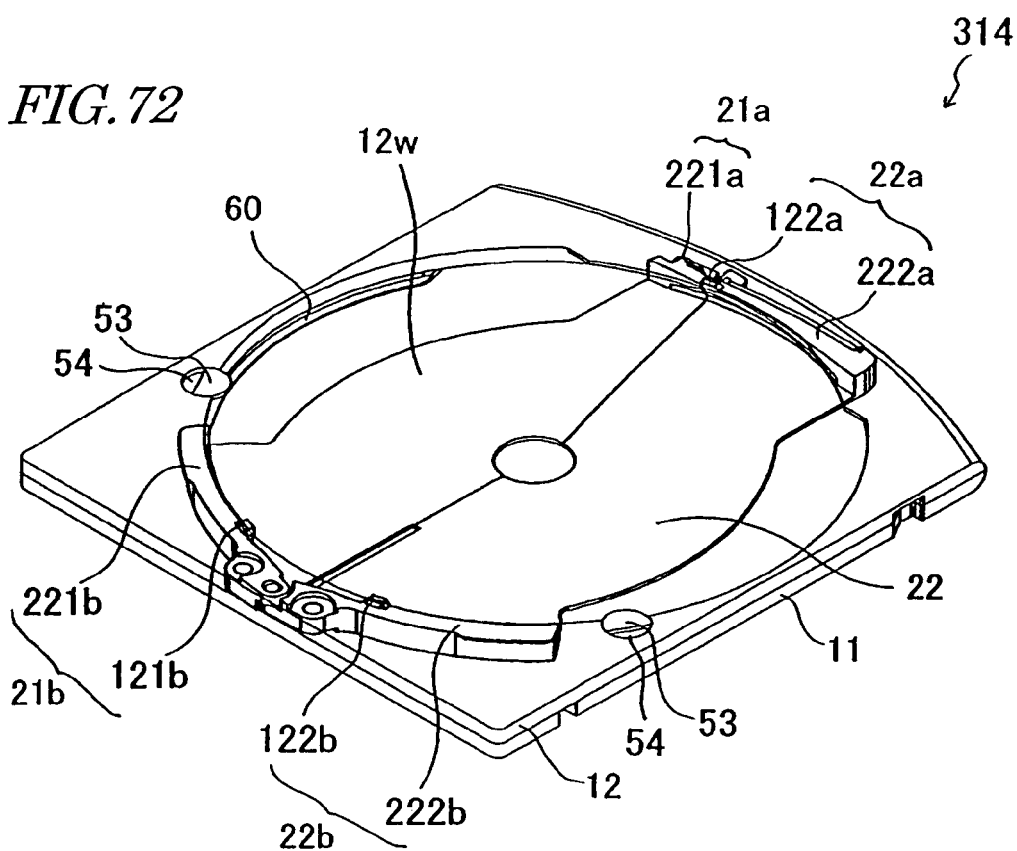
FIG. 72 is a perspective view illustrating an overall configuration for a disc cartridge according to a fourteenth specific preferred embodiment of the present invention.
Figure 76:
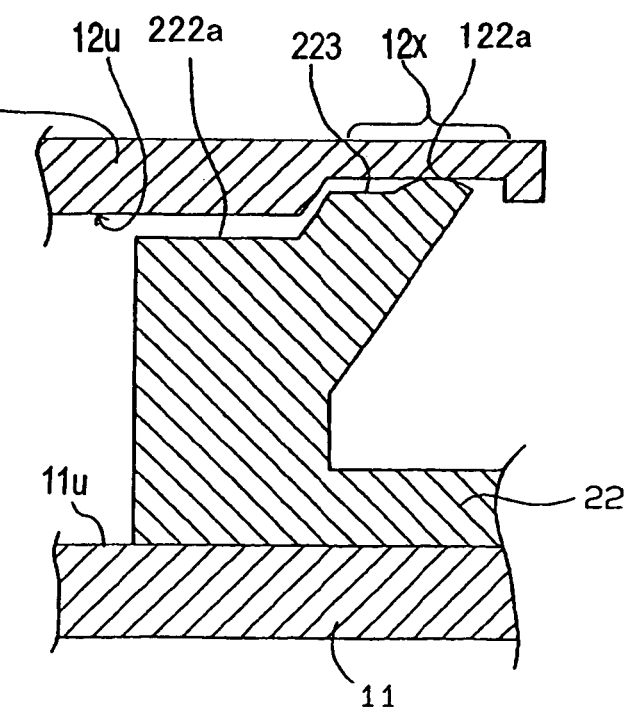
FIG. 76 is a cross-sectional view illustrating the disc older and its surrounding members of the disc cartridge shown in FIG. 72 to a larger scale.
Figure 77:
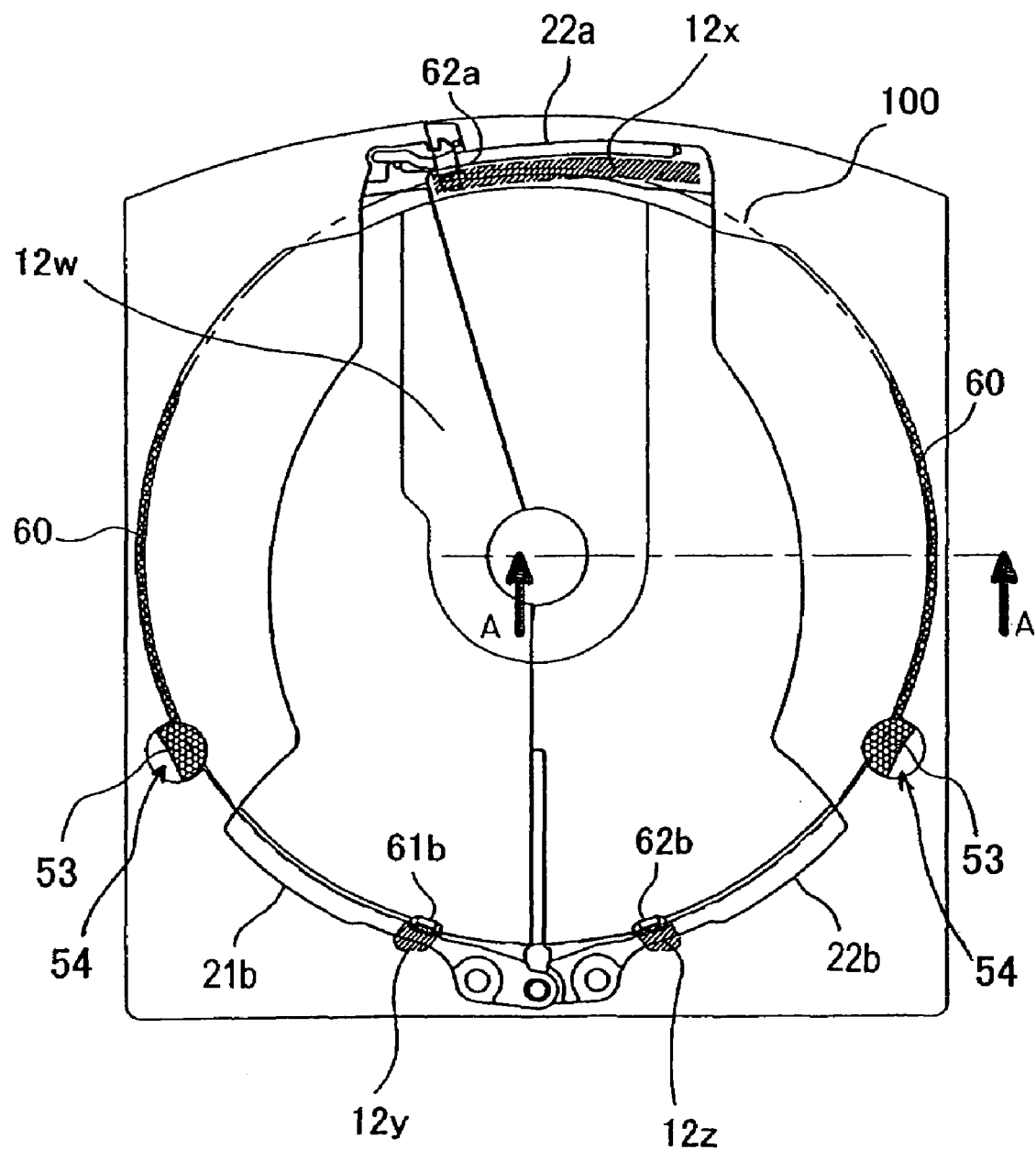
FIG. 77 is a schematic plan view illustrating a state of the disc cartridge shown in FIG. 72 in which its shutters are closed.
Figure 78:
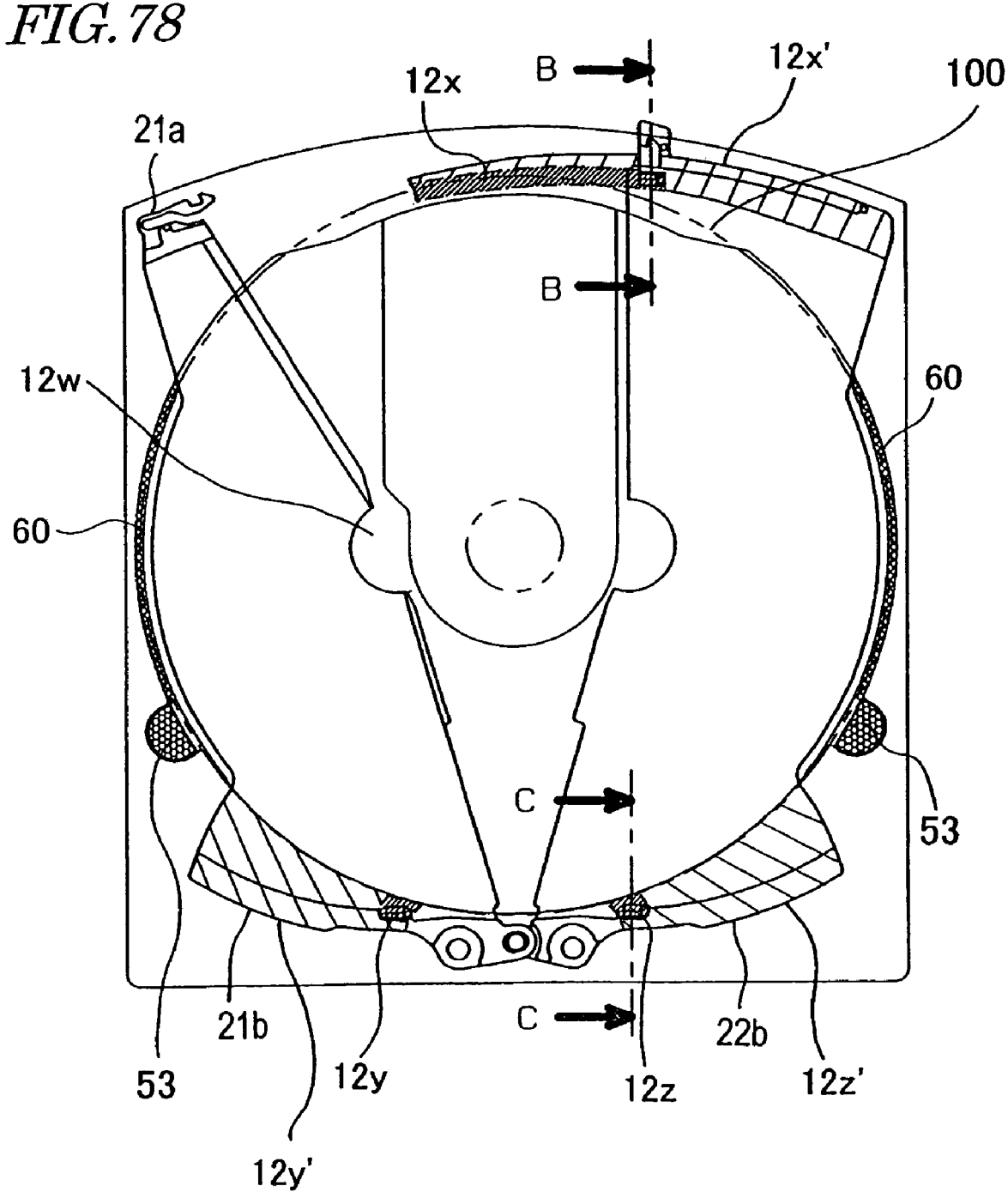
FIG. 78 is a schematic plan view illustrating a state of the disc cartridge shown in FIG. 72 in which its shutters are opened.

The disc cartridge 314 of the fourteenth preferred embodiment is different from the disc cartridge 313 of the thirteenth preferred embodiment described above in the respective shapes of the inner upper surface 12*u* of the cartridge body 10 (see FIG. 79), the disc holders 21*a*, 21*b*, 22*a* and 22*b* (see FIGS. 72 through 79) and the disc stoppers 53 (see FIGS. 72, 77 and 78). In addition, the disc cartridge 314 further includes a disc supporting portion 60 (see FIGS. 72 and 81). Thus, the following description of the disc cartridge 314 of the fourteenth preferred embodiment of the present invention will be focused on these differences.

Figure 73:
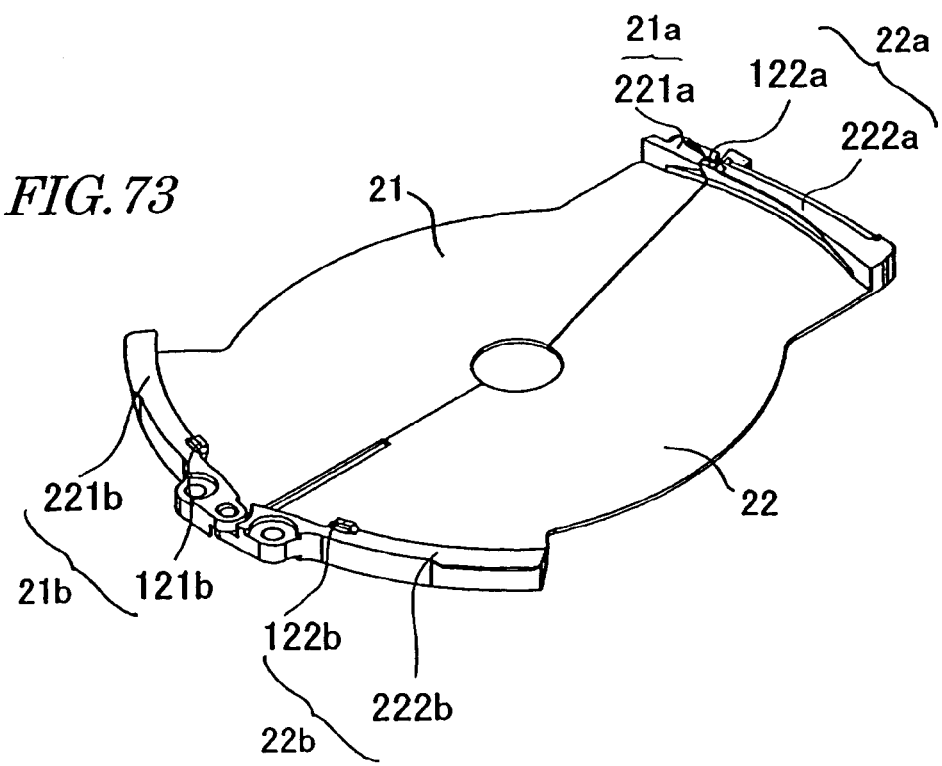
FIG. 73 is a perspective view illustrating the shutters the disc cartridge shown in FIG. 72.
Figure 79:
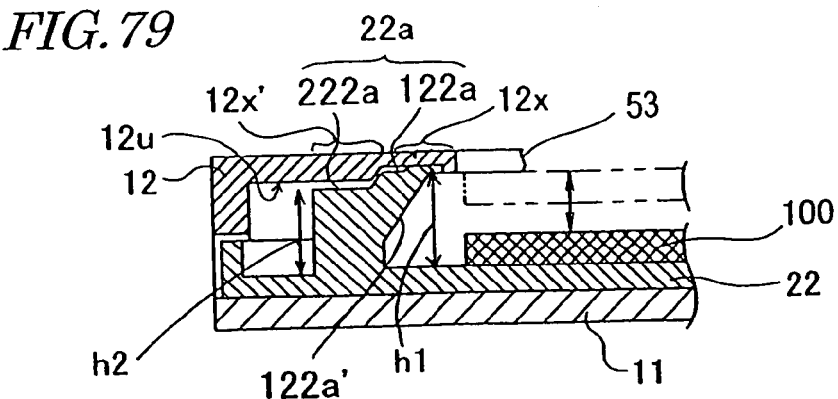
FIG. 79 is a cross-sectional view of the disc cartridge shown in FIG. 72 taken along the line B-B shown in FIG. 78.

In the disc cartridge 313 of the thirteenth preferred embodiment described above, the respective tops of the disc holders 21*a*, 21*b*, 22*a* and 22*b* thereof are located at substantially the same vertical levels along the outer periphery of the disc 100. In contrast, in the disc cartridge 314 of this fourteenth preferred embodiment, protrusions are formed on predetermined areas of the disc holders 21*b*, 22*a* and 22*b* as shown in FIGS. 73 and 79. More specifically, as shown in FIG. 79, each of these three disc holders 21*b*, 22*a* and 22*b* includes: a first portion 121*b*, 122*a* or 122*b* that has a protrusion thereon and has a first height h1 as measured from the upper surface of the shutters 21 and 22; and a second portion 221*b*, 222*a* or 222*b* that has a second height h2 as measured from the upper surface of the shutters 21 and 22. The other disc holder 21*a* consists of a second portion 221*a* that has the second height h2.

The first height h1 is greater than the second height h2 and is approximately equal to the height (i.e., the vertical level of the upper surface) of the disc holders 21*a*, 21*b*, 22*a* and 22*b* of the disc cartridge 313 of the thirteenth preferred embodiment described above. That is to say, the disc holders 21*a*, 21*b*, 22*a* and 22*b* of this fourteenth preferred embodiment are lower than the counterparts of the disc cartridge 313 of the thirteenth preferred embodiment except their first portions 121*b*, 122*a* and 122*b*.

Figure 74:
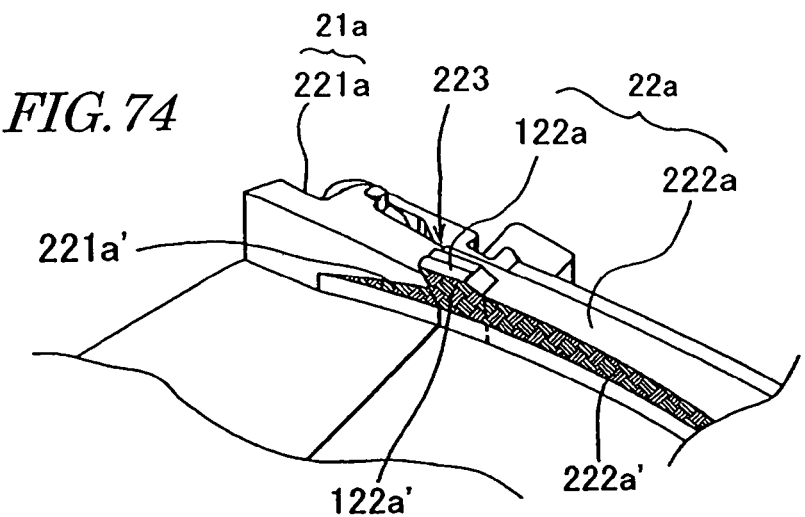
FIG. 74 is a perspective view illustrating the disc holders and their surrounding members of the disc cartridge shown in FIG. 72 to a larger scale.
Figure 75:
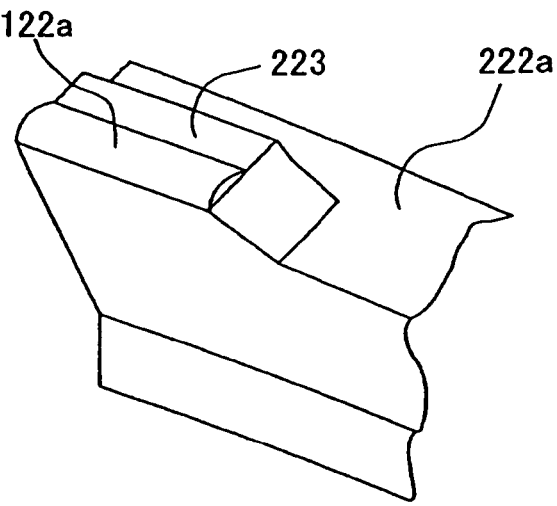
FIG. 75 is a perspective view illustrating the disc holder and its surrounding portion of the disc cartridge shown in FIG. 72 to a larger scale.

Also, as shown in FIGS. 74 and 75, a stepped protrusion 223 is formed on the upper surface of the first portion 122*a* of the disc holder 22*a*. The stepped protrusion 223 has two vertical levels, the higher one of which is closer to the disc 100 mounted. A similar stepped protrusion is also formed on the upper surface of the first portion 121*b* of the disc holder 21*b* and on the upper surface of the first portion 122*b* of the disc holder 22*b*.

As the shutter 21 or 22 is getting closed, the first portion 121*b*, 122*a* or 122*b* of the disc holder 21*b*, 22*a* or 22*b* contacts with the disc 100 earlier than any other portion thereof (i.e., earlier than the second portion 221*b*, 222*a* or 222*b* thereof).

Figure 80:
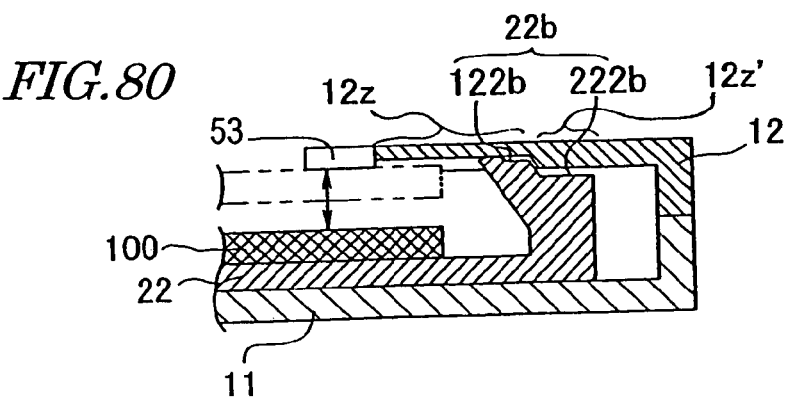
FIG. 80 is a cross-sectional view of the disc cartridge shown in FIG. 72 taken along the line C-C shown in FIG. 78.

The disc holders 21*a*, 21*b*, 22*a* and 22*b* move as the shutters 21 and 22 are opened or closed. FIG. 77 illustrates the respective positions of the disc holders 21*a*, 21*b*, 22*a* and 22*b* while the shutters 21 and 22 are closed. On the other hand, FIG. 78 illustrates the respective positions of the disc holders 21*a*, 21*b*, 22*a* and 22*b* while the shutters 21 and 22 are opened. FIGS. 79 and 80 are cross-sectional views illustrating portions of the disc cartridge 314 that are respectively taken along the lines B-B and C-C shown in FIG. 78.

As shown in FIGS. 77, 78 and 79, the regions 12*y*, 12*x* and 12*z* on the inner upper surface 12*u* of the cartridge body 10, through which the first portions 121*b*, 122*a* and 122*b* of the disc holders 21*b*, 22*a* and 22*b* pass as the shutters 21 and 22 are opened or closed, are recessed. On the other hand, the regions 12*y'*, 12*x'* and 12*z'*, through which the second portions 221*b*, 222*a* and 222*b* thereof pass, are not recessed. Accordingly, the upper shell 12 is thinner in the regions 12*x*, 12*y* and 12*z* than in the regions 12*x'*, 12*y'* and 12*z'*.

As shown in FIGS. 76 and 79, the top of the first portion 122a of the disc holder 22a is located at a vertical level higher than the bottom of the disc stopper 53. Also, the top of the first portion 122a of the disc holder 22a is received by the recessed first region 12x on the inner upper surface 12u. Since the stepped protrusion 223 is formed at the top of the first portion 122a, just a part of the upper surface of the first portion 122a is in contact with the inner upper surface 12u. On the other hand, the second portion 222a of the disc holder 22a is not in contact with the inner upper surface 12u.

To open and close the shutters 21 and 22 smoothly, the friction caused by the contact between the top of the first portion 122a of the disc holder 22a and the inner upper surface 12u is preferably small. For that purpose, the top of the first portion 122a of the disc holder 22a has an arc-shaped cross section when taken in the radial direction of the disc 100. This stepped protrusion 223 is provided to compensate for shortage in mechanical strength, which would be caused by a sharpened top of the first portion 122a, and to make that top moldable more accurately and more easily.

As shown in FIG. 80, the top of the first portion 122b of the disc holder 22b is also located at a vertical level higher than the bottom of the disc stopper 53. And the top of the first portion 122b of the disc holder 22b is received by the recessed first region 12z on the inner upper surface 12u. Although not shown, the top of the first portion 121b of the disc holder 21b is also located at a vertical level higher than the bottom of the disc stopper 53, and is received by the recessed first region 12y on the inner upper surface 12u.

As described above, in the disc cartridge 314 of the fourteenth preferred embodiment, the regions 12x, 12y and 12z on the inner upper surface 12u are recessed to receive portions of the disc holders 22a, 21b and 22b, respectively. Thus, the thickness of the disc cartridge 314 can be reduced by the depth of those recessed regions 12x, 12y and 12z.

Even if the disc cartridge 314 having such a structure is loaded into a disc drive either vertically or upside down, the disc 100 that is no longer chucked never fails to contact with the slope 122a' of the first portion 122a of the disc holder 22a as shown in FIG. 79 as the shutters 21 and 22 are closed. Thereafter, the disc 100 will slide smoothly along the slope 122a' to contact with the slope 222a' of the second portion 222a of the disc holder 22a (see FIG. 74). At the same time, the disc 100 also contacts with the slope 221a' of the second portion 221a of the disc holder 21a. In this manner, the disc holders 21a and 22a hold the disc 100 thereon cooperatively. The two other disc holders 21b and 22b also hold the disc 100 thereon through similar operations. Accordingly, although this disc cartridge 314 has a reduced thickness, the disc cartridge 314 can close the shutters 21 and 22 in any position and can hold the disc 100 thereon just as intended.

If this disc cartridge had its thickness just reduced without changing the shapes of the disc holders (or using the disc holders of the thirteenth preferred embodiments as they are), the regions 12x, 12x', 12y, 12y', 12z and 12z' on the inner upper surface 12u, through which the disc holders 22a, 21b and 22a pass, should all be recessed as can be seen from FIG. 78. In that case, the upper shell 12 would have a reduced thickness over a rather wide area and such a disc cartridge would have a decreased mechanical strength. In contrast, the disc cartridge 314 of this fourteenth preferred embodiment can have its thickness reduced without decreasing its mechanical strength because the regions 12x, 12y and 12z with a reduced thickness are relatively narrow.

In the preferred embodiment described above, three protrusions are provided for three of the four disc holders. However, the number of protrusions to be provided is changeable with the number of disc holders or the shapes of the shutters.

The disc cartridge 314 of the fourteenth preferred embodiment is also different from the disc cartridge 313 of the thirteenth preferred embodiment in the shape of the disc stoppers 53.

As shown in FIG. 72, the disc stoppers 53 have the shape of a notched circular plate. Specifically, notches 54 having substantially the same shape as the disc stoppers 53 are provided along the disc window 12w of the upper shell 12 and the disc stoppers 53 are engaged in a rotatable state with the notches 54. As shown in FIG. 77, the disc stoppers 53 are held in such a manner as to partially protrude into the disc window 12w of the upper shell 12 when rotated. Also, as shown in FIG. 78, by rotating the disc stoppers 53, the disc stoppers 53 may also be held in such a manner as to be stored inside the upper shell 12 and not to protrude into the disc window 12w. If the disc stoppers 53 are easily disengaged from the notches 54 unintentionally, then the side surfaces of the disc stoppers 53 and the notches 54 of the upper shell 12 may have mutually engaging concave and convex portions, for example.

In such a structure, the thickness of the disc stoppers 53 may be substantially equal to that of the upper part of the upper shell 12. Thus, the disc cartridge 314 can have a reduced overall thickness.

Figure 81:
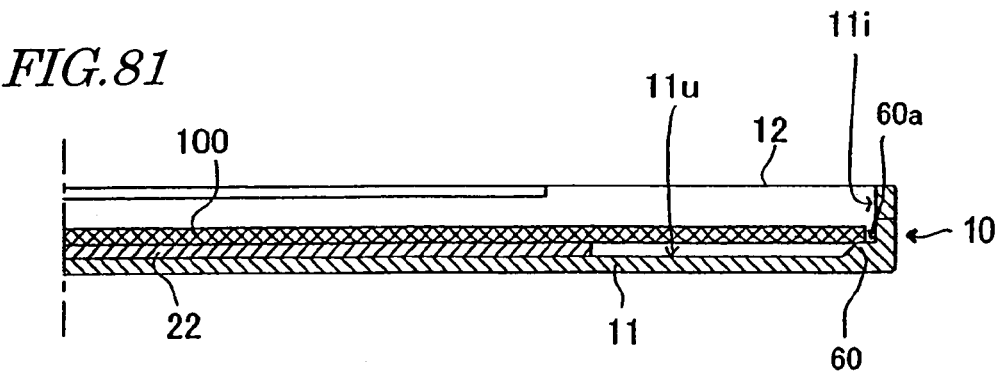
FIG. 81 is a cross-sectional view of the disc cartridge shown in FIG. 72 taken along the line A-A shown in FIG. 77.

The disc cartridge 314 of this fourteenth preferred embodiment is also characterized by including a disc supporting portion 60 at the bottom of the inner periphery of the disc storage portion. The disc supporting portion 60 is located between the inner lower surface 11u and the inner side surface 11i of the cartridge body 10 as shown in FIGS. 72, 77, 78 and 81. As shown in FIG. 81, the disc supporting portion 60 has an upper surface 60a, which is parallel to the inner lower surface 11u of the cartridge body 10.

As also shown in FIG. 81, while the shutters 21 and 22 are closed and the disc 100 is held by the disc holders, the outer edge and its surrounding portion of the signal recording side 100A of the disc 100 are in contact with the upper surface 60a of the disc supporting portion 60. Thus, no dust will be deposited on the signal recording side 100A of the disc 100 or accumulated on the inner lower surface 11u of the cartridge body 10.

Figure 82:
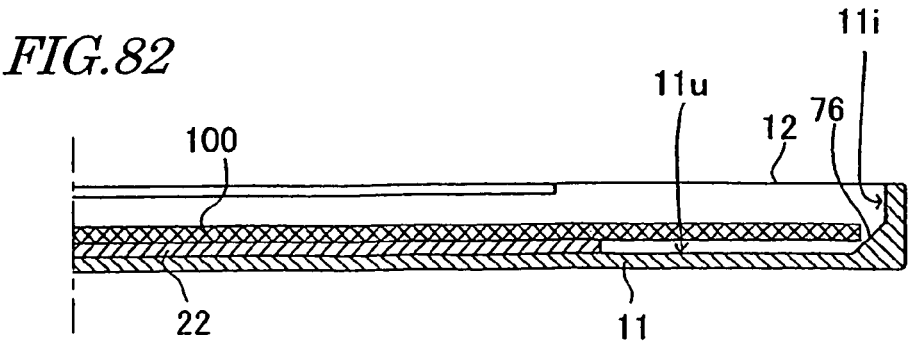
FIG. 82 is a cross-sectional view illustrating a modified example of the disc supporting portion.

Alternatively, the disc supporting portion 60 may have any shape other than that shown in FIG. 81. For example, as shown in FIG. 82, a disc supporting portion 76 having an upwardly tapered cross section may be formed between the inner lower surface 11u and the inner side surface 11i of the cartridge body 10. In that case, while the shutters 21 and 22 are closed and the disc 100 is held by the disc holders, the outer edge of the signal recording side 100A of the disc 100 is in contact with the disc supporting portion 76.

EMBODIMENT 15

Hereinafter, a disc cartridge 315 according to a fifteenth specific preferred embodiment of the present invention will be described with reference to FIGS. 83 through 87. In FIGS. 83 through 87, each member of the disc cartridge 315 of the fifteenth preferred embodiment, having substantially the same function as the counterpart of the disc cartridge 314 of the fourteenth preferred embodiment described above, is identified by the same reference numeral.

Figure 83:
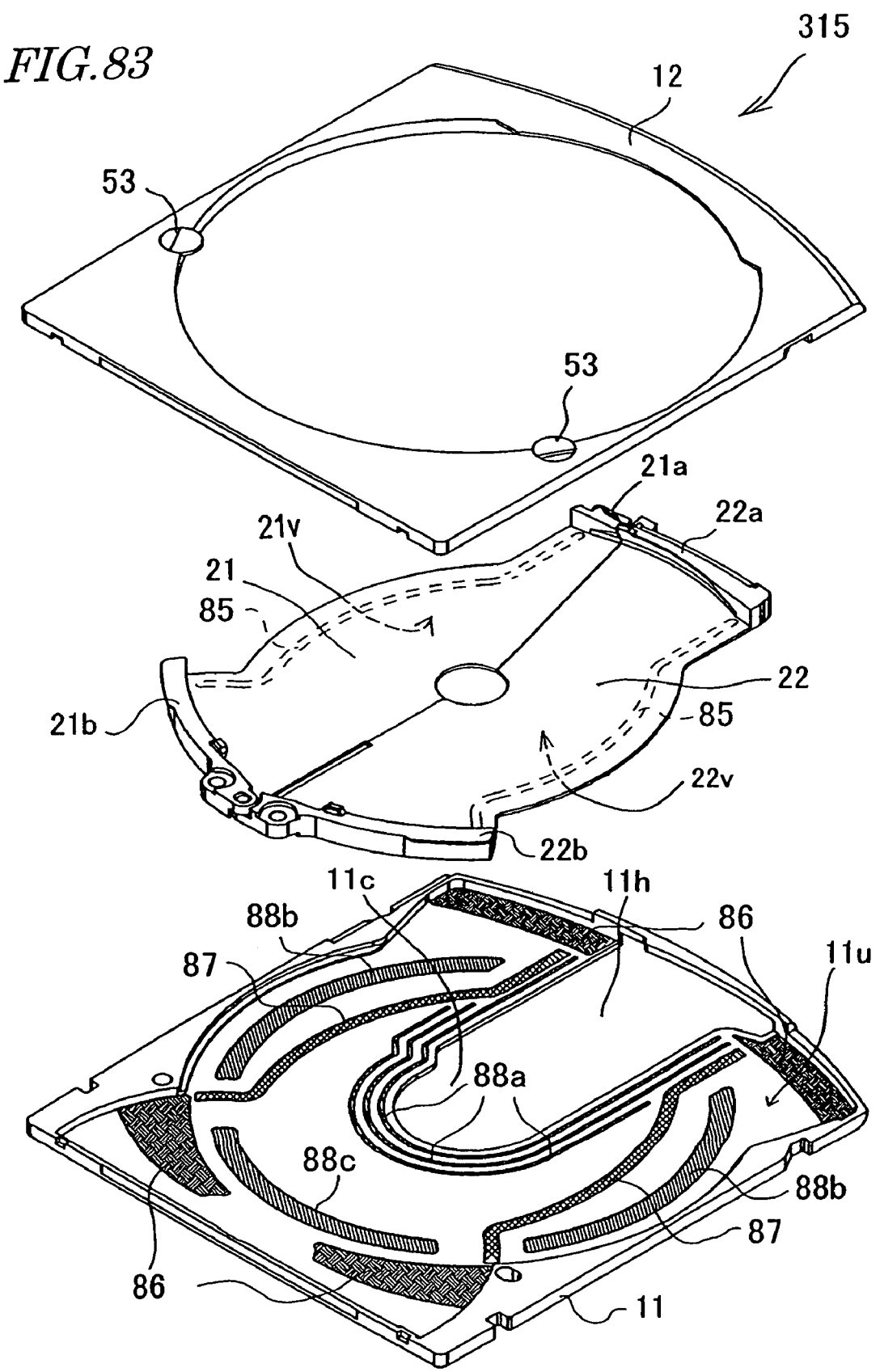
FIG. 83 is an exploded perspective view of a disc cartridge according to a fifteenth specific preferred embodiment of the present invention.

As shown in FIG. 83, unlike the disc cartridge 314 of the fourteenth preferred embodiment described above, the disc cartridge 315 of this fifteenth preferred embodiment includes four types of recesses 85, 86, 87 and 88a through 88c. The recesses 85 are formed on the respective lower surfaces 21v and 22v of the shutters 21 and 22. The other three types of recesses 86, 87 and 88a through 88c are formed on the inner lower surface 11u of the cartridge body 10 that contacts with the shutters 21 and 22. These four types of recesses will be described below one by one. Where the disc cartridge 315 is supposed to hold a disc having a diameter of about 12 cm, these recesses may have a depth of about 0.1 mm to about 0.3 mm, for example.

Figure 84:
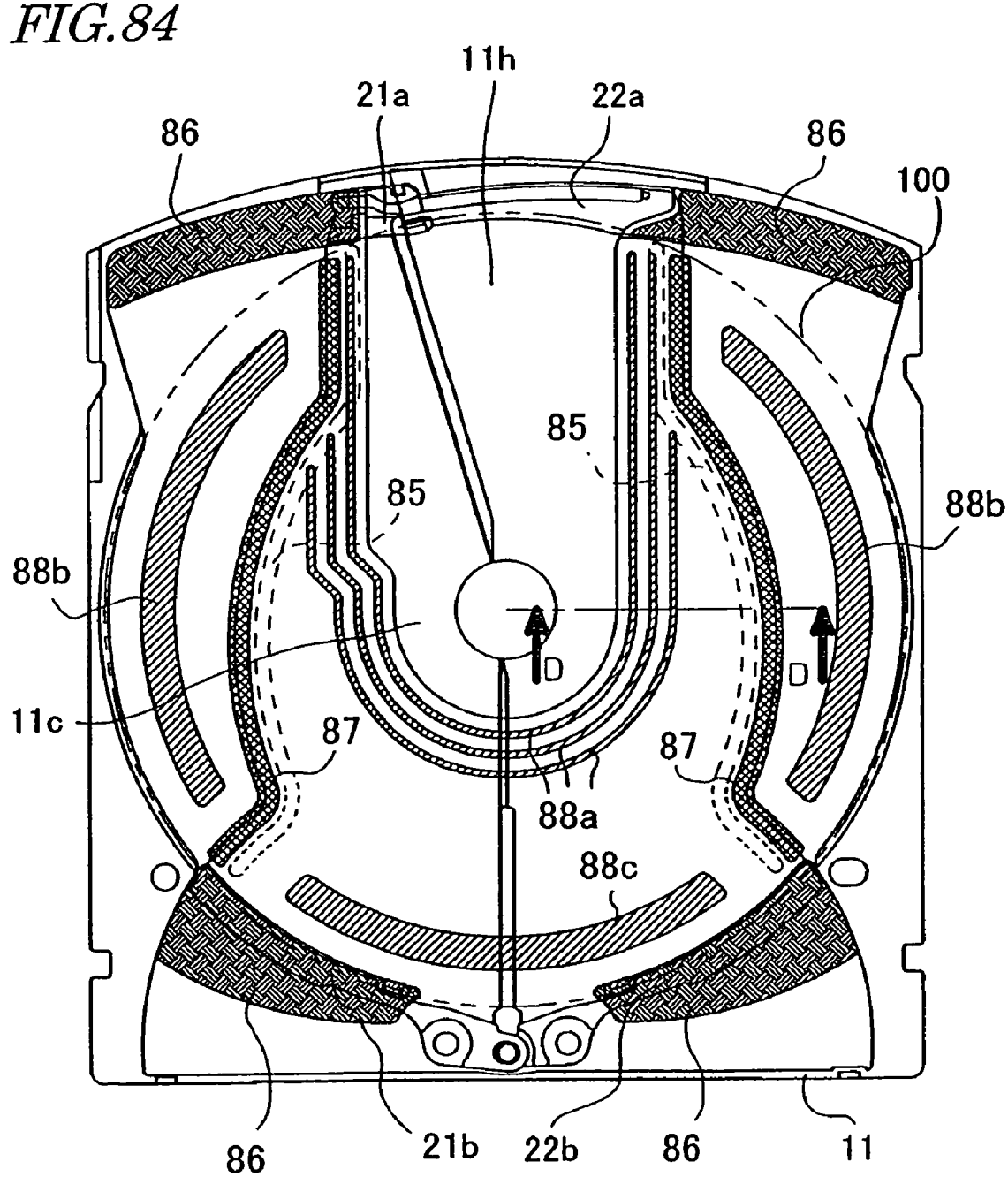
FIG. 84 is a schematic plan view illustrating a state of the disc cartridge shown in FIG. 83 in which its shutters are closed.
Figure 85:
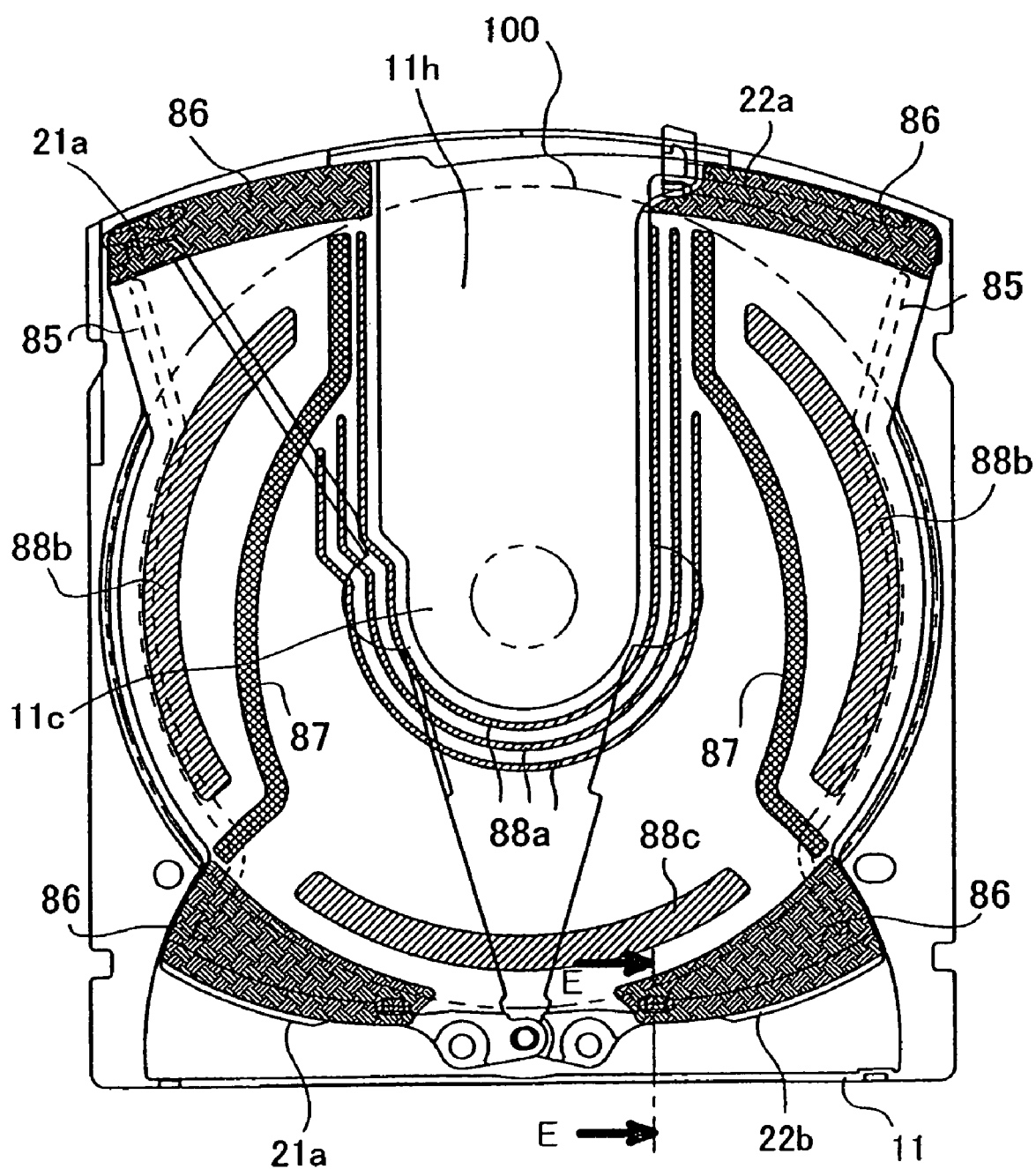
FIG. 85 is a schematic plan view illustrating a state of the disc cartridge shown in FIG. 83 in which its shutters are opened.

As can be seen from FIGS. 84 and 85 illustrating two states of the disc cartridge 315 in which its shutters 21 and 22 are closed and opened, respectively, the first type of recesses 86 are formed in respective regions of the inner lower surface 11u that contact with the disc holders 21a, 21b, 22a and 22b of the shutters 21 and 22 when the shutters 21 and 22 are opened or closed.

The disc holders 21a, 21b, 22a and 22b are sandwiched between the upper and lower shells 12 and 11 with almost no gap left between them. Accordingly, when respective members of the disc cartridge 315 are assembled together or if any of those members of the disc cartridge 315 has a size that is greatly different from the designed one, the disc holders 21a, 21b, 22a and 22b might contact with the upper and lower shells 12 and 11. In that case, excessive friction would be created between the disc holders 21a, 21b, 22a and 22b and the upper or lower shell 12 or 11. As a result, the shutters 21 and 22 might be unable to be opened or closed so easily or dust might be stirred up due to the excessive friction.

However, by providing the first type of recesses 86, gaps are provided under the disc holders 21a, 21b, 22a and 22b, thus reducing such unwanted friction. Then, the shutters 21 and 22 can always be opened or closed smoothly and no dust will be stirred up due to the friction.

Figure 86:
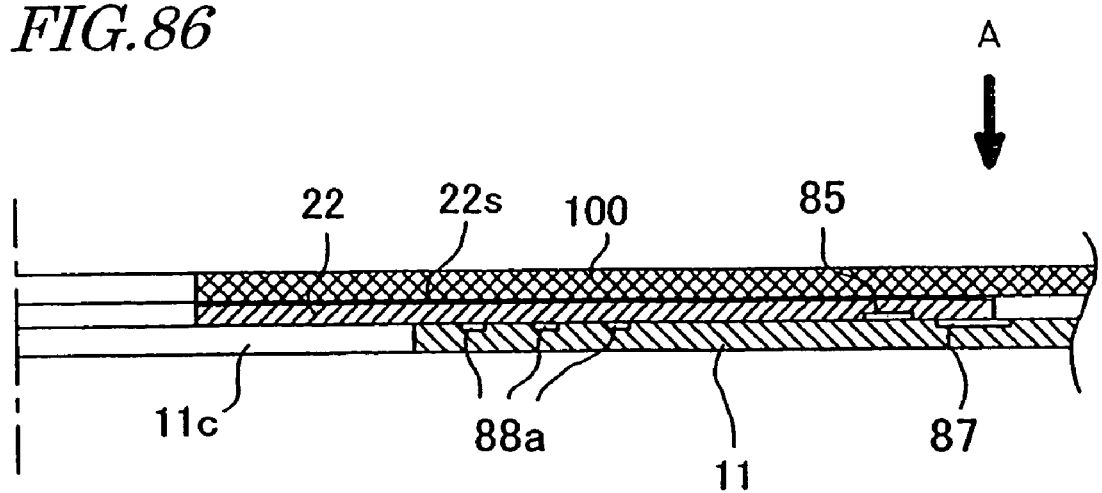
FIG. 86 is a cross-sectional view of the disc cartridge shown in FIG. 83 taken along the line D-D shown in FIG. 84.
Figure 87:
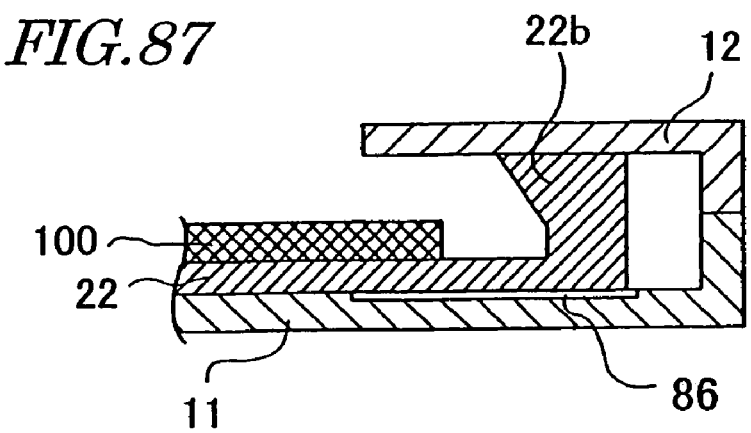
FIG. 87 is a cross-sectional view of the disc cartridge shown in FIG. 83 taken along the line E-E shown in FIG. 85.

The second type of recesses 87 are formed in those regions of the inner lower surface 11u where the respective outer edges of the shutters 21 and 22 are located while the shutters 21 and 22 are closed. As shown in FIGS. 84 and 86, these recesses 87 preferably extend along the boundary that defines the outer edges of the shutters 21 and 22 on the inner lower surface 11u and are preferably present both inside and outside of the boundary.

This disc cartridge 315 is supposed to store the disc 100 therein with one side thereof exposed, and the user can press the disc 100 in the direction indicated by the arrow A in FIG. 86. To protect the signal recording side 100A of the disc 100, the respective upper surfaces of the shutters 21 and 22 are covered with the nonwoven fabrics 21s and 22s but their outer edges are not completely covered with the nonwoven fabrics 21s and 22s. Accordingly, if the disc 100 is pressed in the direction A, then the outer edges of the shutters 21 and 22 contact with the signal recording side 100A of the disc 100, thus possibly scratching the signal recording side 100A as shown in FIG. 86.

However, if the second type of recesses 87 are provided, the shutters 21 and 22 may be deformed in such a manner that the outer edges thereof are partially forced into the second type of recesses 87. Then, the pressing force can be dispersed, and the outer edges of the shutters 21 and 22 will not be pressed against the signal recording side 100A of the disc 100 too strongly.

The third type of recesses include: recesses 88a that are formed on the inner lower surface 11u so as to surround the chucking and head openings 11c and 11h; recesses 88b that are formed in those regions of the inner lower surface 11u that are not overlapped by the shutters 21 and 22 when the shutters 21 and 22 are closed; and a recess 88c that is located in a region of the inner lower surface 11u that is overlapped by the shutters 21 and 22 when the shutters 2i and 22 are closed. The recesses 88b and 88c are provided so as to draw a circle along the circumference of the disc storage portion 10d. In this preferred embodiment, the number of the recesses 88a of the third type is three.

This disc cartridge 315 is also provided with various types of structures (e.g., a disc supporting portion) for preventing dust from entering the disc cartridge 315 or being deposited on the signal recording side 100A of the disc 100. However, it is actually difficult to totally eliminate the dust that enters the disc cartridge 315 or is deposited on the signal recording side 100A.

Thus, the third type of recesses 88a, 88b and 88c are provided to accumulate the dust that has entered the disc cartridge 315. Specifically, as the shutters 21 and 22 are opened or closed, the dust is collected in these recesses 88a, 88b and 88c of the third type. Once collected in the recesses 88a, 88b and 88c, the dust never contacts with the shutters 21 and 22 and remains in the recesses 88a, 88b and 88c without going out of the recesses 88a, 88b and 88c. Accordingly, by accumulating the dust in the third type of recesses 88a, 88b and 88c in this manner, the dust will not interfere with opening or closing of the shutters 21 and 22 or will be stirred up due to an excessive friction.

It should be noted that these effects are also achievable by the first type of recesses 86 or the second type of recesses 87. Accordingly, the disc cartridge 315 does not have to include all of these recesses 86, 87, 88a, 88b and 88c but may include just one type of recesses. Even so, the shutters 21 and 22 will not be interfered with their opening or closing by the dust and almost no dust will be stirred up due to a friction.

Also, to remove the dust from the gap between the shutters 21 and 22 and the inner lower surface 11u and accumulate it in the second type of recesses 87, for example, even more effectively, the respective lower surfaces 21v and 22v of the shutters 21 and 22 may be provided with the recesses 85 along the outer edges thereof. In that case, when the shutters 21 and 22 are closed, these recesses 85 are preferably located inside the second type of recesses 87 (i.e., closer to the centerline of the cartridge 315) as shown in FIG. 84. Also, as shown in FIG. 86, when the shutters 21 and 22 are closed, the recesses 85 of the shutters 21 and 22 are preferably discontinuous with the second type of recesses 87 on the inner lower surface 11u.

When the shutters 21 and 22 have the recesses 85, the outer edges of the shutters 21 and 22 are deformed more easily. Accordingly, even when a force is externally applied to the disc 100 in the direction A, the outer edges of the shutters 21 and 22 are deformed easily and will much less likely press the signal recording side 100A of the disc 100 so strongly as to scratch it. Optionally, these recesses 86, 87, 88a, 88b and 88c may have their inner faces covered with a nonwoven fabric that has been adhered or welded thereto. Then, the gaps created by these recesses inside the cartridge body can be filled and dust will enter this disc cartridge 315 even less easily.

In the fifteenth preferred embodiment described above, the various types of recesses are provided for the disc cartridge 314 of the fourteenth preferred embodiment. Alternatively, these recesses may also be provided for the disc cartridge according to any of the eighth through thirteenth preferred embodiments of the present invention described above.

EMBODIMENT 16

Hereinafter, a disc cartridge 316 according to a sixteenth specific preferred embodiment of the present invention will be described with reference to FIGS. 88 through 93. In FIGS. 88 through 93, each member of the disc cartridge 316 of the sixteenth preferred embodiment, having substantially the same function as the counterpart of the disc cartridge 313 of the thirteenth preferred embodiment described above, is identified by the same reference numeral.

Figure 88:
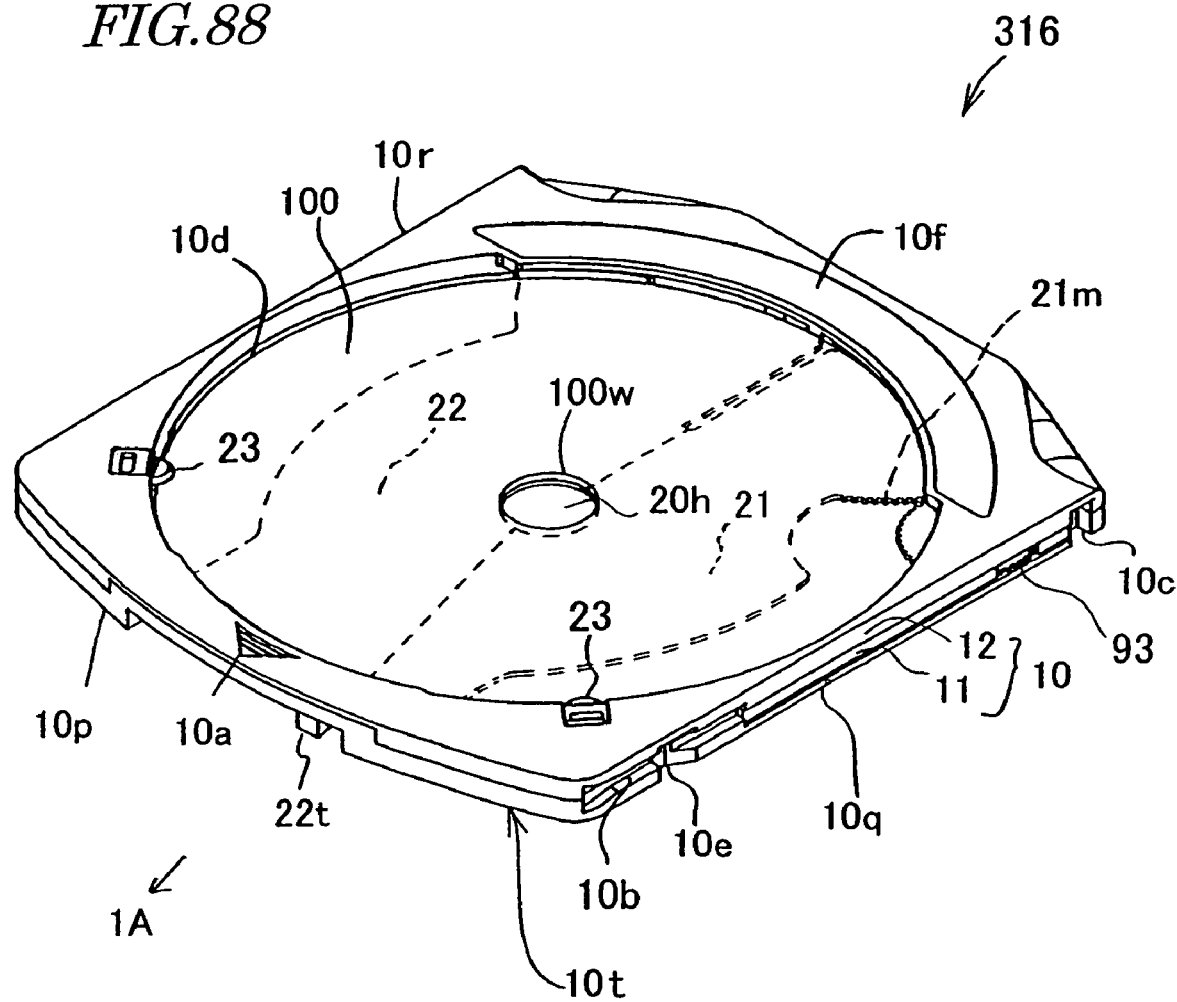
FIG. 88 is a perspective view illustrating an overall configuration for a disc cartridge according to a sixteenth specific preferred embodiment of the present invention.

As shown in FIG. 88, the disc cartridge 316 of this preferred embodiment includes first and second opener/closers 22t and 93 on first and second side surfaces 10p and 10q of the cartridge body 10, respectively. The first opener/closer 22t is formed on the first side surface 10p that extends substantially vertically to the direction 1A in which this disc cartridge 316 is inserted into a disc drive, while the second opener/closer 93 is formed on the second side surface 10q that extends substantially parallelly to the direction 1A. The first opener/closer 22t has the same structure as the shutter opener/closer 22t of the disc cartridge 313 of the thirteenth preferred embodiment.

Figure 89:
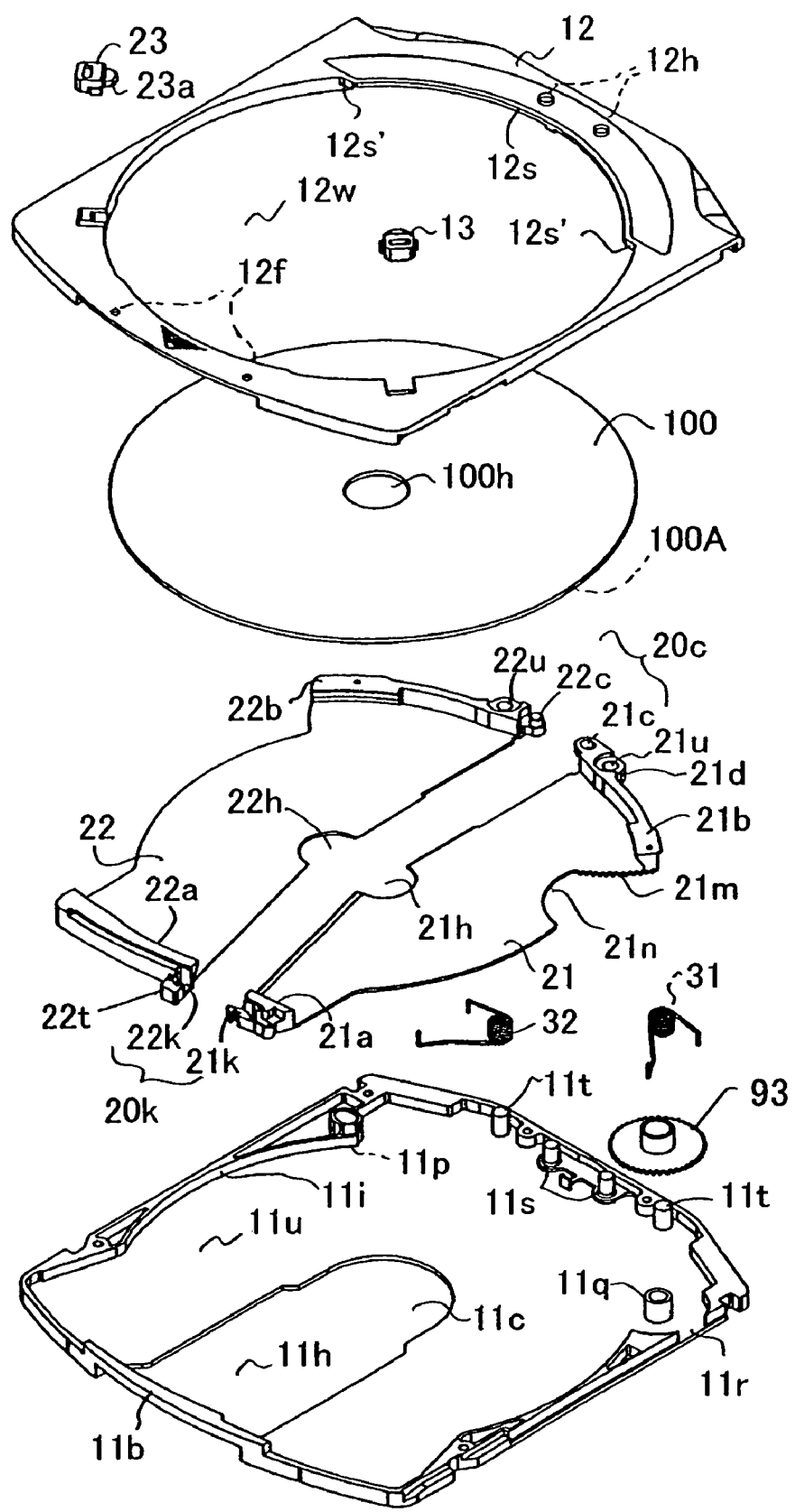
FIG. 89 is an exploded perspective view of the disc cartridge shown in FIG. 88.

As shown in FIG. 89, the second opener/closer 93 is formed in the shape of a gear having a hole that can be inserted into a shaft 11q provided for the lower shell 11. A side surface of the lower shell 11 has an opening 11r to expose a portion of the second opener/closer 93 through the second side surface 10q of the cartridge body 10 when the second opener/closer 93 is inserted into the shaft 11q. Alternatively, the shaft 11q may be provided for the upper shell 12.

The shutters 21 and 22 are also provided to expose or cover the head and chucking openings 11h and 11c of the lower shell 11. The shutters 21 and 22 are equivalent to the second and first shutters as defined in the appended claims. The first opener/closer 22t forms an integral part of the shutter 22. On the other hand, a sector gear 21m, which engages with the second opener/closer 93, is formed on the outer side surface of the shutter 21 and is located near the disc holder 21b. The center of rotation of the sector gear 21m is the hole 21u of the shutter 21. The outer side surface of the shutter 21 also has a concave portion 21n, which is adjacent to the sector gear 21m. This concave portion 21n is formed to define a space in which the second opener/closer 93 engages with the sector gear 21m.

Figure 90:
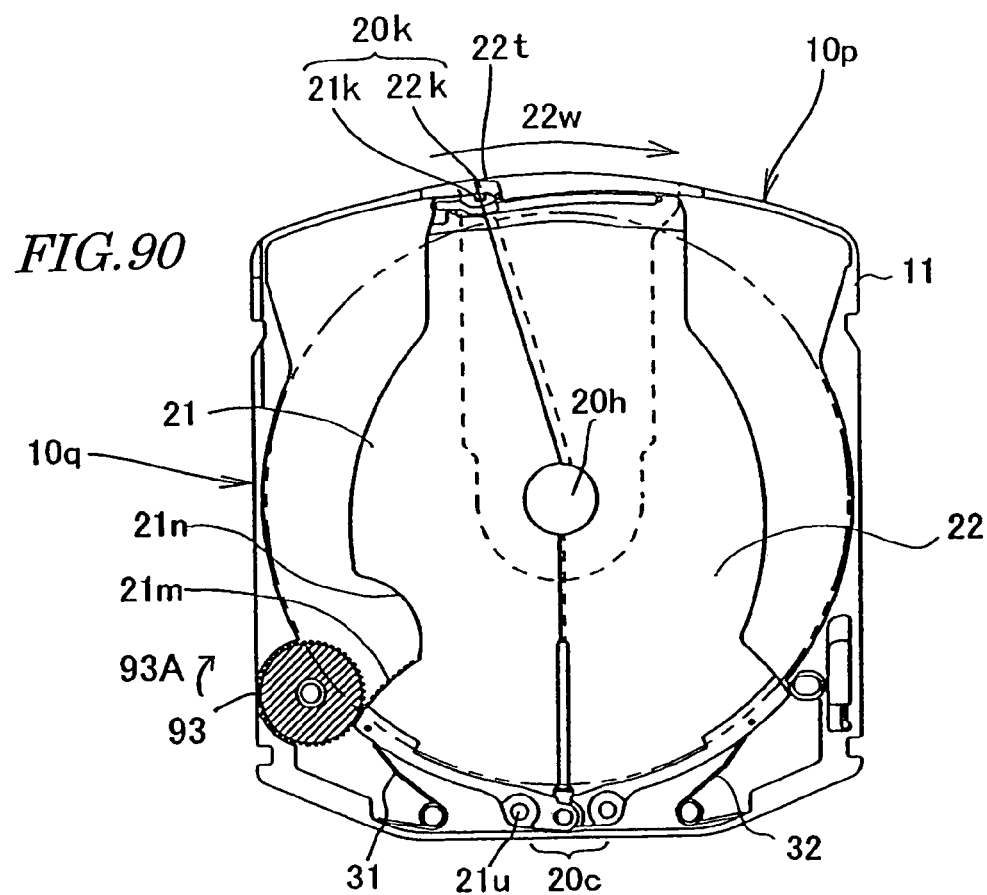
FIG. 90 is a schematic plan view illustrating a state of the disc cartridge shown in FIG. 88 in which its shutters are closed.
Figure 91:
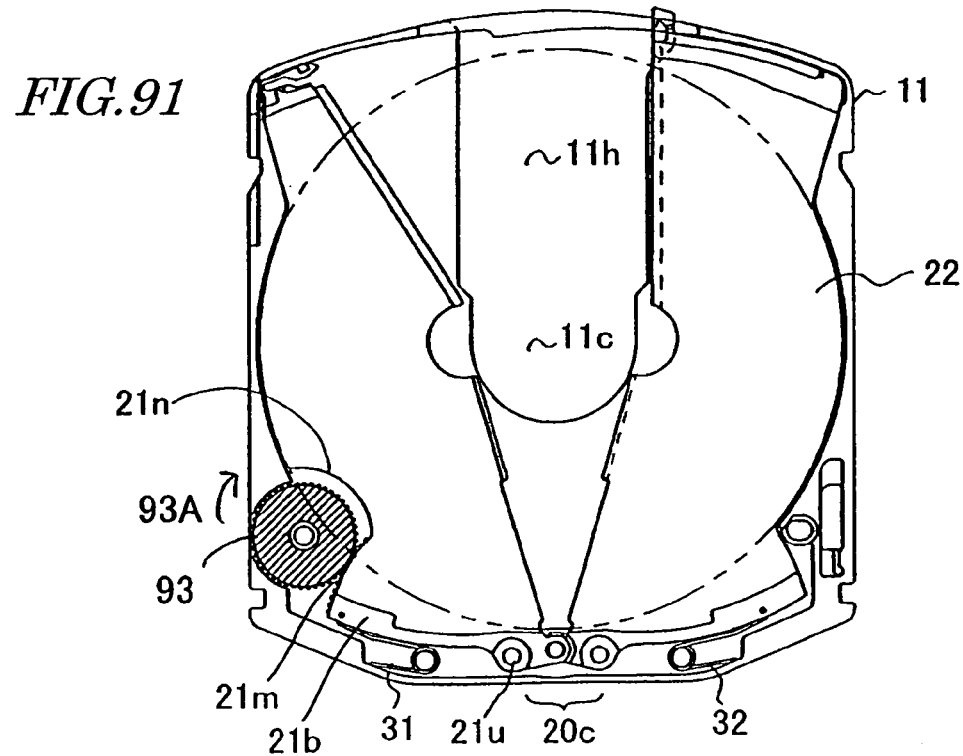
FIG. 91 is a schematic plan view illustrating a state of the disc cartridge shown in FIG. 88 in which its shutters are opened.

The shutters 21 and 22 may be opened or closed by using the first opener/closer 22t in the following manner. First, as shown in FIG. 90, the locking protrusion 21k and the locking engaging portion 22k, which together make up the locking mechanism 20k, are disengaged from each other. Then, the first opener/closer 22t is slid along the first side surface 10p of the cartridge body 10 as indicated by the arrow 22W in FIG. 90. As a result, the other shutter 21 is also moved synchronously with the shutter 22 by way of the interlocking mechanism 20c, and these two shutters 21 and 22 expose the head and chucking openings 11h and 11c as shown in FIG. 91.

The shutters 21 and 22 may also be opened by using the second opener/closer 93 in the following manner. First, the locking mechanism 20k is unlocked as shown in FIG. 90. Next, the second opener/closer 93 is rotated to the direction indicated by the arrow 93A. Then, the sector gear 21m gets engaged with the second opener/closer 93 and starts to rotate on the hole 21u, thereby opening the shutter 21. Since the other shutter 22 is also moved synchronously with the shutter 21 by way of the interlocking mechanism 20c, these two shutters 21 and 22 expose the head and chucking openings 11h and 11c. When the head and chucking openings 11h and 11c are completely exposed by the shutters 21 and 22 as shown in FIG. 91, a portion of the second opener/closer 93 is located inside the concave portion 21n of the shutter 21.

To close the shutters 21 and 22, the first opener/closer 22t may be slid in the direction opposite to the direction 22W or the second opener/closer 93 may be rotated to the direction opposite to the direction 93A. In this preferred embodiment, the disc cartridge 316 includes the shutter springs 31 and 32 that apply an elastic force to the shutters 21 and 22 in such a direction as to close the shutters 21 and 22. Accordingly, unless a force that is strong enough to open, or keep opened, the shutters 21 and 22 against the elastic force of the shutter springs 31 and 32 is applied to the first or second opener/closer 22t or 93, the shutters 21 and 22 close themselves automatically.

In the disc cartridge 316 of the sixteenth preferred embodiment, the opener/closers are provided for the shutters 21 and 22 both on a side surface that is perpendicular to the direction in which this disc cartridge 316 is inserted into a disc drive and on a side surface that is parallel to the disc cartridge inserting direction. Accordingly, no matter whether the disc drive used is compatible with only a disc cartridge including a shutter opener/closer on a side surface that extends perpendicularly to the disc cartridge inserting direction or only a disc cartridge including a shutter opener/closer on a side surface that extends parallelly to the disc cartridge inserting direction, the disc drive can always read or write a signal from/on the disc stored in the disc cartridge of this preferred embodiment.

Also, in the disc cartridge 316 of this sixteenth preferred embodiment, the second opener/closer 93, provided for the side surface parallel to the direction in which the disc cartridge 316 is inserted, has a gear shape. Accordingly, a shutter opening/closing mechanism to be provided for the disc drive may also be any of various shapes of gears that can engage with the second opener/closer 93. Thus, the disc drive may use a relatively simple mechanism to open or close the shutters 21 and 22 of the disc cartridge 316.

Figure 92:
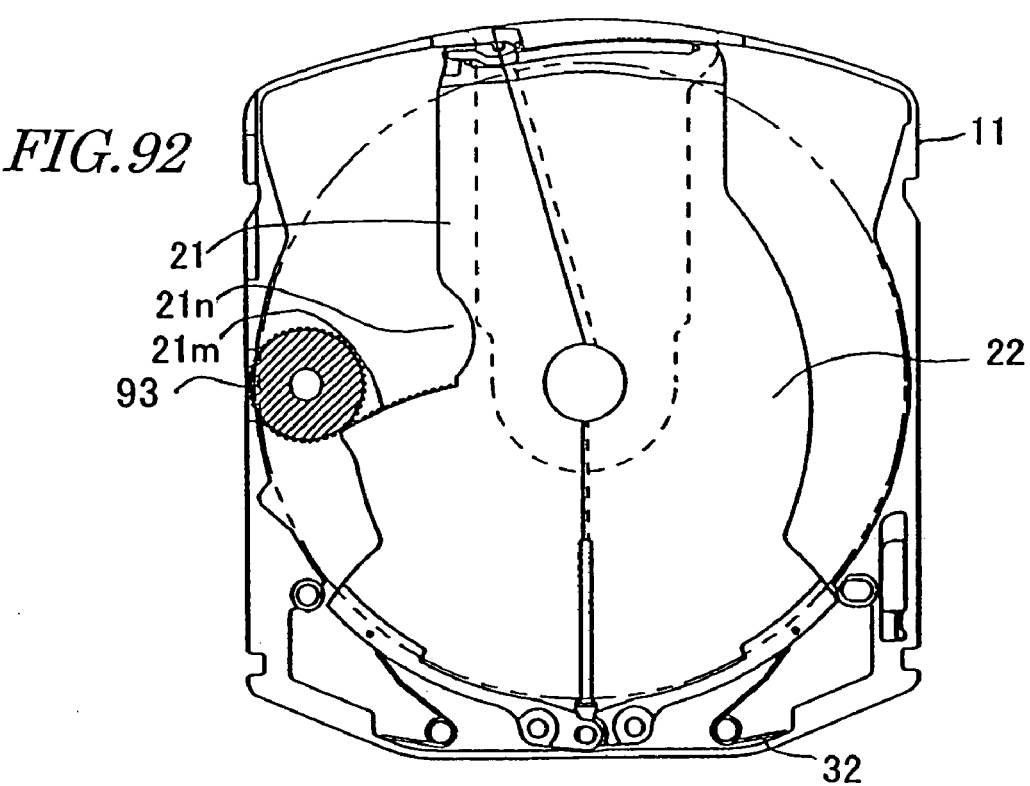
FIG. 92 is a schematic plan view illustrating a modified example of the disc cartridge shown in FIG. 88 in which its shutters are closed.
Figure 93:
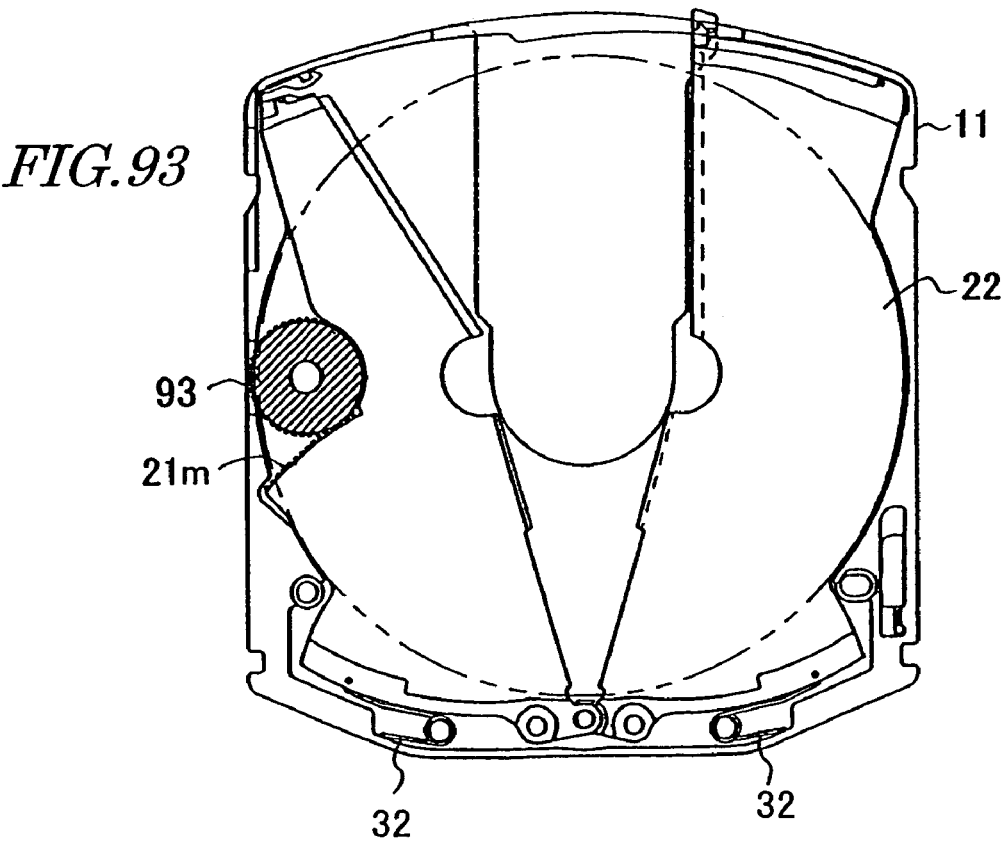
FIG. 93 is a schematic plan view illustrating a state of the disc cartridge shown in FIG. 92 in which its shutters are opened.

In the preferred embodiment described above, the sector gear 21m is provided near the disc holder 21b. This is because the distance between the sector gear 21m at such a position and the hole 21u of the shutter 21 is relatively short and because the sector gear 21m needs to have a relatively short length to open the shutter 21 fully. However, the sector gear 21m does not have to be provided at this position. Alternatively, the sector gear 21m and the second opener/closer 93 may also be provided at such positions as shown in FIGS. 92 and 93. In the alternative preferred embodiment shown in FIGS. 92 and 93, the sector gear 21m may be located at such a position that when extended, a circular trace drawn by the sector gear 21m will substantially intersect with the center of the disc 100, while the second opener/closer 93 may be provided at such a position as to engage with the sector gear 21m. When the second opener/closer 93 is provided at such a position, the sector gear 21m should be relatively long to open the shutter 21 fully, but the distance between the sector gear 21m and the hole 21u may also be relatively long. That is to say, since there is a long distance between the fulcrum and the application point in that case, a lighter force is needed to rotate the second opener/closer 93 and open or close the shutters 21 and 22.

EMBODIMENT 17

Hereinafter, a disc cartridge 317 according to a seventeenth specific preferred embodiment of the present invention will be described with reference to FIGS. 94 through 97. In FIGS. 94 through 97, each member of the disc cartridge 317 of the seventeenth preferred embodiment, having substantially the same function as the counterpart of the disc cartridge 316 of the sixteenth preferred embodiment described above, is identified by the same reference numeral.

Figure 94:
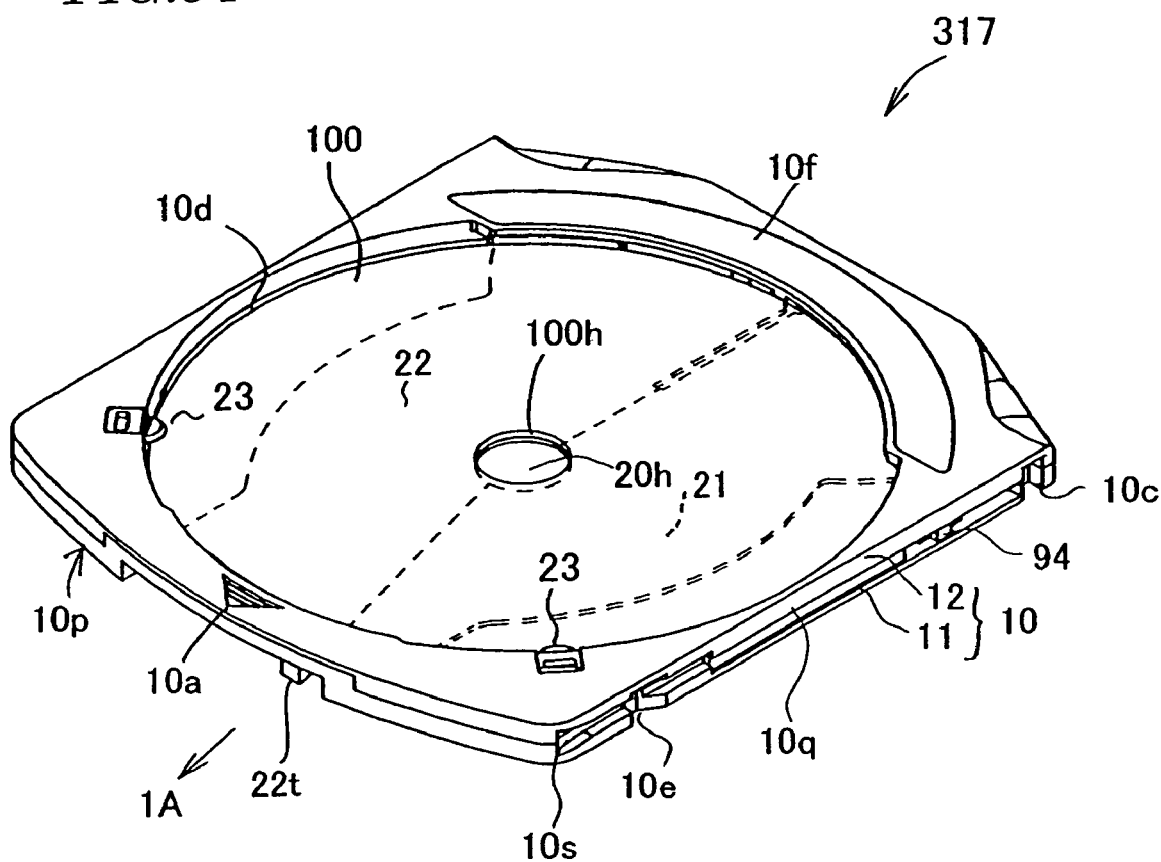
FIG. 94 is a perspective view illustrating an overall configuration for a disc cartridge according to a seventeenth specific preferred embodiment of the present invention.

As shown in FIG. 94, the disc cartridge 317 of this seventeenth preferred embodiment includes a second opener/closer 94 on its second side surface 10q instead of the second opener/closer 93 of the disc cartridge 316 of the sixteenth preferred embodiment described above.

Figure 95:
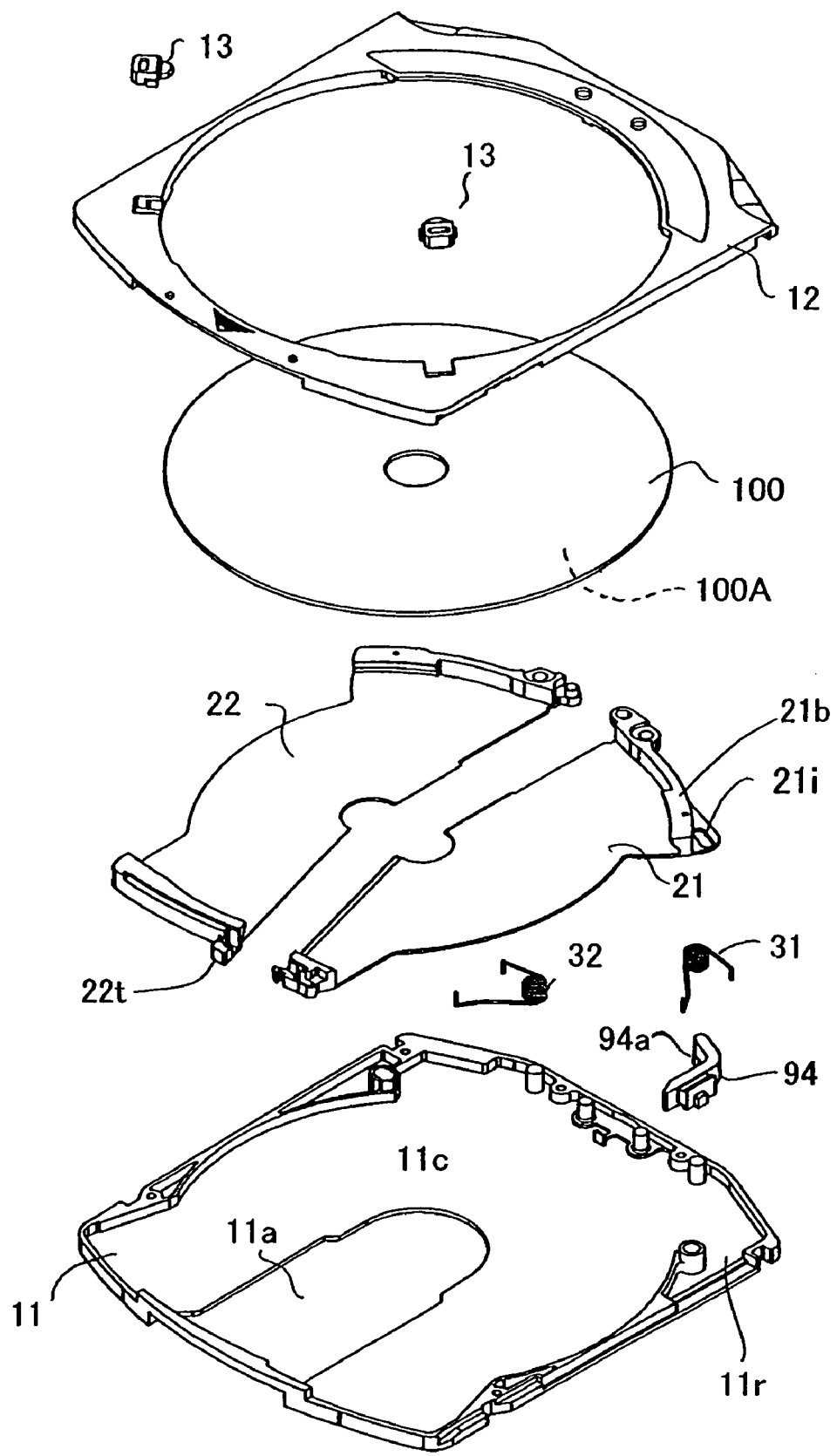
FIG. 95 is an exploded perspective view of the disc cartridge shown in FIG. 94.

As can be seen from FIG. 95, the second opener/closer 94 is a link member that can slide along the opening 11r of the lower shell 11 and that is bent approximately at the center thereof. Also, the second opener/closer 94 includes a protrusion 94a at one end thereof. This protrusion 94a engages with a groove 21i that is provided on the upper surface of the shutter 21 near the disc holder 21b.

Figure 96:
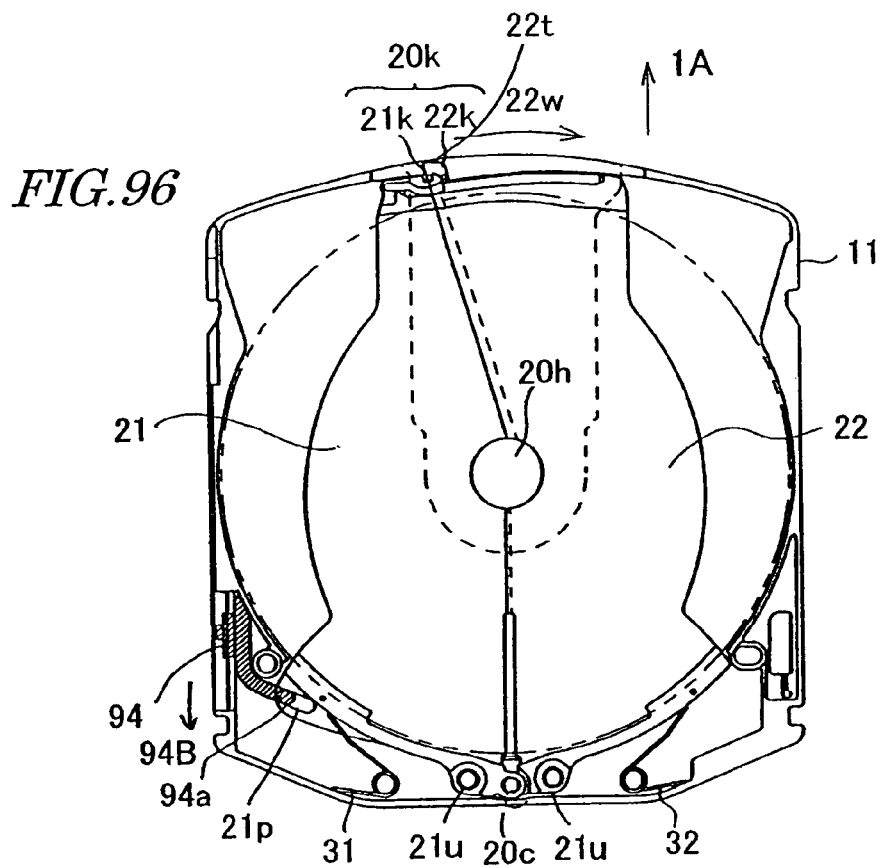
FIG. 96 is a schematic plan view illustrating a state of the disc cartridge shown in FIG. 94 in which its shutters are closed.
Figure 97:
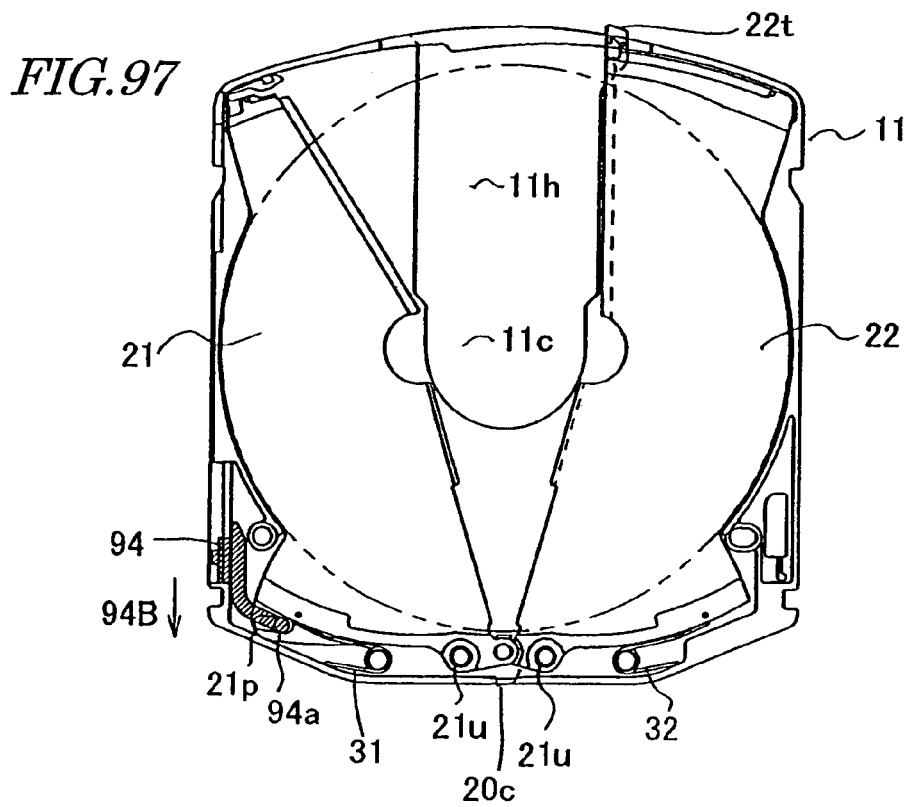
FIG. 97 is a schematic plan view illustrating a state of the disc cartridge shown in FIG. 94 in which its shutters are opened.

FIGS. 96 and 97 illustrate two states of the disc cartridge 317 in which the shutters 21 and 22 thereof are closed and opened, respectively. As already described for the thirteenth and sixteenth preferred embodiments, the shutters 21 and 22 can be opened or closed by sliding the first opener/closer 22t in the direction 22w or in the opposite direction.

The shutters 21 and 22 may also be opened by using the second opener/closer 94 in the following manner. First, the locking mechanism 20k is unlocked as shown in FIG. 96. Next, the second opener/closer 94 is slid in the direction indicated by the arrow 94B. As a result of this operation, a force is applied to the second opener/closer 94 in such a direction as to move the protrusion 94a of the second opener/closer 94 in the direction indicated by the arrow 94B. Thus, the shutter 21 is rotated on the hole 21u and opened. Since the other shutter 22 is also moved synchronously with the shutter 21 by way of the interlocking mechanism 20c, these two shutters 21 and 22 expose the head and chucking openings 11h and 11c. As in the sixteenth preferred embodiment described above, the shutters 21 and 22 can also be closed by sliding the second opener/closer 94 in the direction opposite to the direction 94B, and the shutter springs 31 and 32 also apply an elastic force to the shutters 21 and 22 in such a direction as to close the shutters 21 and 22.

Just like the disc cartridge 316 of the sixteenth preferred embodiment described above, no matter whether the disc drive used is compatible with only a disc cartridge including a shutter opener/closer on a side surface that extends perpendicularly to the disc cartridge inserting direction or only a disc cartridge including a shutter opener/closer on a side surface that extends parallelly to the disc cartridge inserting direction, the disc drive can always read or write a signal from/on the disc stored in the disc cartridge 317 of this preferred embodiment.

Also, as shown in FIGS. 96 and 97, the direction 94B in which the second opener/closer 94 is slid to open the shutters 21 and 22 is antiparallel to the disc cartridge inserting direction 1A. Accordingly, if a protrusion that engages with the second opener/closer 94 is provided for a disc drive, that protrusion engages with the second opener/closer 94 and opens the shutters 21 and 22 of the disc cartridge 317 while this disc cartridge 317 is going to be inserted into the disc drive. Thus, a simplified shutter opening/closing mechanism may be provided for the disc drive.

EMBODIMENT 18

Hereinafter, a disc cartridge 318 according to an eighteenth specific preferred embodiment of the present invention will be described with reference to FIGS. 98 through 101. In FIGS. 98 through 101, each member of the disc cartridge 318 of the eighteenth preferred embodiment, having substantially the same function as the counterpart of the disc cartridge 316 of the sixteenth preferred embodiment described above, is identified by the same reference numeral.

Figure 98:
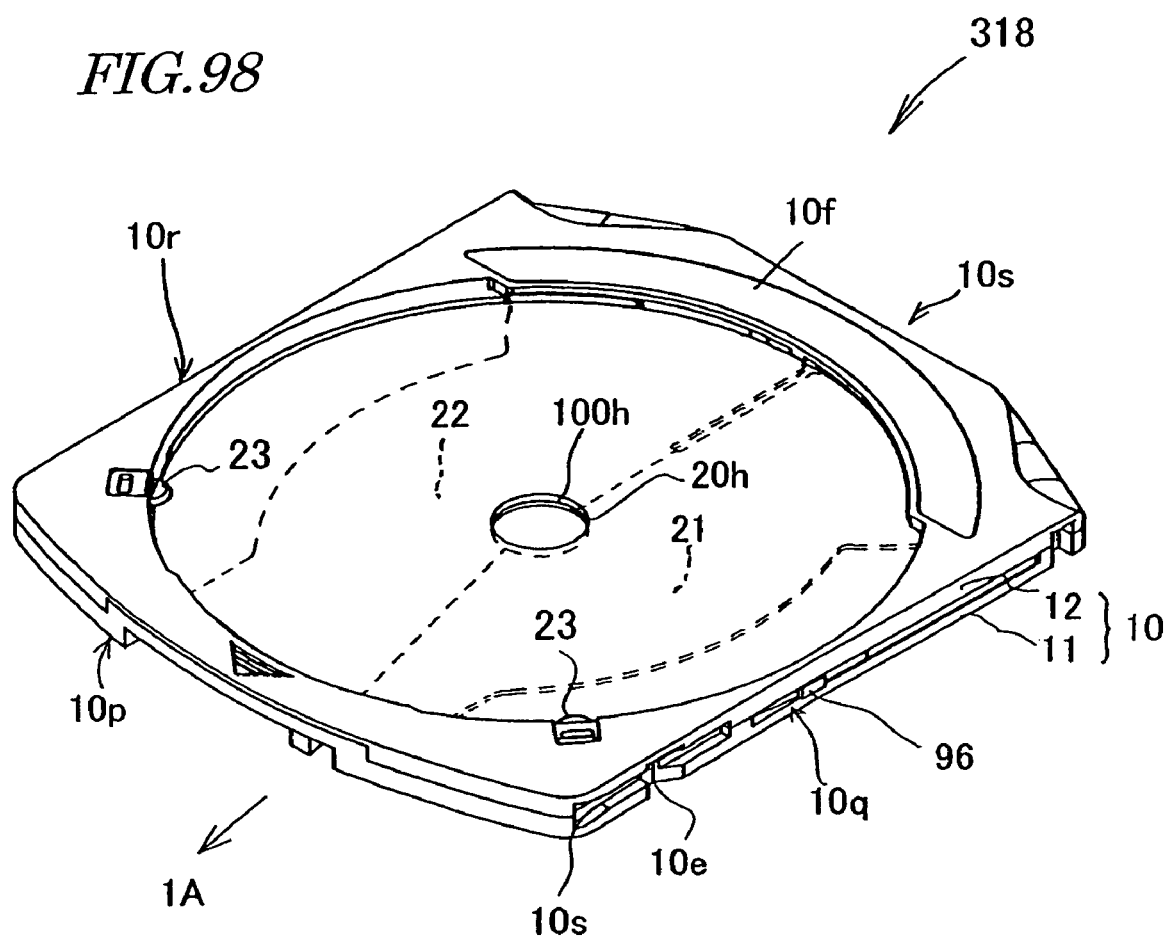
FIG. 98 is a perspective view illustrating an overall configuration for a disc cartridge according to an eighteenth specific preferred embodiment of the present invention.

As shown in FIG. 98, the disc cartridge 318 of this eighteenth preferred embodiment includes a second opener/closer 96 on its second side surface 10q instead of the second opener/closer 93 of the disc cartridge 316 of the sixteenth preferred embodiment described above.

Figure 99:
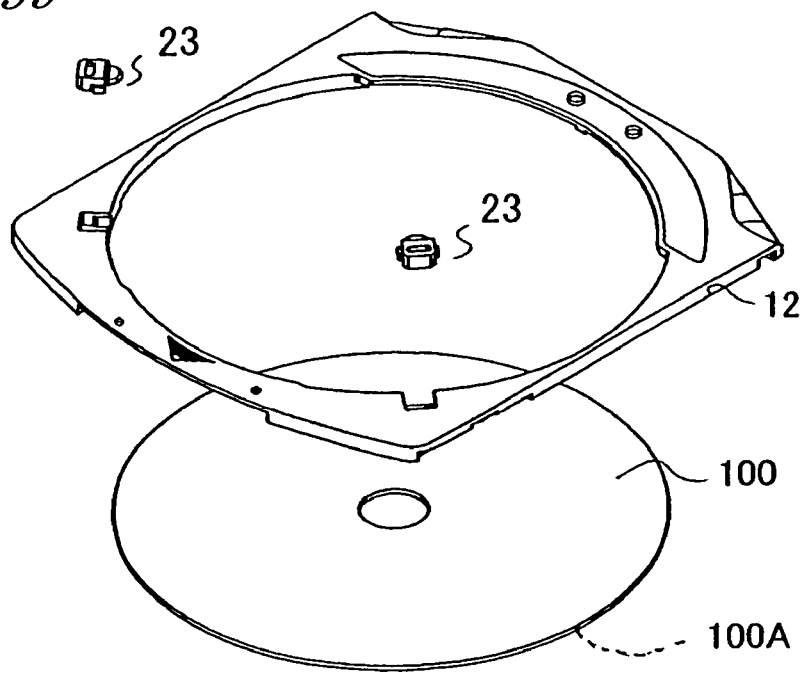
FIG. 99 is an exploded perspective view of the disc cartridge shown in FIG. 98.
Figure 99:
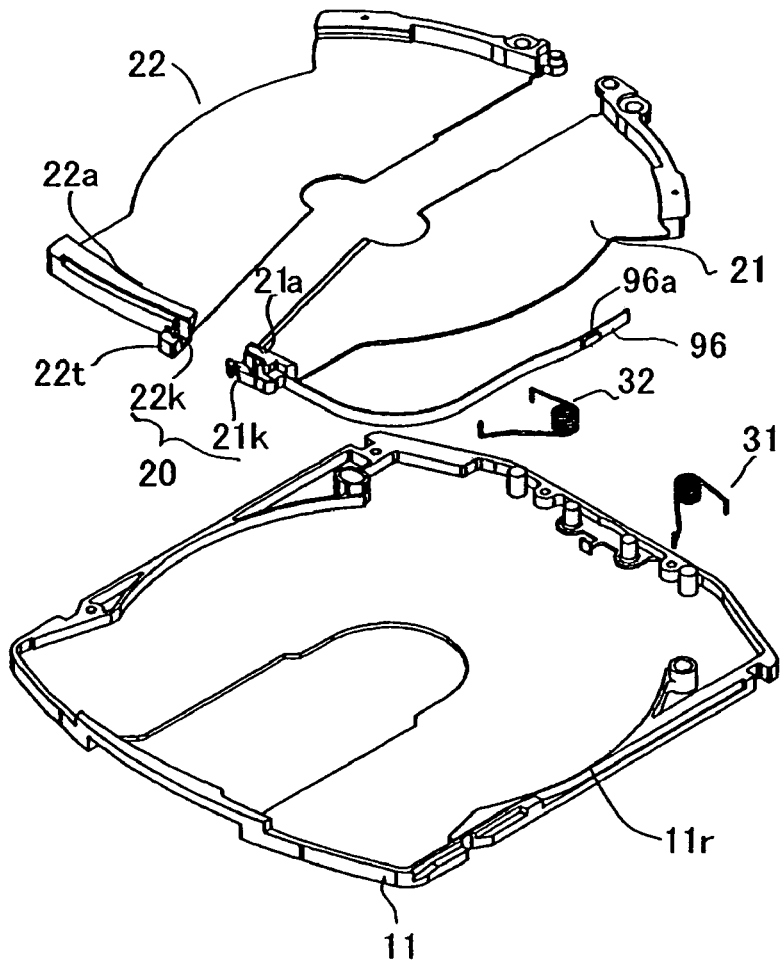

As can be seen from FIG. 99, the second opener/closer 96 is a belt member that is connected to the disc holder 21a of the shutter 21. This belt member 96 has a protrusion 96a at one end thereof. And the protrusion 96a can slide along the opening 11r of the lower shell 11. Alternatively, the second opener/closer 96 may form an integral part of the shutter 21.

Figure 100:
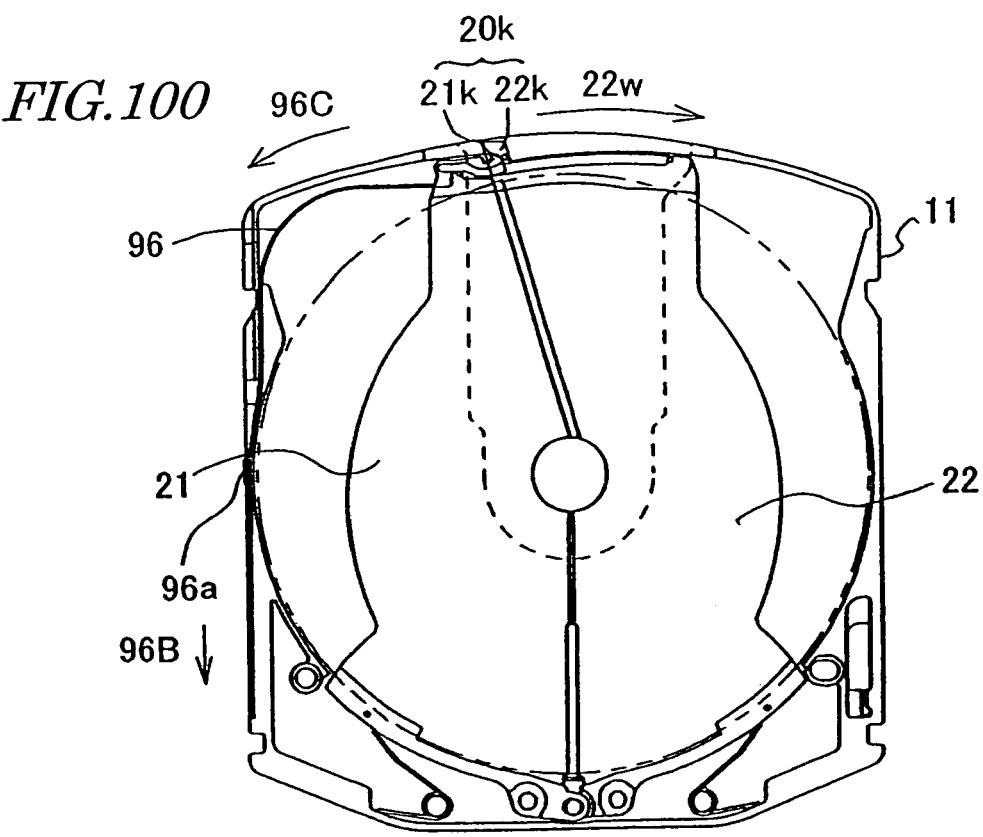
FIG. 100 is a schematic plan view illustrating a state of the disc cartridge shown in FIG. 98 in which its shutters are closed.
Figure 101:
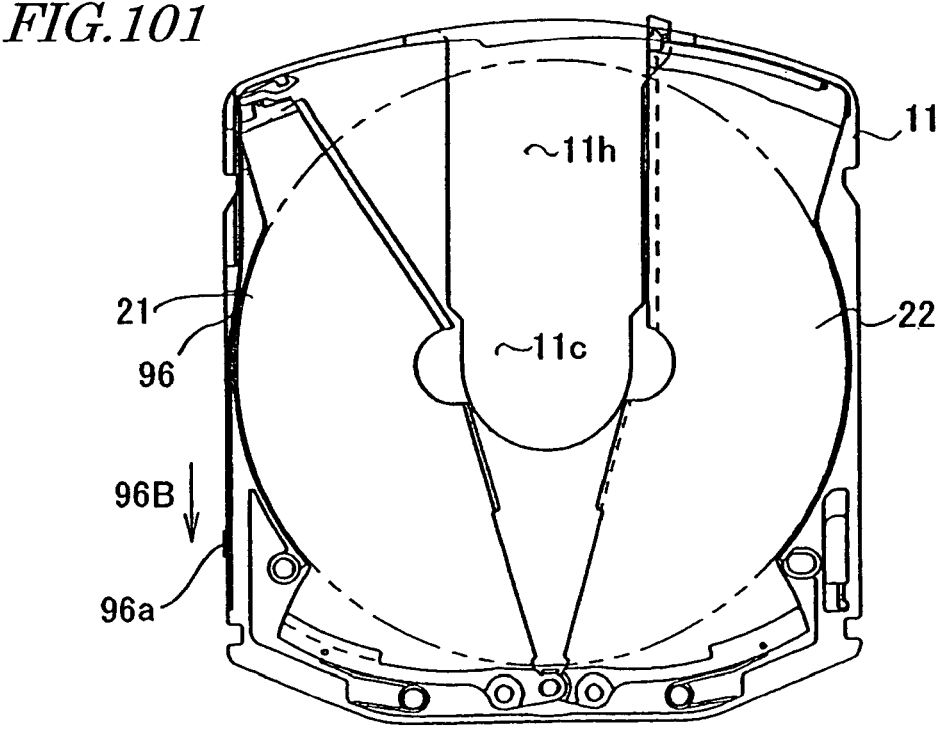
FIG. 101 is a schematic plan view illustrating a state of the disc cartridge shown in FIG. 98 in which its shutters are opened.

FIGS. 100 and 101 illustrate two states of the disc cartridge 318 in which the shutters 21 and 22 thereof are closed and opened, respectively. As already described for the sixteenth and seventeenth preferred embodiments, the shutters 21 and 22 can be opened or closed by sliding the first opener/closer 22t in the direction 22w or in the opposite direction.

The shutters 21 and 22 may also be opened by using the second opener/closer 96 in the following manner. First, the locking mechanism 20k is unlocked as shown in FIG. 100. Next, the protrusion 96a of the second opener/closer 96 is slid in the direction indicated by the arrow 96B. As a result of this operation, a force is applied to the shutter 21 in such a direction as to rotate the end of the shutter 21 on the hole 21u, i.e., to the direction indicated by the arrow 96C. Since the other shutter 22 is also moved synchronously with the shutter 21 by way of the interlocking mechanism 20c, these two shutters 21 and 22 expose the head and chucking openings 11h and 11c. To close the shutters 21 and 22, the protrusion 96a of the second opener/closer 96 may be slid in the opposite direction.

Just like the disc cartridge 316 of the sixteenth preferred embodiment described above, no matter whether the disc drive used is compatible with only a disc cartridge including a shutter opener/closer on a side surface that extends perpendicularly to the disc cartridge inserting direction or only a disc cartridge including a shutter opener/closer on a side surface that extends parallelly to the disc cartridge inserting direction, the disc drive can always read or write a signal from/on the disc stored in the disc cartridge 318 of this preferred embodiment.

If the second opener/closer 96 forms an integral part of the shutter 21, the number of members that make up the disc cartridge 318 can be reduced. As a result, the disc cartridge can be manufactured at a lower cost or the manufacturing process thereof can be simplified.

In the sixteenth through eighteenth preferred embodiments of the present invention described above, the second opener/closer is provided on the left-hand side with respect to the disc cartridge inserting direction. However, the location of the second opener/closer is not limited to the left-hand side. Alternatively, the second opener/closer may be provided on the right-hand side 10r of the disc cartridge 316 with respect to the disc cartridge inserting direction as shown in FIG. 88. As another alternative, the second opener/ closer may also be provided on the backside 10t of the disc cartridge 316 as shown in FIG. 88. In that case, the belt-shaped second opener/closer 96 of this eighteenth preferred embodiment is preferably used because the disc cartridge 318 can have the protrusion 96a of the second opener/closer 96 on its backside without changing its details so much.

EMBODIMENT 19

Figure 102:
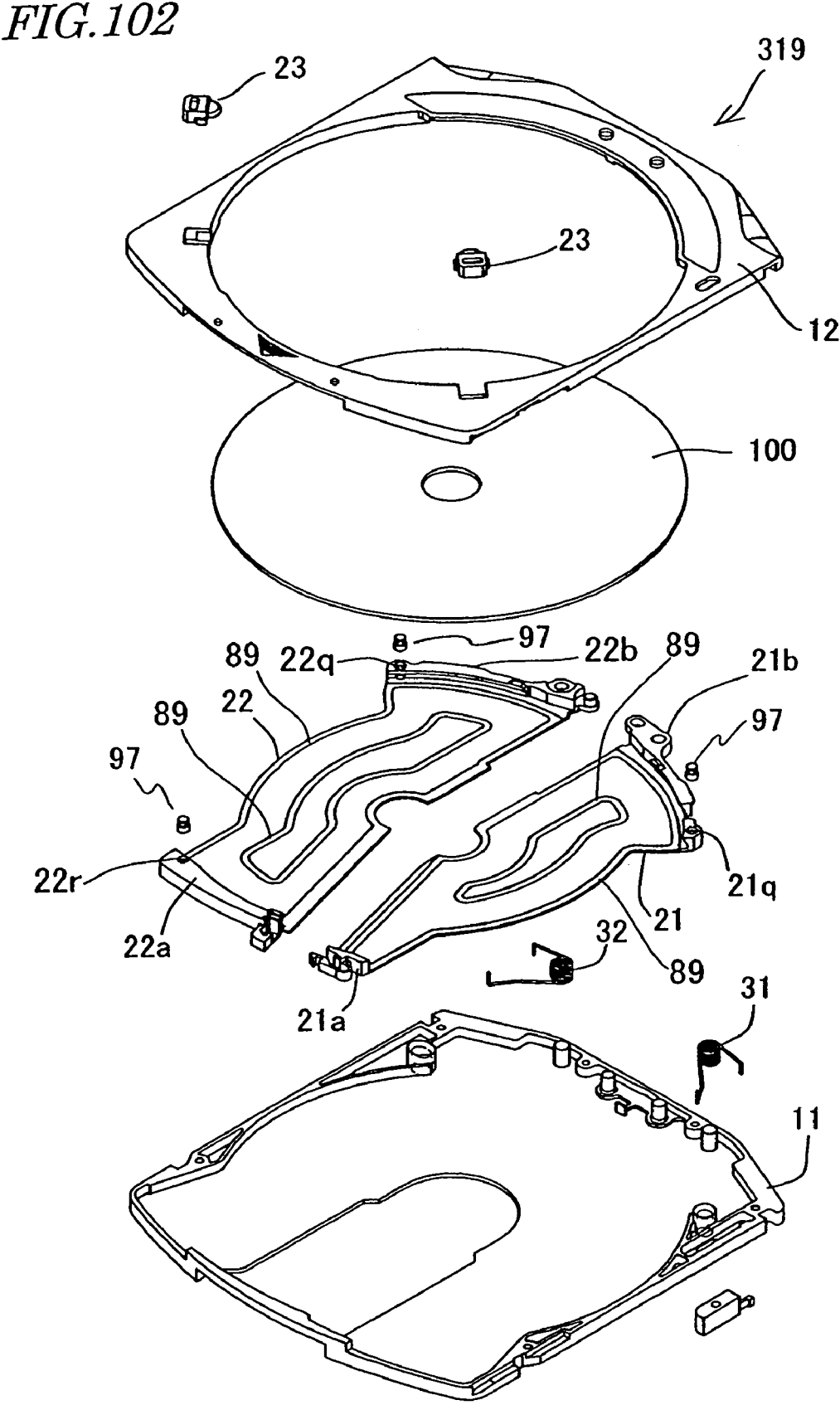
FIG. 102 is an exploded perspective view of a disc cartridge according to a nineteenth specific preferred embodiment of the present invention.
Figure 103:
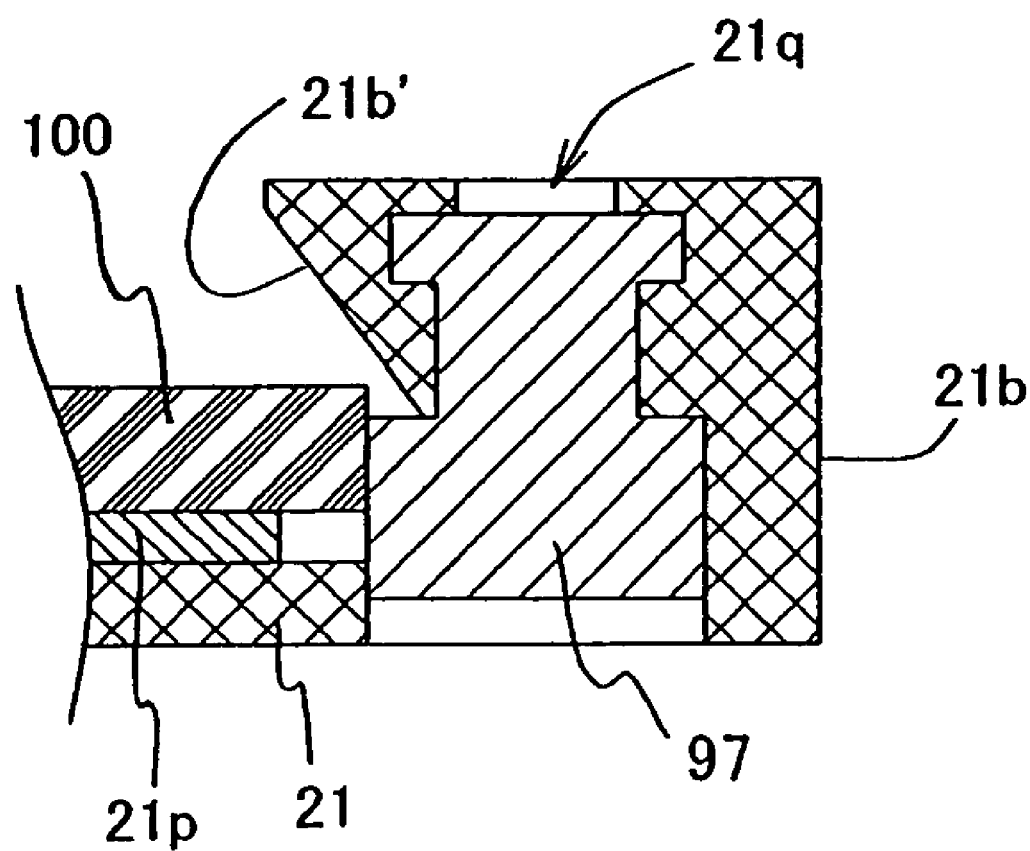
FIG. 103 is a cross-sectional view illustrating a disc holder and its surrounding members of the disc cartridge shown in FIG. 102 to a larger scale.

Hereinafter, a disc cartridge 319 according to a nineteenth specific preferred embodiment of the present invention will be described with reference to FIGS. 102 and 103. In FIGS. 102 through 103, each member of the disc cartridge 319 of the nineteenth preferred embodiment, having substantially the same function as the counterpart of the disc cartridge 313 of the thirteenth preferred embodiment described above, is identified by the same reference numeral.

The disc cartridge 319 of this preferred embodiment is characterized by providing rotation stoppers 97 for the disc holders 21b, 22a and 22b and concave portions 89 for the shutters 21 and 22, respectively. The concave portions 89 are used to ultrasonic weld a nonwoven fabric to the shutters 21 and 22.

More specifically, the disc holders 21b, 22a and 22b include holes 21q, 22r and 22q that engage with the rotation stoppers 97. As shown in FIG. 103, the rotation stoppers 97 partially protrude from the slopes 21b', 22a' and 22b' of the disc holders 21b, 22a and 22b and contact with the outer edge of the disc 100 while the disc 100 is held by the disc holders 21a, 21b, 22a and 22b. The rotation stoppers 97 are preferably made of an elastic material that has a large coefficient of friction, e.g., rubber.

It should be noted that at least one of the disc holders 21a, 21b, 22a and 22b should include the rotation stopper 97 to stop the unwanted rotation of the disc 100 sufficiently. However, to prevent the unintentional rotation of the disc 100 with more certainty, the three rotation stoppers 97 are preferably provided as shown in FIG. 102.

In this structure, while the disc 100 is held by the disc holders 21a, 21b, 22a and 22b, the rotation stoppers 97 that are in tight contact with the disc 100 do not allow the user to rotate the disc 100 so easily. Accordingly, in such a state, even if the user tries to rotate the disc 100 intentionally while pressing the disc 100 against the shutters 21 and 22, the disc 100 will not rotate so easily. Thus, even if relatively stiff dust has adhered to the nonwoven fabric that covers the shutters 21 and 22, the disc 100 will not get scratched by such dust because the user cannot rotate the disc 100 accidentally.

In addition, by providing the rotation stoppers 97, it is possible to prevent the disc 100 from moving inconstantly inside the disc storage portion.

As shown in FIG. 102, the shutters 21 and 22 include the concave portions 89 to which a nonwoven fabric is ultrasonic welded to partially cover the shutter surfaces that contact with the signal recording side 100A of the disc 100. In the preferred embodiment illustrated in FIG. 102, the concave portions 89 are formed so as to surround the outer periphery of those portions of the shutters 21 and 22 that contact with the signal recording side 100A. The concave portions 89 are also formed inside the outer periphery. However, the concave portions 89 may be formed in any regions other than those illustrated in FIG. 102 as long as the nonwoven fabric can be adhered to the shutters 21 and 22 just as intended. At these concave portions 89, the nonwoven fabric is ultrasonic welded to the shutters 21 and 22. When the nonwoven fabric is ultrasonic welded to the shutters 21 and 22, the nonwoven fabric might be partially cured or the resin material of the shutters 21 and 22 might partially protrude from the nonwoven fabric. Even so, those cured or protruding portions are received by the concave portions 89 and do not scratch the signal recording side 100A of the disc 100. When a nonwoven fabric is attached to the shutters 21 and 22, these concave portions 89 are preferably formed on the shutters 21 and 22 in any of the disc cartridges according to the first through eighteenth preferred embodiments of the present invention described above.

EMBODIMENT 20

Hereinafter, a disc cartridge 320 according to a twentieth specific preferred embodiment of the present invention will be described with reference to the accompanying drawings.

Figure 104:
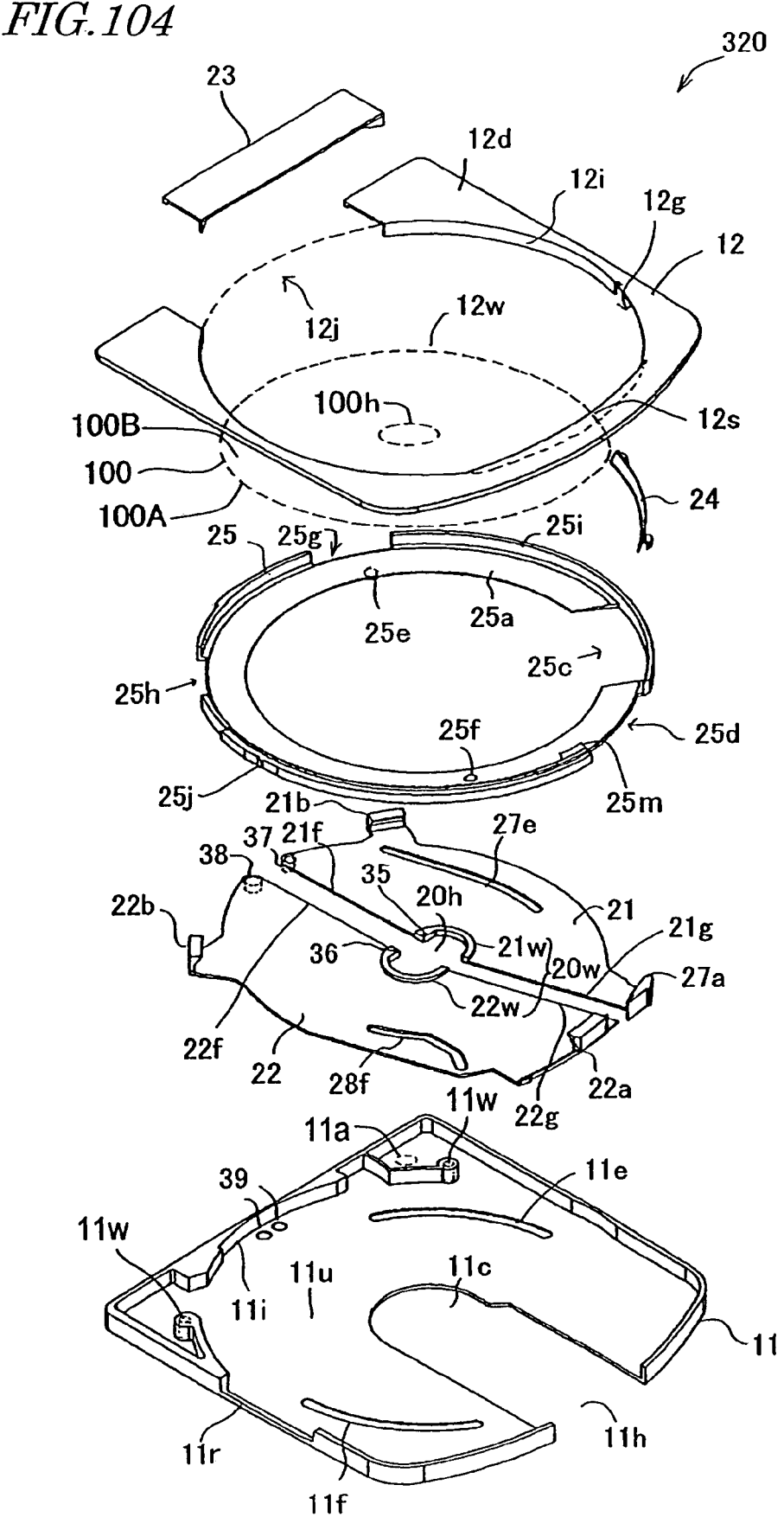
FIG. 104 is an exploded perspective view of a disc cartridge according to a twentieth specific preferred embodiment of the present invention.

First, the overall structure of the disc cartridge 320 will be outlined with reference to FIG. 104. The disc cartridge 320 includes lower shell 11, upper shell 12, first shutter 21, second shutter 22, disc stopper 23, shielding member 24 and rotational member 25. These members may be made of a synthetic resin, for example. However, there is no need to make all of these members of the same material. Instead, best materials may be selected for these members in view of the mechanical strengths or appearance required for them.

As shown in FIG. 104, the cartridge body 10 has an inner lower surface 11u. The inner lower surface 11u has a chucking opening 11c and a head opening 11h. The chucking opening 11c allows a chucking member (e.g., a spindle motor for rotating the disc 100) to enter the disc cartridge 320 externally. The head opening 11h allows a head, which reads and/or writes a signal (or information) from/on the signal recording side 100A of the disc 100, to enter the disc cartridge 320 and access a target location on the disc 100. The head opening 11h is continuous with the chucking opening 11c and reaches one side surface of the lower shell 11. Also, another opening 11r is provided on another side surface of the lower shell 11, which is adjacent to the side surface having the head opening 11h. The lower shell 11 further includes a pair of positioning holes 11w to engage with a pair of cartridge positioning pins of the disc drive and thereby position the disc cartridge 320 with respect to the disc drive.

As will be described in detail later, the inner lower surface 11u has two grooves 11e and 11f that receive the respective ends of convex portions 25e and 25f provided for the rotational member 25. These grooves 11e and 11f preferably do not reach the bottom of the inner lower surface 11u. The inner lower surface 11u further includes holes 39 that receive shafts 37 and 38 provided for the first and second shutters 21 and 22, respectively. These holes 39 preferably do not reach the bottom of the inner lower surface 11u, either. In the preferred embodiment illustrated in FIG. 104, the shafts 37 and 38 are formed on the first and second shutters 21 and 22 and the holes 39 are formed on the lower shell 11. Alternatively, holes may be formed on the first and second shutters 21 and 22 and shafts may be formed on the lower shell 11.

A type recognizing region 11a for use to recognize the type of the disc 100 in the disc cartridge 320 is provided near one of the positioning holes 11w of the lower shell 11. The types of the disc 100 are made correspond to the states of the type recognizing region 11a. That is to say, if one type of disc 100 is stored in the disc cartridge 320, the type recognizing region 11a of the disc cartridge 320 may have a concave portion. However, if another type of disc 100 is stored in the disc cartridge 320, the type recognizing region 11a may have no concave portion. The concave portion may define either an opening or a recess. Alternatively, the type recognizing region 11a of the lower shell 11 may define an opening, but at least a portion of the opening is preferably covered with a cap member such that no concave portion is normally present there. In that structure, the concave portion may be present by removing the cap member.

The disc drive, to which the disc cartridge 320 is loaded, determines whether or not the concave portion is present in the type recognizing region 11a. Based on the result, the disc drive selects a specific mode of control to perform. Accordingly, the difference in type between the discs 100 stored is preferably a difference in structure between the discs 100, which would require the disc drive to perform mutually different types of controls on them. For example, the type recognizing region 11a may be used to determine whether the disc 100 stored has a single recording side or double recording sides (i.e., whether the disc 100 has a single recording layer structure or a double recording layer structure). More specifically, if the disc 100 has a double recording layer structure, then the type recognizing region 11a may define a concave portion. On the other hand, if the disc 100 has a single recording layer structure, then the type recognizing region 11a may define no concave portion. Alternatively, the type recognizing region 11a may define a concave portion when the disc 100 stored has a single recording layer structure and may define no concave portion when the disc 100 stored has a double recording layer structure.

To be compatible with both a single-sided disc and a double-sided disc, the disc drive to be loaded with the disc cartridge 320 should switch the output powers of its recording laser beam depending on the specific recording layer structure of the disc that has been inserted thereto. The reason is as follows. Specifically, if the disc drive attempts to write information on a single-sided disc with the output power of its recording laser beam misadjusted to a double-sided disc, then the recording area of the single-sided disc will be exposed to excessively high-power laser beam and the data stored there may be destroyed.

For that reason, when a disc cartridge including a disc is loaded into such a disc drive, the read/write head of the disc drive normally emits a laser beam toward the disc in the disc cartridge and detects the light that has been reflected from the disc, thereby determining whether the disc in the disc cartridge is single-sided or double-sided. This operation of the disc drive is a sort of learning.

However, if the disc drive has failed to recognize the type of the inserted disc correctly for some reason, then the information stored on the disc might be destroyed by mistake.

Accordingly, if the presence and absence of that concave portion in/from the type recognizing region 11a of the disc cartridge 320 respectively represent the two possible types of the disc 100 in the disc cartridge 320, then the disc drive can correctly recognize the specific type of the disc 100 inserted thereto by checking out the type recognizing region 11a. Thus, the information stored on the disc is not destroyed by mistake.

Also, the "learning" operation described above normally takes several seconds to about ten seconds, and may take an even longer time if the disc drive irradiates and detects the laser beam repeatedly to recognize the disc type more accurately. However, if the disc cartridge 320 includes the type recognizing region 11a that may or may not have the concave portion depending on the specific structure of the disc 100 stored therein so as to allow the disc drive to recognize the type of the disc 100 easily by checking out the type recognizing region 11a, then the learning operation may be omitted or shortened significantly at least. Thus, the disc drive can get ready to read and/or write information from/onto the disc 100 in just a short time after the disc cartridge 320 including the disc 100 has been loaded into the disc drive.

Although the disc cartridge 320 shown in FIG. 104 has a structure that allows the user to remove the disc 100 from the disc cartridge 320, the disc cartridge 320 including the type recognizing region 11a preferably has a structure that prohibits the user from removing the disc 100 from the disc cartridge 320. This is because if the user can remove the disc 100 from the disc cartridge 320 easily, then the user may store another type of disc 100 in the disc cartridge 320 to nullify the presence or absence of the concave portion in/from the type recognizing region 11a. Alternatively, the disc cartridge 320 may also have a structure that allows the user to remove the disc 100 therefrom. In that case, however, some means should be provided to indicate the user's removal of the disc 100 from the disc cartridge 320. If that means indicates that the disc 100 has been removed from the disc cartridge 320, then the information represented by the type recognizing region 11a may be incorrect. Thus, that information should not be relied on in that case.

Next, the specific structure of the upper shell 12 will be described. The upper shell 12 includes a circular disc window 12w, which expands over the entire projection area of the disc 100. The disc window 12w is defined by a cylindrical inner side surface 12i of the cartridge body 10. The disc 100 can be inserted into the disc cartridge 320 through this disc window 12w. The inner side surface 12i has a notch 12g.

The upper surface 12d of the upper shell 12 also has a notch 12j, which engages with the disc stopper 23. Although not shown, the disc stopper 23 and the upper surface 12d of the upper shell 12 are provided with concavo/convex portions, which engage with each other so that the disc stopper 23 does not disengage itself from the upper shell 12 easily. When the disc stopper 23 is fitted with the upper shell 12, a portion of the disc stopper 23 protrudes into the disc window 12w. In this preferred embodiment, to reduce the overall thickness of the cartridge body as much as possible, the notch 12j is formed by removing a portion of the upper shell 12 completely. However, if the disc cartridge may have a thickness somewhat greater than that of the illustrated one, a concave portion may also be formed instead of the notch 12j by removing a portion of the upper shell 12 incompletely, and a disc stopper engaging with such a concave portion may be prepared. For example, the notch and the disc stopper 23 of the disc cartridge 308 of the eighth preferred embodiment described above may be provided for the disc cartridge 320 of this twentieth preferred embodiment.

Another disc stopper 12s is provided as an integral part of the upper surface 12d of the upper shell 12 so as to protrude into the disc window 12w. The disc stoppers 12s and 23 are arranged symmetrically to each other with respect to the center of the circular opening that is defined by the disc window 12w. The disc stoppers 12s and 23 are used to prevent the disc 100 from dropping down through the disc window 12w. These disc stoppers 12s and 23 are particularly effective when this disc cartridge 320 is loaded into a vertically mounted disc drive. To remove the disc 100 from this disc cartridge 320, the disc stopper 23 needs to be disengaged and removed from the upper shell 12, and the disc 100 needs to be picked up from around the notch 12j, for example. Optionally, three or more disc stoppers may be provided and/or each of the disc stoppers may be formed in any other shape or disposed at any position other than that illustrated in FIG. 104.

Figure 119:
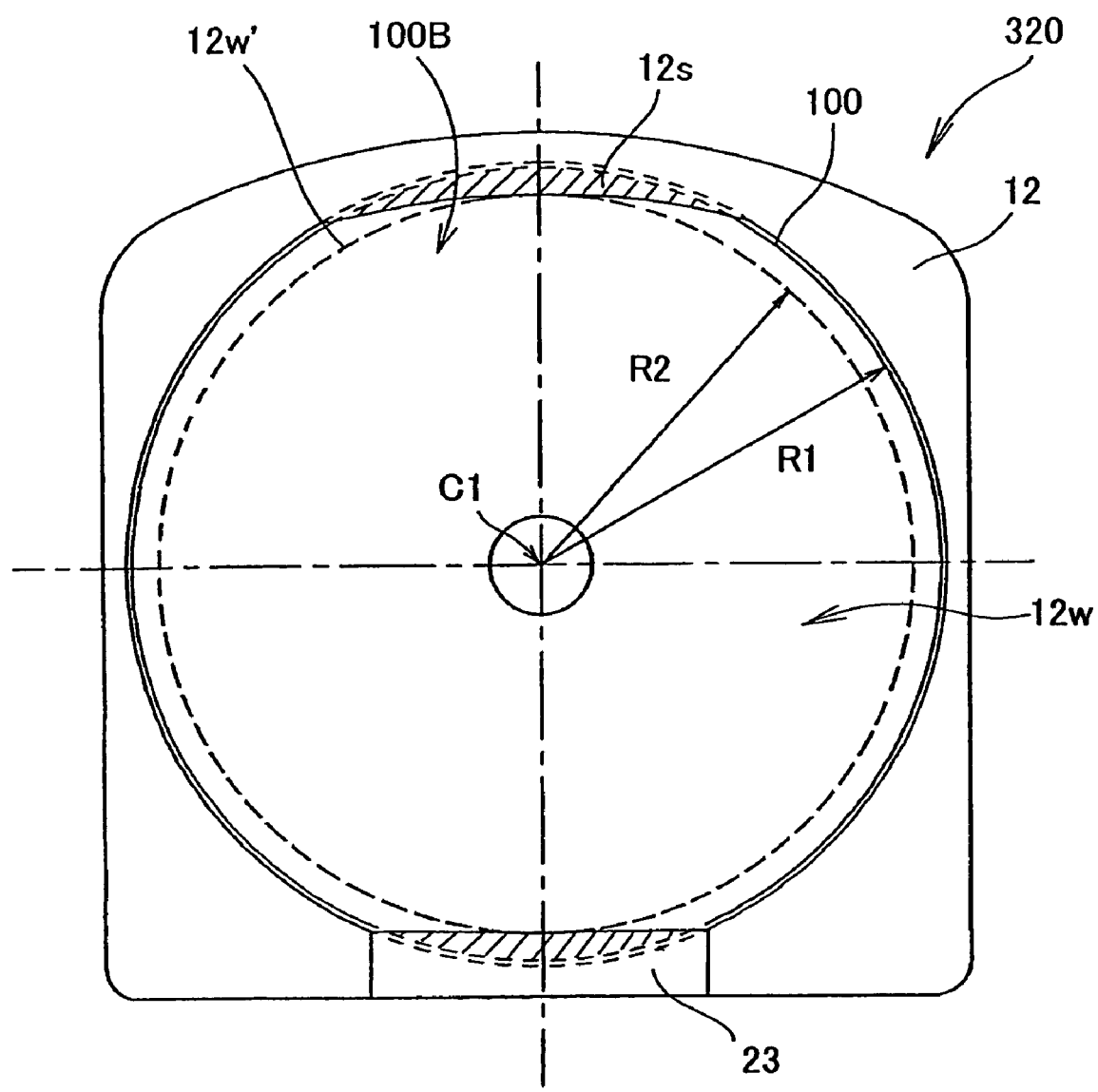
FIG. 119 is a plan view of the disc cartridge shown in FIG. 104.

FIG. 119 is a plan view of the disc cartridge 320. As is clear from FIG. 119, the closer to the center C1 of the disc window 12w the disc stoppers 12s and 23 reach, the less likely the disc 100 drops through the disc window 12w. However, as the disc stoppers 12s and 23 reach closer toward the center C1, the area of overlap between each disc stopper 12s or 23 and the disc 100 increases as indicated by the hatching in FIG. 119.

The greater the overlap area, the more easily an unexpected object is caught in the gap between the protruding disc stopper 12s or 23 and the disc 100. Some unexpected object that has entered the gap between the disc stopper 12s or 23 and the disc 100 might be undetectable because the unexpected object might hide itself behind the disc stopper 12s or 23. The probability of intrusion of big unexpected objects and the inability to detect those unexpected objects both increase with the expansion of the area of overlap between the disc stopper 12s or 23 and the disc 100.

If the disc cartridge 320 with such an unexpected object caught in the gap between the disc stopper 12s or 23 and the disc 100 is inserted into the disc drive, then the disc 100 could not be rotated normally by the disc drive or might get scratched or partially damaged. The disc drive might also cause a failure if such an unexpected object dropped inside the disc drive.

Furthermore, if the disc stoppers 12s and 23 protrude excessively inward, then the disc 100 to be picked up from the disc cartridge 320 by removing the disc stopper 23 from the upper shell 12 might come into contact with the inner edge of the disc stopper 12s and could not be removed easily.

To overcome these problems, the radius R1 of the disc 100 and the radius R2 of a smallest circular opening 12w', of which the center matches with the center C1 of the disc window 12w and which is in contact with at least one of the disc stoppers 12s and 23, preferably satisfy the inequality of $14/15 \leq R2/R1$. Also, to prevent the disc 100 from dropping through the disc window 12w, the radii R1 and R2 preferably satisfy $R2/R1 < 1$, too. When the radii R1 and R2 satisfy these inequalities, the disc 100 will not drop through the disc window 12w and yet the area of overlap between the disc stopper 12s or 23 and the disc 100 can be too narrow to admit those unexpected objects. Thus, even if any unexpected object happens to be caught in the gap between the disc stopper 12s or 23 and the disc 100, that objects should be easily detectable. Also, the disc 100 to be picked up can be removed from the disc cartridge 320 just as intended. Furthermore, even if an increased number of disc stoppers are provided for the disc cartridge 320 or if any of the disc stoppers extends a longer distance around the disc window 12w, the first side (i.e., the label side) 100B of the disc 100 can still be exposed almost entirely inside the circular opening 12w'. Thus, the disc cartridge 320 looks great or beautiful by making use of the design on the label side of the disc 100.

For example, if the disc 100 has a radius R1 of about 60 mm (i.e., a diameter of about 120 mm), then the radius R2 of the circular opening 12w' is preferably about 56 mm. In that case, the overlap area between the disc stopper 12s or 23 and the disc 100 has a width of about 4 mm in the disc radial direction. Accordingly, even if a clip, for example, has been caught as an unexpected object in the gap between the disc stopper 12s or 23 and the disc 100, the clip cannot hide itself behind the overlap area entirely but should protrude toward the circular opening 12w' partially. Thus, the user can easily sense the existence of the clip in the gap between the disc stopper 12s or 23 and the disc 100. As a result, no damage will be done on the disc 100 or the disc drive.

As already described above, each of the disc stoppers 12s and 23 may have any other shape and be provided at any other position. Thus, a disc stopper having a different shape may be provided at a non-illustrated position. In any case, however, the alternative disc stopper also needs to protrude into the disc window 12w and define the circular opening 12w' inside it.

It should be noted that if there is no need to remove the disc 100 from the disc cartridge 320, then the disc stopper may be a ring that surrounds the disc window 12w fully with the circular opening 12w' defined inside it.

The upper and lower shells 12 and 11 are adhered, welded or joined (e.g., screwed up) together around their outer periphery, thereby forming a cartridge body 10. Also, the inner lower surface 11u and the inner side surface 12i of the cartridge body 10 together make up a disc storage portion for storing the disc 100 therein.

In the disc storage portion, the space defined by the inner side surface 12i is wide enough to allow the disc 100 to rotate freely therein without contacting with the inner side surface 12i. The top of the disc storage portion is opened as the disc window 12w, and the first side 100B of the disc 100 stored in the disc storage portion is exposed entirely inside the disc window 12w. On the other hand, the second side, i.e., the signal recording side 100A, of the disc 100 faces the inner lower surface 11u.

By adopting such a structure, the cartridge 320 can be thinner than the conventional cartridge in which both sides of the disc are covered. In addition, the label side of the disc 100 can be displayed inside the disc window 12w and the user can check the contents of the disc 100 that were printed on the label side (i.e., the first side) 100B. Moreover, by displaying the design of the label side, the disc cartridge including the disc can also have a good design.

The first and second shutters 21 and 22 are provided on the inner lower surface 11u of the cartridge body 10. When the disc 100 is stored inside the disc cartridge 320, the first and second shutters 21 and 22 are located between the signal recording side (i.e., the second side) 100A of the disc 100 and the inner lower surface 11u. The first and second shutters 21 and 22 have the shafts 37 and 38, respectively, which are inserted into the holes 39 of the lower shell 11. Thus, the first and second shutters 21 and 22 rotate on the shafts 37 and 38, thereby covering or exposing the head and chucking openings 11h and 11c. When the first and second shutters 21 and 22 are opened, the second side 100A of the disc 100 is partially exposed inside the head opening 11h.

The first and second shutters 21 and 22 are provided with notches so as to define a hole 20h in a region that overlaps with the center hole 100h of the disc 100 stored in the disc storage portion when the first and second shutters 21 and 22 are closed. The notches of the first and second shutters 21 and 22 are surrounded with convex portions 21w and 22w, respectively. When the first and second shutters 21 and 22 are closed, these convex portions 21w and 22w are in close contact with each other, thereby forming a ring 20w that is adjacent to the inner circumference of the center hole 100h of the disc 100. As already described in detail for the twelfth preferred embodiment, the ring 20w prevents the dust from reaching the signal recording side 100A of the disc 100 by way of the center hole 100h. Furthermore, the convex portions 21w and 22w have protrusions 35 and 36, respectively. That is to say, the top of the protrusions 35 and 36 is higher than that of the convex portions 21w and 22w.

Furthermore, to hold the disc 100 in the disc storage portion while the first and second shutters 21 and 22 are closed, the first shutter 21 includes a disc holder 21*b* and the second shutter 22 includes disc holders 22*a* and 22*b*. These disc holders 21*b*, 22*a* and 22*b* work just like the disc holders as described for the eighth through nineteenth preferred embodiments described above. In the eighth through nineteenth preferred embodiments, the first shutter 21 further includes the disc holder 21*a*. In this twentieth preferred embodiment, however, the first shutter 21 includes a convex portion 27*a* instead of the disc holder 21*a*. The convex portion 27*a* is provided to prevent the side surface of the disc 100 from being exposed through the head opening 11*h*, which reaches one side surface of the lower shell 11, while the first and second shutters 21 and 22 are closed.

When closed, the first and second shutters 21 and 22 are not entirely in contact with each other along a line but have a plurality of contact portions that are not aligned with the line. More specifically, the shutters 21 and 22 have a first pair of contact portions 21*f* and 22*f* and a second pair of contact portions 21*g* and 22*g*. In this preferred embodiment, the contact portions 21*f* and 22*f* contact with each other approximately along the centerline of the disc cartridge 320. On the other hand, the contact portions 21*g* and 22*g* contact with each other along a line that defines a predetermined angle (e.g., approximately 15 degrees to approximately 18 degrees) with the centerline of the disc cartridge 320. The effects achieved by such a structure are already described in detail for the thirteenth preferred embodiment. As also described for the thirteenth preferred embodiment, the contact portions 21*g* and 22*g* partially overlap with each other in the thickness direction of the disc 100.

As will be described in detail later, the first and second shutters 21 and 22 include guide grooves 27*e* and 28*f* that respectively engage with the convex portions 25*e* and 25*f* of the rotational member 25. The guide grooves 27*e* and 28*f* extend vertically through the first and second shutters 21 and 22, respectively, so that the convex portions 25*e* and 25*f* of the rotational member 25 can reach the grooves 11*e* and 11*f*, respectively.

The rotational member 25 includes a sidewall 25*i* and a disc supporting portion 25*a* that is connected to the bottom of the sidewall 25*i*. The sidewall 25*i* has a cylindrical shape and has such a size as to surround the side surface of the disc 100 stored in the disc storage portion. The sidewall 25*i* is discontinued by three notches 25*d*, 25*g* and 25*h*. The disc supporting portion 25*a* has a flat ring shape including a notch 25*c*. As the first and second shutters 21 and 22 are opened, the rotational member 25 is rotated, thereby overlapping the notch 25*c* with the head opening 11*h*. A protrusion 25*m* for moving the shielding member 24 is provided near the notch 25*d*.

As described above, the convex portions 25*e* and 25*f*, which protrude toward the lower shell 11, are provided on the lower surface of the disc supporting portion 25*a*. Furthermore, an opener/closer 25*j*, which engages with the shutter opening/closing mechanism of a disc drive, is provided on the outer side surface of the sidewall 25*i*. Alternatively, where the shutter opening/closing mechanism of the disc drive has a gear shape, a gear may be provided on the outer side surface of the sidewall 25*i* instead of the opener/closer 25*j*.

The shielding member 24 is disposed inside the notch 12*g* of the inner side surface 12*i* of the cartridge body 10. The structure and operation of the shielding member 24 will be described in detail later.

The respective members of the disc cartridge 320 are assembled in such a manner as satisfy the vertical positional relationship shown in FIG. 104. As a result, the lower and upper shells 11 and 12 are joined together so that the first and second shutters 21 and 22 are disposed on the lower shell 11 and that the rotational member 25 is located over the shutters 21 and 22.

Figure 105:
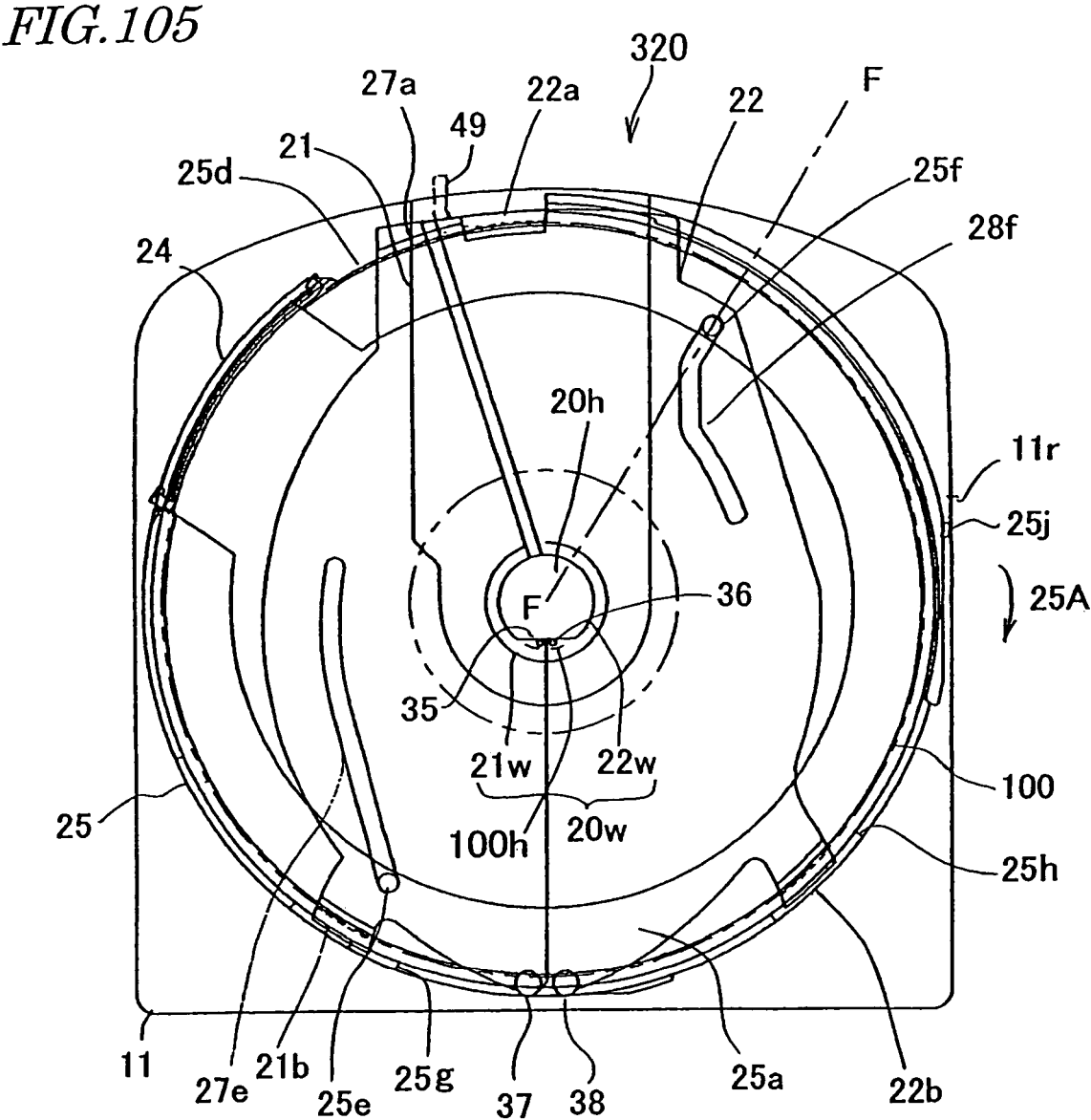
FIG. 105 is a plan view illustrating the disc cartridge shown in FIG. 104 with its upper shell removed.
Figure 106:
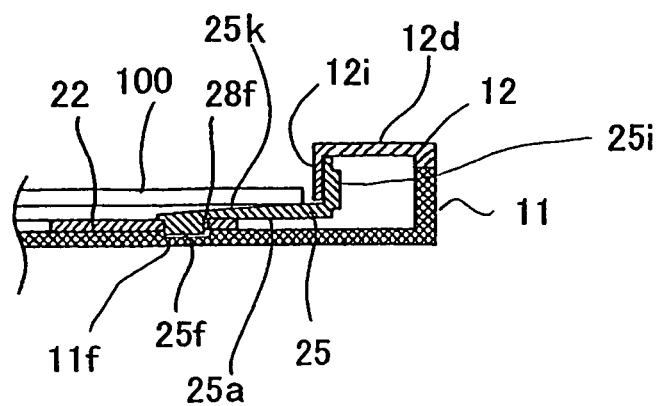
FIG. 106 is a cross-sectional view of the disc cartridge shown in FIG. 104 taken along the line F-F shown in FIG. 105.

FIG. 105 is a plan view illustrating the disc cartridge 320 with the upper shell 12 thereof removed. FIG. 106 is a cross-sectional view of the disc cartridge 320 taken along the line F-F shown in FIG. 105. The first and second shutters 21 and 22 are now closed.

As shown in FIG. 105, the disc holder 22*a* of the second shutter 22 holds the disc 100 thereon inside the notch 25*d* of the rotational member 25. The disc 100 is also held by the disc holders 21*b* and 22*b* of the first and second shutters 21 and 22 inside the notches 25*g* and 25*h* of the rotational member 25, respectively.

The opener/closer 25*j* of the rotational member 25 is located inside the opening 11*r* of the lower shell 11. The protrusions 35 and 36 of the first and second shutters 21 and 22 protrude into the center hole 10*h* of the disc 100. The center of rotation of the rotational member 25 substantially matches with the center of the disc 100. That is to say, the rotational member 25 is disposed inside the disc storage portion so as to rotate substantially around the center of the disc 100.

The shafts 37 and 38 of the first and second shutters 21 and 22 are located under the disc supporting portion 25*a* of the rotational member 25. As shown in FIG. 106, there is almost no gap between the top of the sidewall 25*i* of the rotational member 25 and the bottom of the upper surface 12*d* of the upper shell 12, thus regulating the vertical movement of the rotational member 25. Accordingly, the rotational member 25 can effectively prevent the shafts 37 and 38 of the first and second shutters 21 and 22 from being raised and disengaged from the holes 39 of the lower shell 11 when the first and second shutters 21 and 22 rotate.

As shown in FIG. 106, the disc supporting portion 25*a* of the rotational member 25 has a sloped upper surface 25*k*, and therefore, the disc 100 is in contact with only a portion of the upper surface 25*k* of the disc supporting portion 25*a* near the sidewall 25*i*. In such a structure, even if the ring-shaped disc supporting portion 25*a* has its width increased to increase the mechanical strength of the rotational member 25, the upper surface 25*k* is in contact with only a portion of the signal recording side 100A of the disc 100 around its outer periphery. Thus, the signal recording area is hardly in contact with the disc supporting portion 25*a*. It should be noted that the top of that portion of the disc supporting portion 25*a* that is in contact with the disc 100 is located at the same vertical level as the top of the convex portions 21*w* and 22*w* of the first and second shutters 21 and 22.

Figure 107:
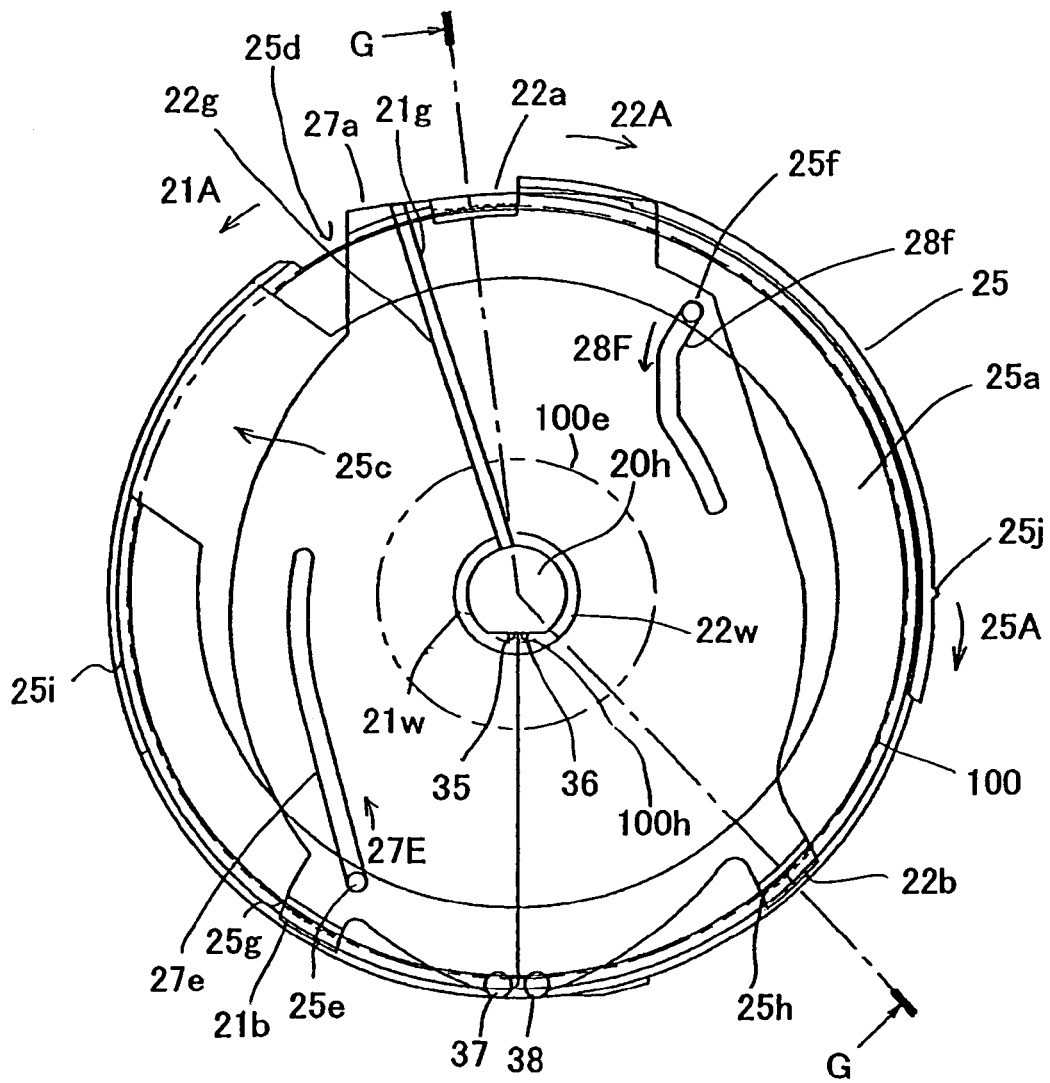
FIG. 107 is a plan view illustrating the shutters and rotational member of the disc cartridge shown in FIG. 104 in a state where the shutters are closed.
Figure 108:
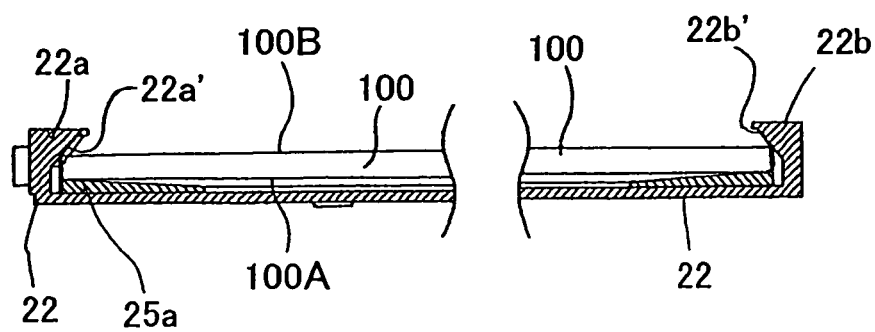
FIG. 108 is a cross-sectional view of the disc cartridge shown in FIG. 104 taken along the line G-G shown in FIG. 107.
Figure 109:
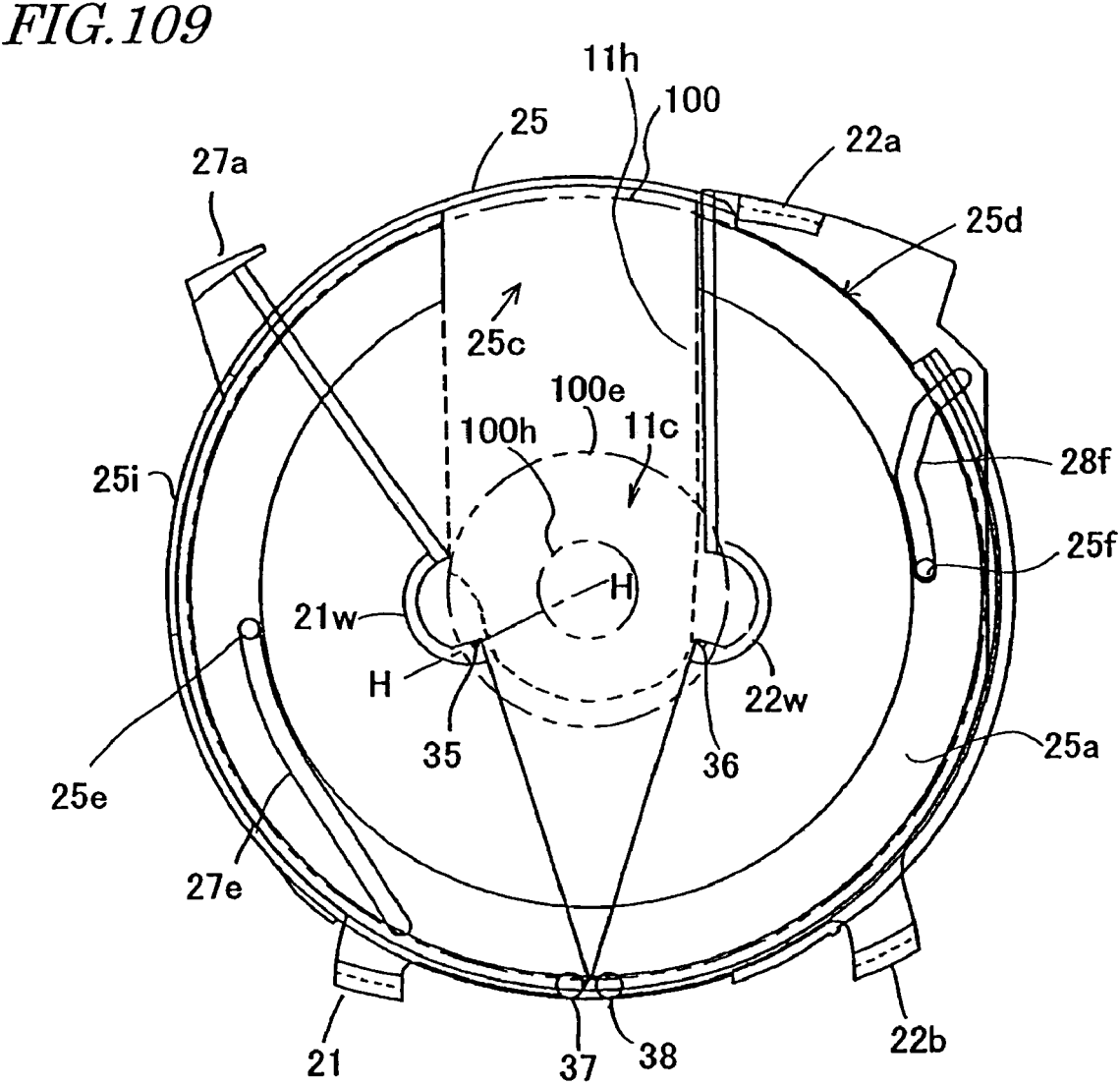
FIG. 109 is a plan view illustrating the shutters and rotational member of the disc cartridge shown in FIG. 104 in a state where the shutters are opened.
Figure 110:
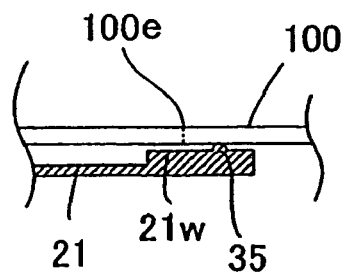
FIG. 110 is a cross-sectional view of the disc cartridge shown in FIG. 104 taken along the line H-H shown in FIG. 109.

Next, it will be described how the first and second shutters 21 and 22 that is going to be closed or opened mount or dismount the disc 100 thereon/therefrom. FIG. 107 is a plan view illustrating the respective positions of the first and second shutters 21 and 22 and the rotational member 25 in a state where the first and second shutters 21 and 22 are closed. FIG. 108 is a cross-sectional view of the disc cartridge 320 taken along the line G-G shown in FIG. 107. FIG. 109 is a plan view illustrating the respective positions of the first and second shutters 21 and 22 and the rotational member 25 in a state where the first and second shutters 21 and 22 are opened. FIG. 110 is a cross-sectional view of the disc cartridge 320 taken along the line H-H shown in FIG. 109. In FIGS. 107 and 109, the disc 100 is indicated by the two-dot chain.

As shown in FIG. 107, while the first and second shutters 21 and 22 are closed, the disc holders 21b, 22a and 22b protrude through the notches 25g, 25d and 25h of the sidewall 25i of the rotational member 25 toward the center of the disc 100, thereby holding the disc 100 thereon. As shown in FIG. 108, the disc holders 22a and 22b have downwardly tapered slopes 22a' and 22b' that are in contact with the outer edge of the first side 100B of the disc 100. Thus, the disc holders 22a and 22b press the disc 100 not only toward the center thereof but also toward the first and second shutters 21 and 22. Although not shown, the other disc holder 21b is also in the same state. As a result, a portion of the signal recording side 100A of the disc 100 around the outer periphery thereof contacts with the disc supporting portion 25a. Also, as already described for the twelfth preferred embodiment, the convex portions 21w and 22w of the first and second shutters 21 and 22 contact with a portion of the signal recording side 100A of the disc 100 near the center hole 100h thereof (not shown). In this manner, the signal recording area on the signal recording side 100A of the disc 100 is shut off from the open air by the disc supporting portion 25a of the rotational member 25 and by the convex portions 21w and 22w of the first and second shutters 21 and 22. Consequently, no dust or fine particles will be deposited on, or no scratches will be created on, the signal recording area.

The hole 20h defined by the first and second shutters 21 and 22 has a diameter approximately equal to that of the center hole 100h of the disc 100. Accordingly, even if this disc cartridge 320 is left upside down with the first and second shutters 21 and 22 thereof closed, no part of the signal recording side 100A of the disc 100 will be exposed inside the hole 20h of the first and second shutters 21 and 22. For that reason, no dust or fine particles will be deposited on the signal recording side 100A of the disc 100.

To open the first and second shutters 21 and 22, the opener/closer 25j is engaged with the shutter opening/closing mechanism of the disc drive, and is turned to the direction indicated by the arrow 25A. Then, the rotational member 25 starts to rotate inside the disc storage portion and the protrusions 25e and 25f also start to rotate around the center of the disc 100. The protrusions 25e and 25f are engaged with the guide grooves 27e and 28f, respectively. Accordingly, the protrusions 25e and 25f rotating go inside the guide grooves 27e and 28f in the directions indicated by the arrows. 27E and 28F, respectively, while pressing the sidewalls of the guide grooves 27e and 28f. As the sidewalls of the guide grooves 27e and 28f are pressed by the protrusions 25e and 25f, the first and second shutters 21 and 22 rotate on the shafts 37 and 38 to the directions indicated by the arrows 21A and 22A, respectively.

The disc holder 21b also starts to rotate on the shaft 37 to the direction indicated by the arrow 21A, while the disc holders 22a and 22b start to rotate on the shaft 38 to the direction indicated by the arrow 22A. Thus, the disc holders 21b, 22a and 22b go away from the disc 100 and release the disc 100.

As the first and second shutters 21 and 22 are opened, the protrusions 35 and 36 on the first and second shutters 21 and 22 also rotate to the directions 21A and 22A, respectively. In the meantime, the disc 100 does not move. Accordingly, the protrusions 35 and 36 contact with the non-signal recording area 100e on the signal recording side 100A of the disc 100. The protrusions 35 and 36 are located at a vertical level higher than that of the convex portions 21w and 22w. Thus, while the protrusions 35 and 36 are in contact with the signal recording side 100A, the convex portions 21w and 22w are out of contact with the signal recording side 100A. Consequently, it is possible to prevent the convex portions 21w and 22w from scratching the signal recording side 100A, or the signal recording area thereof, in particular.

As the rotational member 25 is rotated to a certain degree, the protrusions 25e and 25f will soon reach the ends of their guide grooves 27e and 28f, respectively, as shown in FIG. 109. Then, the first and second shutters 21 and 22 will be fully opened to expose the head and chucking openings 11h and 11c entirely.

At that time, the notch 25c of the disc supporting portion 25a of the rotational member 25 is aligned with the head opening 11h, and no part of the disc supporting portion 25a is exposed inside the head opening 11h. Accordingly, when the first and second shutters 21 and 22 are fully opened, the head of the disc drive can access the disc 100 easily and is not interfered with by the rotational member 25.

Also, as shown in FIGS. 109 and 110, even when the first and second shutters 21 and 22 are opened, the protrusions 35 and 36 of the first and second shutters 21 and 22 are still in contact with the non-signal recording area 100e on the signal recording side 100A of the disc 100. Thus, the signal recording area will not get scratched by the protrusions 35 and 36.

To close the shutters 21 and 22, the respective members should be moved in the opposite directions. That is to say, as the first and second shutters 21 and 22 are closed, the disc holders 21b, 22a and 22b are getting closer to the disc 100 and eventually hold the disc 100 thereon. These operations have already been described in detail for the eighth through thirteenth preferred embodiments, and the description thereof will be omitted herein.

Figure 111:
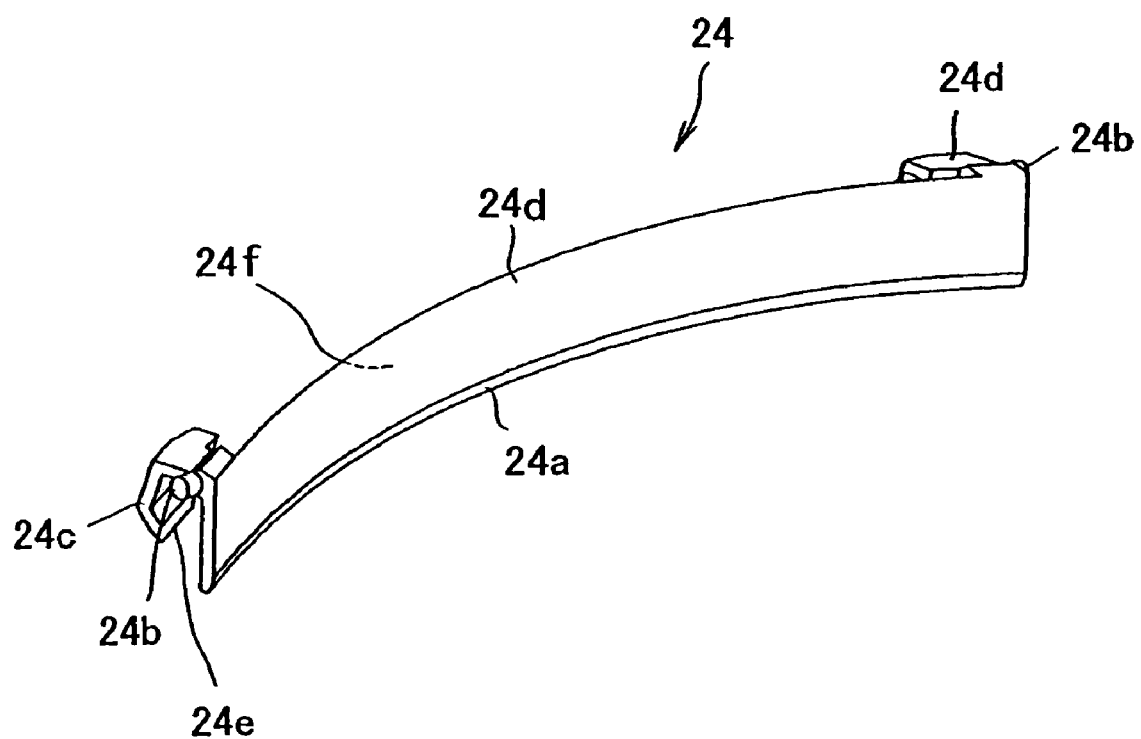
FIG. 111 is a perspective view illustrating the shielding member of the disc cartridge shown in FIG. 104.

Next, the structure and operation of the shielding member 24 will be described. As shown in FIG. 111, the shielding member 24 includes a sidewall 24d and a pair of shafts 24b provided at the ends of the sidewall 24d. At the bottom of the sidewall 24d, a first contacting portion 24a is provided. The first contacting portion 24a needs to contact with the outer side surface of the disc 100 and has a curved surface having the same radius of curvature as the outer side surface of the disc 100. The backside of the sidewall 24d is a second contacting portion 24f. An arm 24c is provided near each of the shafts 24b and has a third contacting portion 24e at the end thereof.

Figure 112:
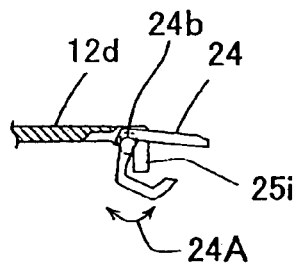
FIG. 112 is a cross-sectional view illustrating how the shielding member shown in FIG. 111 is supported by the upper shell.

As shown in FIG. 112, the shielding member 24 is disposed at such a position that the shaft 24b thereof is located between the upper surface 12d of the upper shell 12 and the sidewall 25i of the rotational member 25. As indicated by the arrow 24A, the shielding member 24 can swing on the shaft 24b. A line that connects the respective centers of the shafts 24b together is parallel to a tangent line defined with respect to the disc 100 and is located at a vertical level higher than the first side 100B of the disc 100.

Figure 113:
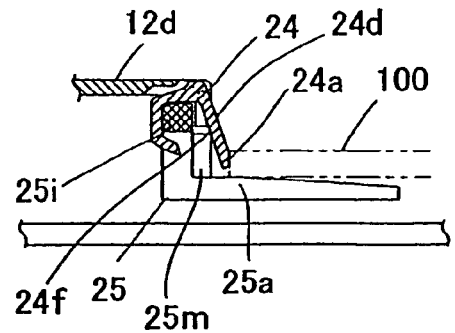
FIG. 113 is a cross-sectional view illustrating the end of the shielding member in a state where the shutters are closed.
Figure 114:
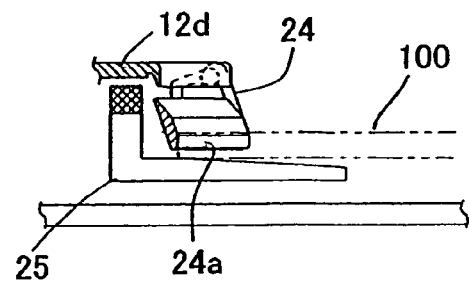
FIG. 114 is a cross-sectional view illustrating the center of the shielding member in a state where the shutters are closed.

FIGS. 113 and 114 illustrate cross sections of the shielding member 24 at one end and the center thereof while the first and second shutters 21 and 22 are closed. As shown in FIGS. 113 and 114, the sidewall 24d is pressed toward the center of the disc 100 so that the convex portion 25m of the rotational member 25 contacts with the second contacting portion 24f of the shielding member 24 and that the first contacting portion 24a contacts with the outer side surface of the disc 100. Thus, no dust or dirt will reach the signal recording side 100A of the disc 100 by way of the notch 25c of the disc supporting portion 25a (see FIG. 104). In this manner, the disc supporting portion 25a and the shielding member 24 are in contact with the outer periphery of the disc 100 continuously, thereby preventing the dust or dirt from reaching the signal recording side 100A.

As the rotational member 25 is rotated to open the first and second shutters 21 and 22, the convex portion 25m of the rotational member 25 goes away from the shielding member 24. As a result, no force is applied to the shielding member 24 toward the disc 100 anymore.

Figure 115:
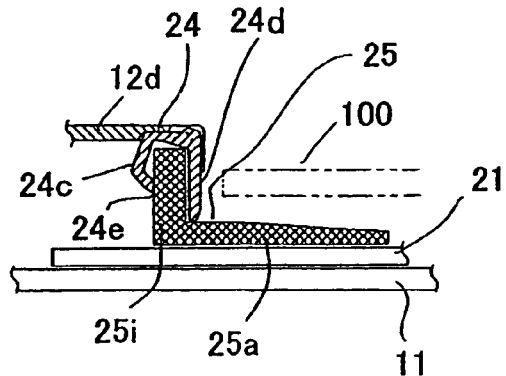
FIG. 115 is a cross-sectional view illustrating the end of the shielding member in a state where the shutters are opened.
Figure 116:
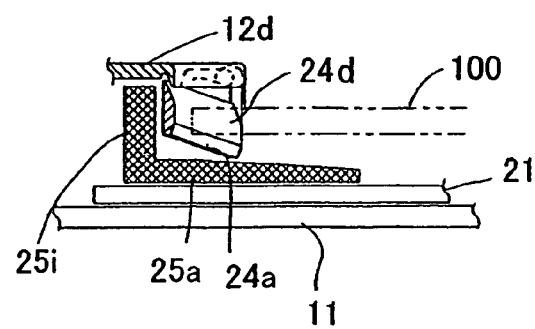
FIG. 116 is a cross-sectional view illustrating the center of the shielding member in a state where the shutters are opened.

As the first and second shutters 21 and 22 are further opened and as the rotational member 25 is further rotated, the outer side surface of the sidewall 25i of the rotational member 25 will soon contact with the third contacting portion 24e of the shielding member 24, thereby pressing the sidewall 24d outward. FIGS. 115 and 116 illustrate cross sections of the shielding member 24 at one end and the center thereof. As shown in FIG. 115, the outer side surface of the disc 100 has been out of contact with the first contacting portion 24a of the shielding member 24. As a result, the disc 100 is now rotatable inside the disc storage portion.

In this manner, the shielding member 24 swings as the rotational member 25 is rotated, thereby alternately coming into contact with the outer side surface of the disc 100 and out of contact with the outer side surface of the disc 100 to allow the disc 100 to rotate freely.

As described above, in this preferred embodiment, the label side 100B of the disc 100 is displayed inside the disc cartridge 320. Thus, the disc cartridge 320 can have a good design and a reduced thickness.

In addition, the first and second shutters 21 and 22 can be opened and closed by rotating the rotational member 25. While the shutters 21 and 22 are closed, the disc 100 can be held firmly by the disc holders 21b, 22a and 22b.

Furthermore, while the disc 100 is held inside the disc storage portion, the label side 100B of the disc 100 is exposed. Even so, the disc supporting portion 25a of the rotational member 25, the protrusions 21w and 22w of the first and second shutters 21 and 22, and the shielding member 24 interlocked with the rotational member 25 together protect the signal recording side 100A of the disc 100 from dust, dirt or scratches.

In the twentieth preferred embodiment described above, the opening 11r is provided on one side surface of the lower shell 11 so that the opener/closer 25j for use to rotate the rotational member 25 is operated on the side surface that is adjacent to another side surface thereof including the head opening 11h. Alternatively, the opener/closer 25j may be provided on any other side surface of the cartridge body 10. As another alternative, a plurality of opener/closers may be provided as well. For example, the opener/closer 25j of the preferred embodiment described above may be used as a first opener/closer and a protrusion may be provided as a second opener/closer for the sidewall 25i of the rotational member 25 so as to be located inside the head opening 11h. Optionally, as shown in FIG. 105, a protrusion 49 may be provided as a second opener/closer near the disc holder 22a of the second shutter 22 so that the second shutter 22 can be operated directly. In that case, as the second shutter 22 is moved, the rotational member 25 rotates, thereby moving the first shutter 21 synchronously.

In the twentieth preferred embodiment described above, the shielding member 24 prevents dust from reaching the signal recording side 100A of the disc 100 by way of the notch 25c of the disc supporting portion 25a. Alternatively, any other structure may be used to prevent dust from entering the disc cartridge 320 through the notch 25c.

Figure 117:
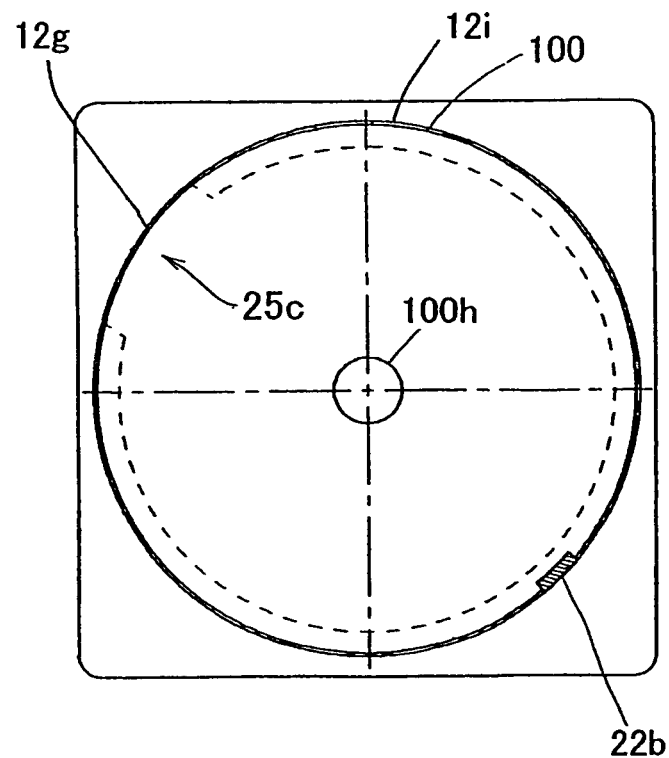
FIG. 117 is a schematic plan view illustrating a modified example of the disc cartridge shown in FIG. 104.
Figure 118:
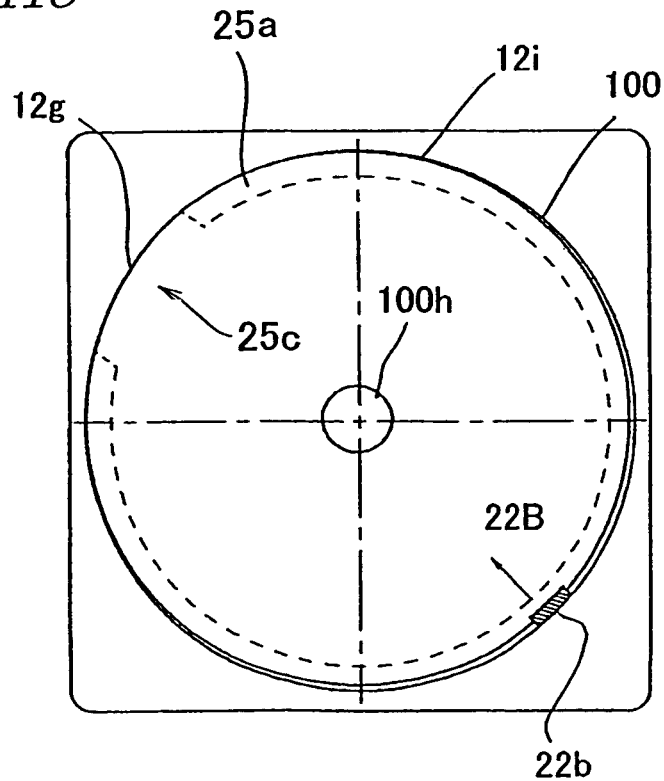
FIG. 118 is a schematic plan view illustrating another modified example of the disc cartridge shown in FIG. 104.

For example, as schematically illustrated in FIG. 117, the notch 12g of the inner side surface 12i of the cartridge body 10 may be closed up by extending the inner side surface 12i, and the disc holder 22b of the second shutter 22 (not shown) may be disposed at a position that is symmetrical to the notch 12g with respect to the center of the disc 100. Just like the disc holder of the thirteenth preferred embodiment described above, the disc holder 22b needs to be movable toward the center of the disc 100 and an elastic force needs to be applied to the disc holder 22b toward the center of the disc 100, too. As another alternative, as in the disc holder of the nineteenth preferred embodiment described above, an elastic member may be provided for a portion of the disc holder 22b that contacts with the disc 100 so that the elastic force applied therefrom presses the disc 100 toward the center thereof as shown in FIG. 118.

Specifically, such a disc holder 22b contacts with the disc 100 and holds it thereon, thereby pressing the outer side surface of the disc 100 toward the notch 25c of the inner side surface 12i of the cartridge body 10. The sizes of the disc storage portion and the disc 100 are almost equal to each other. Accordingly, the radius of curvature of the inner side surface 12i is approximately equal to that of the outer side surface of the disc 100. As a result, the outer side surface of the disc 100 closely contact with the inner side surface 12i of the cartridge body 10. Thus, the inner side surface 12i and the disc supporting portion 25a together prevent dust from reaching the signal recording side 100A of the disc 100.

Such a structure needs no shielding member 24, thus simplifying the structure of the disc cartridge.

EMBODIMENT 21

Figure 120:
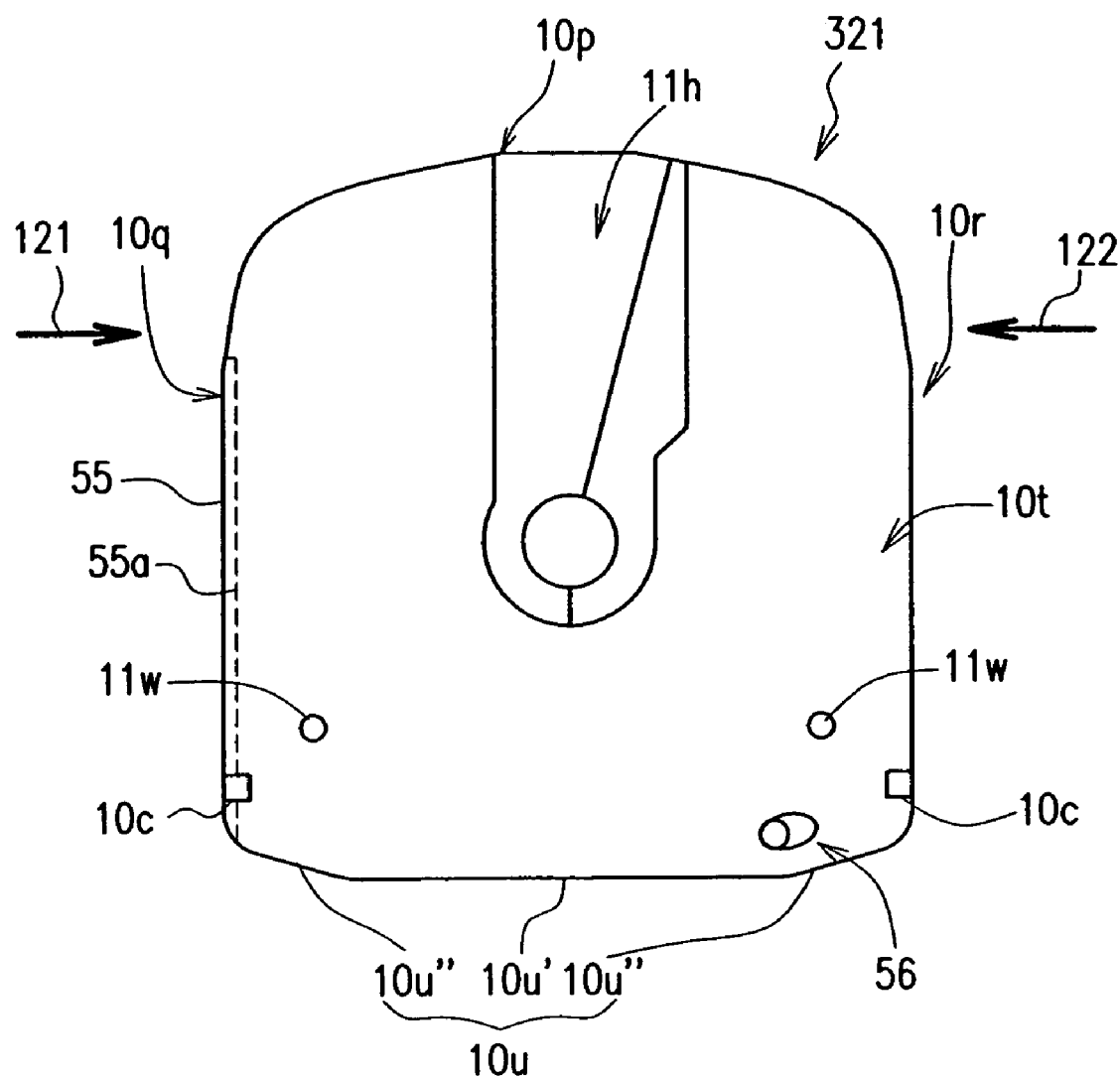
Figure 121:
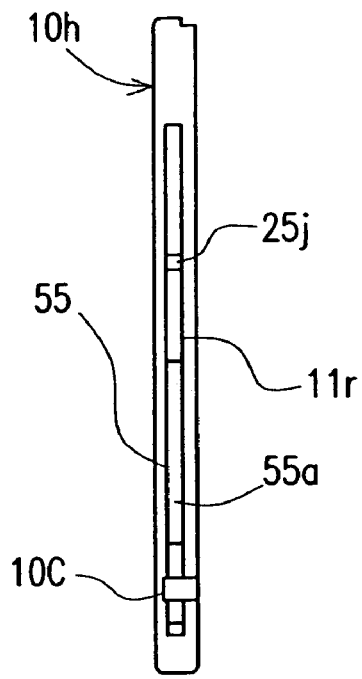
Figure 122:
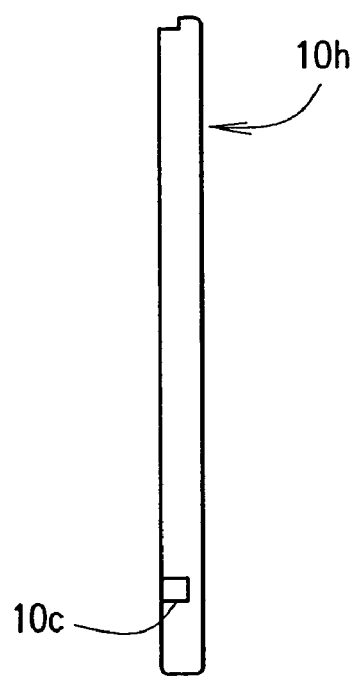

Hereinafter, a disc cartridge according to a twenty-first specific preferred embodiment of the present invention will be described. FIG. 120 is a plan view illustrating the back surface of the disc cartridge 321 of this preferred embodiment. FIGS. 121 and 122 are side views of the disc cartridge 321 as viewed in the directions indicated by the arrows 121 and 122, respectively. Although not shown clearly in FIG. 120, the disc cartridge 321 also includes a rotational member 25, a shielding member 24, a first shutter 21, a second shutter 22 and a disc stopper 23, each of which may have the same structure as the counterpart of the disc cartridge 320 of the twentieth preferred embodiment described above. Since the functions of these members have already been described for the twentieth preferred embodiment, the description thereof will be omitted herein.

As shown in FIGS. 120, 121 and 122, the disc cartridge 321 includes a groove 55 and a pair of concave portions 10c, which are provided on two side surfaces of the cartridge body 10 thereof. The disc cartridge 321 further includes a write-protect mechanism 56 near another side surface of the cartridge body 10, which is opposed to a third side surface thereof with the head opening 11h. Hereinafter, these members will be described in detail.

As shown in FIG. 120, the cartridge body 10 of the disc cartridge 321 includes: two side surfaces 10q and 10r that are parallel to each other; a side surface 10p with the head opening 11h; and a side surface 10u that is opposed to the side surface 10p. In this preferred embodiment, the four corners of the cartridge body 10 are all rounded. Accordingly, there are no edges that definitely divide the four side surfaces. For example, there is no clearly defined boundary between the side surfaces 10p and 10q. However, a boundary between two adjacent side surfaces is herein supposed to exist near a rounded corner. More specifically, the side surface 10u includes: a center portion 10u' that crosses the side surfaces 10q and 10r substantially at right angles; and two sloped portions 10u" that define a predetermined tilt angle with the center portion 10u'.

As shown in FIGS. 120 and 121, the groove 55 is provided on the side surface 10q, through which the opener/closer 25j of the rotational member 25 protrudes, and extends almost along the length of the side surface 10q. The bottom 55a of the groove 55 includes an opening 11r that is provided for the side surface 10q. The opening 11r defines a region in which the opener/closer 25j moves to open or close the shutters 21 and 22. The opener/closer 25j protrudes through the groove 55 and engages with the shutter opening/closing mechanism of the disc drive. Thus, as the shutter opening/closing mechanism slides along the groove 55, the shutters 21 and 22 can open or close.

The concave portions 10c are provided for the two opposed side surfaces 10q and 10r and are located near the side surface 10u. The concave portions 10c pass through the back surface 10t of the cartridge body 10 but do not reach the upper surface 10h of the cartridge body 10. As shown in FIG. 121, the concave portion 10c of the side surface 10q is provided so as to divide the groove 55 into two.

While the disc cartridge 321 is being loaded into a changer, the concave portions 10c get engaged with roller-like or tab-like gripping structures, which are provided in such a manner as to sandwich the disc cartridge 321 between them. In this preferred embodiment, the concave portions 10c on the side surfaces 10q and 10r have the same shape. Alternatively, the concave portion 10c on the side surface 10r may have a different shape from the concave portion 10c on the other side surface 10q. If the two concave portions 10c have mutually different shapes, then the gripping structures of the disc drive can engage with the disc cartridge 321 only when the disc cartridge 321 is inserted correctly (i.e., with upside up and downside down).

Figure 123:
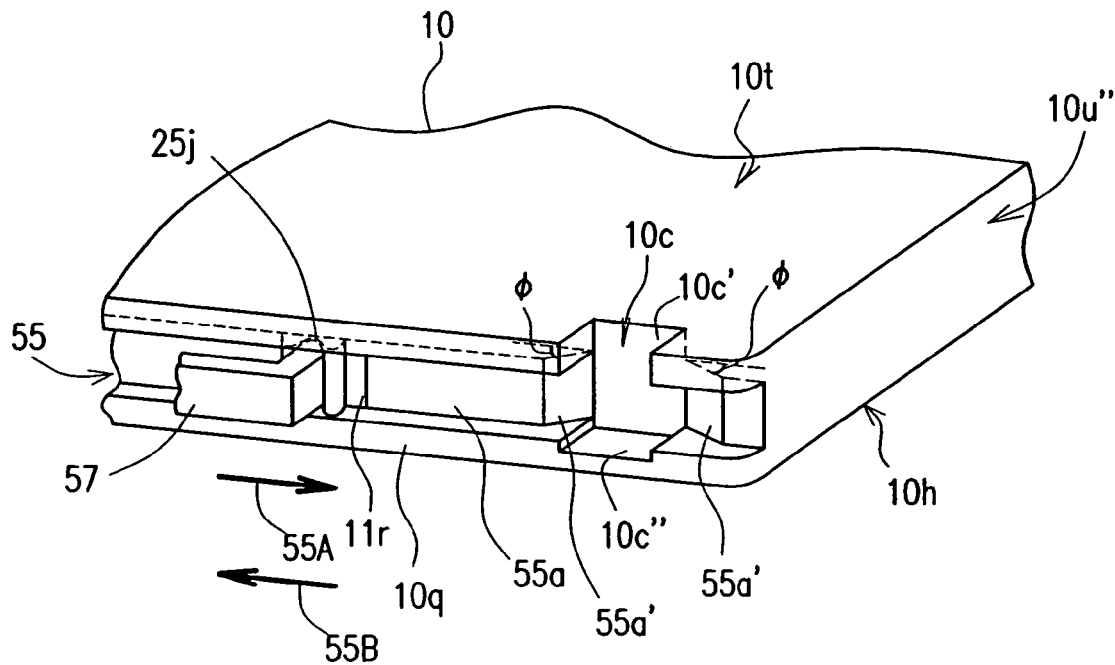

FIG. 123 illustrates the structure of a portion of the disc cartridge 321 near the concave portion 10c on the side surface 10q of the cartridge body 10. As shown in FIG. 123, the concave portion 10c is deeper than the groove 55 as measured from the side surface 10q. That is to say, the distance from the side surface 10q to the bottom 10c' of the concave portion 10c is greater than the distance from the side surface 10q to the bottom 55a of the groove 55. To create no steps between the bottoms 55a and 10c', a sloped portion 55a' is provided between the bottom 55a of the groove 55 and the bottom 10c' of the concave portion 10c. The angle $\phi$ defined by the sloped portion 55a' with the bottom 10c' of the concave portion 10c is preferably about 20 degrees to about 40 degrees, more preferably about 30 degrees. The reason is as follows. Specifically, if the angle $\phi$ defined by the sloped portion 55a' with the bottom 10c' of the concave portion 10c is over about 40 degrees, then the end of the shutter opening/closing mechanism 57 will get stuck in the concave portion 10c and will not move easily. On the other hand, if the angle $\phi$ defined by the sloped portion 55a' with the bottom 10c' of the concave portion 10c is under about 20 degrees, then the sloped portion 55a' might be too long to be located between the concave portion 10c and the opening 11r. Also, the side surface 10c" of the concave portion 10c is closer to the upper surface 10h of the cartridge body 10 than the side surface of the groove 55.

Next, it will be described how the shutter opening/closing mechanism 57 slides along the groove 55. After the disc cartridge 321 has been loaded into the disc drive or while the disc cartridge 321 is being loaded into the disc drive, the shutter opening/closing mechanism 57 of the disc drive engages with the groove 55 of the disc cartridge 321. Then, the shutter opening/closing mechanism 57 moves along the groove 55 in the direction indicated by the arrow 55A while pressing its end against the bottom 55a of the groove 55. Once the end of the shutter opening/closing mechanism 57 has interlocked with the opener/closer 25j, the opener/closer 25j also moves as the shutter opening/closing mechanism 57 moves. In this manner, the shutters 21 and 22 are opened. When the shutters 21 and 22 are fully opened, the opener/closer 25j reaches the end of the opening 11r and cannot advance in the direction 55A any farther. Thus, the end of the shutter opening/closing mechanism 57 disengages itself from the opener/closer 25j.

If the shutter opening/closing mechanism 57 further keeps going in the same direction 55A after that, the end of the shutter opening/closing mechanism 57 will be pressed against the sloped portion 55a' of the groove 55 and come into contact with the bottom 10c' of the concave portion 10c and then the second sloped portion 55a' adjacent to the side surface 10u. Thereafter, the shutter opening/closing mechanism 57 finally leaves the groove 55. As described above, the sloped portions 55a' are provided so as to define a predetermined angle with the bottom 10c' of the concave portion 10c. Accordingly, the shutter opening/closing mechanism 57 can move smoothly between the bottom 55a of the groove 55 and the bottom 10c' of the concave portion 10c, which are located at mutually different depths as measured from the side surface 10q.

If the user commands the disc drive to unload (or eject) the disc cartridge 321, then the shutters 21 and 22 are closed by the opposite operations before the disc cartridge 321 starts to be unloaded or while the disc cartridge 321 is being unloaded. Specifically, the shutter opening/closing mechanism 57 gets engaged with the groove 55 of the cartridge body 10 by way of the side surface 10u thereof and moves along the groove 55 in the direction indicated by the arrow 55B while pressing its end against the bottom 55a of the groove 55. That is to say, the end of the shutter opening/closing mechanism 57 moves while contacting with the second sloped portion 55a' of the groove 55, the bottom 10c' of the concave portion 10c and then the first sloped portion 55a' of the groove 55. Thereafter, the end of the shutter opening/closing mechanism 57 soon interlocks with the opener/closer 25j while sliding on the bottom 55a of the groove 55. Once the end of the shutter opening/closing mechanism 57 has interlocked with the opener/closer 25j, the opener/closer 25j moves in the same direction 55B as the shutter opening/closing mechanism 57. In this manner, the shutters 21 and 22 are closed. When the shutters 21 and 22 are fully closed, the opener/closer 25j reaches the end of the opening 11r and cannot advance in the same direction 55B any farther. Thus, the end of the shutter opening/closing mechanism 57 disengages itself from the opener/closer 25j. Thereafter, the shutter opening/closing mechanism 57 leaves the groove 55.

In the disc cartridge 321 with such a structure, no steps are formed between the bottom 10c' of the concave portion 10c and the bottom 55a of the groove 55. Thus, the shutter opening/closing mechanism 57 can slide along the groove 55 smoothly because the end of the shutter opening/closing mechanism 57 will not be caught in the concave portion 10c. Accordingly, there is no need to accurately define the sliding range of the shutter opening/closing mechanism 57 (e.g., such that the shutter opening/closing mechanism 57 will not go as far as the concave portion 10c). Thus, the movement of the shutter opening/closing mechanism 57 can be controlled more easily and/or no additional control mechanism, which is sometimes required to control the movement of the shutter opening/closing mechanism 57 accurately, is needed anymore.

On the other hand, the bottom 10c' of the concave portion 10c is deeper than the bottom 55a of the groove 55 as described above. Also, the side surface 10c" of the concave portion 10c is located closer to the upper surface 10h of the cartridge body 10 than the side surface of the groove 55. Thus, the concave portion 10c can engage with the gripping structure of the changer in an increased area. In other words, the gripping structure of the changer can grip the disc cartridge 321 by the concave portions 10c just as intended. As a result, loading errors can be reduced significantly. That is to say, the gripping structure of the changer almost never fails to grip the disc cartridge 321 and rarely drops the disc cartridge 321 during the loading operation.

Also, the concave portion 10c passes through the back surface 10t of the cartridge body 10 but does not reach the upper surface 10h thereof. Accordingly, if a tray is provided for the disc drive to insert and eject the disc cartridge 321 into/from the disc drive by getting its protrusions engaged with, and disengaged from, the concave portions 10c, the disc cartridge 321 mounted upside down on the tray cannot be loaded into the disc drive. This is because the protrusions on the tray do not engage with the upper surface 10h of the disc cartridge 321. In this manner, the concave portions 10c can be used as means for distinguishing the recto and verso of the disc cartridge 321.

In the cartridge body 10 of this disc cartridge 321 in particular, the groove 55 is provided near the disc storage portion thereof, and cannot be so deep. However, when the concave portion 10c is simply added to compensate for the insufficient depth of the groove 55, a dead space is left inside the concave portion 10c. Accordingly, by providing the sloped portions 55a' for the bottom 55a of the groove 55, the concave portion 10c can increase its depth appropriately according to the specific shape of the gripping structure without allowing the shutter opening/closing mechanism 57 to be locked onto the steps between the bottom 55a of the groove 55 and the bottom 10c' of the concave portion 10c.

In the preferred embodiment described above, the concave portion 10c is provided on the side surface 10q in such a manner as to divide the groove 55 into two. Alternatively, the concave portion 10c may be located at the end of the groove 55 as long as the concave portion 10c is continuous with the groove 55. In that case, the sloped portion 55a' is provided at the connection between the groove 55 and the concave portion 10c.

Figure 124:
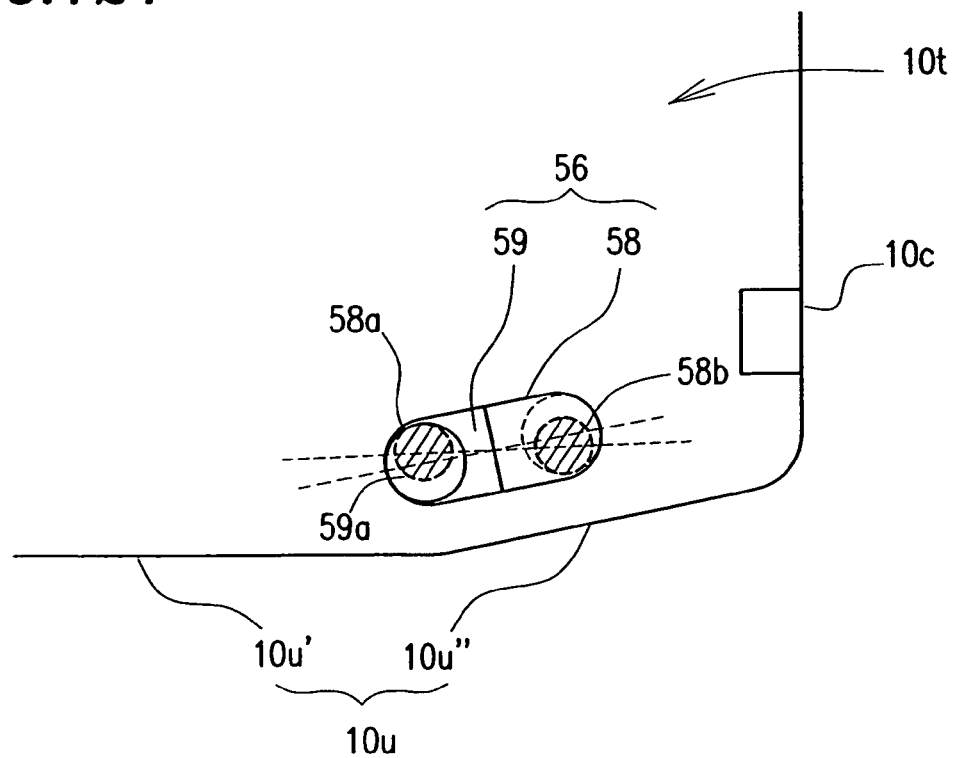

Next, the write-protect mechanism 56 will be described. As shown in FIG. 124, the write-protect mechanism 56 includes: an elongated hole 58, which is provided on the back surface 10t of the cartridge body 10; and a sliding member 59 with a raised portion 59a that protrudes through the elongated hole 58. The elongated hole 58 extends parallelly to the sloped portion 10u" of the side surface 10u of the cartridge body 10, and includes a first circular decision region 58a and a second circular decision region 58b. The raised portion 59a has a flat circular top, which is parallel to the back surface 10t of the cartridge body 10 and which is larger in diameter than the first or second decision region 58a or 58b. The elongated hole 58 has a shape corresponding to the trace of the raised portion 59a moving.

The first decision region 58a and the second decision region 58b of the disc cartridge 321 correspond to first and second decision regions of another type of disc cartridge according to a different set of specifications, if the disc cartridge 321 is overlapped with another type of disc cartridge, such that the center of the disc stored in the disc cartridge 321 matches with that of the disc stored in the DVD-RAM disc cartridge and that the insert directions of these two disc cartridges are matched with each other (i.e., front sides of the two disc cartridges face the same direction). In another type of disc cartridge, the first decision region is used to determine whether the disc stored therein is writable or unwritable. For example, the disc may be unwritable when the first decision region is open but may be writable when the first decision region is closed.

The second decision region of another type of disc cartridge is used to read the disc information that is uniquely defined according to its specifications. Specifically, in the case where another type of disc cartridge is a DVD-RAM disc cartridge, the DVD-RAM disc cartridge is designed in such a manner as to be insertable into a disc drive either upside up or upside down. Also, the DVD-RAM disc cartridge accepts both single-sided discs and double-sided discs. Accordingly, the second decision region is used to determine whether the side of the disc that faces this region is the signal recording side or not. For example, if the second decision region is open, the side of the disc facing this region is a non-active side, or not a signal recording side. On the other hand, if the second decision region is closed, the side of the disc facing this region is an active side, i.e., a signal recording side.

As shown in FIG. 124, the first and second decision regions 58a and 58b are arranged vertically to the inserting direction of the disc cartridge 321 (i.e., parallelly to the center portion 10u' of the side surface 10u). Accordingly, the direction in which the elongated hole 58 extends is not parallel to, but intersects with, the direction in which the first and second decision regions 58a and 58b are arranged.

However, when the sliding member 59 is located at such a position that the raised portion 59a thereof is in contact with one end of the elongated hole 58, the raised portion 59a covers the first decision region 58a of the elongated hole 58 almost entirely as indicated by the bold circle in FIG. 124. On the other hand, when the sliding member 59 is located at such a position that the raised portion 59a thereof is in contact with the other end of the elongated hole 58, the raised portion 59a covers the second decision region 58b of the elongated hole 58 almost entirely as indicated by the dashed circle in FIG. 124.

Figure 125:
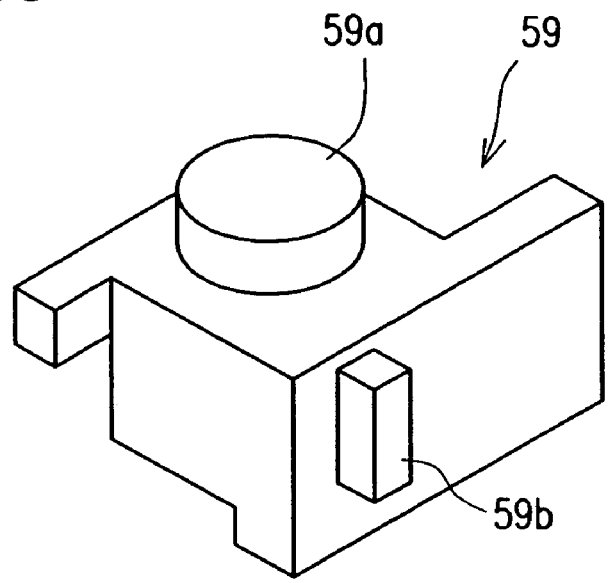
Figure 125:
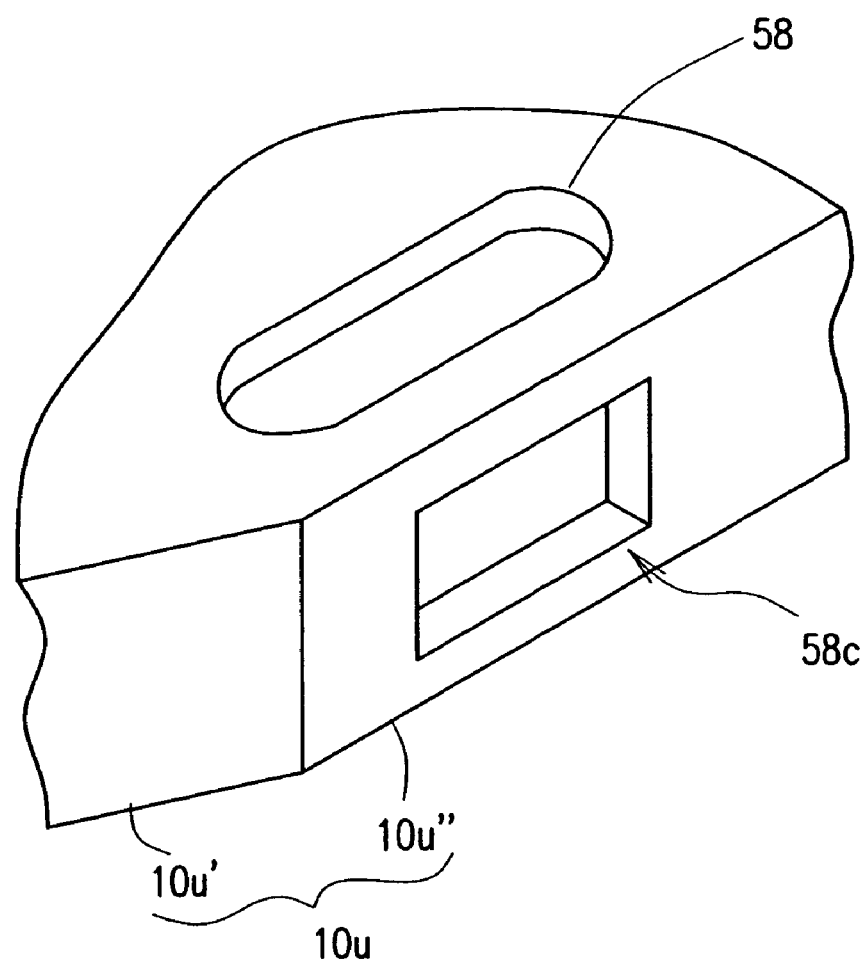
Figure 126:
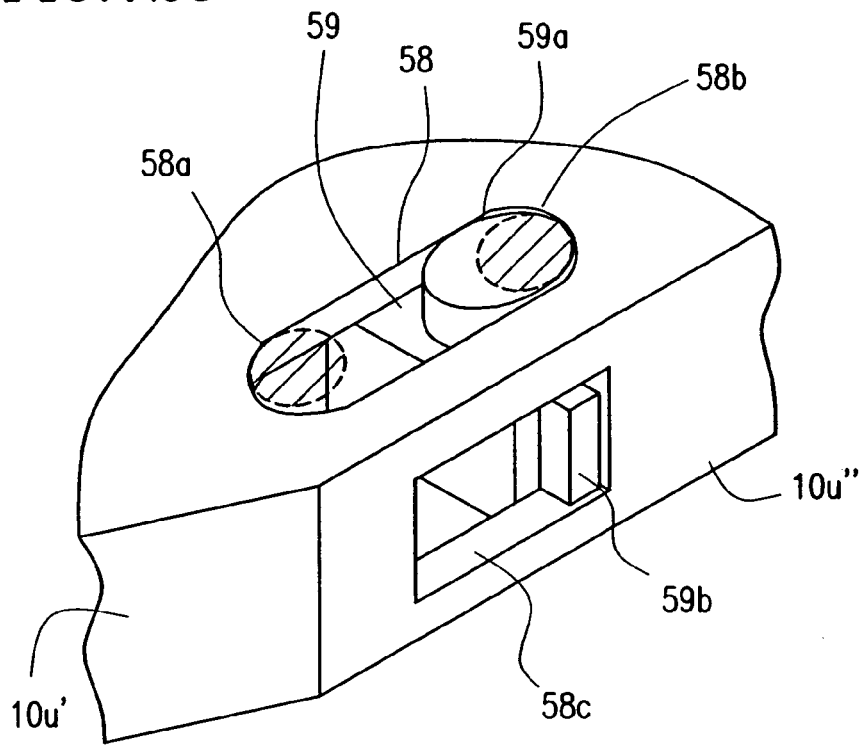
Figure 127:
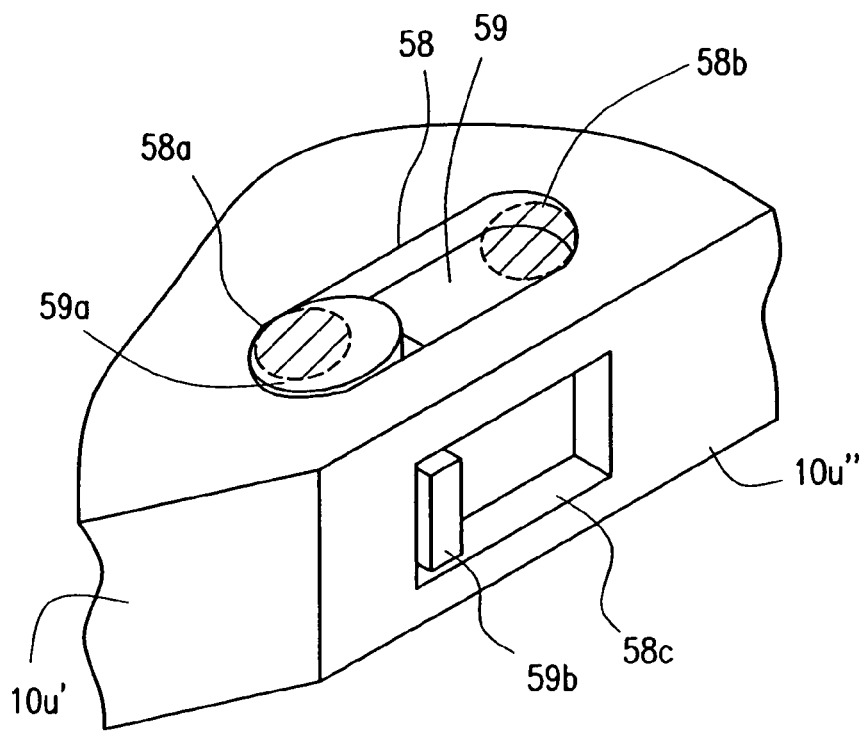

FIG. 125 is an exploded perspective view of the write-protect mechanism 56. As shown in FIG. 125, the sliding member 59 includes the cylindrical raised portion 59a and a lever 59b. The lever 59b is inserted into the opening 58c of the sloped portion 10u" of the side surface 10u and used to slide the sliding member 59. By moving the lever 59b in one direction, the first decision region 58a of the elongated hole 58 may be opened while the second decision region 58b thereof may be closed as shown in FIG. 126. Conversely, the first decision region 58a of the elongated hole 58 may be closed and the second decision region 58b thereof may be opened as shown in FIG. 127 by moving the lever 59b in the opposite direction.

In this manner, if the sliding member 59 is slid in either direction by operating the lever 59b, the first decision region 58a of the disc cartridge 321 can be selectively opened or closed. Accordingly, if the disc drive, accepting both the disc cartridge 321 and another type of disc cart-ridge, for example, includes a first sensor switch that senses the loaded disc as either writable or unwritable by checking out the state of the first decision region of another type of disc cartridge, the disc drive can also sense the disc in the disc cartridge 321 as writable or unwritable. That is to say, the single sensor switch of the same disc drive can detect the specific status of the disc that is stored in either of the two different types of disc cartridges. In this manner, the disc drive can detect the write protect state by a much simplified mechanism and can be manufactured at a significantly reduced cost.

On the other hand, if the disc drive includes a second sensor switch to detect the state of the second decision region of another type of disc cartridge, the second sensor switch may also check out the state of the second decision region 58*b* of the elongated hole 58 in the disc cartridge 321. In that case, the second sensor switch detects either contact with the raised portion 59*a* as shown in FIG. 126 or no contact with the raised portion 59*a* but an opening as shown in FIG. 127. Thus, the second sensor switch will not contact with, or be damaged by, any other member of the disc cartridge 321. Furthermore, when the disc cartridge 321 is loaded into the disc drive, the result obtained by the second sensor switch may be used to sense the type of the disc cartridge loaded or the disc stored therein.

In the first through nineteenth preferred embodiments described above, a nonwoven fabric is ultrasonic welded or adhered to the shutters. However, if the disc has some anti-scratching structure (e.g., if the signal recording side of the disc is covered with a stiff hard coating), then the nonwoven fabric does not have to be attached thereto, but the shutters may directly contact with the disc. Also, not the entire surface of the shutters has to contact with the signal recording side of the disc, but the shutters may have such a structure that at least portion of the shutters contacts with the signal recording side of the disc. That is to say, not the entire surface but just a portion of the surface of the shutters may be in contact with the disc. In that case, some anti-scratching structure (e.g., a nonwoven fabric) may be provided for only that portion contacting with the disc.

In the first through twenty-first preferred embodiments of the present invention described above, the disc 100 to be stored in the disc cartridge has just one signal recording side 100A. However, a single-sided disc like this is used for illustrative purposes only. This is because the disc cartridge of the present invention has such a structure as to expose one side of the disc stored therein and because a single-sided disc is best suited to the disc cartridge of that type. Thus, even a disc having two signal recording sides (i.e., a double-sided disc) may be appropriately stored in the disc cartridge of the present invention and may be loaded into a disc drive to read or write a signal therefrom/thereon. It should be noted, however, that where a double-sided disc is stored in the disc cartridge of the present invention, dust may be deposited on the exposed one of the two signal recording sides. Accordingly, in that case, some mechanism for preventing the unwanted dust deposition should be provided for the disc cartridge.

Also, in the first through twenty-first preferred embodiments described above, the size of the disc 100 is not particularly specified. This is because the disc cartridge of the present invention may accommodate a disc having a size of 12 cm or any of various other sizes.

Furthermore, in the first through twenty-first preferred embodiments described above, the disc cartridge is illustrated as having an outer dimension that is slightly greater than the size of the disc. However, the size relationship between the disc and the disc cartridge is not limited to the illustrated one. For example, even when the disc cartridge has an outer dimension that is large enough to store a 12 cm disc therein, the disc storage portion and the disc holders of the disc cartridge may have their sizes and structures defined in such a manner as to store an 8 cm disc. Such a disc cartridge may be used as an adapter for getting read and write operations performed on an 8 cm disc by a disc drive for a 12 cm disc.

The various features of the present invention as described for the first through twenty-first preferred embodiments may be combined appropriately. For example, the rotation stoppers as described for the nineteenth preferred embodiment may be provided for the disc cartridge of the sixteenth preferred embodiment. Also, the recesses for use to collect dust therein as described for the fifteenth preferred embodiment may be provided for the disc cartridge of the sixteenth preferred embodiment. As can be seen, the first through twenty-first preferred embodiments of the present invention may be modified or combined in numerous other ways and not all of those possible combinations or alternatives have been described herein. However, it is quite possible for those skilled in the art to conceive and carry out those various alternatives or combinations by reference to the description of the present application. Thus, it is intended by the appended claims to cover all of those modifications or combinations of the present invention that fall within the true spirit and scope of the present invention.

INDUSTRIAL APPLICABILITY

A disc cartridge according to any of various preferred embodiments of the present invention described above can be used particularly effectively to store a disc having only one signal recording side. The cartridge body of the disc cartridge has such a structure as to cover only the signal recording side of the disc and expose the other side thereof. Thus, the disc cartridge can have a reduced thickness. Also, the shutters of the disc cartridge are formed in such a shape as to cover the openings on just one side of the disc cartridge. Accordingly, the shutters can have a simplified structure and can be formed at a lower cost. In addition, the disc holders of the disc cartridge hold a disc thereon by pressing the disc against the shutters or the cartridge body. Thus, the disc will not move inconstantly inside the cartridge body and no dust will be deposited on the signal recording side of the disc. Furthermore, since the label side of the disc is displayed inside the disc window, the disc cartridge can also have a good design.

Thus, the present invention provides a thinner and highly dustproof disc cartridge of a good design that is applicable for use in various types of disc drives.

It should be understood that the foregoing description is only illustrative of the invention. Various alternatives and modifictions can be devised by those skilled in the art without departing from the invention. Accordingly, the present invention is intended to embrace all such alternatives, modifications and variances which fall within the scope of the appended claims.

The invention claimed is:

1. A disc cartridge comprising:
 a cartridge body including a disc storage portion, a chucking opening and a head opening, wherein the disc storage portion has a disc window and a bottom and stores a disc, having first and second sides, therein so that the disc is rotatable in the disc storage portion and that the disc exposes the first side inside the disc window; the chucking opening is provided on the bottom of the disc storage portion so as to get the disc chucked externally; and the head opening is also provided on the bottom of the disc storage portion so as to allow a head, which reads and/or writes a signal from/on the second side of the disc, to access the second side of the disc;

a first shutter and a second shutter, which are provided on the bottom of the disc storage portion to expose or cover the head opening;

a groove, which is provided on, and extends along, a first side surface of the cartridge body;

an opener/closer, which protrudes through the bottom of the groove and which moves along the groove, thereby opening or closing the first and second shutters;

a first concave portion, which is provided on the first side surface of the cartridge body; and a second concave portion, which is provided on a second side surface of the cartridge body, the second side surface being opposed to the first side surface, wherein the first concave portion is continuous with the groove on the first side surface and has a bottom that is deeper than the bottom of the groove, and wherein the bottom of the first concave portion and the bottom of the groove are connected together by a sloped surface that defines a predetermined angle with the bottom of the first concave portion.

2. The disc cartridge of claim 1, wherein the first concave portion passes through the back surface of the cartridge body but does not reach the upper surface of the cartridge body.

3. The disc cartridge of claim 2, wherein a side surface of the first concave portion, which crosses the bottom of the first concave portion, is located closer to the upper surface of the cartridge body than a side surface of the groove, which crosses the bottom of the groove.

4. The disc cartridge of claim 2, wherein the predetermined angle that is defined by the sloped surface with the bottom of the first concave portion is in the range of about 20 degrees to about 40 degrees.

* * * * *